(12) United States Patent
Klughart

(10) Patent No.: US 9,164,946 B2
(45) Date of Patent: Oct. 20, 2015

(54) DATA STORAGE RAID ARCHITECTURE SYSTEM AND METHOD

(71) Applicant: Kevin Mark Klughart, Denton, TX (US)

(72) Inventor: Kevin Mark Klughart, Denton, TX (US)

(*) Notice: Subject to any disclaimer, the term of this patent is extended or adjusted under 35 U.S.C. 154(b) by 0 days.

(21) Appl. No.: 14/685,439

(22) Filed: Apr. 13, 2015

(65) Prior Publication Data

US 2015/0220478 A1 Aug. 6, 2015

Related U.S. Application Data

(63) Continuation of application No. 14/526,855, filed on Oct. 29, 2014, now Pat. No. 9,015,355, and a continuation of application No. 14/317,892, filed on Jun. 27, 2014, now Pat. No. 8,943,227, and a continuation-in-part of application No. 14/314,143, filed on Jun. 25, 2014, now Pat. No. 8,914,549, and a continuation-in-part of application No. 13/200,242, filed on Sep. 21, 2011, now Pat. No. 8,799,523, and a continuation-in-part of application No. 13/200,572, filed on Sep. 25, 2011, now Pat. No. 8,813,165.

(51) Int. Cl.
| | |
|---|---|
| *G06F 3/00* | (2006.01) |
| *H05K 7/10* | (2006.01) |
| *G06F 13/42* | (2006.01) |
| *G06F 13/40* | (2006.01) |
| *G06F 13/28* | (2006.01) |

(52) U.S. Cl.
CPC .......... *G06F 13/4247* (2013.01); *G06F 13/287* (2013.01); *G06F 13/4068* (2013.01); *G06F 13/4234* (2013.01); *G06F 2213/0032* (2013.01); *G06F 2213/28* (2013.01); *G06F 2213/3802* (2013.01)

(58) Field of Classification Search
CPC .... G06F 13/4247; G06F 3/0689; G06F 13/37
USPC .................................................. 710/2, 301, 5
See application file for complete search history.

(56) References Cited

U.S. PATENT DOCUMENTS

| | | |
|---|---|---|
| 4,873,665 A | 10/1989 | Jiang et al. |
| 5,164,613 A | 11/1992 | Mumper et al. |

(Continued)

OTHER PUBLICATIONS

Serial ATA International Organization (specification), Serial ATA Revision 2.5—High Speed Serialized At Attachment; www.sata-io.org; Oct. 27, 2005; USA.

(Continued)

*Primary Examiner* — Ernest Unelus
(74) *Attorney, Agent, or Firm* — Kevin M. Klughart; Carstens & Cahoon, LLP

(57) ABSTRACT

A data storage RAID architecture system and method that daisy-chains multiple SATA disk drive storage elements to allow a single host bus adapter (HBA) to view the daisy-chain as one logical SATA disk drive is disclosed. The system/method may be broadly described as comprising a pass-thru disk drive controller (PTDDC) further comprising a pass-thru input (PTI) port, disk drive interface (DDI) port, and pass-thru output (PTO) port. The PTDDC intercepts and translates PTI port input to the requirements of a SATA disk drive connected to the DDI. Each PTDDC may be daisy-chained to other PTDDCs to permit a plethora of SATA drives to be associated with a given HBA, with the first PTDDC providing a presentation interface to the HBA integrating all SATA disk drive storage connected to the PTDDCs. Rack mounting of PTDDC-enabled SATA disk drives enables creation of inexpensive dynamically expandable petabyte-class RAID storage arrays.

20 Claims, 136 Drawing Sheets

(56) References Cited

U.S. PATENT DOCUMENTS

| | | |
|---|---|---|
| 5,299,156 A | 3/1994 | Jiang et al. |
| 5,363,361 A | 11/1994 | Bakx |
| 5,532,958 A | 7/1996 | Jiang et al. |
| 5,926,602 A | 7/1999 | Okura |
| 6,118,690 A | 9/2000 | Jiang et al. |
| 6,324,338 B1 | 11/2001 | Wood et al. |
| 6,405,239 B1 | 6/2002 | Addington et al. |
| 7,600,070 B1 | 10/2009 | Linnell |
| 7,814,272 B2 | 10/2010 | Barrall et al. |
| 7,814,273 B2 | 10/2010 | Barrall |
| 7,818,531 B2 | 10/2010 | Barrall |
| 7,873,782 B2 | 1/2011 | Terry et al. |
| 7,889,964 B1 | 2/2011 | Barton et al. |
| 8,352,649 B2 | 1/2013 | Liu et al. |
| 2002/0102092 A1 | 8/2002 | Thai |
| 2003/0014762 A1 | 1/2003 | Conover et al. |
| 2003/0063893 A1 | 4/2003 | Read |
| 2005/0195660 A1 | 9/2005 | Kavuri et al. |
| 2006/0036777 A1 | 2/2006 | Innan et al. |
| 2007/0149148 A1 | 6/2007 | Yoshikawa et al. |
| 2007/0266037 A1 | 11/2007 | Terry et al. |
| 2008/0046947 A1 | 2/2008 | Katznelson |
| 2008/0068513 A1 | 3/2008 | Ariyoshi et al. |
| 2008/0162811 A1 | 7/2008 | Steinmetz et al. |
| 2009/0016009 A1 | 1/2009 | Barrall et al. |
| 2009/0036067 A1 | 2/2009 | Rofougaran |
| 2009/0067363 A1 | 3/2009 | Ruiz et al. |
| 2009/0292843 A1 | 11/2009 | Haban et al. |
| 2010/0049919 A1 | 2/2010 | Winokur et al. |
| 2010/0064104 A1 | 3/2010 | Steinmetz et al. |
| 2010/0146206 A1 | 6/2010 | Yochai et al. |
| 2010/0257401 A1 | 10/2010 | Stolowitz |
| 2011/0013882 A1 | 1/2011 | Kusonoki et al. |
| 2011/0035565 A1 | 2/2011 | Barrall |
| 2011/0060773 A1 | 3/2011 | Itoh |
| 2011/0072233 A1 | 3/2011 | Dawkins et al. |
| 2011/0252007 A1 | 10/2011 | Cho et al. |
| 2011/0283150 A1 | 11/2011 | Konishi et al. |
| 2013/0145106 A1 | 6/2013 | Kan |

OTHER PUBLICATIONS

Serial ATA International Organization (specification), Serial ATA Revision 2.6—High Speed Serialized At Attachment; www.sata-io.org; Feb. 15, 2007; USA.

Hitachi Global Storage Technologies (datasheet), Hitachi Deskstar 7K1000 Hard Disk Drive Specification, Models HDS7721010KLA330, HDS7721075KLA330; Rev. 0.1, Jun. 21, 2007; USA.

Serial ATA International Organization (specification), Serial ATA Revision 3.0—High Speed Serialized At Attachment; www.sata-io.org; Jun. 2, 2009; USA.

Hitachi Global Storage Technologies (datasheet), Hitachi Deskstar 7K3000 Hard Disk Drive Specification, Models HDS723020BLA642, HDS723015BLA642; Rev. 1.0, Oct. 28, 2010; USA.

Hitachi Global Storage Technologies (datasheet), Hitachi Deskstar 7K3000 Hard Disk Drive Specification, Models HUA723030ALA640, HUA723020ALA640; Rev. 1.1, Jan. 25, 2011; USA.

Iomega; "Using Iomega StorCenter IX 12-300R with Windows Server 2008 R2 HYPER-V Over iSCSI"; White Paper (online); Iomega Corporation; Mar. 2011; http://download.iomega.com/nas/pdfs/hyperv-overiscsi.pdf.

*Prior Art*

*Prior Art*

*Prior Art*

*Prior Art*

*Prior Art*

*Prior Art*

*Prior Art*

*Prior Art*

*Prior Art*

*Prior Art*

*FIG. 86*
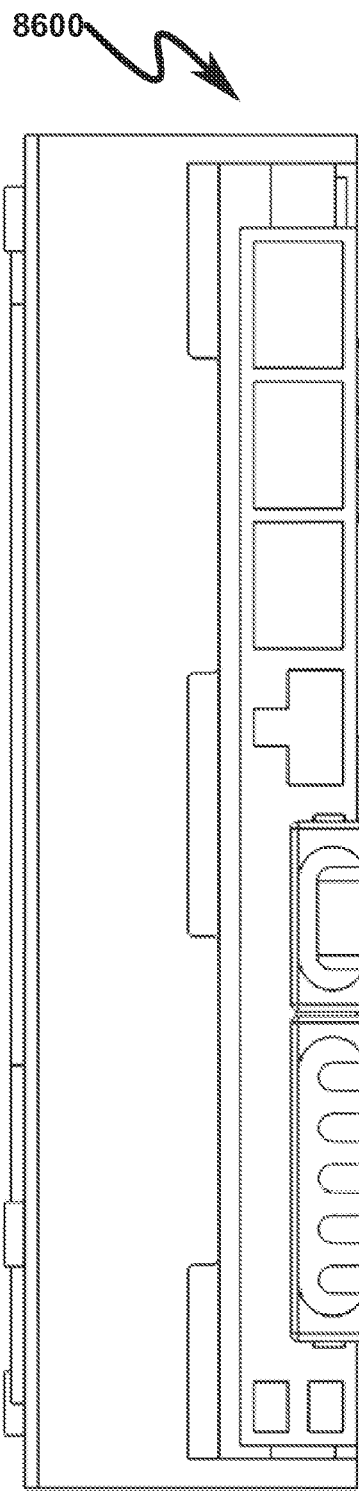
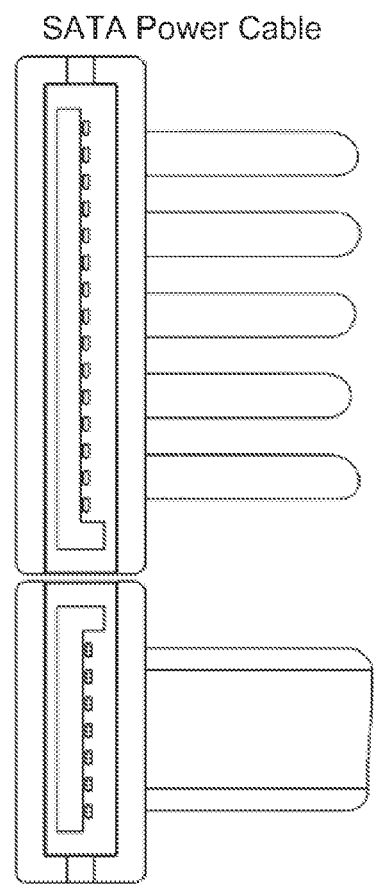
*Prior Art*

*Prior Art*

10300

FIG. 116
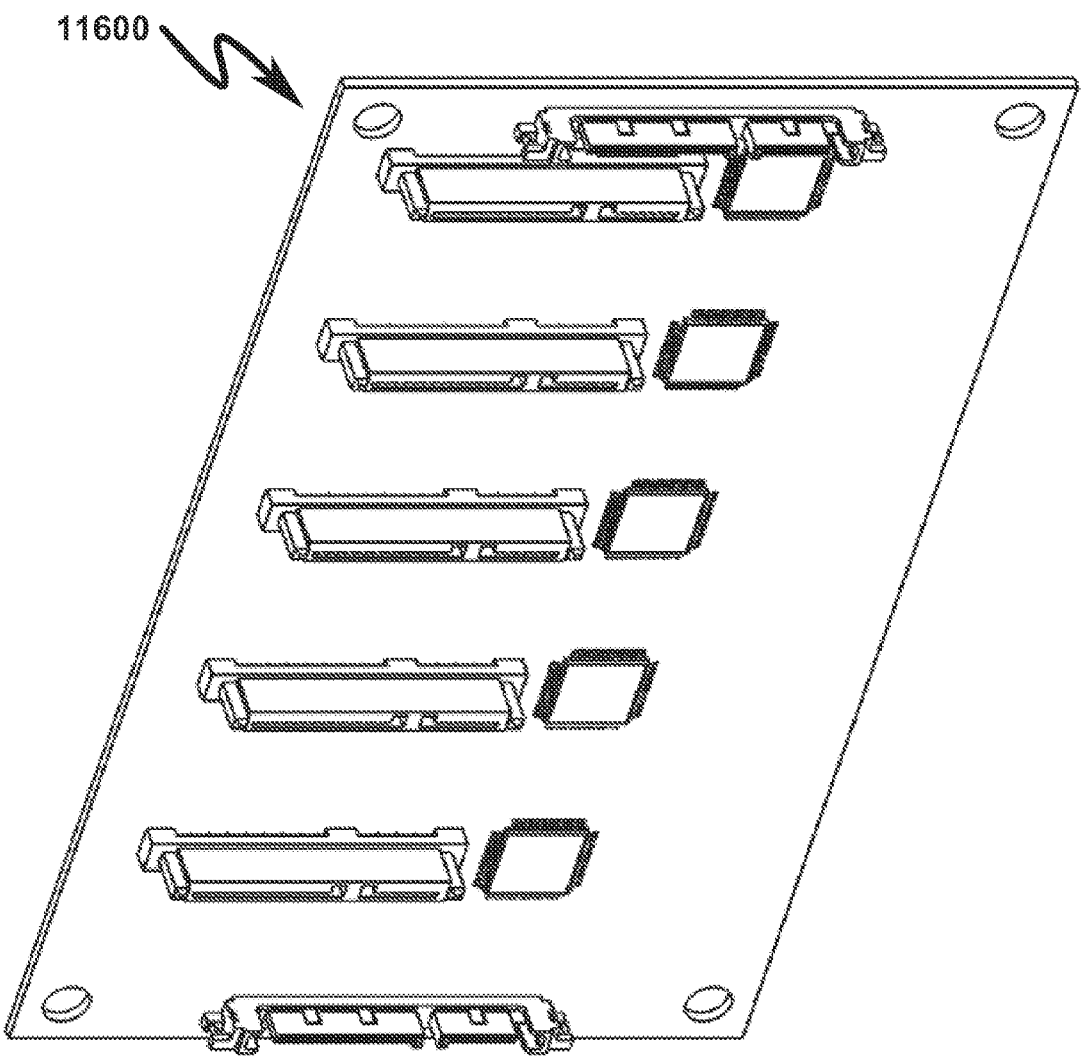
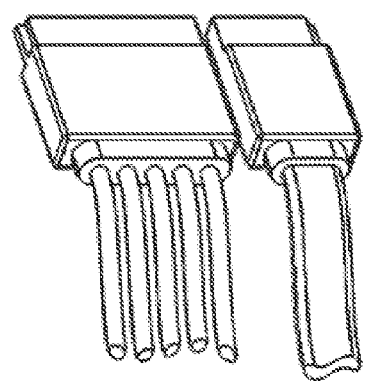

11900

12100

12900

13200

13300

DATA STORAGE RAID ARCHITECTURE SYSTEM AND METHOD

CROSS REFERENCE TO RELATED APPLICATIONS

This application is a Continuation Patent Application (CPA) of and incorporates by reference United States Utility Patent Application for DATA STORAGE ARCHITECTURE EXTENSION SYSTEM AND METHOD by inventor Kevin Mark Klughart, filed with the USPTO on Oct. 29, 2014, with Ser. No. 14/526,855, and issued as U.S. Pat. No. 9,015,355 on Apr. 21, 2015.

This application is a Continuation Patent Application (CPA) of and incorporates by reference United States Utility Patent Application for DATA STORAGE ARCHITECTURE EXTENSION SYSTEM AND METHOD by inventor Kevin Mark Klughart, filed with the USPTO on Jun. 27, 2014, with Ser. No. 14/317,892, and issued as U.S. Pat. No. 8,943,227 on Jan. 27, 2015.

This application is a Continuation-In-Part (CIP) patent application of and incorporates by reference United States Utility Patent Application for DATA STORAGE ARCHITECTURE EXTENSION SYSTEM AND METHOD by inventor Kevin Mark Klughart, filed with the USPTO on Jun. 25, 2014, with Ser. No. 14/314,143, and issued as U.S. Pat. No. 8,914,549 on Dec. 16, 2014.

This application is a Continuation-In-Part (CIP) patent application of and incorporates by reference United States Utility Patent Application for DATA STORAGE ARCHITECTURE EXTENSION SYSTEM AND METHOD by inventor Kevin Mark Klughart, filed with the USPTO on Sep. 21, 2011, with Ser. No. 13/200,242, and issued as U.S. Pat. No. 8,799,523 on Aug. 5, 2014.

This application claims benefit under 35 U.S.C. §120 and incorporates by reference United States Utility Patent Application for DATA STORAGE ARCHITECTURE EXTENSION SYSTEM AND METHOD by inventor Kevin Mark Klughart, filed with the USPTO on Sep. 21, 2011, with Ser. No. 13/200,242, and issued as U.S. Pat. No. 8,799,523 on Aug. 5, 2014.

This application claims benefit under 35 U.S.C. §120 and incorporates by reference United States Utility Patent Application for AUDIO/VIDEO STORAGE/RETRIEVAL SYSTEM AND METHOD by inventor Kevin Mark Klughart, filed with the USPTO on Sep. 25, 2011, with Ser. No. 13/200,572, confirmation and issued as U.S. Pat. No. 8,813,165 on Aug. 19, 2014.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems/methods associated with computer data storage, and specifically to systems/methods used to store data on disk drives, and in some preferred embodiments, storage of data on disk drives connected to computer systems running under a variety of operating system environments. Some preferred exemplary embodiments of the present invention also implement data storage architecture extension utilizing Redundant Array of Independent Disk (RAID) storage methodologies.

PRIOR ART AND BACKGROUND OF THE INVENTION

Conventional Computer Storage Architecture (0100)

As generally illustrated in FIG. 1 (0100), conventional computer storage architectures utilize a computer system (0110) (often running under control of an operating system (0112)) that further comprises a system bus (0111) that communicates with one or more disk drive interfaces (0120, 0130) that then communicate via a host bus adapter (HBA) physical interface to the particular disk drives (0121, 0122, 0131, 0132). Generally speaking the disk drive interface controllers (0120, 0130) are limited to 1-4 disk drives per controller in most personal computer (PC) environments.

PATA/PATAPI (0200, 0300)

Many conventional computer storage architectures utilize a parallel ATA (PATA) interface as generally illustrated in FIG. 2 (0200). Here the disk drive controller (0211) communicates via a parallel ribbon cable (0212) to the disk drives (0214, 0215). Note, however, that this HBA interface is limited to two disk drives per controller. Additional disk drives may be added, but this requires additional disk drive controllers (0211) for each pair of disk drives added.

A view of the physical interface associated with the PATA interface is generally illustrated in FIG. 3 (0300). It should be noted that cable management in PATA configurations is often an issue, as the disk drives must each have a separate ribbon cable connection to the disk drive controller, or in some situations two disk drives may share a single host controller ribbon cable.

SATA/SATAPI (0400, 0500)

Many late-model computer storage architectures utilize a serial ATA (SATA) interface as generally illustrated in FIG. 4 (0400). Here the disk drive controller (0411) communicates via a serial cable (0412, 0413) to each disk drive (0414, 0415). Note, however, that this HBA interface is generally limited to 1-4 disk drives per controller. Additional disk drives may be added, but this requires additional disk drive controllers (0411) for each group of disk drives added.

A view of the physical interface associated with the SATA interface is generally illustrated in FIG. 5 (0500). The connector (0500) generally incorporates a signal connector (0501) and a power connector (0502) with corresponding drive signal receptacle (0503) and drive power receptacle (0504). While cable management in SATA configurations is often less of an issue than in PATA configurations, this architecture still requires one serial cable for each disk drive connected to the disk drive controller.

Port Multiplier/Port Selector (0600)

Computer storage architectures utilizing a serial ATA (SATA) interface as generally illustrated in FIG. 4 (0400) and FIG. 5 (0500) may incorporate a "port multiplier" and/or "port selector" as generally illustrated in FIG. 6 (0600) that permits a computer system (0610) (typically running under an operating system (0611)) with a HBA interface (0620) to communicate to the port multiplier (0630) and subsequently transfer data/commands to multiple disk drives (0631, 0632, 0633, 0634) or operate multiple HBA interfaces (0640, 0650) to permit access via a port selector (0660) to a single disk drive (0661). The SATA specification permits port multipliers (0630) to communicate with up to 15 disk drives.

It should be noted that these port multipliers have several restrictions:
  Port multipliers cannot be nested or cascaded (per the SATA specification, "A Port Multiplier shall not be connected to another Port Multiplier (i.e. no cascading)".
  Port multipliers are limited to 15 connected disk drives.
  Since port multipliers cannot be cascaded, they must provide for the maximum number of anticipated disk drive attachments, and cannot be incrementally extended to support additional disk drives. Once the extension capability of a particular port multiplier is exceeded, it must be replaced with a port multiplier of higher expansion capacity.
  Port multipliers connect the disk drives to the HBA as SEPARATE disk drives. It is the responsibility of the host operating system (0611) to coordinate data storage on the individual disk drives (0631, 0632, 0633, 0634). There is no mechanism to concatenate the storage attached to a port multiplier.
  Port multipliers do not provide for any form of hardware assisted RAID capability. If RAID is implemented within disk drives connected to one or more port multipliers, it must be accomplished using host operating system (0612) software.

These limitations mean that port multipliers cannot be utilized to extend the logical size of a given disk drive volume. Rather, the port multiplier concept permits the limited extension of a given HBA to permit interfacing with a finite number (<16) of disk drives attached to the specific port multiplier.

NAS/Beyond RAID Topologies (0700, 0800)

While a variety of network attached storage (NAS) solutions are currently on the market, these systems generally utilize a network interface adapter (typically Ethernet) to provide an HBA to the storage array. This system architecture essentially requires that another computer system (typically running LINUX or some other high level operating system) be utilized to provide both the network interface to the host computer system as well as implementing file system support on the storage elements.

Many of these NAS architectures implement some form of RAID to provide for data protection in the event of drive failures and/or data redundancy for increased data availability. Recent improvements to these architectures have included DROBO® brand NAS BeyondRAID® brand storage systems manufactured by Data Robotics, Inc. and described in U.S. Pat. No. 7,873,782 for FILE SYSTEM-AWARE BLOCK STORAGE SYSTEM, APPARATUS, AND METHOD issued on Jan. 18, 2011 and other associated U.S. patents assigned to Data Robotics, Inc. The present invention incorporates by reference U.S. Pat. Nos. 7,814,272; 7,814,273; 7,818,531; and 7,873,782 to clarify the scope and character of these storage systems. An example of the system complexity incorporated in such systems is generally illustrated by the prior art block diagram of FIG. 7 (0700).

These storage implementations suffer from a requirement that to properly manage the data storage in the enhanced storage array requires that the drive controller be aware of the file system activity occurring on the disk drive array. This essentially requires that a software "drive emulator" be incorporated into the system to properly manage drive storage allocation/deallocation. The numerous "abstraction layers" present in this type of storage architecture limit the speed of the overall system and drastically increase the overall system complexity. This abstraction requirement not only limits the logical drive size to 16 TB in many configurations, it severely limits the overall system performance of the storage array.

One concept utilized by the prior art is that of logical volumes sparsely backed by physical disk drive volumes. The prior art generally teaches that to achieve this structure within the context of a file system created under control of an operating system, there must be some form of abstraction layer to control the logical-to-physical mapping of allocated storage elements to prohibit situations in which a disk read/write request is targeted towards a logical block that currently has no physical disk drive block association. This concept is generally illustrated in FIG. 8 (0800) and represents the current state-of-the-art in storage allocation systems that permit extensions to their physical storage capacity. This extension capability is generally achieved by "tricking" the operating system into thinking the storage element has more storage than is physically attached, and then remapping logical block requests made to the logical storage array to sparsely populated physical disk drive elements associated with the array. This remapping process is generally clumbersome, time consuming, and a potential point of failure in large storage array systems. Methodologies to achieve redundancy in these situations can solve the point-of-failure problems, but only at the expense of significantly increased system overhead and reduced system performance.

Prior Art Cost Structure

Enterprise Cost Structure
  One of the issues associated with storage arrays within the context of the prior art is overall disk drive storage cost. Paraphrasing several commentaries on the subject,
    There is a general disconnect between what hard drives cost in the consumer market and what the disk based enterprise storage systems cost per GB. . . . While the cost of disk drives in terms of cost/GB is becoming lower, the disks are not getting cheaper—they are just getting bigger. Enterprise disks are very expensive once you include the costs of the storage controller, switching, and maintenance. Excerpted from "The Real Price of Enterprise Storage" by Jamon Bowen.
  This year 2011 information goes on to state that while the cost/GB for disk drive storage is steadily declining, the total average cost per enterprise disk drive remains steady at around USD$2500/drive.

Current Disk Drive Price Trends

The above enterprise disk drive cost structure is very surprising given the following current price trends in retail disk drive storage:

| Drive Capacity | Drive Cost (USD$) | Cost/TB (USD$/TB) |
|---|---|---|
| 500 GB | 40 | 80 |
| 1 TB | 60 | 60 |
| 2 TB | 80 | 40 |
| 3 TB | 180 | 60 |

From this year 2011 data, it is clear that the individual disk drive costs are not a significant part of the overall cost of implementing the disk drive in an enterprise environment. As stated above, the costs associated with the storage controller, switching, and maintenance dominate the overall data storage costs in this context.

Additionally, note that the price per terabyte of a given drive is not uniform across the market. In this example, smaller drives will generally have a higher cost/TB than larger disk drives, but at the extreme end of the capacity curve the largest drives will generally command a price premium. In this example note that 4 TB of storage (using two 2-TB drives) can be had for less than the cost of a single 3-TB drive. This cost/TB disparity has as yet not been leveraged by the prior art attached storage market because as seen below the overhead associated with attaching a given drive to a computer system vastly exceeds any price differential in the individual disk drives.

NAS Storage Price Trends

As stated previously, a variety of NAS and other technologies have become available that permit an array of disk drives to be attached to a computer system for the purposes of aggregating the storage capacity of the disk drives in a manner suitable for access by the computer system as one or more logical disk drives. Within this context, the use of RAID and other fault-tolerant architectures have been implemented within hardware and software to act as a "bridge" between the storage array and the host computer system.

Attachment for these systems may include a variety of technologies, including eSATA, gigabit Ethernet, and other interfaces. All of these approaches rely on the storage array being housed in a separate enclosure with separate power supply and generally a disk drive controller motherboard that includes a computer processor capable of accessing all the attached (often racked) disk drives and providing a logical disk drive interface to the attached disk drives to the host computer system.

All of this hardware overhead, especially the requirement of a separate disk drive controller motherboard, dramatically increases the overall cost of the attached storage. As an example, the following table illustrates several NAS systems available and their cost structure using this architecture:

| NAS System | Size (TB) | Cost | Cost/TB |
|---|---|---|---|
| BUFFALO ® TS-X8.0TL/R5 (standalone) | 8 | 1030 | 129 |
| BUFFALO ® TS-RIX8.0TL/R5 (rackmount) | 8 | 2200 | 275 |
| BUFFALO ® TERASTATION ® Pro 6 WSS NAS server | 12 | 2040 | 170 |
| BUFFALO ® TERASTATION ® Duo TS-WX1.0TL/R1 - NAS server | 1 | 340 | 340 |
| BUFFALO ® TERASTATION ® III 2-TB Network Attached Storage | 4 | 680 | 340 |
| BUFFALO ® TERASTATION ® Pro 8 NAS server | 16 | 2716 | 170 |
| DROBO ® B800FS 16 TB bundle | 16 | 5183 | 323 |
| DROBO ® B800FS 24 TB bundle | 24 | 15000 | 625 |

What is significant to observe from this data is the price disparity in the cost/TB of a given disk drive versus the cost of attaching that disk drive to a computer system using a conventional NAS or other prior art attachment architecture. Generally speaking, the cost of attaching an individual disk drive to a computer using a NAS or other similar architecture increases the cost of the attached disk drive by approximately a factor of 4 to 10. Additionally, this factor increases as the overall disk drive array size is increased, making the larger arrays MORE expensive to implement than their smaller counterparts.

Deficiencies in the Prior Art

The prior art as detailed above suffers from the following deficiencies:
- The ratio of permissible disk drives to drive controllers is generally never more than eight (8), but may be as low as two (2). This low ratio means that to extend total storage capacity in a data storage system requires the addition of both disk drives and host controllers, or alternatively replacement of current disk drives with units of larger capacity (if possible).
- The HBA interfaces generally must utilize additional software (or in some cases firmware) to implement RAID functionality within storage elements attached to a given computer system. This generally makes it impossible to implement RAID functionality within a given computer system in a retrofit application.
- It is impossible to incrementally increase the storage capacity of a given storage system using conventional storage architectures.
- Existing NAS and related RAID architectures increase overall system costs by requiring additional host controller interfaces and/or system infrastructure.
- Existing NAS and related RAID architectures may limit the type of file system supported by the data storage system. Such configurations may not be fully compatible with the host operating system from which the storage array is accessed. As an example, many NAS systems utilize XFS file system architectures, which are not fully compatible with the NTFS file structures that are used on many MICROSOFT® WINDOWS® brand operating systems.
- The hardware cost overhead of adding NAS and other related disk drive array technologies to existing computer systems creates an significant increase in the cost/TB of a given storage array. Specifically, the cost associated with interfacing the storage array to a computer system dwarf the costs associated with the disk drive storage elements, making the overall system implementation very inefficient.
- The incremental cost of adding a given disk drive to a computer system using NAS and other related architectures increases the per-drive incremental disk drive cost by a factor of 5-10, vastly increasing the cost of additional disk drive storage on a computer system.

While some of the prior art may teach some solutions to several of these problems, the core issue of inexpensively extending data storage systems within existing computer systems that have limited HBA interface capabilities has not been addressed by the prior art.

OBJECTIVES OF THE INVENTION

Accordingly, the objectives of the present invention are (among others) to circumvent the deficiencies in the prior art and affect the following objectives:
(1) Provide for a data storage architecture extension system and method that permits incremental increases in overall storage capacity.
(2) Provide for a data storage architecture extension system and method that permits additional disk drives to be added to a storage array without the need for additional HBA interfaces.
(3) Provide for a data storage architecture extension system and method that permits additional disk drives to be added to a storage array without the need for software modifications of the operating system or changes to the partition structure of the storage device.
(4) Provide for a data storage architecture extension system and method that permits RAID functionality to be added to a given computer system without the need for hardware and/or software modifications of the system software.
(5) Provide for a data storage architecture extension system and method that permits a plethora of disk drives to be attached to a single HBA interface.
(6) Provide for a data storage architecture extension system and method that permits transparent replacement of failing disk drives in a storage array.
(7) Provide for a data storage architecture extension system and method that permits host operating system file system structures to be created on the storage array.
(8) Provide for a data storage architecture extension system and method that permits addition of storage array elements to a computer system while minimizing the cost overhead associated with attaching the individual disk drives.
(9) Provide for a data storage architecture extension system and method that permits addition of storage array elements to a computer system at a cost substantially lower than that achievable with NAS and related technologies.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION (0900)

A brief summary of the general architecture of the present invention is illustrated in FIG. 9 (0900), which contrasts the disk drive architecture extension system/method taught by the present invention as compared to the prior art configuration generally illustrated in FIG. 1 (0100). Here we see that the system application architecture illustrated in FIG. 9 (0900) includes a computer system (0910) (typically running under control of an operating system (0912)) further comprising a system bus (0911) with one or more host bus adapters (HBAs) that service two exemplary disk drive interfaces: a PATA disk drive interface (0920) and a SATA disk drive interface (0930). As with the conventional prior art configuration of FIG. 1 (0100), these disk drive interfaces are generally limited to 2-4 disk drives per controller.

The present invention introduces the concept of a pass-thru disk drive controller (PTDDC) (0941, 0942, 0943, 0944, 0951, 0952, 0953, 0954) within this conventional framework as a direct interface between the host bus adapter (HBA) disk drive interface and the corresponding disk drives serviced (0921, 0922, 0923, 0924, 0931, 0932, 0933, 0934). However, note in this architecture that the PTDDCs (0941, 0942, 0943, 0944, 0951, 0952, 0953, 0954), while servicing a single disk drive (0921, 0922, 0923, 0924, 0931, 0932, 0933, 0934), may be daisy-chained. This sequential daisy-chaining of PTDDCs (0941, 0943), (0942, 0944), (0951, 0953), (0952, 0954) permits a plethora of disk drives to be electrically attached to a single HBA interface.

The function of the PTDDC (0941, 0942, 0943, 0944, 0951, 0952, 0953, 0954) is to receive data/control information from a HBA interface port and translate this information to a logical block address (LBA) associated with one or more of the disk drives attached to the PTDDC interfaces. This LBA mapping occurs transparently to the function of the HBA interface such that as far as the computer system (0910) (and more importantly any operating system (0912) running on the computer system (0910)) is concerned the chain of PTDDCs appears as one physical disk drive with a logical capacity comprising (at a minimum) the sum of the maximum number of logical blocks within the PTDDC disk drive daisy-chain. In contrast to the prior art approaches to the addition of expansion data storage, the present invention does not require a "file system aware" approach to data storage on the PTDDC daisy-chain storage array. Rather, the translation of LBA addresses occurs seamlessly and rapidly through each PTDDC (as necessary) to effect proper placement and recovery of data on a given disk drive within the PTDDC daisy-chain string.

While the exemplary embodiment illustrated in FIG. 9 (0900) utilizes PATA/SATA disk drives, the present invention is not limited to any specific disk drive or any specific disk drive HBA or interface bus. Rather, the invention is sufficiently generalized to work with any data storage element. Additionally, with the use of proper volume formatting the daisy-chained PTDDC disk drive string can be incrementally increased in size after initial formatting/initialization by the operating system (0912). Additional embodiments anticipate the incorporation of RAID technologies within the PTDDC that is totally transparent to the operation of the computer system (0910) and/or operating system (0912) running thereon. Thus, using the PTDDC daisy-chained architecture it is possible to implement RAID storage arrays (of indeterminate size) without the need for a separate RAID controller or specialized software. This permits retrofitting existing systems for RAID support and/or incorporating RAID support in cost-sensitive data storage applications.

An important benefit to this architecture is the fact that from the computer system (0910) and operating system (0912) point of view, the PTDDC daisy-chains appear as one large physical drive, indistinguishable from a single disk drive with appropriately sized LBA characteristics. Thus, no software modifications are necessary to utilize the daisy-chained PTDDC system.

Furthermore, in computer systems with limited HBA interfaces, the effective storage capacity of the HBA interface can be expanded to include a plethora of disk drives without the requirement of additional hardware (which might not be possible in some hardware environments). This permits essentially unlimited expansion of the data storage capability of a given HBA interface, irrespective of the available capacity of disk drive storage elements.

Finally, the present invention while having many preferred embodiments, may include preferred exemplary embodiments wherein the PTDDC comprises an application specific integrated circuit (ASIC) mounted on a printed circuit board (PCB) that is configured to plug into the back of a conventional disk drive interface port, permitting these PCB modules to be connected in disk drive stacks, thus allowing reduced cable management and minimal cost overhead for implementation of the chained. Based on an estimated cost of USD$1.00 per square inch of populated printed circuit board, the present invention cost estimate is less than USD$4.00 (and asymptotically approaching USD$1.00 in quantity), making the use of the PTDDC concept a very cost effective alternative to data storage architectures costing hundreds of times more.

BRIEF DESCRIPTION OF THE DRAWINGS

For a fuller understanding of the advantages provided by the invention, reference should be made to the following detailed description together with the accompanying drawings wherein:

FIG. 86 illustrates an electrical connector back view of a conventional prior art disk drive incorporating a SATA electrical interface with power and SATA interface cables attached;

FIG. 116 illustrates a front right perspective view of a preferred exemplary system embodiment active PCB backplane with SATA power and data cables positioned for insertion into the backplane;

FIG. 119 illustrates a front right perspective view of a preferred exemplary system embodiment active PCB backplane with multiple PTDDC-enabled SATA disk drives inserted into the PCB backplane;

FIG. 120 illustrates a front left perspective view of a preferred exemplary system embodiment active PCB backplane with multiple PTDDC-enabled SATA disk drives inserted into the PCB backplane and the first SATA disk drive removed for connector viewing;

FIG. 121 illustrates a front view of an exemplary embodiment of the present invention implemented as a PCB backplane supporting daisy-chained SATA disk drives;

FIG. 122 illustrates a perspective view of an exemplary embodiment of the present invention implemented as a PCB backplane supporting daisy-chained SATA disk drives;

FIG. 123 illustrates a perspective view of an exemplary rack mount enclosure supporting the PCB of FIG. 121-FIG. 122;

FIG. 124 illustrates a perspective view of an exemplary separator insert used with the rack enclosure of FIG. 123;

FIG. 125 illustrates an assembly perspective view of the rack mount enclosure of FIG. 123 with the separator insert of FIG. 124;

FIG. 126 illustrates an assembly perspective view of the rack mount enclosure of FIG. 123 with the PCB of FIG. 121 and FIG. 122;

FIG. 127 illustrates an assembly perspective view of the rack mount enclosure of FIG. 123 with the separator insert of FIG. 124 and the PCB of FIG. 121 and FIG. 122;

FIG. 128 illustrates an assembly perspective view of two SATA rack mount systems in front and rear of a single PCB backplane;

FIG. 129 illustrates a front perspective view of a populated SATA storage rack incorporating PTDDC-enabled SATA disk drives connected in a daisy-chain fashion;

FIG. 130 illustrates a front view of a populated SATA storage rack incorporating PTDDC-enabled SATA disk drives connected in a daisy-chain fashion;

Figure 131:
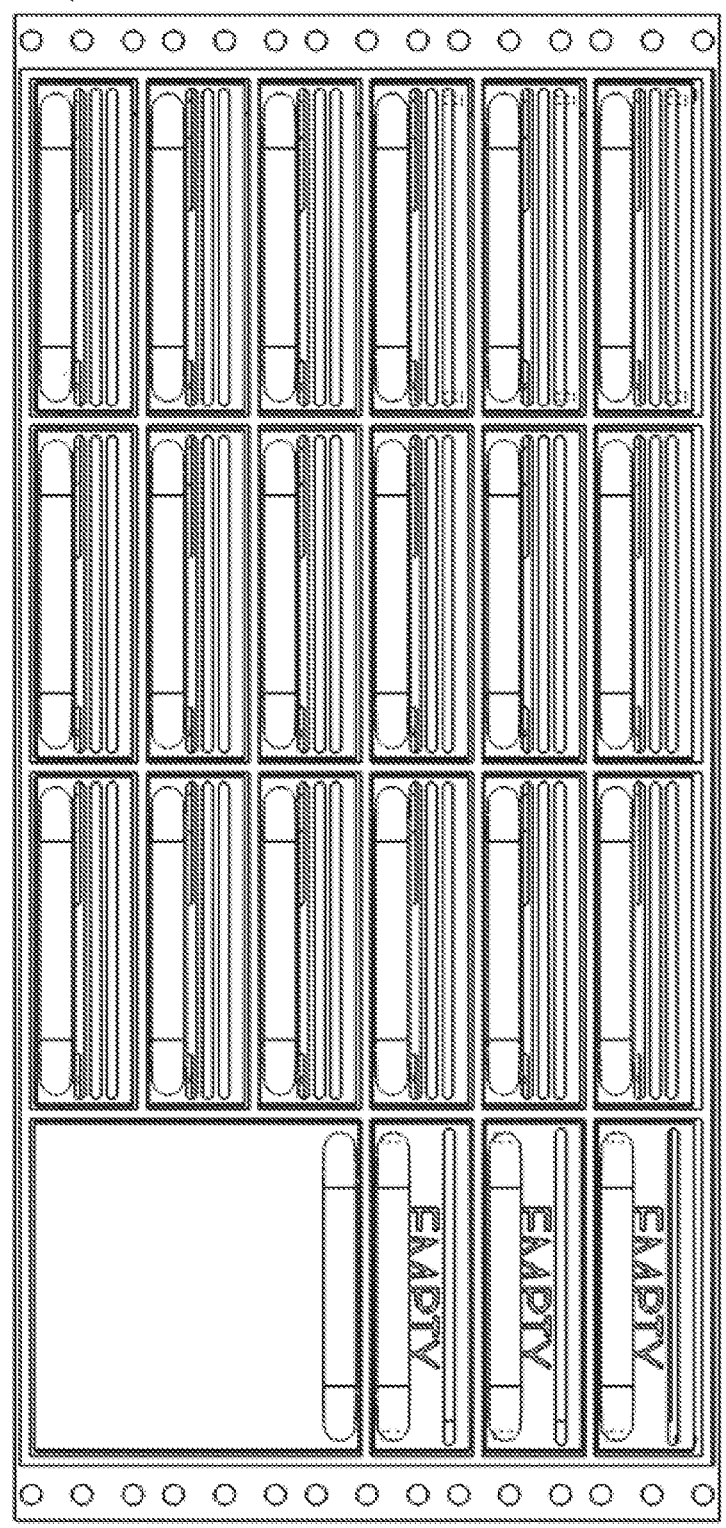
Figure 132:
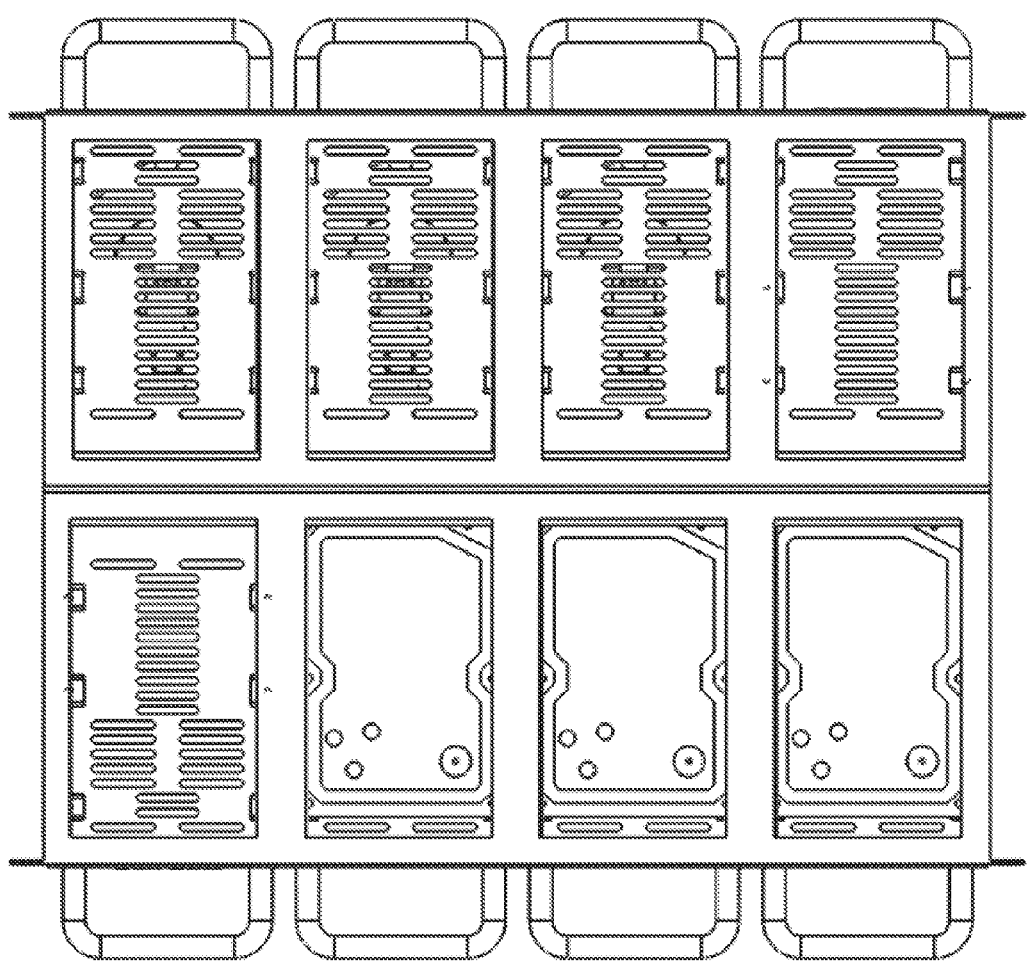
Figure 133:
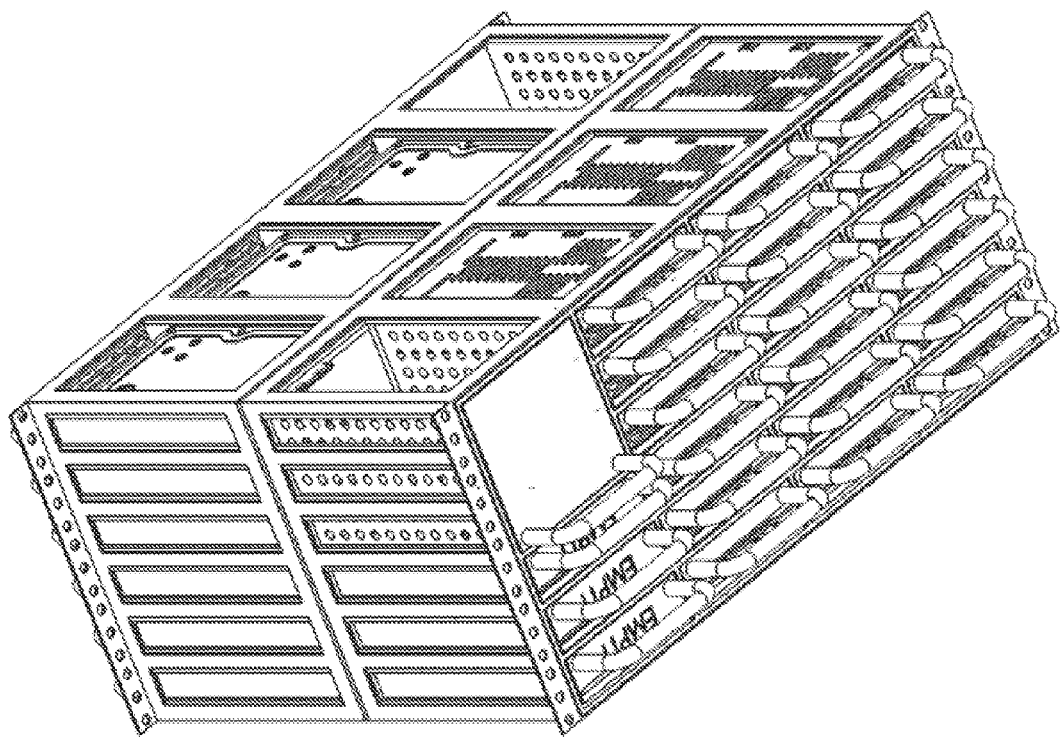
Figure 134:
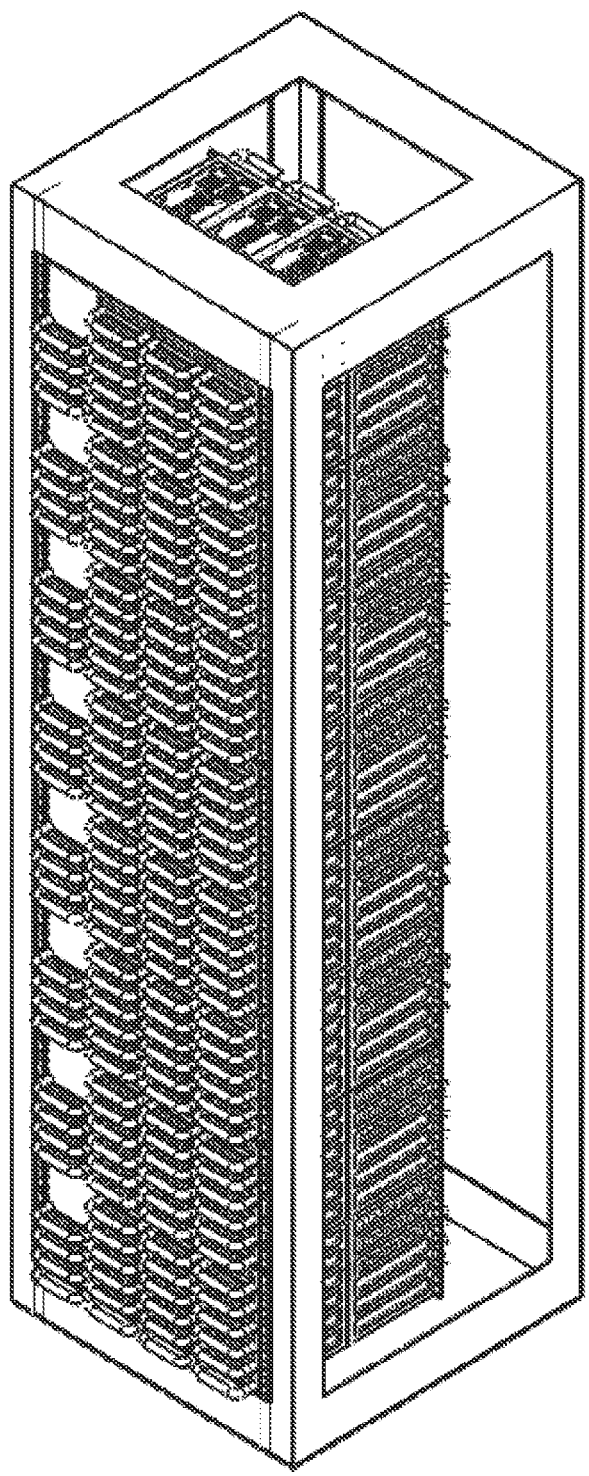
Figure 135:
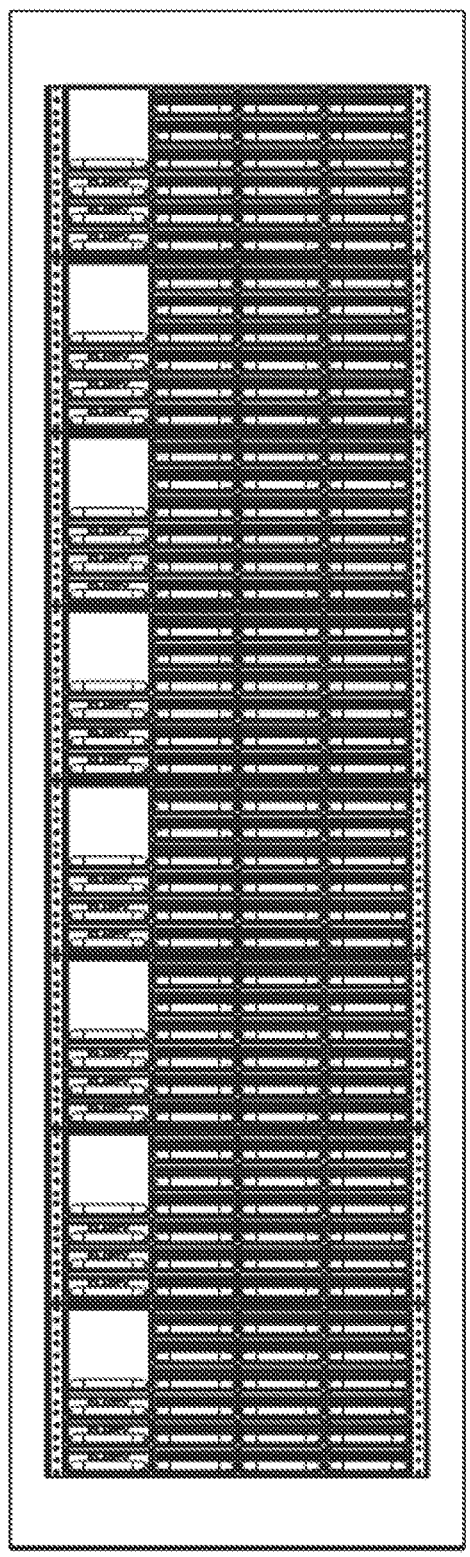
Figure 136:
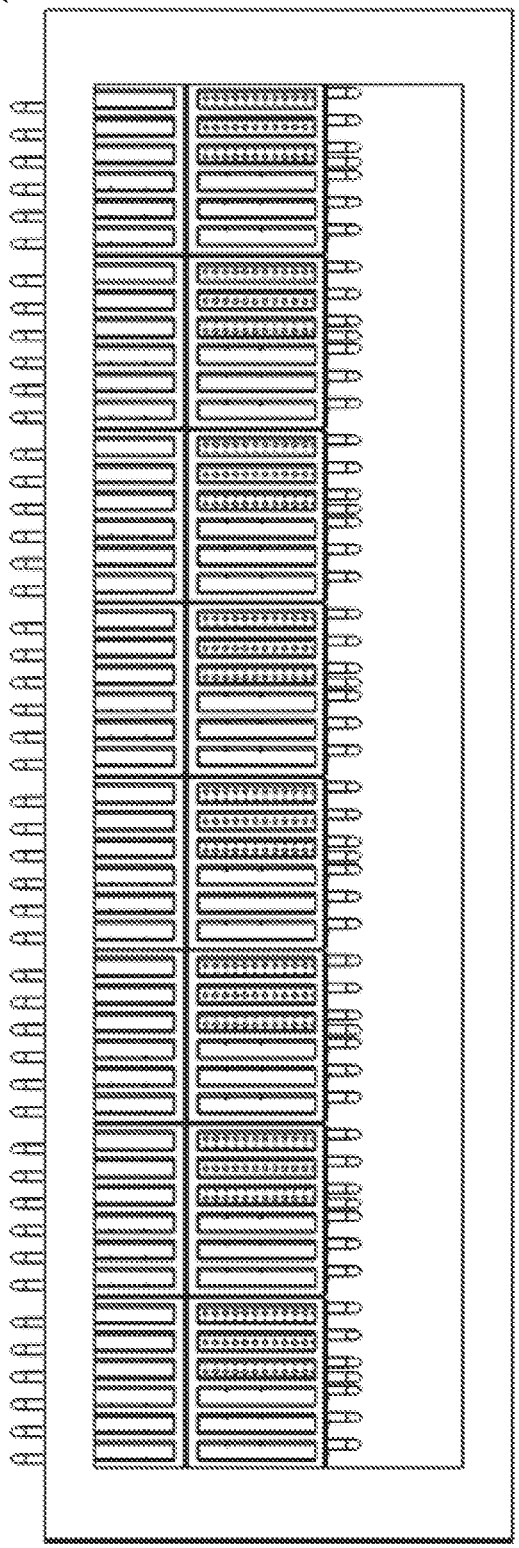

FIG. 131 illustrates a rear view of a populated SATA storage rack incorporating PTDDC-enabled SATA disk drives connected in a daisy-chain fashion;

FIG. 132 illustrates a top view of a populated SATA storage rack incorporating PTDDC-enabled SATA disk drives connected in a daisy-chain fashion;

FIG. 133 illustrates a rear perspective view of a populated SATA storage rack incorporating PTDDC-enabled SATA disk drives connected in a daisy-chain fashion;

FIG. 134 illustrates a front perspective view of a populated 19-inch storage array rack incorporating 8 PTDDC-enabled storage racks to form an inexpensive petabyte-class storage array;

FIG. 135 illustrates a front view of a populated 19-inch storage array rack incorporating 8 PTDDC-enabled storage racks to form an inexpensive petabyte-class storage array;

FIG. 136 illustrates a side view of a populated 19-inch storage array rack incorporating 8 PTDDC-enabled storage racks to form an inexpensive petabyte-class storage array;

DESCRIPTION OF THE PRESENTLY PREFERRED EXEMPLARY EMBODIMENTS

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a DATA STORAGE ARCHITECTURE EXTENSION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

SATA Mechanical Interface not Limitive

While the exemplary invention embodiments depicted herein may utilize standard SATA mechanical dimensions for power and/or signal connectors, the present invention is not limited to these particular mechanical examples, and may include a variety of other SATA mechanical interfaces including mini and micro style connectors. Appropriate scaling of the mechanical examples provided herein is within the expertise of one of ordinary skill in the electrical/mechanical arts.

HBA/DDI Port not Limitive

The present invention may be applied to a wide variety of disk drive storage systems incorporating a wide variety of host bus adapter (HBA) and disk drive interface (DDI) physical hardware interfaces. While many preferred embodiments may be configured wherein the HBA and DDI are of the same type of physical hardware interface, the present invention is not limited to this configuration, and the HBA and DDI may be of any disparate type of hardware interface.

PTI/PTO Port not Limitive

The present invention may be advantageously configured in some situations where the pass-thru input (PTI) port and pass-thru output (PTO) port are of the same hardware configuration as the HBA interface, but the present invention does not require this conformity.

Host Bus Adapter (HBA) not Limitive

The present invention may be applied to a wide variety of disk drive storage systems incorporating a wide variety of host bus adapter (HBA) interfaces. Generally speaking, the HBA interface may vary widely among current disk drive subsystems as well as enhancements and/or replacements to these interfaces that may occur in the future. The present invention, while suitable for many current and future HBA interfaces, is particularly suitable for implementation using parallel ATA (PATA/PATAPI) (also identified as IDE/EIDE), serial ATA (SATA/SATAPI/eSATA/microSATA), Fibre Channel, Serial Storage Architecture (SSA), and universal serial bus (USB) interfaces. Thus, the present invention, while not limiting the scope of the HBA used with the system, may be implemented in some preferred exemplary embodiments using one or more of the HBA interfaces listed.

Many preferred exemplary embodiments utilize the serial ATA (SATA) disk drive interface standard. This standard, available from the Serial ATA International Organization (www.sata-io.org), is hereby incorporated by reference in this document.

File System not Limitive

Many preferred exemplary embodiments of the present invention may incorporate an on-disk file system that is compatible with a particular operating system running on the host computer system to which the HBA port of the PTDDC is connected. While the present invention makes no limitation on the on-disk file system which may be implemented on a logical storage system comprising a daisy-chained series of PTDDC controllers (and their associated attached disk drives), the present invention does specifically anticipate that many preferred exemplary embodiments may implement an on-disk file structure selected from a group consisting of EXT2, EXT3, EXT4, FAT12, FAT16, FAT32, Files-11 (ODS), HFS, HFS Plus (HFS+), NTFS, and XFS.

Within this context, the present invention prefers several file systems, the table below specifying those known to be preferred at this time:

| FILE SYSTEM | MAXIMUM FILE SIZE | MAXIMUM VOLUME SIZE |
|---|---|---|
| exFAT | 127 PiB | 64 ZiB, 512 TiB |
| NTFS | 16 EiB | 16 EiB |
| HFS Plus | 8 EiB | 8 EiB |
| FFS | 8 ZiB | 8 ZiB |
| UFS1 | 226 TiB | 226 TiB |
| UFS2 | 32 PiB | 1 YiB |
| ext2 | 2 TiB | 32 TiB |
| ext3 | 2 TiB | 32 TiB |
| ext4 | 16 TiB | 1 EiB |
| Lustre | 320 TiB (on ext 4) | 1 YiB-10 PB |
| GPFS | 512 YiB | 512 YiB (4 PiB tested) |
| GFS | 8 EiB | 8 EiB |
| ReiserFS | 2 GB-8 TiB | 16 TiB |
| NILFS | 8 EiB | 8 EiB |
| Reiser4 | 8 TiB on x86 | Unknown |
| XFS | 8 EiB | 8 EiB |
| JFS1 | 8 EiB | 4 PiB |
| JFS | 4 PiB | 32 PiB |
| QFS | 16 EiB | 4 PiB |
| BFS | 260 GiB | 2 EiB |
| VxFS | 256 TiB | 256 TiB |
| UDF | 16 EiB | Unknown |
| ZFS | 16 EiB | 16 EiB |
| VMFS2 | 4 TiB | 64 TiB |
| VMFS3 | 2 TiB | 64 TiB |
| HAMMER | Unknown | 1 EiB |
| Btrfs | 16 EiB | 16 EiB |
| LEAN | 8 EiB | 8 EiB |

Format/Initialization not Limitive

Within the context of on-disk file system implementations on a variety of computer operating systems, there is generally some ambiguity with respect to the terminology used to describe various activities associated with creating a logical file structure in these contexts. Specifically, the term "format" may mean anything from a low-level surface format of the disk drive media as well as in some cases including the incorporation of a file system after this low-level surface format is complete. Similarly, disk drive "initialization" while typically referring only to the incorporation of an on-disk logical structure, can in some instances incorporate "partitioning" of the disk drive into various logical drive structures. Within the context of this document, the term "format" will generally be used to incorporate the broader of these meanings, incorporating low-level surface formatting, partitioning, and/or on-disk logical file structure initialization. Within the application context of the claimed invention, the scope of application of this term will necessarily be application specific based on the operating system and hardware context.

Logical Partitioning not Limitive

The present invention makes no limitation on the underlying file system that may be present on the logical volume comprising one or more disks connected in a PTDDC sequential chain as described herein. Within the scope of this anticipation are situations in which the logical PTDDC volume is partitioned using one or more disk drive file system partitioning techniques to produce logically partitioned sub-drives within the logical PTDDC volume. This partitioning capability is well known in the data storage and file system arts, and will not be detailed here.

SATA Physical Interface not Limitive

While the 7-conductor (two pairs of differential signals and three interdigitated ground traces) physical SATA data interfaces presented in this document represent preferred embodiments of the present invention, other forms of SATA physical interface are also possible including those that use 9-pin connectors (with interdigitated ground traces between each signal) with no loss of generality in the teaching of the present invention. Thus, the examples provided herein can be adapted to use other forms of SATA data interface connectors with no loss of generality in overall invention scope.

System Overview (1000)

Figure 10:
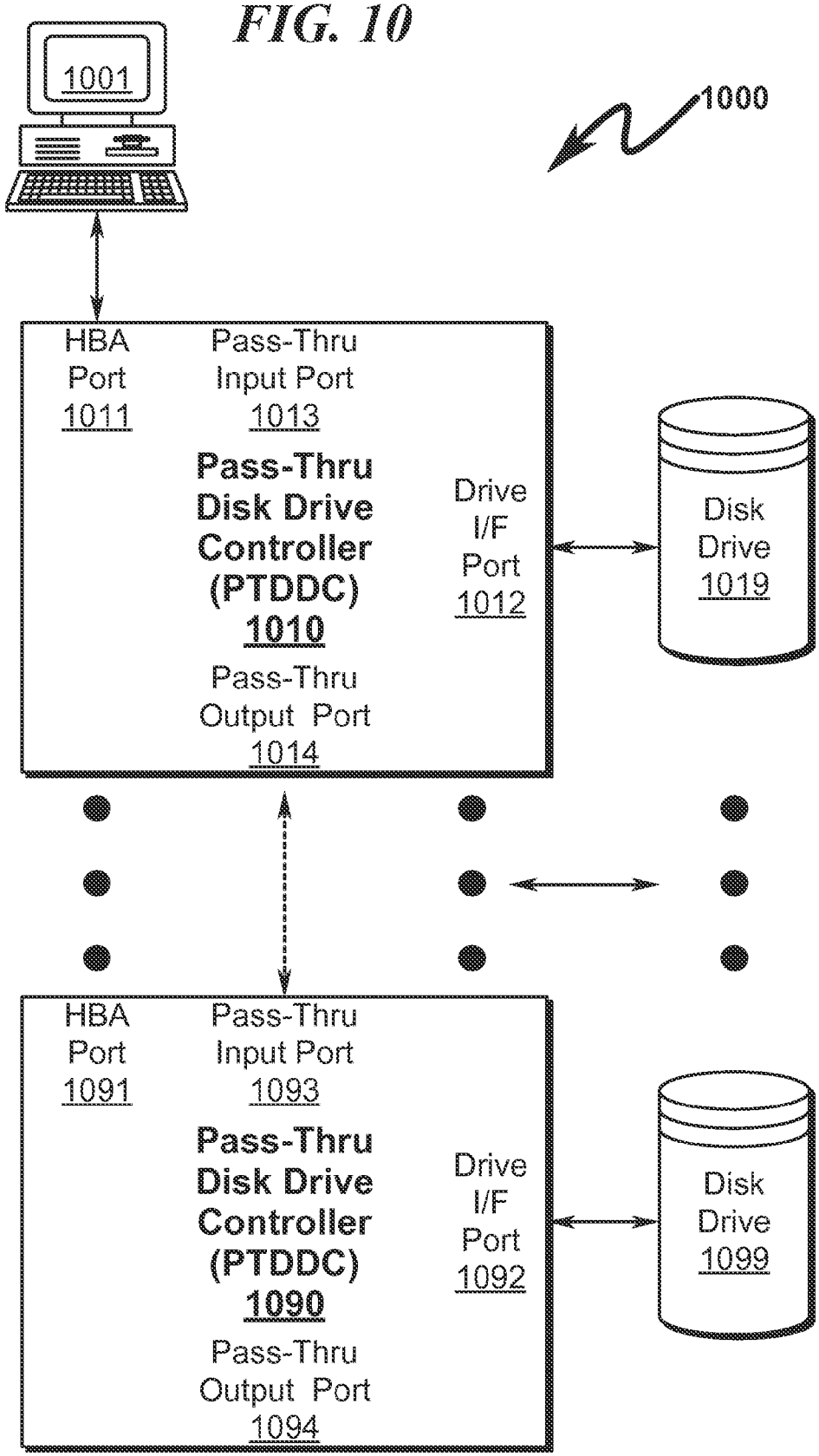
FIG. 10 illustrates a general system block diagram illustrating a preferred exemplary embodiment of the present invention.

The present invention and typical system application as applied to a data storage architecture extension system is generally illustrated in FIG. 10 (1000). The system herein generally described is targeted in this exemplary embodiment to adapt a conventional computer-based data storage architecture to incorporate additional extended storage capabilities. The system context as generally illustrated in FIG. 10 (1000) utilizes a computer system (1001) with conventional HBA interface(s) to communicate with a pass-thru-disk drive controller (PTDDC) (1010) that is the heart of the disclosed invention.

The PTDDC (1010) incorporates three or four interface ports. The first port is designated the host bus adapter (HBA) port (1011) and acts as the electrical connection to the HBA interface on the host computer (1001). The second port is the disk drive I/F port (1012) that acts as an emulated HBA port interface to the disk drive (1019) being serviced. The pass-thru input (PTI) port (1013) and pass-thru output (PTO) port (1014) permit multiple PTDDC entities (1010, 1090) to be daisy-chained together, with each PTDDC controlling one disk drive (1019, 1099) in the storage array. As the PTDDC units (1010, 1090) may be daisy-chained together to any desired level of nesting, there is no explicit limit on the number of disk drives (1019, 1099) that may be serviced by this architecture from a single HBA port (1011) connected to a single computer (1001) HBA interface.

The functionality of the PTDDC (1010, 1090) is as follows. Commands and/or data that originate from the computer (1001) via the HBA interface are presented to the HBA port (1011) and interpreted by the PTDDC (1010) to determine if the requested data transfer should be applied to a particular disk drive (1019) attached to the PTDDC (1010). This transfer request generally involves a logical block address (LBA) identifying the starting block to be transferred to/from the disk drive (1019). If the requested LBA is serviced by the attached disk drive (1019), then the request is passed on to the current disk drive attached to the PTDDC (1010). If not, the requested transfer is optionally translated by reducing the LBA request by the size of the attached disk drive (1019) and/or passed on to subsequent PTDDC (1090) units for processing, depending on the particular embodiment of the invention. Once the data transfer is attached to or associated with a particular disk drive (1019, 1099), the data is read from or written to the particular disk drive (1019, 1099) that has been activated by the attached PTDDC (1010, 1090).

While the present invention anticipates that some embodiments may integrate the HBA port (1011) and pass-thru input (PTI) port (1013) functionality into a single interface connection, many preferred embodiments may utilize two separate ports for these connections to enable a simplification of cabling between PTDDC printed circuit board (PCB) connections that support stacked arrays of disk drives (1019, 1099) in a given storage array.

Method Overview

Sequential Incremental Mapping Method (1100)

Figure 11:
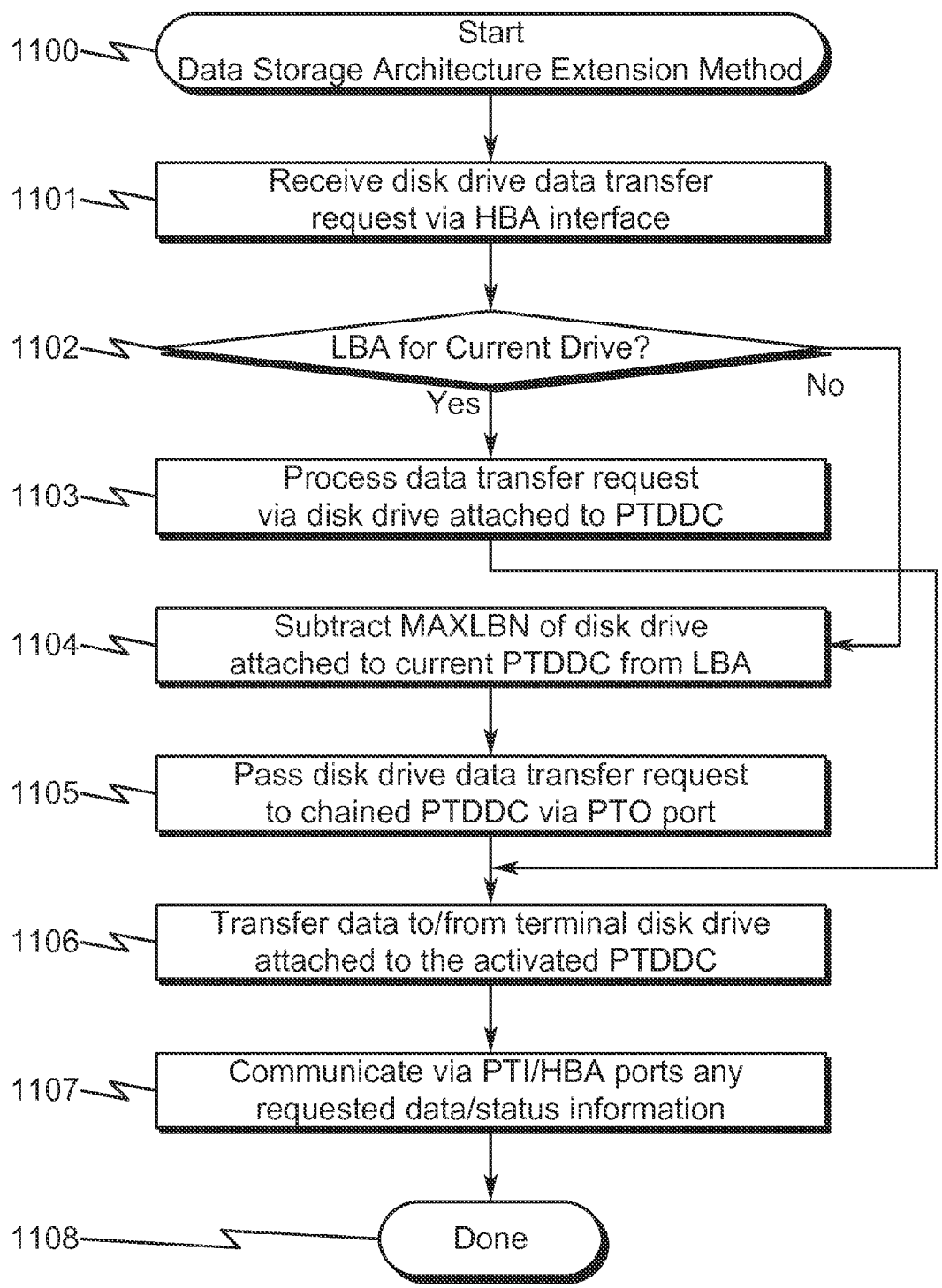
FIG. 11 illustrates a general method flowchart illustrating a preferred exemplary embodiment of the present invention.

The present invention method can be generally illustrated by the preferred exemplary embodiment illustrated in FIG. 11 (1100). The general steps of this method comprise the following:

Receiving a disk drive transfer request via the HBA input port (1101);
Determining if the LBA associated with the disk drive data transfer request is mapped to the disk drive attached to the current PTDDC, and if not, proceeding to step (4) (1102);
Processing the disk drive data transfer request via the disk drive attached to the current PTDDC, and then proceeding to step (6) (1103);
Subtracting the MAXLBN of the current disk drive attached to the current PTDDC from the disk drive data transfer LBA (1104);
Passing the disk drive data transfer request to the chained PTDDC via the PTO port (1105)
Completing the disk drive data transfer request by transferring data to/from the terminal disk drive attached to the activated PTDDC (1106);
Communicating via the PTI and HBA ports any data/status information requested by the disk drive data transfer request (1107).

This general method as illustrated in FIG. 11 (1100) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Direct Mapping Method (1200)

It should be noted that the method illustrated in FIG. 11 (1100) assumes that the PTDDC actually modifies the data transfer request before passing it on to subsequent PTDDC/disk drive pairs. Another equivalent method merely passes on ALL disk drive data transfer requests, with only the PTDDC associated with the mapped LBA initiating the data transfer to/from the attached disk drive. This present invention method embodiment direct mapping variation can be generally illustrated by the preferred exemplary embodiment illustrated in FIG. 12 (1200). The general steps of this method comprise the following:

Receiving a disk drive transfer request via the HBA input port (1201);
Passing the disk drive data transfer request to the chained PTDDC via the PTO port (1202);
Determining if the disk drive data transfer request LBA is mapped to the disk drive connected to the current PTDDC, and if not, proceeding to step (6) (1203);
Subtracting the base LBN of the current PTDDC from the disk drive data transfer request LBA (1204);
Processing the disk drive data transfer request via the disk drive attached to the current PTDDC with the modified LBA (1205);
Transferring data to/from the disk drive attached to the activated PTDDC (1206);
Communicating via the PTI and HBA ports any data/status information requested by the disk drive data transfer request (1207).

Figure 12:
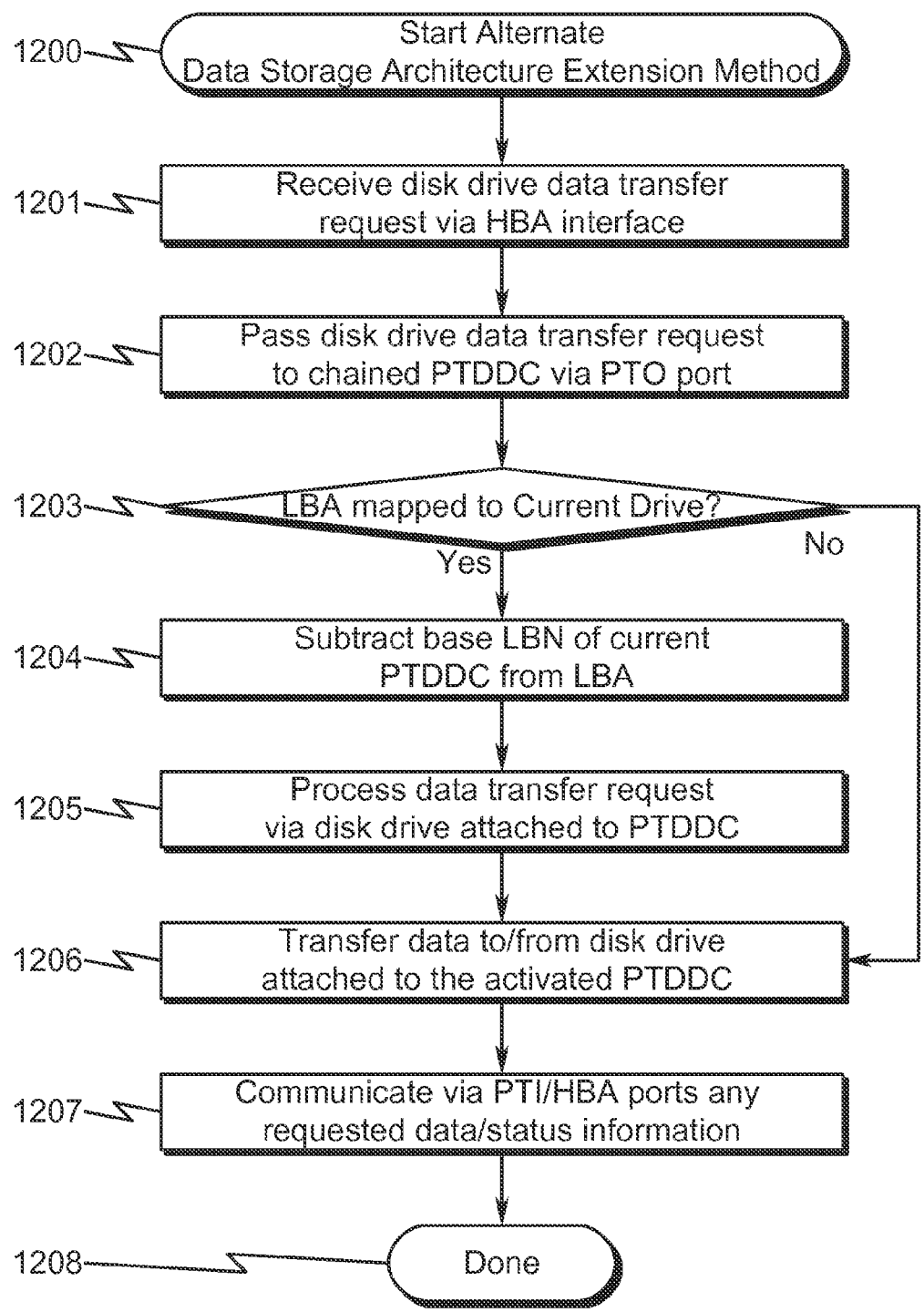
FIG. 12 illustrates a alternate general method flowchart illustrating a preferred exemplary embodiment of the present invention.

This general method variation as illustrated in FIG. 12 (1200) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Logical Volume Mapping (1300)

The present invention may incorporate one or more PTDDCs to create "logical volumes" that are formed by concatenating the physical block address space of physical disk drives in a transparent manner. This transparent formation of the logical volume from the physical logical block address (LBA) space of physical drives permits an arbitrary concatenation of physical drives to appear as one logical volume to the HBA controller interface. Since the HBA interface sees only one logical disk drive that is sized to incorporate all the physical blocks of the attached disk drives, no software or hardware modifications need be made to the computer system or operating system software to support logical disk drives of arbitrary size.

Figure 13:
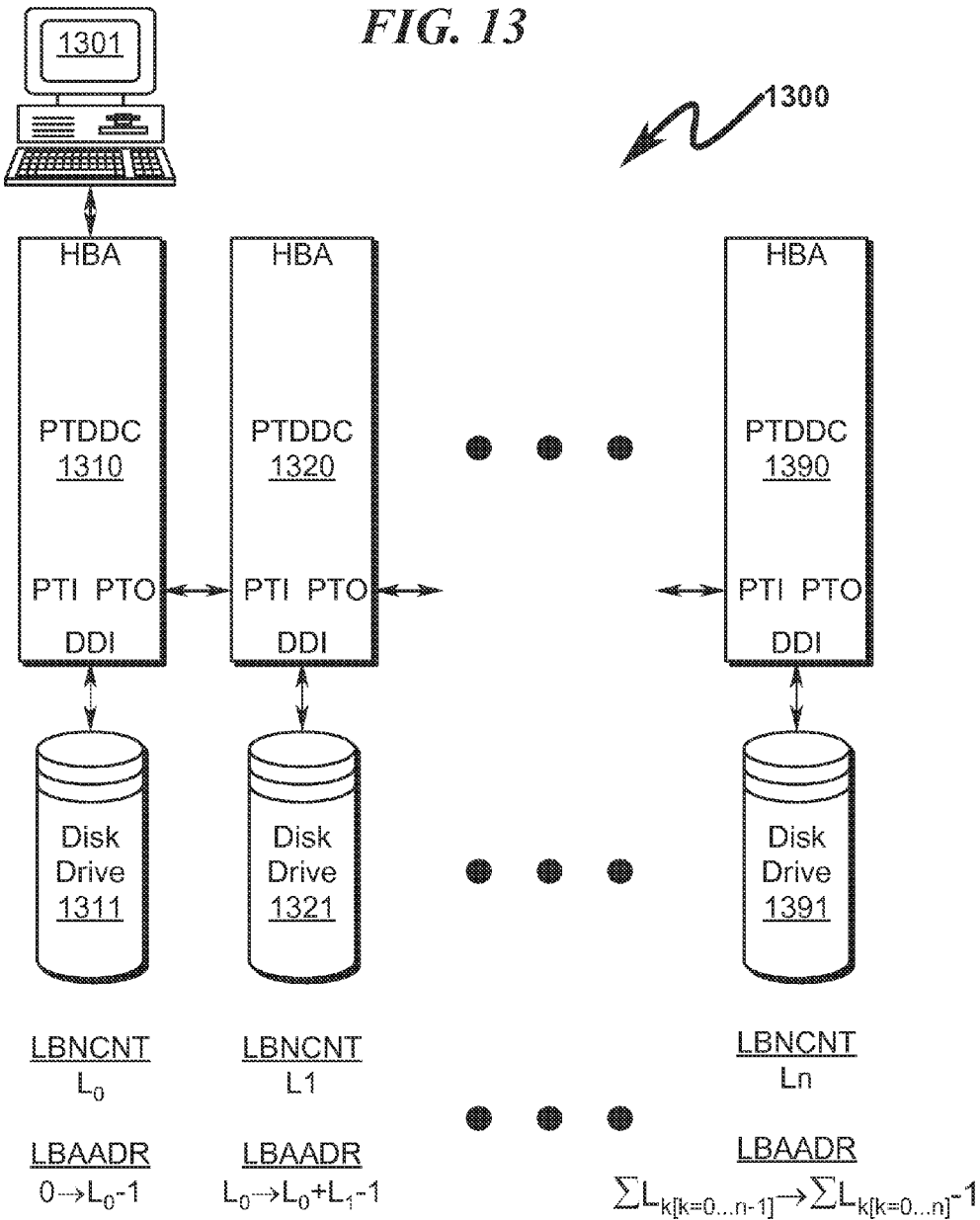
FIG. 13 illustrates an exemplary embodiment of the present invention depicting concatenation of disk drive storage within the context of a single PTDDC.

One preferred exemplary embodiment of this concept is depicted in the pictorial example generally illustrated in FIG. 13 (1300). Here we see a computer system (1301) connected to the HBA port of a PTDDC (1310) connected to a disk drive (1311). This PTDDC (1310) forms a chain of PTDDCs (1310, 1320, 1390) that have associated with each PTDDC a corresponding disk drive (1311, 1321, 1391). Each attached disk drive (1311, 1321, 1391) has a corresponding logical block count (LBNCNT) that is symbolically designated at $L_0$, $L_1$, ..., $L_n$ in the figure. This logical block count represents the physical number of logical blocks that is accessible by the disk drive. Associated with each disk drive is also a logical block address (LBA) that ranges from zero (0) to the logical block count minus one (1), as each disk drive is generally addressed by a number ranging from zero to the maximum physical logical block count value minus one. Thus, as seen by the diagram, the LBA address value of the chained disk drives is based on the sum of previous LBNCNT values within the PTDDC disk drive chain, with each disk drive having a base LBA value and logical block extent associated with its particular placement within the overall logical volume mapping.

Note that in this configuration it is important to distinguish between the number of physical blocks present on a given disk drive and the maximum addressable block or maximum LBA accessible on a given disk drive. Many disk drives may have the capability to "size" the drive with modification of internal registers so that the maximum accessible block address is less than the total number of available blocks on the disk drive. This capability permits some disk drives to be retrofit into situations that require a disk drive of a specific size that is less than the number of physical blocks available in the disk drive. Therefore, in the context of the present invention, the maximum LBA value of the disk drive may represent a value smaller than the maximum number of available physical blocks on the disk drive, depending on the configuration of the disk drive maximum addressable logical address.

It should be noted that this particular example as generally illustrated in FIG. 13 (1300) represents only one method of mapping the LBA addresses of each disk drive to the logical LBA address space as seen by the host computer (1301). As discussed later, the LBA mapping need not be sequential with respect to each individual disk drive.

LBA Mapping Example #1

Sequential Incremental Mapping

The teachings of the present invention as applied to some preferred exemplary embodiments utilizing a sequential incremental mapping method as generally described in the flowchart of FIG. 11 (1100) can be understood via the use of an exemplary daisy-chained drive configuration. In this example we will use four drives, although the present invention makes no limitation on the number of drives in a PTDDC daisy-chain configuration. In this example, the following disk drives will be connected via PTDDC interfaces to a main HBA interface on a computer system:

| Disk Drive # | Capacity (TB) | Capacity (LBNCNT) | Capacity (bytes) |
|---|---|---|---|
| 1 | 1.0 TB | 1,953,525,168 | 1,000,204,866,016 |
| 2 | 1.5 TB | 2,930,277,168 | 1,500,301,910,016 |
| 3 | 2.0 TB | 3,907,029,168 | 2,000,398,934,016 |
| 4 | 3.0 TB | 5,860,533,168 | 3,000,592,982,016 |

Using the sequential incremental mapping method as described above, a logical drive access starting at logical block (5,000,000,000) would proceed as follows:

The PTDDC attached to disk drive #1 receives the data transfer request and notes that the starting LBA of the transfer address (5,000,000,000) exceeds the maximum LBA count of disk drive #1 (1,953,525,168).

The LBA of the data transfer request is reduced by the maximum LBA count of disk drive #1 (1,953,525,168), resulting in a new disk transfer LBA value of (5,000,000,000)−(1,953,525,168)=(3,046,474,832).

This new LBA transfer address (3,046,474,832) is passed to disk drive #2 via the PTDDC PTO port.

The PTDDC attached to disk drive #2 receives the modified data transfer request (3,046,474,832) and notes that the starting LBA of the transfer address exceeds the maximum LBA count of disk drive #2 (2,930,277,168).

The LBA of the data transfer request (3,046,474,832) is reduced by the maximum LBA count of disk drive #2 (2,930,277,168), resulting in a new disk transfer LBA value of (3,046,474,832)−(2,930,277,168)=(116,197,664).

The PTDDC attached to disk drive #3 receives the modified data transfer request (116,197,664) and notes that the starting LBA of the transfer address is less than the maximum LBA count of disk drive #3 (3,907,029,168).

The PTDDC associated with disk drive #3 passes the modified data transfer request LBA (116,197,664) to disk drive #3 and data is transmitted to/from disk drive #3 based on the remaining specifications of the data transfer request.

Any data to be read from disk drive #3 is relayed back through the PTDDC daisy-chain of PTI/PTO ports back to the originating HBA port associated with the PTDDC connected to disk drive #1.

The above scenario may be modified in situations where the disk drive data transfer request crosses the logical block boundaries associated with a given pair of disk drives. For example, a sufficiently large data transfer request that spans disk volumes can bifurcated into two data transfer requests: one that is processed by the initially mapped disk drive in the PTDDC chain, and the remainder of the transfer can be processed by the next disk drive in the PTDDC chain. One skilled in the art will recognize that it is a simple matter to bifurcate these data transfer requests by limiting the first data transfer request to the available space in the initially mapped disk drive and reducing the transfer size for the next disk drive in the chain (after substituting a value of zero (0) for the initial data transfer block LBA value for this drive).

LBA Mapping Example #2

Direct Mapping

The teachings of the present invention as applied to some preferred exemplary embodiments utilizing a direct mapping method as generally described in the flowchart of FIG. 12 (1200) can be understood via the use of an exemplary daisy-chained drive configuration. In this example we will use four drives, although the present invention makes no limitation on the number of drives in a PTDDC daisy-chain configuration. In this example, the following disk drives will be connected via PTDDC interfaces to a main HBA interface on a computer system:

| Disk Drive # | Capacity (TB) | Capacity (LBNCNT) | Capacity (bytes) |
|---|---|---|---|
| 1 | 1.0 TB | 1,953,525,168 | 1,000,204,866,016 |
| 2 | 1.5 TB | 2,930,277,168 | 1,500,301,910,016 |
| 3 | 2.0 TB | 3,907,029,168 | 2,000,398,934,016 |
| 4 | 3.0 TB | 5,860,533,168 | 3,000,592,982,016 |

This disk drive information is used to generate a disk drive LBA mapping table associated with each disk drive (and accessible by the individual PTDDC controllers). This mapping table has the following form in many preferred embodiments:

| Disk Drive | Capacity (TB) | Start LBA | MAX LBA |
|---|---|---|---|
| 1 | 1.0 TB | 0 | 1,953,525,168 |
| 2 | 1.5 TB | 1,953,525,168 | 4,883,802,336 |
| 3 | 2.0 TB | 4,883,802,336 | 8,790,831,504 |
| 4 | 3.0 TB | 8,790,831,504 | 14,651,364,672 |

Using the direct mapping method as described above, a logical drive access starting at logical block (5,000,000,000) would proceed as follows:

The PTDDC attached to disk drive #1 receives the data transfer request and notes that the starting LBA of the transfer address (5,000,000,000) is equal to or exceeds the maximum LBA address of disk drive #1 (1,953,525,168). The data transfer request is passed to disk drive #2.

The PTDDC attached to disk drive #2 receives the data transfer request and notes that the starting LBA of the transfer address (5,000,000,000) is equal to or exceeds the maximum LBA address of disk drive #2 (4,883,802,336). The data transfer request is passed to disk drive #3.

The PTDDC attached to disk drive #3 receives the data transfer request and notes that the starting LBA of the transfer address (5,000,000,000) is less than the maximum LBA address of disk drive #3 (8,790,831,504).

The PTDDC associated with disk drive #3 subtracts the starting LBA of the transfer address (5,000,000,000) from the start LBA associated with disk drive #3 (4,883,802,337) to produce a local LBA starting address for data associated with disk drive #3 (5,000,000,000)−(4,883,802,337)=(116,197,664). This modified disk drive transfer address (including LBA) is passed to disk drive #3.

The PTDDC associated with disk drive #3 passes the modified data transfer request LBA (116,197,664) to disk drive #3 and data is transmitted to/from disk drive #3 based on the remaining specifications of the data transfer request.

Any data to be read from disk drive #3 is relayed back through the PTDDC daisy-chain of PTI/PTO ports back to the originating HBA port associated with the PTDDC connected to disk drive #1.

The above scenario may be modified in situations where the disk drive data transfer request crosses the logical block boundaries associated with a given pair of disk drives. For example, a sufficiently large data transfer request that spans disk volumes can bifurcated into two data transfer requests: one that is processed by the initially mapped disk drive in the PTDDC chain, and the remainder of the transfer can be processed by the next disk drive in the PTDDC chain. One skilled in the art will recognize that it is a simple matter to bifurcate these data transfer requests by limiting the first data transfer request to the available space in the initially mapped disk drive and reducing the transfer size for the next disk drive in the chain (after substituting a value of zero (0) for the initial data transfer block LBA value for this drive).

LBA Mapping Configuration Storage (1400)

Figure 14:
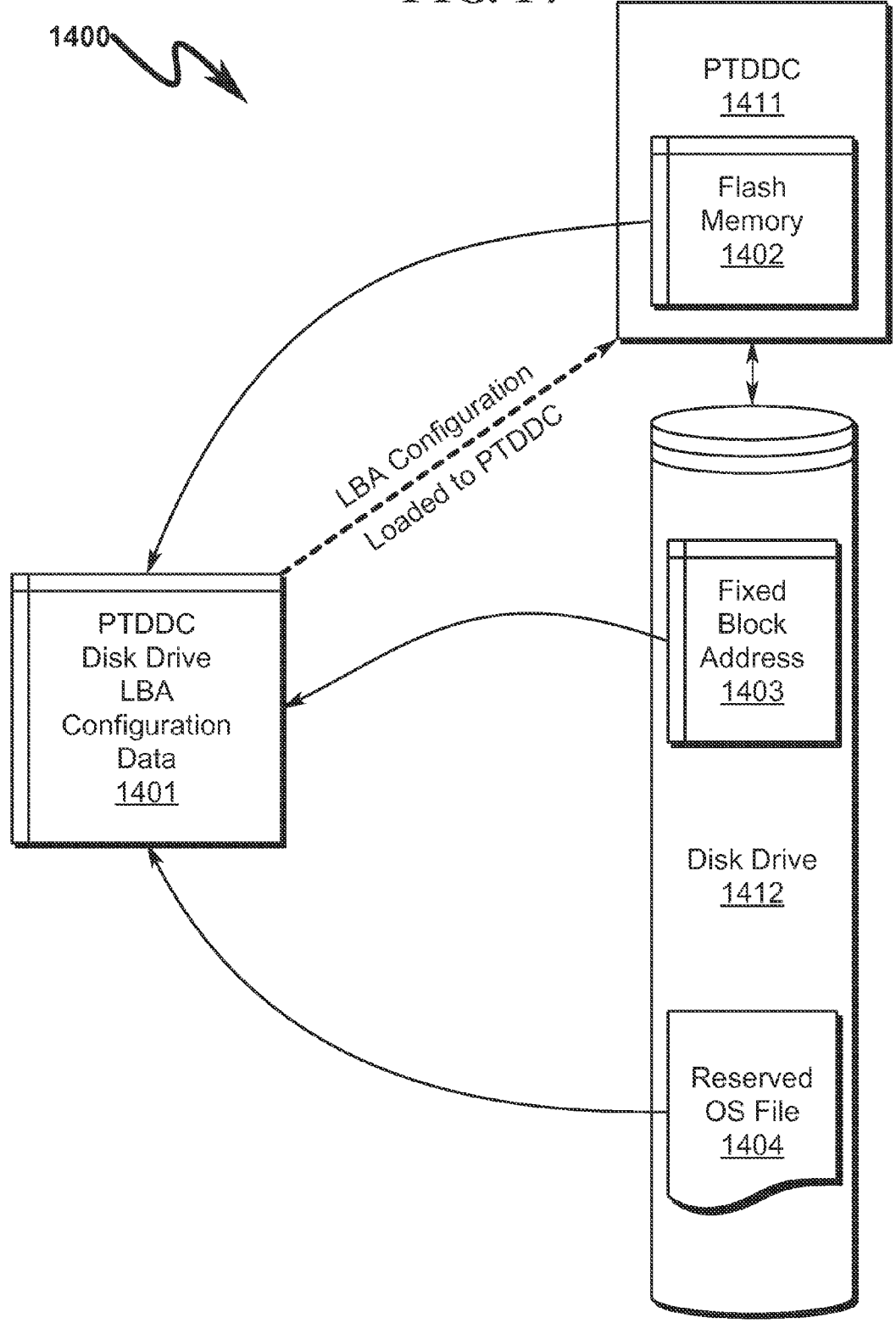
FIG. 14 illustrates several exemplary embodiments of how PTDDC disk drive LBA configuration data may be stored within the context of a PTDDC system.

The present invention as previously described anticipates a variety of methodologies may be used to provide LBA mapping from a logical volume request to the physical mapping to PTDDC connected physical disk drives. As generally illustrated in FIG. 14 (1400), storage of the LBA mapping configuration data (1401) may take many forms, but the present invention anticipates that the following methodologies are superior in many preferred exemplary embodiments:

Flash, FRAM, or non-volatile memory (1402) within each PTDDC (1411) may be utilized to store LBA mapping configuration information (1401). This approach is fast and provides a methodology to permit replacement of disk drives without regard for their contents. Note that this memory may reside outside the ASIC associated with most of the functionality of the PTDDC in many preferred embodiments. Additionally, this memory may be loaded via a serial protocol sent to the PTDDC chain and/or the PTDDC may recognize a fixed LBA block address as comprising the contents of the LBA configuration memory. A preferred exemplary embodiment utilizes logical block zero (0) (or alternatively the logical block address of all 1's) as the configuration data array, with suitable modifications to the LBA mapping logic of the PTDDC to offset all disk drive transfer requests by one logical block.

Dedicated block storage (1403) within the PTDDC attached disk drive (1412) may be utilized to store LBA mapping configuration information (1401). A dedicated block address (1403) on the attached disk drive (1412) may store a table of LBA configuration information (1401) used in the logical remapping process by the PTDDC (1411). Note in cases where the disk drive is capable of indicating a logical volume size less than the physical number of blocks on the volume, the LBA mapping configuration information can be placed BEYOND the last logically addressable block on the disk drive, and retrieved when necessary by adjusting the logical size of the disk drive. Another approach is to allocate specific blocks at the beginning or end of the volume and utilize an LBA offset to remap requests to the disk drive from the HBA interface.

Dedicated file storage (1404) within a file system resident on the PTDDC (1411) attached disk drive (1412). Specific files with optional (SYSTEM, READONLY) attributes may be placed on PTDDC attached disk drives (1412) via a supervisory operating system or application program to contain the LBA mapping information.

The present invention anticipates that these storage methodologies are only exemplary of how this LBA configuration information may be stored, and that combinations of these approaches may be appropriate in some circumstances.

LBA Logical-to-Physical Mapping Configuration (1500, 1600)

Figure 15:
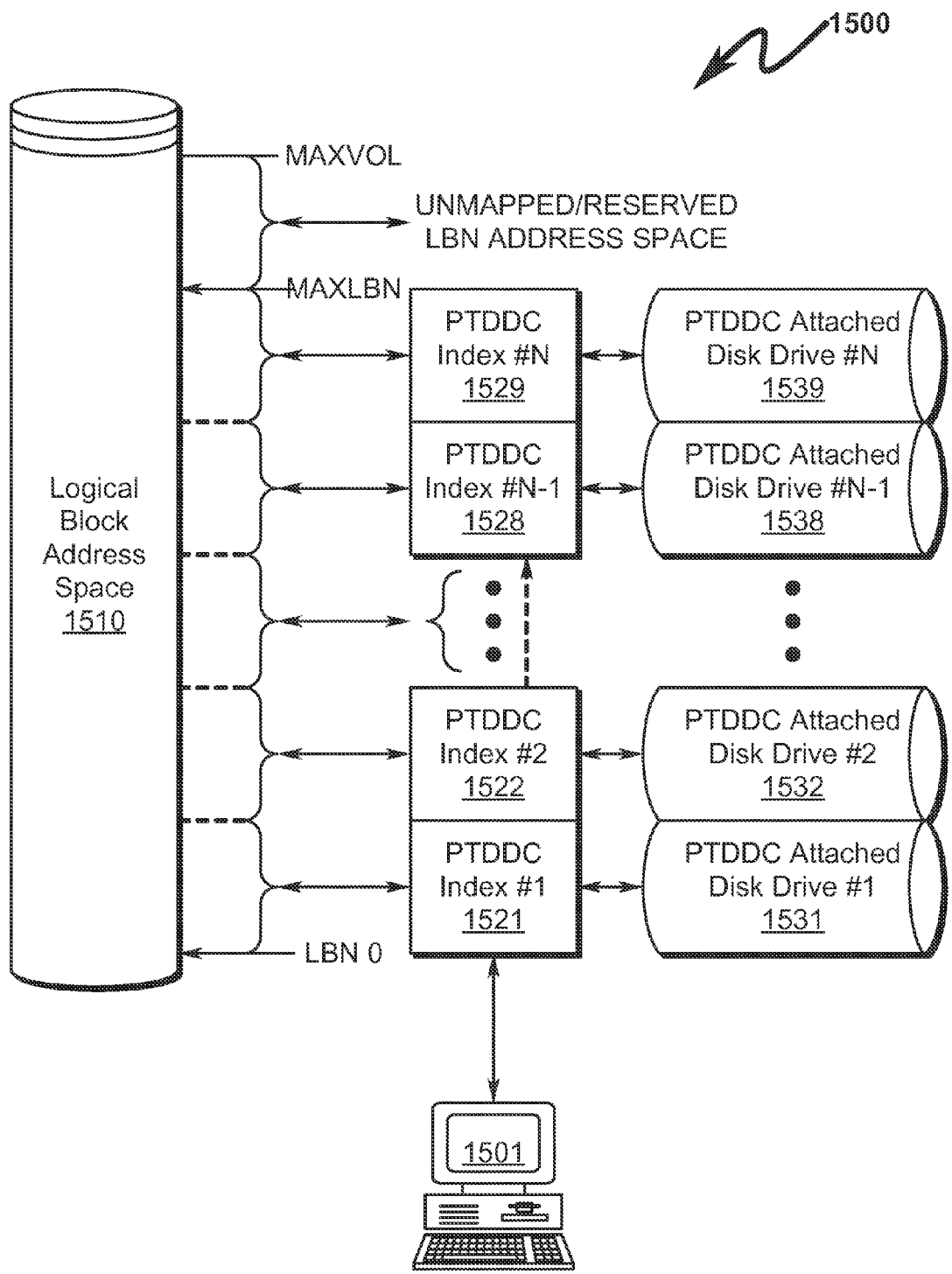
FIG. 15 illustrates an exemplary embodiment of the present invention wherein LBA logical-to-physical mapping occurs sequentially with respect to PTDDC-attached disk drives.

The present invention anticipates a variety of methodologies may be used to provide LBA logical-to-physical mapping from a logical volume request to the physical mapping of PTDDC connected physical disk drives. As previously depicted in FIG. 13 (1300) and generally illustrated in FIG. 15 (1500), LBAs may be mapped contiguously starting from the first LBA of the first PTDDC attached disk drive as seen from the computer system (1501).

Figure 16:
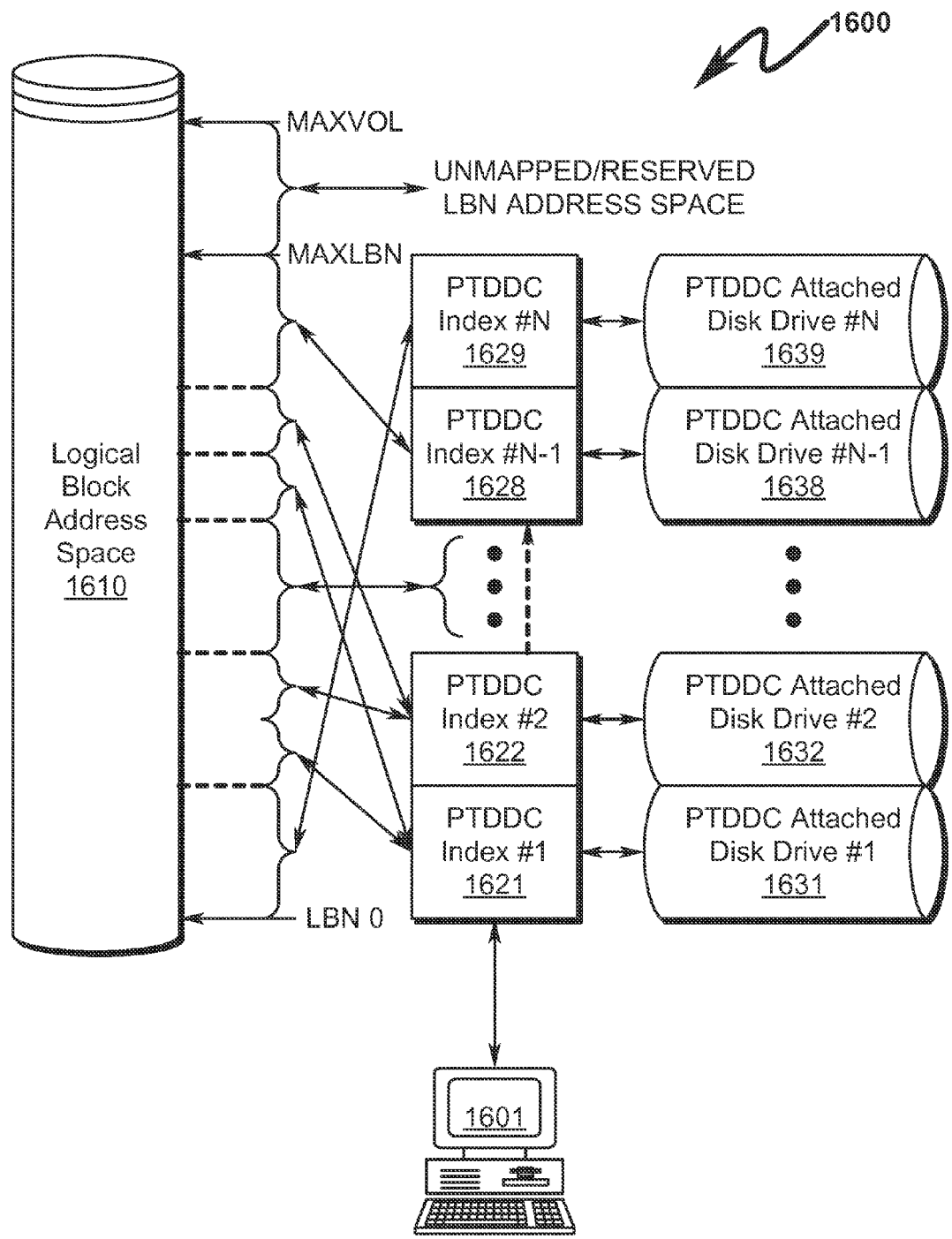
FIG. 16 illustrates an exemplary embodiment of the present invention wherein LBA logical-to-physical mapping occurs non-sequentially with respect to PTDDC-attached disk drives.

However, as generally illustrated in FIG. 16 (1600), LBAs may be mapped non-contiguously wherein the LBA range of a given PTDDC attached disk drive is arbitrarily mapped into the logical address space of the logical drive as seen from the computer system (1601). This approach is more general and permits the greatest flexibility in the physical arrangement of disk drives within a storage array comprising chained PTDDCs. This approach also permits reconfiguration of the array in situations where a failing RAID drive is to be replaced by logically remapping a spare drive within the PTDDC chain to become the mirror drive for another drive within the PTDDC chain.

Furthermore, as generally illustrated in FIG. 16 (1600), a given disk drive (1631, 1632) that is attached to a chained PTDDC (1621, 1622) may have non-contiguous and segmented mapping into the logical address space of the logical block address space (1610). This permits, for example, replacement of a 1-TB disk drive with a 2-TB disk drive such that the first 1-TB of the replacement drive is mapped to the original 1-TB logical address space consumed by the original disk drive, with the remaining 1-TB address space of the 2-TB disk drive mapped somewhere else in the logical block address space (1610). This illustrates the concept that the PTDDC may contain multiple LBA mapping windows into the logical block address space (1610) for a given PTDDC-attached disk drive. This fact is important to keep in mind when interpreting the LBA mapping address comparators detailed elsewhere in this document, as it should be understood that these LBA address comparators may operate on a multiple number of windows into the logical block address space (1610) for a given PTDDC-attached disk drive.

Internal PTDDC Architecture SATA Example (1700, 1800)

Overview

While many implementations of the PTDDC are possible, the general characteristics of the system/method associated with this concept can be best illustrated by an exemplary embodiment. To this end, the generalized SATA architecture illustrated in FIG. 17 (1700) is useful, as it depicts a preferred exemplary embodiment in a preferred SATA disk drive interface context.

SATA Exemplary Embodiment (1700)

Figure 17:
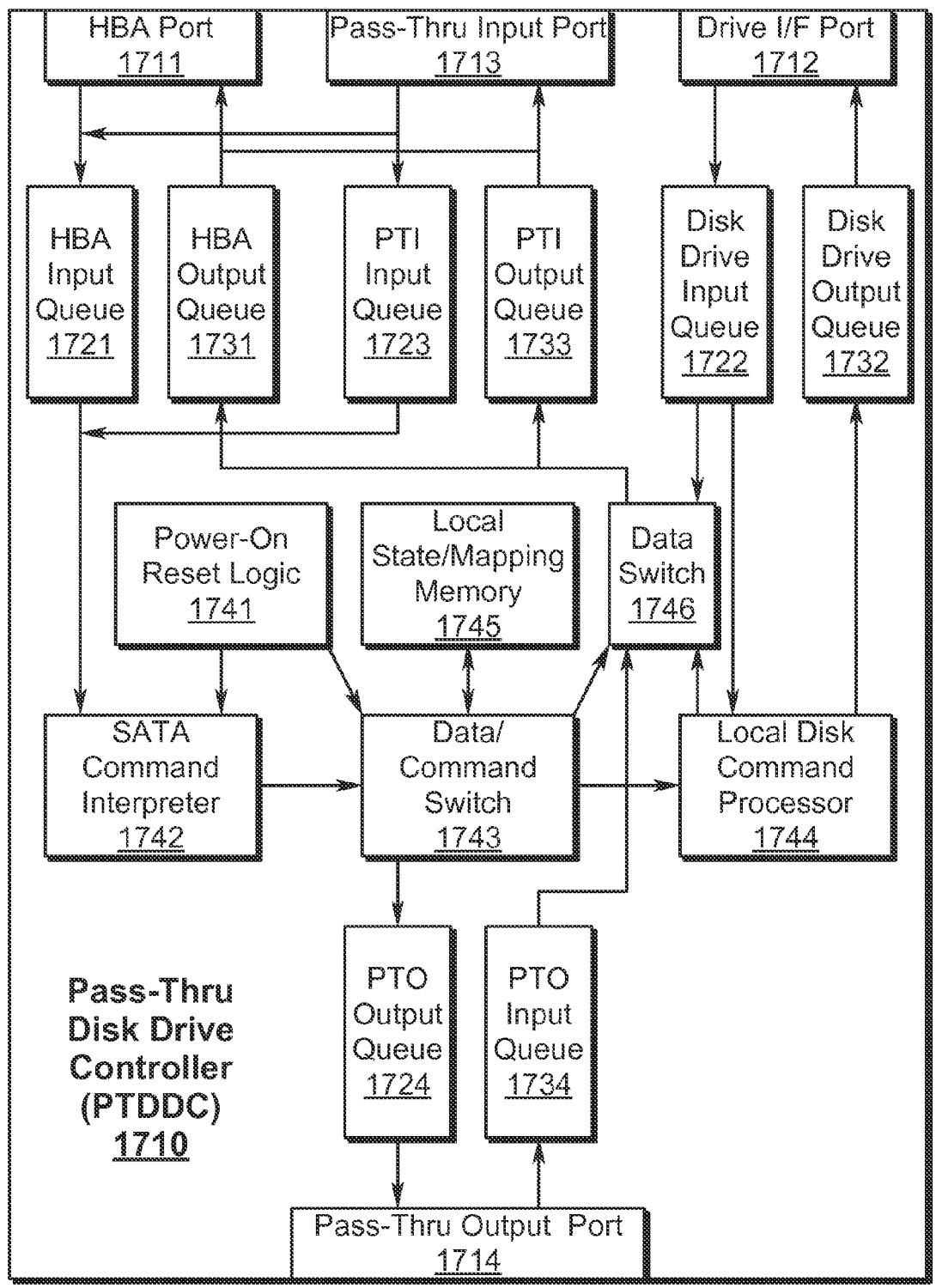
FIG. 17 illustrates an exemplary embodiment of the present invention as applied to a SATA disk drive architecture.

As illustrated in FIG. 17 (1700), the PTDDC concept (1710) as preferably implemented in a SATA environment may incorporate a HBA port interface (1711), disk drive I/F port interface (1712), pass-thru input port interface (1713), and pass-thru output port interface (1714). Each of these interfaces is bi-directional and may have associated input queues (1721, 1722, 1723, 1724) and output queues (1731, 1732, 1733, 1734) associated with them, although in the case of the pass-thru input port (1713), this interface (and its associated PTI input (1723) and PTI output (1733) queues) may be integrated into the HBA port interface (1711) as described elsewhere to minimize the hardware associated with the particular PTDDC implementation.

While many methodologies are acceptable to implement the input (1721, 1722, 1723, 1724)/output (1731, 1732, 1733, 1734) queues in this context, many preferred embodiments utilize techniques discussed in U.S. Pat. No. 4,873,665 issued to Ching-Lin Jiang and Clark R. Williams on Jun. 7, 1988 for Dual storage cell memory including data transfer circuits; U.S. Pat. No. 5,299,156 issued to Ching-Lin Jiang and Clark R. Williams on Mar. 29, 1994 for DUAL PORT STATIC RAM WITH BIDIRECTIONAL SHIFT CAPABILITY; U.S. Pat. No. 5,532,958 issued to Ching-Lin Jiang and Clark R. Williams on Jul. 2, 1996 for DUAL STORAGE CELL MEMORY; and U.S. Pat. No. 6,118,690 issued to Ching-Lin Jiang and Clark R. Williams on Sep. 12, 2000 for DUAL STORAGE CELL MEMORY.

It should be noted that while the construction of the HBA port interface (1711), disk drive I/F port interface (1712), pass-thru input port interface (1713), and pass-thru output port interface (1714) are shown to be identical, this need not be the case. For example, in this application of the PTDDC to a SATA disk drive architecture, only the HBA port interface (1711) and disk drive I/F port interface (1712) are by necessity SATA-style hardware interfaces. The remaining pass-thru input port interface (1713) and pass-thru output port interface (1714) may be constructed using other hardware interfaces that are easier/cheaper to implement. Additionally, note that the HBA port interface (1711) and disk drive I/F port interface (1712) need not be the same type of hardware interface. For example, the HBA port interface (1711) could be configured as an iSCSI interface with the disk drive I/F port interface (1712) being configured as SATA. One skilled in the art will recognize that any number of interface combinations are possible with these teachings of the present invention.

The PTDDC operates as follows. If necessary, an optional power-on reset circuit (1741) provides general initialization signaling for power-on startup of the system. While many options are available for this function, one preferred approach is shown in U.S. Pat. No. 5,164,613 issued to Eric W. Mumper, Francis A. Scherpenberg, and William L. Payne, II on Nov. 17, 1992 for RESET MONITOR. One skilled in the art will recognize that such circuits are common in a wide variety of digital systems, including those supporting disk drives.

Data and/or commands received from the HBA port (1711) and queued for processing by the HBA input queue (1721) are interpreted by a SATA command interpreter (1742) to determine content and validity. Depending on the type of command and/or data stream, a data/command switch (1743) interprets the data/command contents and makes a determination as to whether the data/command should be processed locally (to the disk drive attached to the PTDDC) or passed along the PTDDC chain to another PTDDC/disk drive pair.

If the data/command contents are not targeted towards the locally attached PTDDC disk drive, it is forwarded to the pass-thru output port (1714) via the PTO output queue (1724). Command responses and/or data from the downstream PTDDC attached disk drive is then received from the pass-thru output port (1714), cached by the PTO input queue (1734) and eventually relayed back to the HBA port (1711) via the HBA output queue (1731).

If the data/command contents are targeted towards the locally attached PTDDC disk drive, it is forwarded to the disk drive I/F port (1712) via the disk drive output queue (1732) under control of a local disk command processor (1744). Command responses and/or data from the PTDDC locally attached disk drive is then received from the disk drive I/F port (1714), cached by the disk drive input queue (1722) and eventually relayed back to the HBA port (1711) via the HBA output queue (1731).

The data/command switch (1743) controls a data switch (1746) that coordinates the return of command responses and/or data received from the local disk drive I/F port (1712) and the pass-thru output port (1714). This coordination ensures that information received from these sources is properly queued for return back to the HBA port (1711) via the HBA output queue (1731). However, in some circumstances, conversations between the local PTDDC and the locally attached disk drive should be confined to the PTDDC interface and not be relayed back to the HBA port (1711). For example, retrieving local PTDDC configuration information from the locally attached disk, inquiring as to the device identification of the locally attached disk (for drive indexing as detailed below), and other situations in which the communications should be localized to the immediate PTDDC interface space.

To aid in determining if given locally attached disk drive is within the LBA addressing range of a given PTDDC, the use of local state/mapping memory (1745) is anticipated in many preferred embodiments. This local state/mapping memory (1745) may include LBA upper/lower ranges for the attached disk drive, disk drive model/serial number information, an index value to indicate the position of the local PTDDC within a chain of serially connected PTDDCs, and other information as needed.

LBA Mapping Architecture (1800)

Figure 18:
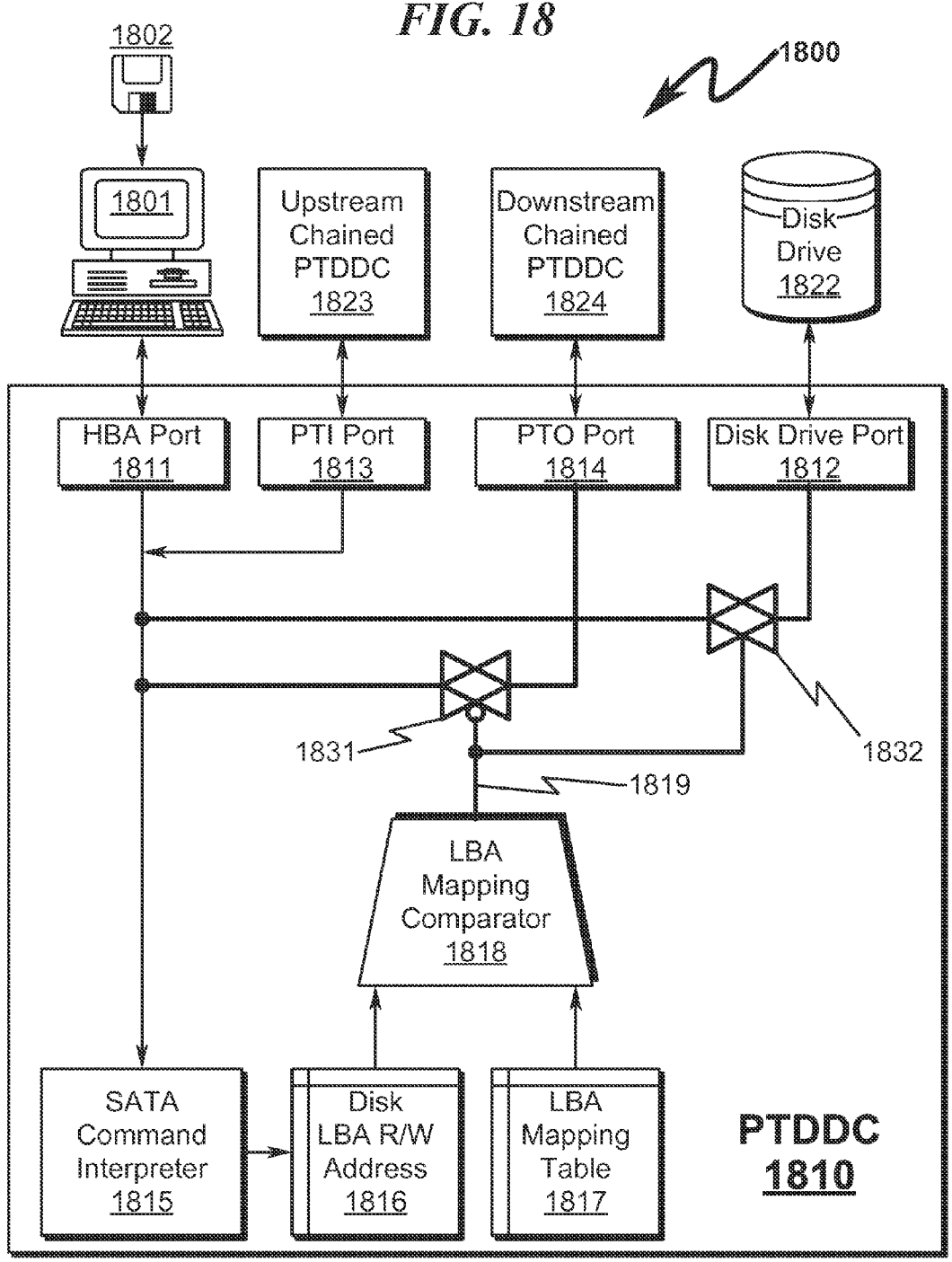
FIG. 18 illustrates an exemplary embodiment of the present invention as applied to a SATA disk drive architecture, detailing the internal LBA mapping functions of the PTDDC.

The data/command switch (1743) and data switch (1746) functionality as depicted in FIG. 17 (1700) may be clarified by inspection of the exemplary LBA mapping architecture methodology as generally illustrated in FIG. 18 (1800). In this exemplary implementation, the host computer (1801) running software (1802) interfaces with a PTDDC (1810) via a HBA port (1811) (or equivalently an upstream PTDDC (1823) is interfaced with the PTDDC (1810) via a PTI port (1813)). A locally attached disk drive (1822) is supported by the PTDDC (1810) via a disk drive port (1812) and optionally a downstream chained PTDDC (1824) is supported via a PTO port (1814).

SATA commands received from the HBA port (1811) and/or the PTI port (1813) are received by the SATA command interpreter (1815) and decoded based on the desired SATA command function. In situations where the command includes loading of disk LBA values for subsequent read/write operations, this information is loaded into a local disk LBA R/W address register (1816). This register (1816) is matched with an internal LBA mapping table (1817) (previously loaded when the PTDDC (1810) was configured) using a LBA mapping comparator (1818). The LBA mapping comparator (1818) takes the disk LBA R/W address register and determines if the requested data transfer is within the range of the locally attached disk drive (1822) as determined by the LBA mapping table (1817). The match output (1819) from the LBA mapping comparator (1818) is then used to enable a data switch (1831) from the HBA/PTI port (1811, 1813) to the PTO port (1814) and associated downstream chained PTDDC (1824) if the data transfer is not within the LBA range as indicated by the LBA mapping table (1817) or alternatively enable a data switch (1832) from the HBA/PTI port (1811, 1813) to the disk drive port (1812) and associated PTDDC-attached disk drive (1822) if the data transfer is within the LBA range as indicated by the LBA mapping table (1817). While the data switches (1831, 1832) are indicated symbolically here as transmission gates, one skilled in the art will recognize that a wide variety of active and/or passive data switching methodologies may be utilized in the implementation of this functionality.

SATA LBA Mapping Range

One advantage of using SATA (and SATA class) disk drives is their ability to support 48-bit LBA addressing. These drives typically incorporate a 6-byte sector address selection register which permits 2**48 sectors to be addressed (281.47E+12) or approximately 144E+15 bytes. Assuming the SATA disk drives are 1-TB capacity and comprise 1,953,525,168 512-byte sectors (1,000,204,866,016 bytes), this LBA addressing range permits approximately 144,085 disk drives to be placed within this LBA address space. Thus, for all practical situations, the PTDDC chain can be sequentially appended without any concern for exhausting the overarching address space permitted by the disk drive architecture. As mentioned previously, a wide variety of file systems support this 48-bit LBA addressing, and as such the PTDDC concept maintains compatibility with both the SATA disk drive architecture and common operating systems under which it must function.

Given that the 48-bit SATA addressing range is so large in comparison to currently available disk drive physical addressing capabilities, it should be mentioned that in some embodiments of the present invention the PTDDC chain may be serialized such that each PTDDC controller in the chain is given a unique byte identifier. Subsequent to this controller identification, LBA addresses associated with that particular PTDDC can be uniquely identified by incorporating this byte identifier as the most significant byte (MSB) of the 48-bit SATA LBA address field. This subpartitioning of the PTDDC logical address space would permit 256 "zones" of PTDDCs, each zone comprising approximately 256 disk drives. This technique, when used in conjunction with port multipliers and port selectors can provide the architectural framework for massive "cloud" computing storage systems having both high capacity, high availability, and internal redundancy.

One skilled in the art will recognize that the 48-bit SATA LBA address space can be subpartitioned into a number of "groups" or "zones", each of which comprising a number of bits of the 48-bit address map with the general architecture being one of a "network" of disk drives that form a "tree" of information storage, all of which is accessible via a single HBA connection to the host computer system. This is a very powerful concept when applied to very large computer installations, both because of its capability, but also the practical nature of its implementation feasibility, especially given the low cost profile of the overall system implementation as detailed elsewhere in this document.

Individual Drive Indexing

SATA Example

Overview

The PTDDC concept disclosed herein attempts to treat the entire chain of PTDDC-attached disk drives as one logical volume from the perspective of the host computer HBA. While in the vast majority of hard drive access operations this is acceptable, there are some circumstances in which it may be necessary to individually address a given disk drive in the PTDDC chain for a variety of purposes, including but not limited to:

- Initializing the disk drive with an index value (disk drive address (DDA)) to be associated with accessing the individual disk drive.
- Configuring the disk drive with the lower/upper range of LBA addresses in which the drive is to be mapped into the overall HBA logical address space.
- Low-level formatting of the drive.
- Setting drive security information.
- Reporting of drive diagnostics and other maintenance information.
- Other functions as permitted by the individual disk drives.

One skilled in the art will recognize that the scope of the inquiry will be heavily based on the hard drive architecture utilized within the context of the PTDDC system/method.

Fundamental Unique PTDDC Indexing Question and System Context

A core question to be answered in this context is "How does a PTDDC become individually addressable when each PTDDC may be manufactured in an identical fashion (and therefore has no uniqueness when originally installed)?". To provide exemplary embodiments of the present invention that implement this feature it will be useful to select a particular disk drive technology as the basis of analysis. Therefore, the remaining discussion will utilize the SATA disk drive interface, a preferred implementation context for the present invention, as the basis for detailing a solution to this problem.

PTDDC ID Method #1—PTDDC Internal Indexing/Identification (1900)

Figure 19:
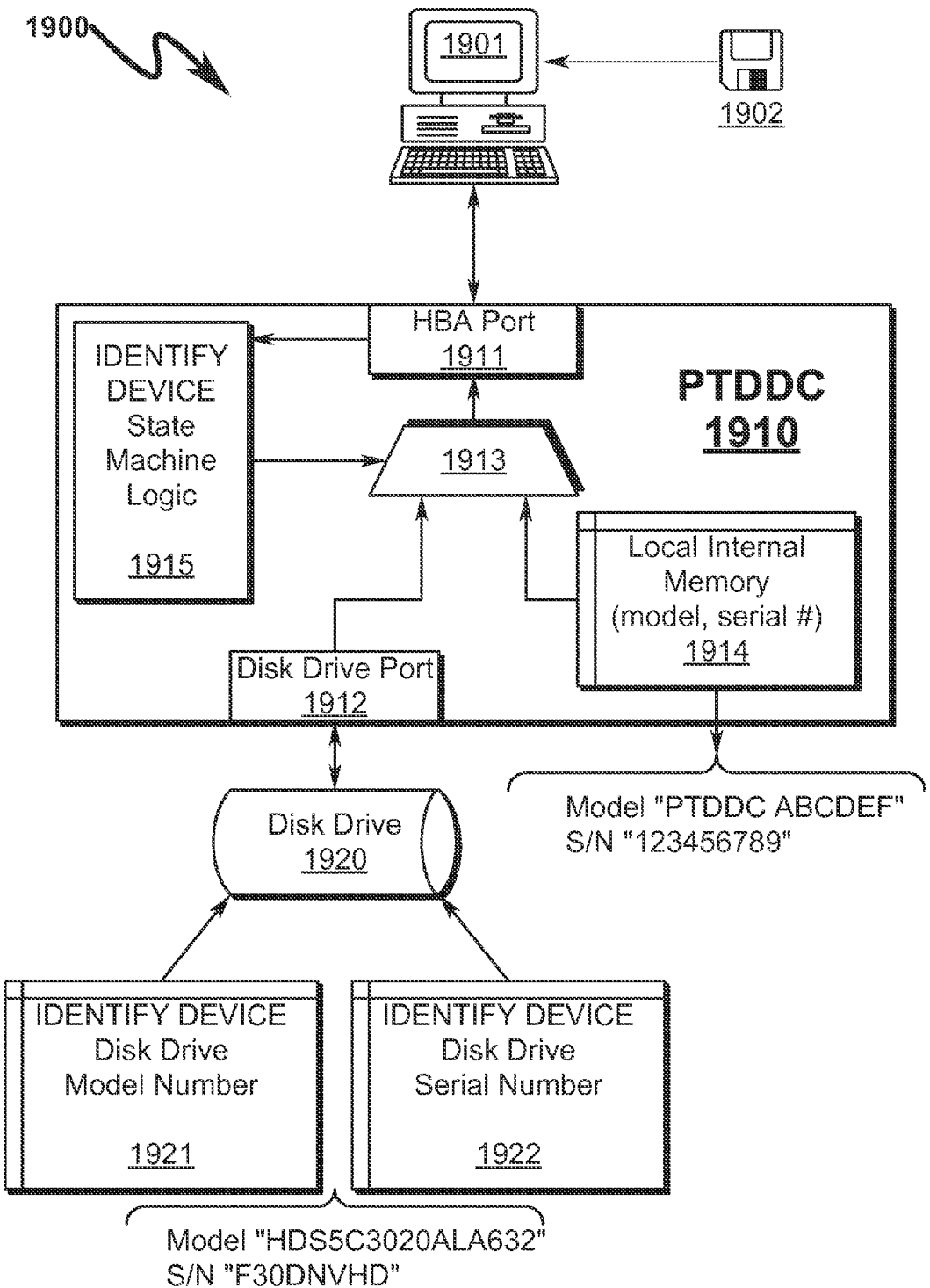
FIG. 19 illustrates an exemplary system/method of accessing PTDDC identification information.

As generally illustrated in FIG. 19 (1900), one method of uniquely identifying a particular PTDDC is to have each PTDDC (1910) uniquely tagged in the factory with an electronic serial number (1914) that is readable via the HBA port (1911) via a computer system (1901) under control of operating system or application software (1902). This may be accomplished in a SATA environment by modification of the IDENTIFY DEVICE (0xEC) command results (1921, 1922) to modify the following return fields for this inquiry:

- DISK DRIVE MODEL NUMBER (1921). Words 27-46 (20 bytes) of the returned 512-byte sector in this command normally indicate the model number of the attached disk drive in ASCII. This 20-byte field can be replaced on alternate IDENTIFY DEVICE commands with a unique electronic text field ("PTDDC" for example) to indicate that the associated serial number field returned is for the PTDDC.
- DISK DRIVE SERIAL NUMBER (1922). Words 10-19 (10 bytes) of the returned 512-byte sector in this command normally indicate the serial number of the attached disk drive in ASCII, and zero (0) if not specified. This 10-byte field can be replaced on alternate IDENTIFY DEVICE commands with a unique electronic serial number for the PTDDC.

This technique can be used in conjunction with methods below to provide information on both the PTDDC interface itself as well as any disk drive attached to the PTDDC. For example, it may be possible to interrogate the chain of PTDDC interfaces separate and apart from the disk drives that are attached to the individual PTDDCs.

This system/method normally operates such that a "RESET DEVICE" command received by the PTDDC (1910) HBA port (1911) operates to initialize the state machine logic (1915) so that a subsequent IDENTIFY DEVICE command retrieves disk drive (1920) information normally including a model number (1921) and serial number (1922). This information is relayed back to the host computer via the HBA port (1911) through a data multiplexer (1913). A subsequent IDENTIFY DEVICE command changes the state of the state machine logic (1915) so that data from a PTDDC local memory (including a model, serial number, and other identifying information) is substituted for the original disk drive model (1921) and/or serial (1922) number information and presented to the host computer (1901) via the HBA port (1911) through the data multiplexer (1913).

PTDDC ID Method #2—Phantom Interface (2000)

Yet another method of accessing data within the context of the PTDDC is to use a "phantom" interface similar to that utilized in the MAXIM INTEGRATED PRODUCTS, INC. model DS1315 Phantom Time Chip. This integrated circuit utilizes a series of device accesses under a strict address accessing protocol to match a 64-bit data pattern (0xC5, 3A, A3, 5C, C5, 3A, A3, 5C). If this series of address access patterns is matched, the state of the phantom interface changes to permit reads and/or writes of data to the phantom memory via particular address accesses.

As illustrated in the exemplary system block diagram of FIG. 20 (2000), application of this phantom interface technique to the PTDDC (2010) can be described as follows. The host computer system (2001) under control of software (2002) interfaces with the PTDDC (2010) via the HBA port (2011) (or equivalently an upstream chained PTDDC (2023) connected via a PTI port (2013)) to send disk drive commands to a SATA interpreter (2030) that decodes and validates the disk drive command.

The output of the SATA command interpreter (2030) is filtered by a command address filter (2031) that extracts the address protocol information from the command stream. This function can take many forms, but one example would be to extract the byte value associated with the MSB of the 48-bit SATA LBA sector address. This address value is compared with a protocol match pattern (2032) by a protocol matching comparator (2033). If a match between the protocol match pattern (2032) and the SATA address access is detected, a match latch (2034) is activated to indicate a protocol match.

Within the context of this protocol matching functionality a power-on reset (2035) circuit permits initialization of a protocol index counter (2036) that indexes the protocol match pattern (2032) against the incoming results of the command address filter (2031).

If a protocol match is indicated by the match latch (2034), a data switch is activated (2037) to divert address access information from the SATA command interpreter (2031) to permit read/write access to the local setup memory (2038). This local setup memory (2038) is responsible for configuring the characteristics of the PTDDC (2010), such as setting LBA mapping ranges and other functions.

Figure 20:
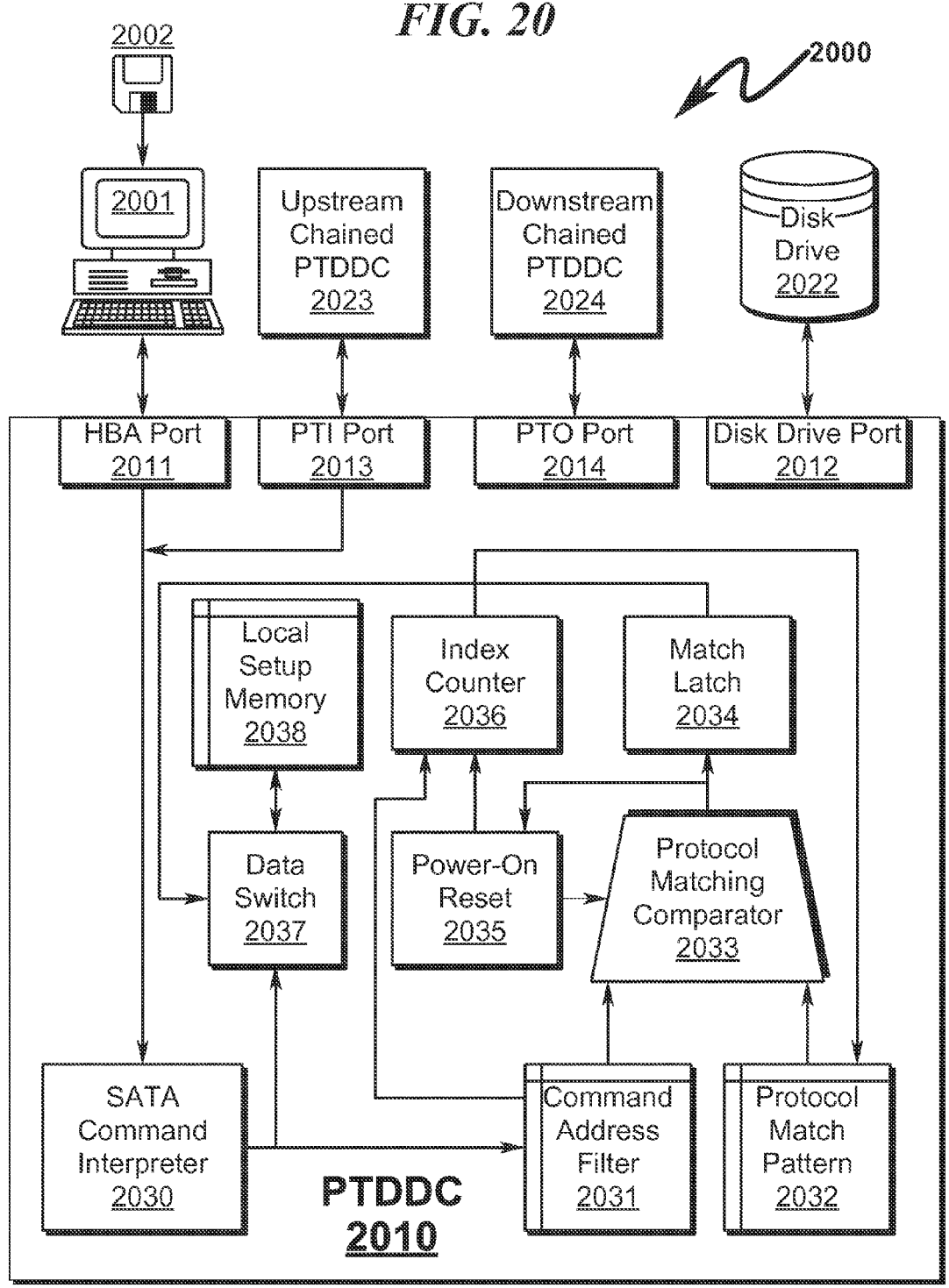
FIG. 20 illustrates an exemplary system/method of accessing PTDDC internal data structures using phantom addressing techniques.

As generally illustrated in FIG. 20 (2000), within the context of the PTDDC (2010), this technique can be used to access local setup memory (2038) within the first PTDDC in the chain to write configuration information to the PTDDC. A "lock" bit can then be written to lock the information within the first PTDDC, thus permitting subsequent protocol accesses to skip the first PTDDC and access the downstream chained PTDDC (2024). The process can be repeated for each PTDDC in the sequential chain and thus permit complete configuration of each PTDDC in the entire chain. Use of a "DRIVE RESET" command or other SATA specific command can be utilized to reset the "lock" bit to permits access to the front of the PTDDC chain if necessary.

As to the specifics of the protocol match pattern (2032) and the manner in which the address recognition by the command address filter (2031) is accomplished, the present invention makes no limitation on how this is accomplished. One preferred methodology would be to use the most significant bit of the SATA LBA address to provide this addressing information, requiring one SATA read cycle for each match of the protocol match pattern (2032). Once the protocol match pattern (2032) has been matched, subsequent SATA read operations could indicate a "write" if the high order LBA sector address bit is a "1" and a "read" if the high order LBA sector address bit is a "0", with "write" data being obtained from the low order LBA sector address bit if necessary. This architecture ensures that a fixed number of configuration bits can be stored in the local setup memory (2038) using only SATA READ SECTOR commands, providing insurance that these operations are non-destructive with respect to data contained on the PTDDC-attached disk drive (2022).

PTDDC ID Method #3—Sequential Drive Serial Number Search (2100)

Figure 21:
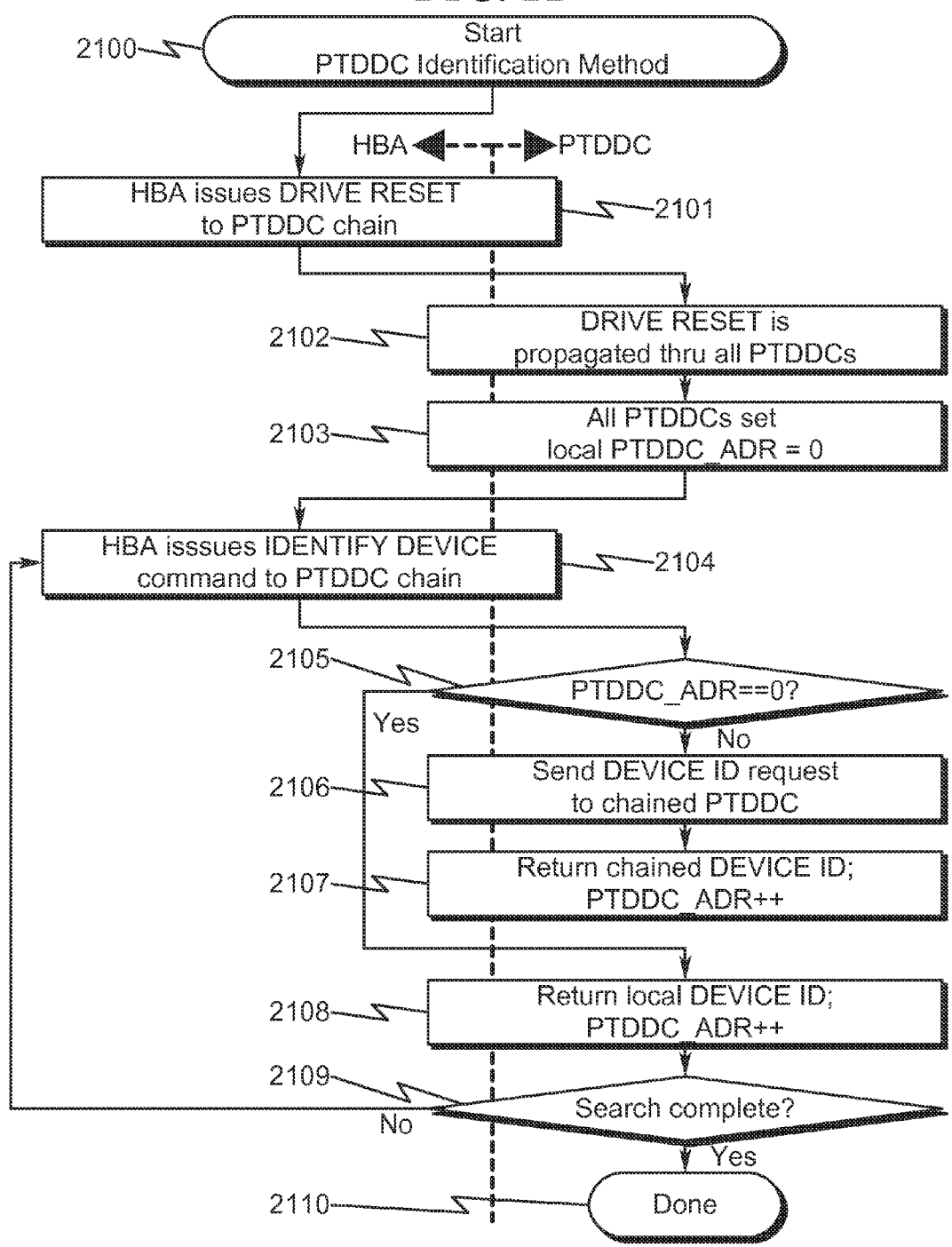
FIG. 21 illustrates an exemplary PTDDC/disk drive identification method.

One present invention PTDDC ID method embodiment variation can be generally illustrated by the preferred exemplary embodiment illustrated in FIG. 21 (2100), wherein the method flowchart as illustrated is depicted using actions by the HBA and the PTDDC. The general steps of this method comprise the following:

Issuing a DRIVE RESET command by the HBA to the PTDDC chain (2101);

Propagating the DRIVE RESET command issued by the HBA thru all chained PTDDCs (2102);

All PTDDCs set a local variable PTDDC_ADR to zero (0) in response to the DRIVE RESET command (2103);

Issuing an IDENTIFY DEVICE command by the HBA to the PTDDC chain (2104);

If the PTDDC receiving the IDENTIFY DEVICE command indicates the value of PTDDC_ADR as non-zero, then control passes to step (8) (2105);

The IDENTIFY DEVICE command is sent to the chained PTDDC (2106).

Data returned from the chained PTDDC IDENTIFY DEVICE command is returned to the HBA, the PTDDC_ADR value is incremented, and control proceeds to step (9) (2107).

If the first PTDDC receiving the IDENTIFY DEVICE command indicates the value of PTDDC_ADR as zero (0), then the IDENTIFY DEVICE command is issued to the disk drive attached to the PTDDC, and the PTDDC_ADR value is incremented (2108).

If the search is not complete, then control passes to step (4) (2109).

The PTDDC identification method is terminated (2110).

It should be noted that after this procedure is completed, the HBA has been able to sequentially read the results of the IDENTIFY DEVICE command that contains not only 20 bytes of information on the disk drive model number, but also 10 bytes of information on the disk drive serial number, the combination of which should be unique in the space of attached disk drives. Additionally, at the end of the process, each PTDDC should have a value of PTDDC_ADR that indicates its distance from the end of the PTDDC chain. For example, the last chained PTDDC will have a PTDDC_ADR value of 1, and the first PTDDC will have a value equal to the number of PTDDCs in the chain. Note that the value of PTDDC_ADR in step (7) is only incremented if a value is returned by the chained PTDDC in response to the IDENTIFY DEVICE COMMAND. If there is no chained PTDDC, then no response will be forthcoming, and PTDDC_ADR will not be incremented.

This general method variation as illustrated in FIG. 21 (2100) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

PTDDC Disk Drive Command Method—Drive Serial Number Match (2200)

Once information on the chain of PTDDCs and their associated disk drives is obtained, another question presents itself in devising a method to send disk drive commands to individual disk drives within the PTDDC chain. One present invention PTDDC disk drive command method embodiment variation can be generally illustrated by the preferred exemplary embodiment illustrated in FIG. 22 (2200), wherein the method flowchart as illustrated is depicted using actions by the HBA and the PTDDC. The general steps of this method comprise the following:

Issue a MATCH DEVICE command by the HBA to the PTDDC chain (2201). This command can be arbitrarily selected from a range of unused or reserved disk drive command opcodes for the given disk drive technology.

Send a MATCH ID data block from HBA thru all chained PTDDCs (2202). This MATCH ID block is the concatenation of the DISK DRIVE MODEL NUMBER and the DISK DRIVE SERIAL NUMBER retrieved from a series of previous IDENTIFY DEVICE to the PTDDC chain and uniquely identifies a given disk drive in the universe of disk drives.

Receive the MATCH ID data block by all PTDDCs (2203);

Send an IDENTIFY DEVICE command to all PTDDC attached disk drives (or alternatively using an internal copy of this information from a previously executed IDENTIFY DEVICE command) (2204);

Compare the MATCH ID block to the DEVICE ID block (2205).

If the MATCH ID block does not match the DEVICE ID block, set the local variable PTDDC_CMD to 0 (2206), otherwise set the local variable PTDDC_CMD to 1 (2207).

Sending a disk drive command from the HBA to the PTDDC chain (2208).

If the local PTDDC_CMD variable is not 1, proceed to step (12) (2209).

Pass the HBA disk drive command to the PTDDC locally attached disk drive (2210) and proceed to step (12).

Pass the HBA disk drive command to the next PTDDC in the chain (2211).

The PTDDC disk drive command method is terminated (2212).

It should be noted that after this procedure is completed, subsequent HBA disk drive commands will target the PTDDC that has been flagged as command-active (PTDDC_CMD==1). This behavior can be modified if necessary to only operate on drive-specific commands that are not data transfer related, such that the LBN mapping functions occur transparently to the operation of other drive-specific commands.

Figure 22:
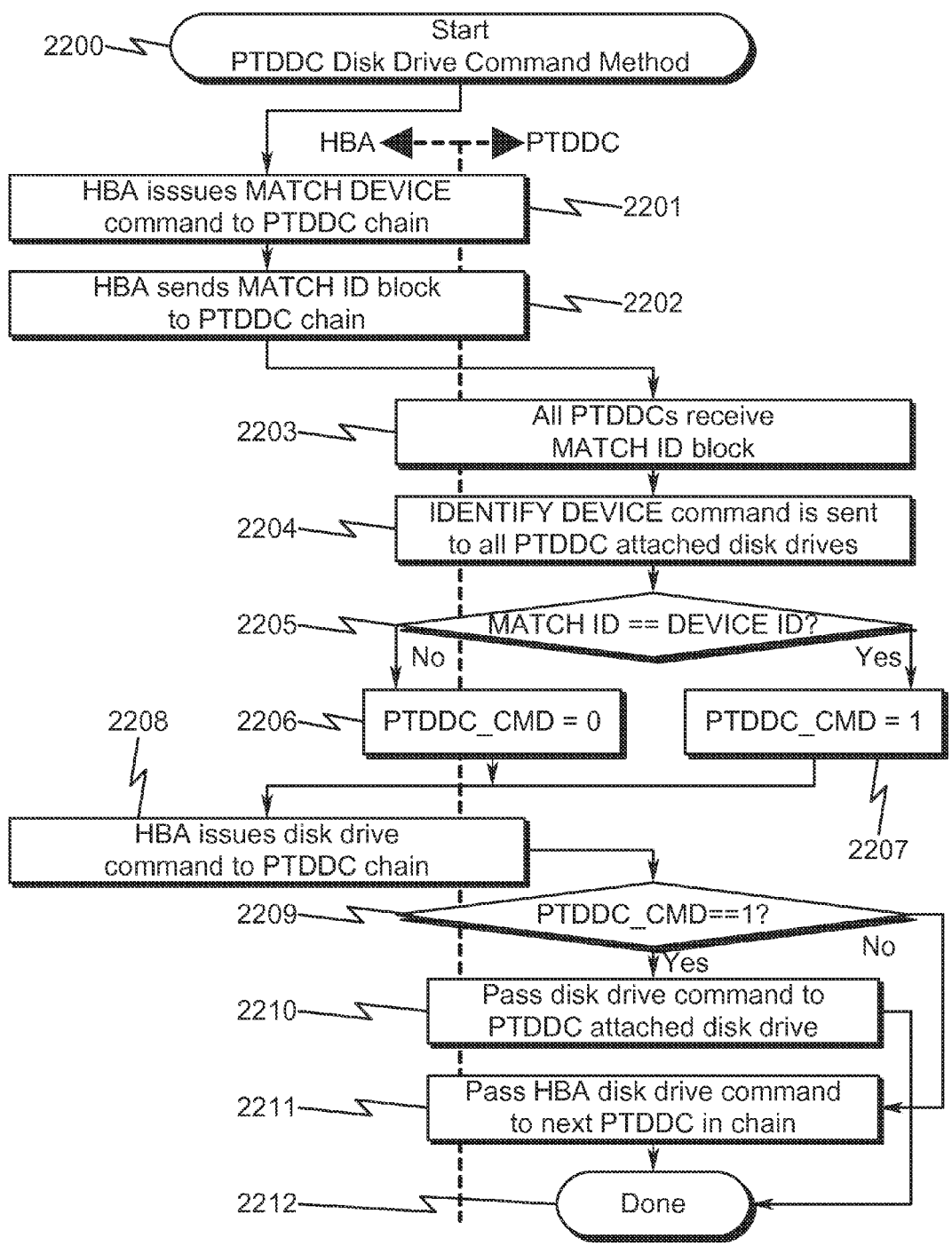
FIG. 22 illustrates an exemplary method for executing a drive-specific disk drive command within a sequential chain of PTDDC-attached disk drives.

This general method variation as illustrated in FIG. 22 (2200) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Exemplary PTDDC ASIC Configuration (2300)

Figure 23:
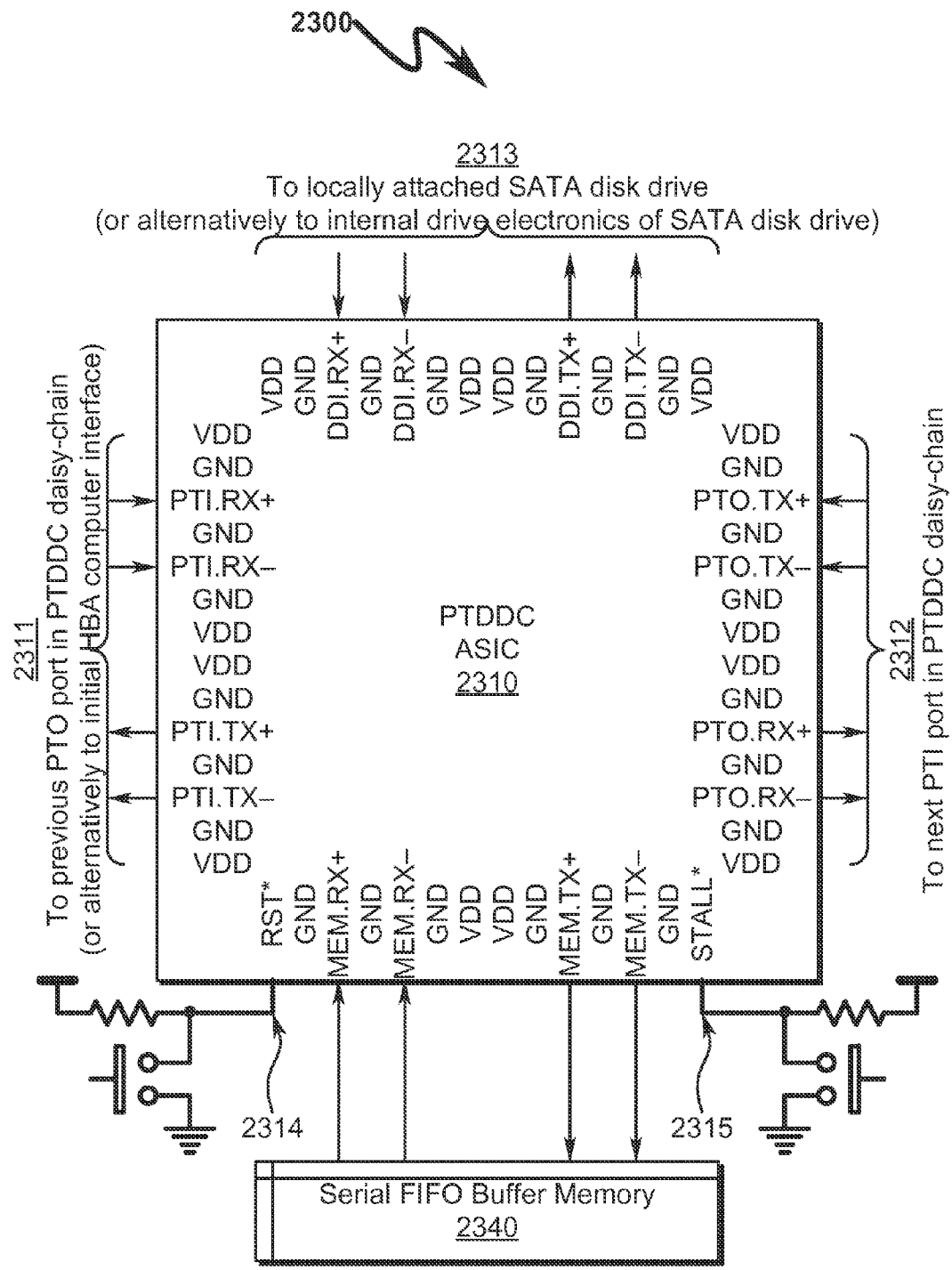
FIG. 23 illustrates an exemplary PTDDC ASIC configuration.

As mentioned elsewhere in this document, the PTDDC functionality may be implemented in an application specific integrated circuit (ASIC). One exemplary configuration of such a circuit profile is generally depicted in the pinout illustrated in FIG. 23 (2300). Here the PTDDC ASIC (2310) is implemented with a PTI port (2311) (connecting to an upstream PTDDC PTO port or host computer HBA), a PTO port (2312) (connecting to a downstream PTI port), and a DDI port (2313) connecting to a SATA disk drive HBA port or alternatively internal SATA disk drive control electronics.

Each of the PTI (2311) and PTO (2312) ports are SATA interfaces. The DDI port (2313) may be a SATA interface or in some circumstances utilize other communication protocols to communicate with internal SATA disk drive electronics. One skilled in the art will recognize that if sufficiently integrated, the ASIC (2310) may incorporate all SATA disk drive electronics necessary to operate the SATA disk drive heads and spindle as well as incorporate the PTDDC pass-thru daisy-chaining functionality. The ASIC (2310) depicted in FIG. 23 (2300) illustrates the application context where the ASIC (2310) is designed to communicate with a conventional SATA disk drive configured with a SATA HBA port.

The PTDDC ASIC (2310) may also incorporate support for communication with a serial FIFO buffer memory (2340) that enables a certain amount of protocol/data buffering along the daisy-chain. While this is an optional external component to the ASIC (2310), in some preferred embodiments this configuration can be an economical method to buffer data along the daisy-chain.

Figure 33:
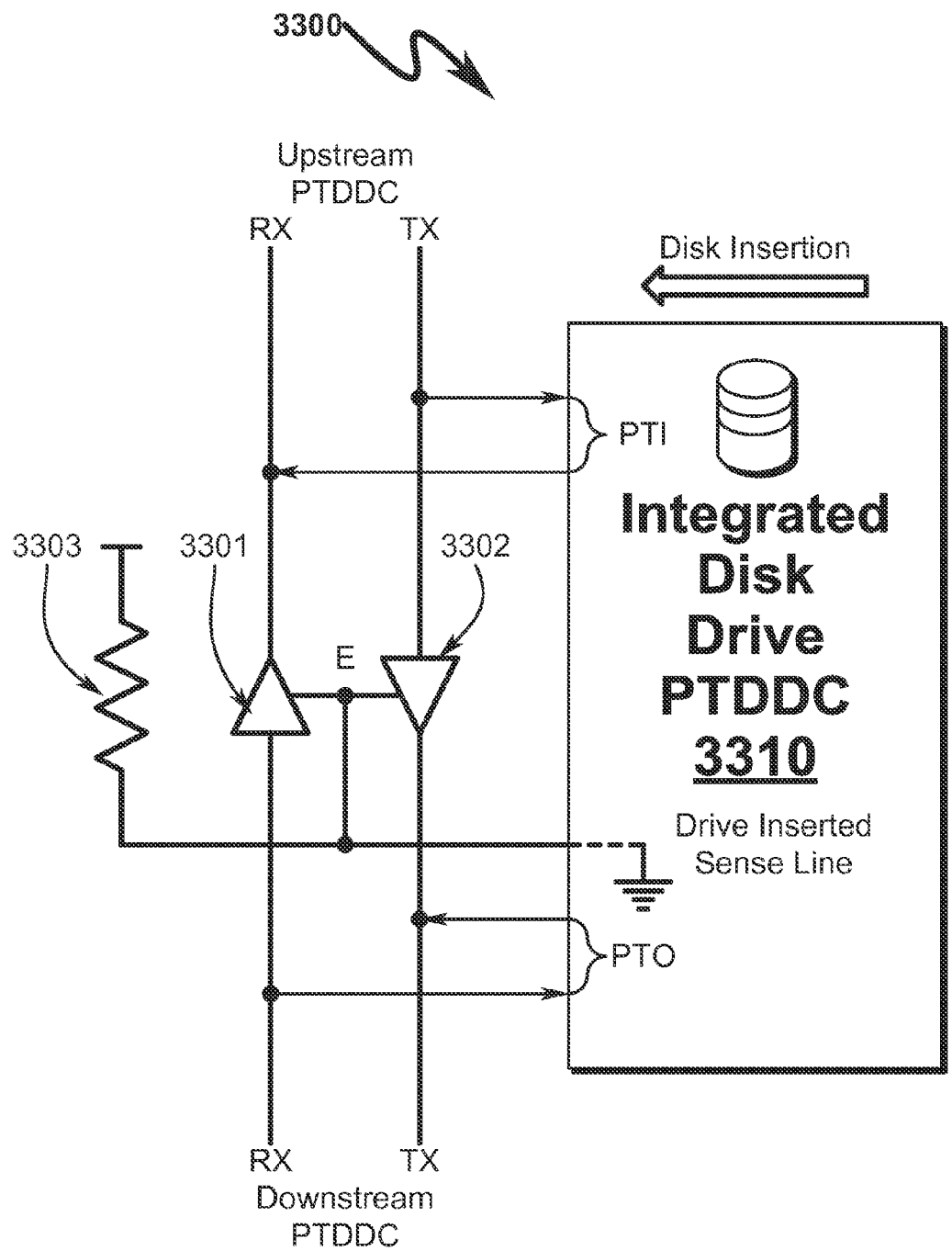
FIG. 33 illustrates an exemplary semi-passive backplane utilizing electrical slot bypass methodology useful in some preferred invention embodiments.
Figure 36:
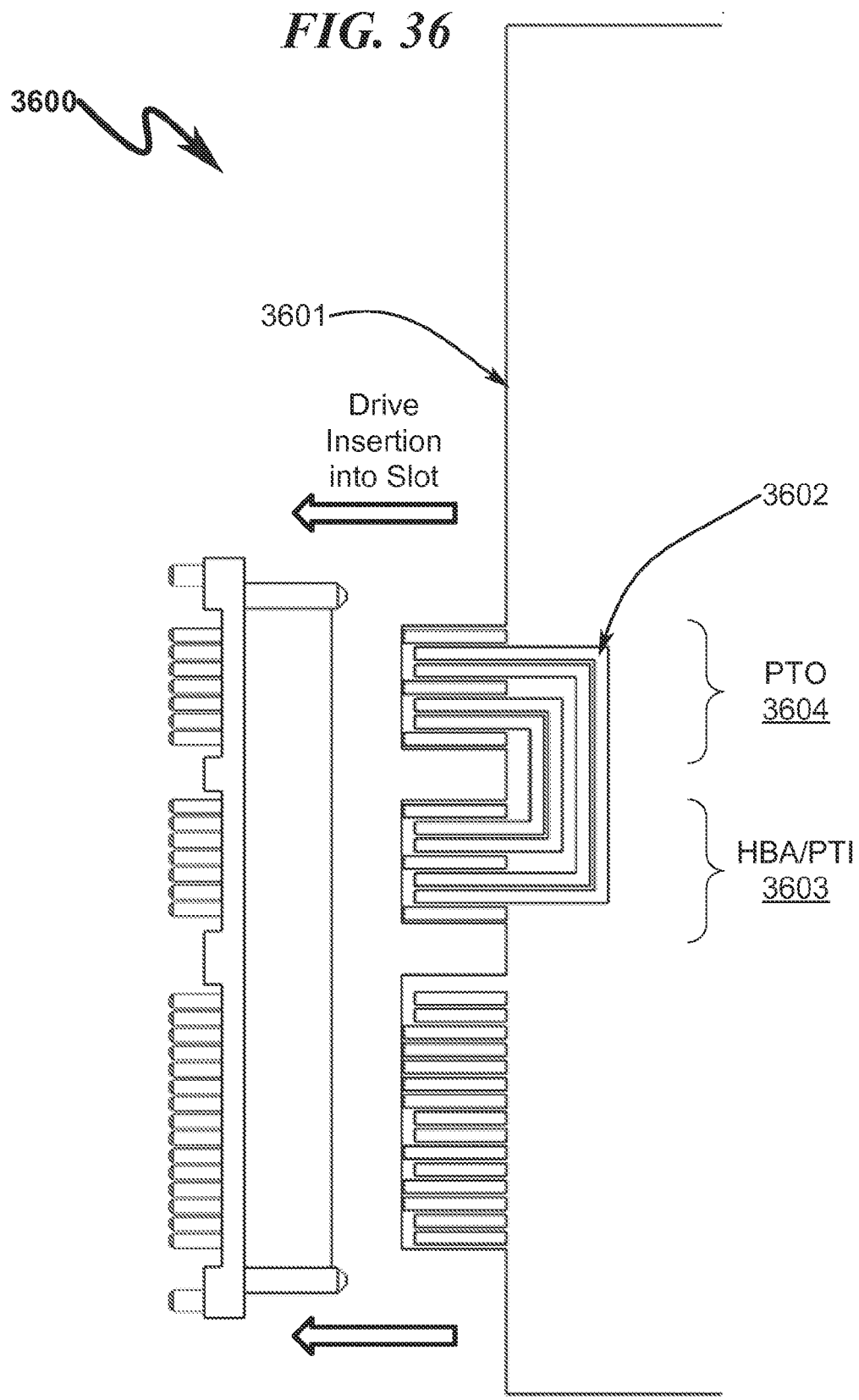
FIG. 36 illustrates a detail view of a bypass carrier PCB with associated PTI/PTO bypass traces.

Additionally, the PTDDC ASIC (2310) may incorporate a hardware reset RST (2314) function that permits internal mapping registers within the PTDDC ASIC (2310) to be cleared to factory settings to permit initial configuration of SATA disk drive mapping. A hardware STALL (2315) function may also be implemented that allows the PTDDC ASIC (2310) to halt data transfers along the daisy-chain to permit installation and/or removal of a SATA disk drive in the PTDDC-enabled daisy chain. This STALL function by halting bus traffic permits a daisy-chained disk drive to be removed and replaced along the chain without disrupting data traffic along the daisy-chain. Various methods used to achieve this PTDDC bypass function are depicted in FIG. 33 (3300)-FIG. 40 (4000), including scenarios where a disk is removed and replaced with an EMPTY bypass unit as depicted in FIG. 36 (3600)-FIG. 40 (4000).

Exemplary PTDDC LBA Sizing Registers (2400)

As stated previously, the PTDDC combines a plurality of SATA disk drives in a serial daisy-chain such that looking into the HBA or PTI port of the first PTDDC in the daisy chain a virtual storage array of arbitrary size can be constructed. As mentioned elsewhere, the amount of storage reported by the PTDDC to the host via the HBA or PTI port may not match that of the actual storage attached along the daisy-chain. This mis-reporting of total attached storage can be used in some circumstances to create virtual storage arrays that are only partially populated with actual SATA disk drives but which may be later expanded via the hot insertion of additional PTDDC-enabled storage units.

Figure 24:
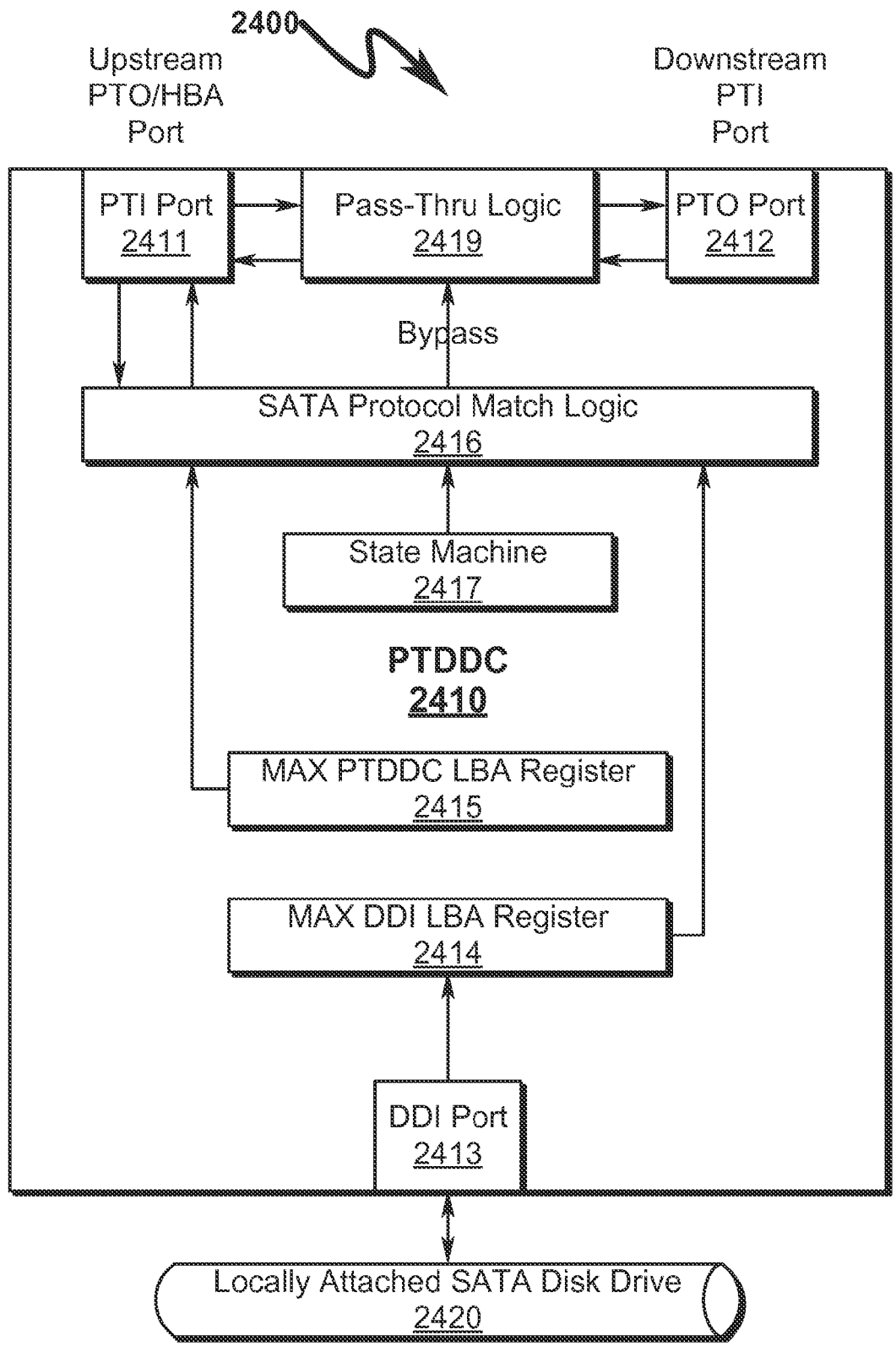
FIG. 24 illustrates the logical and physical block size registers associated with the PTDDC.

As part of this LBA mis-reporting, the PTDDC as depicted in FIG. 24 (2400) may be configured with logic to both enable access to the actual storage capacity limits of the attached SATA disk drive but also provide for a register which responds to HBA requests for "maximum" available storage of the virtual SATA disk drive represented by the entire PTDDC daisy-chain. As depicted in FIG. 24 (2400), the PTDDC (2410) takes input from the PTI port (2411) and passes this through to the PTO port (2412) via pass-thru logic (2419) unless commands/data associated with the information are associated with the locally attached SATA disk drive (2420).

In this context the DDI port (2413) communicates with the locally attached SATA disk drive (2420) and retrieves a local copy of drive information including the maximum DDI LBA available on the SATA drive which is placed in a local register (2414). This information would normally be reported thru the PTI port (2411) in response to requests for drive sizing parameters. However, a phantom LBA sizing register representing the MAX PTDDC LBA (2415) is maintained that contains the virtual size of the PTDDC array. This virtual size is chosen by application context but need not match the value of the DDI register or in fact correspond to the total size of attached SATA drives in the PTDDC-enabled daisy-chain. This virtual size register (2415) is simply the size that the PTDDC will report to the PTI port (2311).

The SATA protocol match logic (2416) determines whether the MAX DDI LBA register (2414) or the virtual MAXPTDDC LBA register (2415) value will be reported to the PTI port (2411) based on information gained from a state machine (2417). While there are various methodologies to implement the state machine (2417), one preferred method is to utilize SATA DRIVE RESET commands to initialize a state in which the individual PTDDCs may be addressed to read/write access the MAX PTDDC LBA register (2415). By individually addressing the PTDDC using other protocols described herein, the individual disk MAX DDI LBA register (2414) (as well as other drive-specific parameters) may be accessed. In this manner, any ordinary host inquiry via the HBA/PTI port (2411) will view the PTDDC daisy-chain as one large disk drive rather than an array of individual disk drives. Alternate protocols (typically operating in conjunction with host application software) can be configured to individually communicate with each locally attached SATA disk drive (2420) and adjust operating parameters or inquire as to drive status on an individual per-drive basis.

In some circumstances the PTDDC may be configured to completely mimic all register functionality of the locally attached SATA disk drive (2420) in a set of registers rather than only providing a phantom size register as in the MAX PTDDC LBA register (2415) as depicted in this diagram. In this case, the PTDDC may switch between accessing these phantom drive parameters and those associated with the physically attached drive. Note that in some circumstances these registers may be optionally "tied" to each other such that modifications of a phantom impact that of the attached drive or reads from the actual drive impact the locally stored phantom registers.

Exemplary Embodiment

Logical Drive Extension (2500)-(2800)

Overview

The present invention may incorporate a system/method for logically increasing the size of a disk drive volume that has been low-level formatted and initialized with a file system structure via an operating system. The goal with these disclosed systems and methods is to permit a user to create a logical file system on one or more disk drive volumes and then extend the size of the physical number of disk drives as needed when space on the existing disk volumes is consumed, without the need for complex manipulation of the existing data on the currently installed disk drive volumes.

Prior Art

The prior art as taught by the various patents issued to Digital Robotics, Inc. (and listed elsewhere in this document), as well as some NAS attached storage systems, is to essentially place a virtual disk drive block allocation operating system (with associated hardware) between the HBA interface and the "farm" of currently installed disk drives residing in the disk drive array. This system permits physical extension of the logical disk drive storage space by misinforming the host operating system as to the true size of the disk drive array, and then via a file system aware operating system mapping allocated blocks used by the operating system to physical disk drives that populate the logical address space. The problem with this approach is its complexity, cost, and overhead.

Present Invention Architecture (2500)

Figure 25:
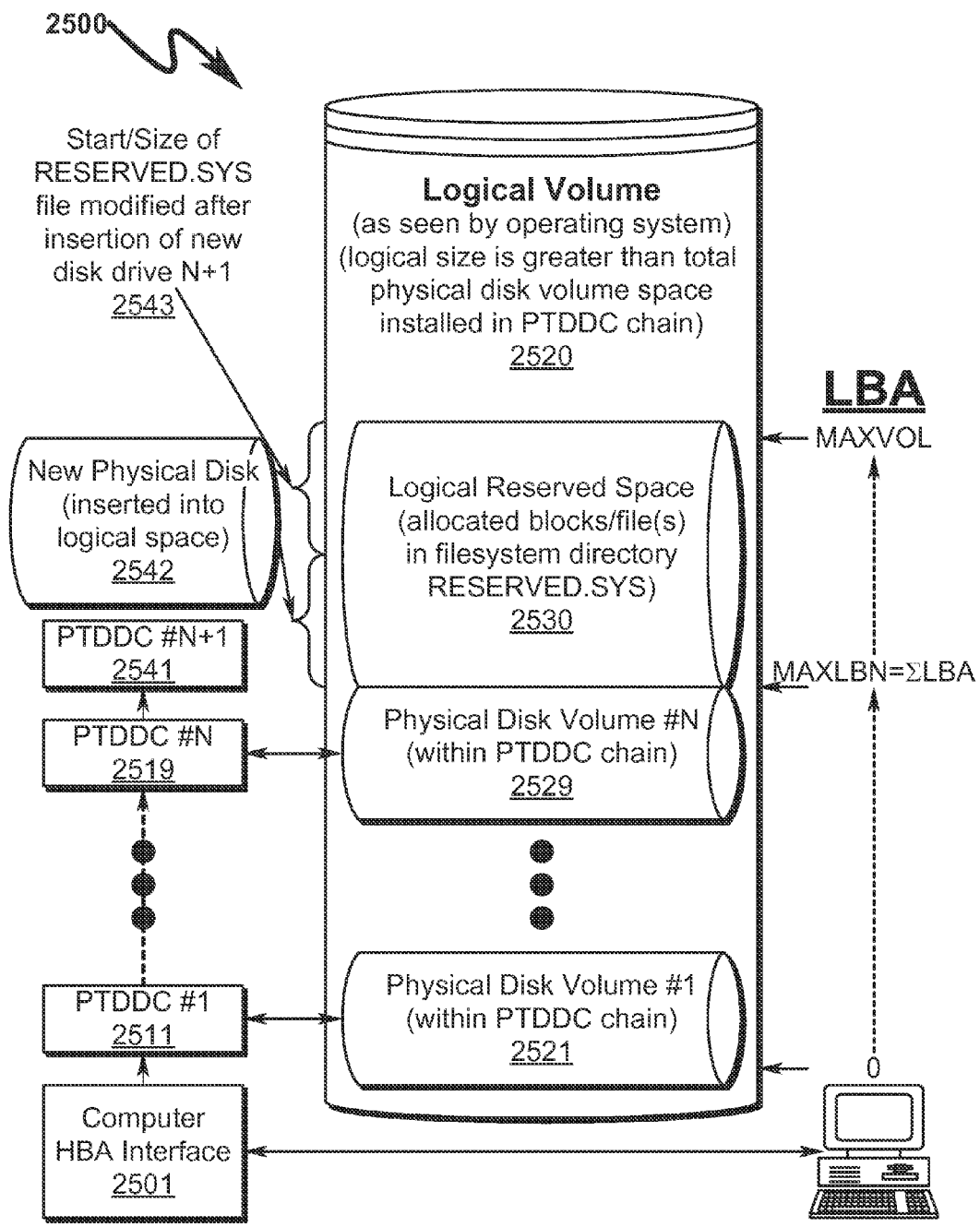
FIG. 25 illustrates the use of RESERVED file allocation within some preferred exemplary embodiments of the present invention that utilize logical volume sizing that is greater than physical volume sizing.

In contrast, the present invention takes the general approach illustrated in FIG. 25 (2500) to address the issue of extensible disk volume support in this context. Here we see that the computer system HBA interface (2501) services an arbitrarily long chain of PTDDC devices (2511, 2519) that directly control physical disk volumes (2521, 2529) within this chain. The logical disk volume (2510) as seen by the operating system comprises the physical disk volumes (2521, 2529) within the chain such that the maximum physical LBA of the logical drive is the sum of the individual disk drive maximum LBN values, or as depicted in this diagram the symbolic value MAXLBN.

However, the logical drive size may be configured to be much larger than MAXLBN. In fact in this configuration the logical drive size as seen by the HBA interface (2501) may be arbitrarily set within the confines of the file system architecture type, here designated symbolically herein as MAXVOL. To prevent the operating system from actually using the logical disk space between MAXLBN and MAXVOL, the file system is modified (via appropriate operating system application software) to allocate and reserve the space between MAXLBN and MAXVOL to one or more reserved system file(s). These files are typically hidden and protected as system/read-only to prevent use of this logical disk space by the operating system.

As storage within the PTDDC attached disk drives (2521, 2529) is filled, the need may arise to increase physical storage within the logical disk volume (2520). This is accomplished by extending the PTDDC chain with another PTDDC controller (2541) and associated disk drive (2542). Once this physical storage has been added, the logical reserved space (RESERVED.SYS) file is modified by (a) increasing the starting LBA BASE LOCATION for the file by the size of the added disk drive (2542), and (b) reducing the EXTENT SIZE of the file by the size of the added disk drive (2542).

Data Storage Architecture Extension Format Method (2600)

The concept of allocating a logical drive serviced by sparsely populated physical drives within a PTDDC chain as described above may be implemented in many preferred exemplary embodiments of the present invention using a variety of methods, two of which are currently known as preferred exemplary embodiments.

Figure 26:
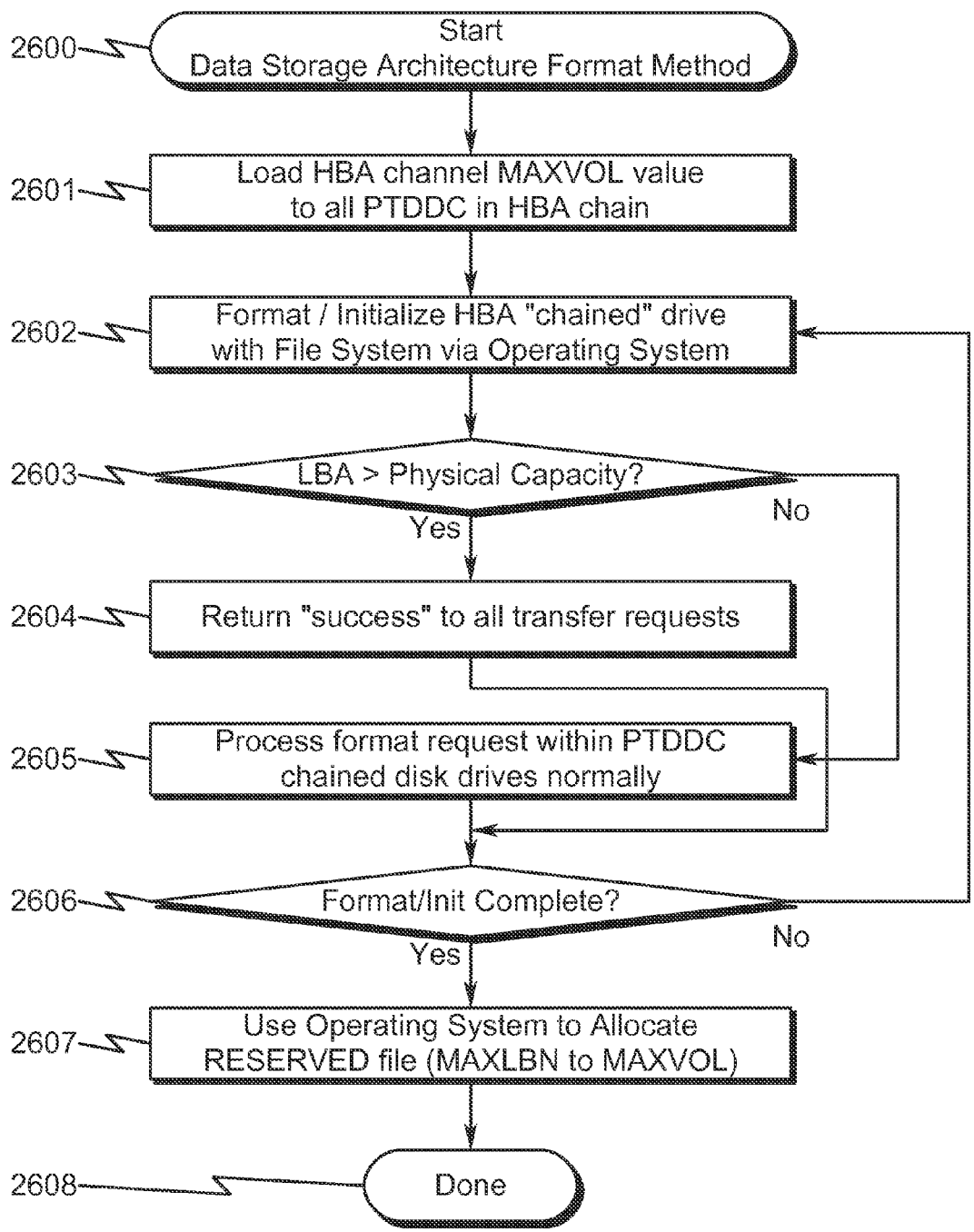
FIG. 26 illustrates a generalized method flowchart illustrating a data storage architecture extension volume formatting methodology utilized in some preferred exemplary embodiments of the present invention.

One present invention format method embodiment variation can be generally illustrated by the preferred exemplary embodiment illustrated in FIG. 26 (2600). The general steps of this method comprise the following:

- Loading the MAXVOL value to be associated with the HBA channel to all PTDDC interfaces in the PTDDC chain associated with the HBA (2601);
- Format/initialize the HBA "chained" drive with a file system using operating system software (2602);
- If a LBA requested during the format/initialization step (2) is less than the MAXLBN physical capacity of the chained PTDDC disk drives, proceed to step (5) (2603);
- Return "success" to all transfer requests to the PTDDC disk drive chain and proceed to step (6) (2604);
- Process the format/initialization request within the PTDDC chained disk drives normally (2605);
- If the format/initialization process is not complete, proceed to step (2) (2606);
- Use operating system utilities or custom applications to allocate RESERVED file space from MAXLBN to MAXVOL within the logical drive space associated with the HBA (2607).

This general method variation as illustrated in FIG. 26 (2600) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Data Storage Architecture Extension Format Method (2700)

Figure 27:
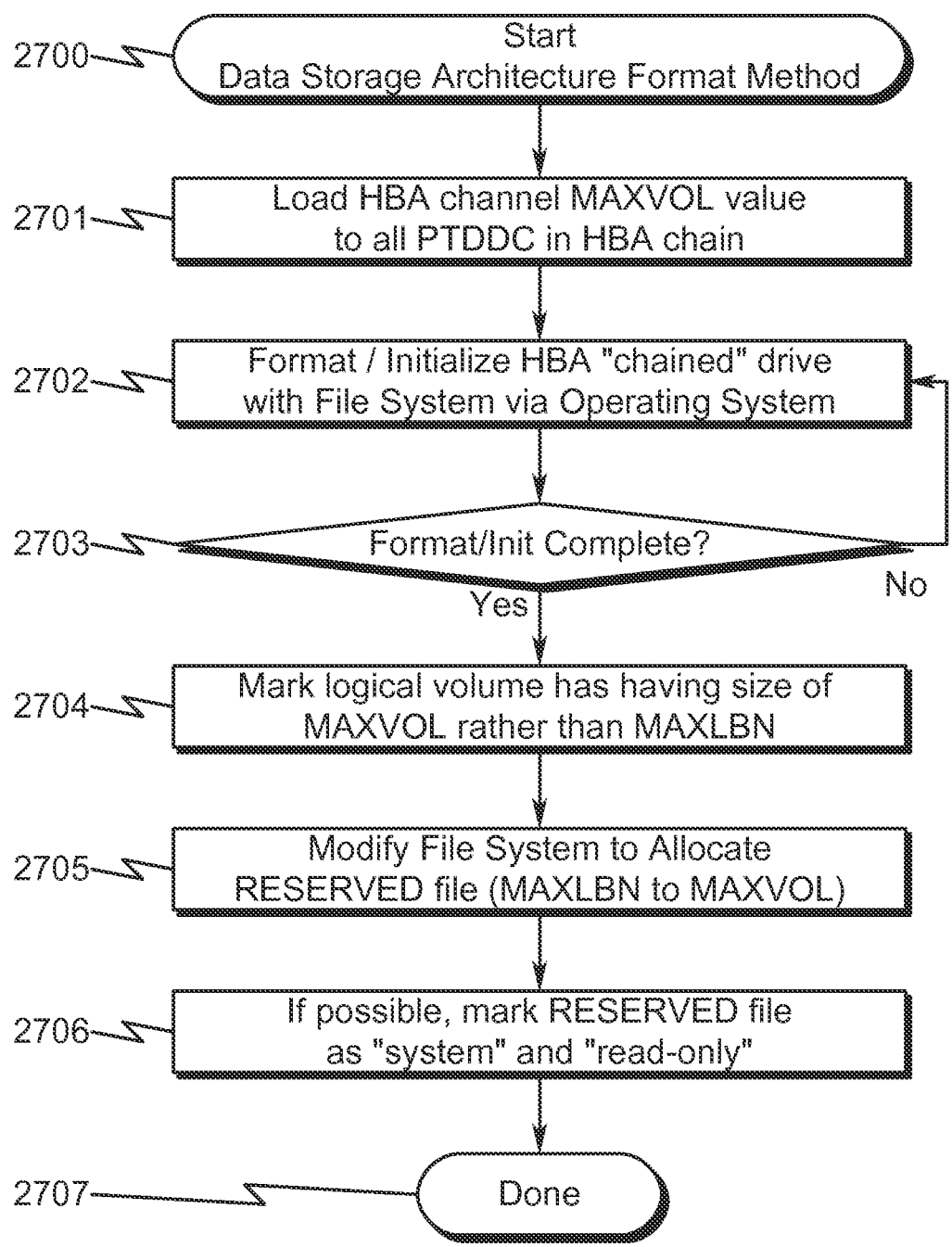
FIG. 27 illustrates an alternate generalized method flowchart illustrating a data storage architecture extension volume formatting methodology utilized in some preferred exemplary embodiments of the present invention.

Another present invention format method embodiment variation can be generally illustrated by the preferred exemplary embodiment illustrated in FIG. 27 (2700). The general steps of this method comprise the following:

- Loading the MAXLBN value (sum of all disk drive sizes in the current PTDDC chain) to all PTDDC interfaces in the PTDDC chain associated with the HBA (2701);
- Format/initialize the HBA "chained" drive with a file system using operating system software and sizing the logical volume to have size MAXLBN (2702);
- If the format/initialization process is not complete, proceed to step (2) (2703);
- Using a custom application program running under the operating system, modify the file system structure created on the HBA chained PTDDC logical drive to indicate a logical drive size of MAXVOL rather than MAXLBN (2704);
- Using a custom application program running under the operating system, create a file directory entry on the logical volume created on the HBA chained PTDDC local drive to allocate a RESERVED file comprising LBA from MAXLBN to MAXVOL (2705);
- If possible, mark the RESERVED file as "system" and "read-only" (2706).

This general method variation as illustrated in FIG. 27 (2700) may be modified heavily depending on a number of factors, with rearrangement and/or addition/deletion of steps anticipated by the scope of the present invention. One skilled in the art will recognize that operating system "mount" and "unmount" operations may be utilized within this general framework to achieve file system consistency within the context of this volume formatting/initialization procedure. Integration of this and other preferred exemplary embodiment methods in conjunction with a variety of preferred exemplary embodiment systems described herein is anticipated by the overall scope of the present invention.

Data Storage Architecture Data Storage Extension Method (2800)

Once the logical drive has been formatted as generally depicted in FIG. 26 (2600) and FIG. 27 (2700), the logical volume may be mounted by the operating system and used as needed to store/retrieve data. Should the logical volume require additional storage as its physical drives become filled with data, an exemplary invention embodiment data extension method may be utilized to increase the physical storage capacity of the overall logical drive.

Figure 28:
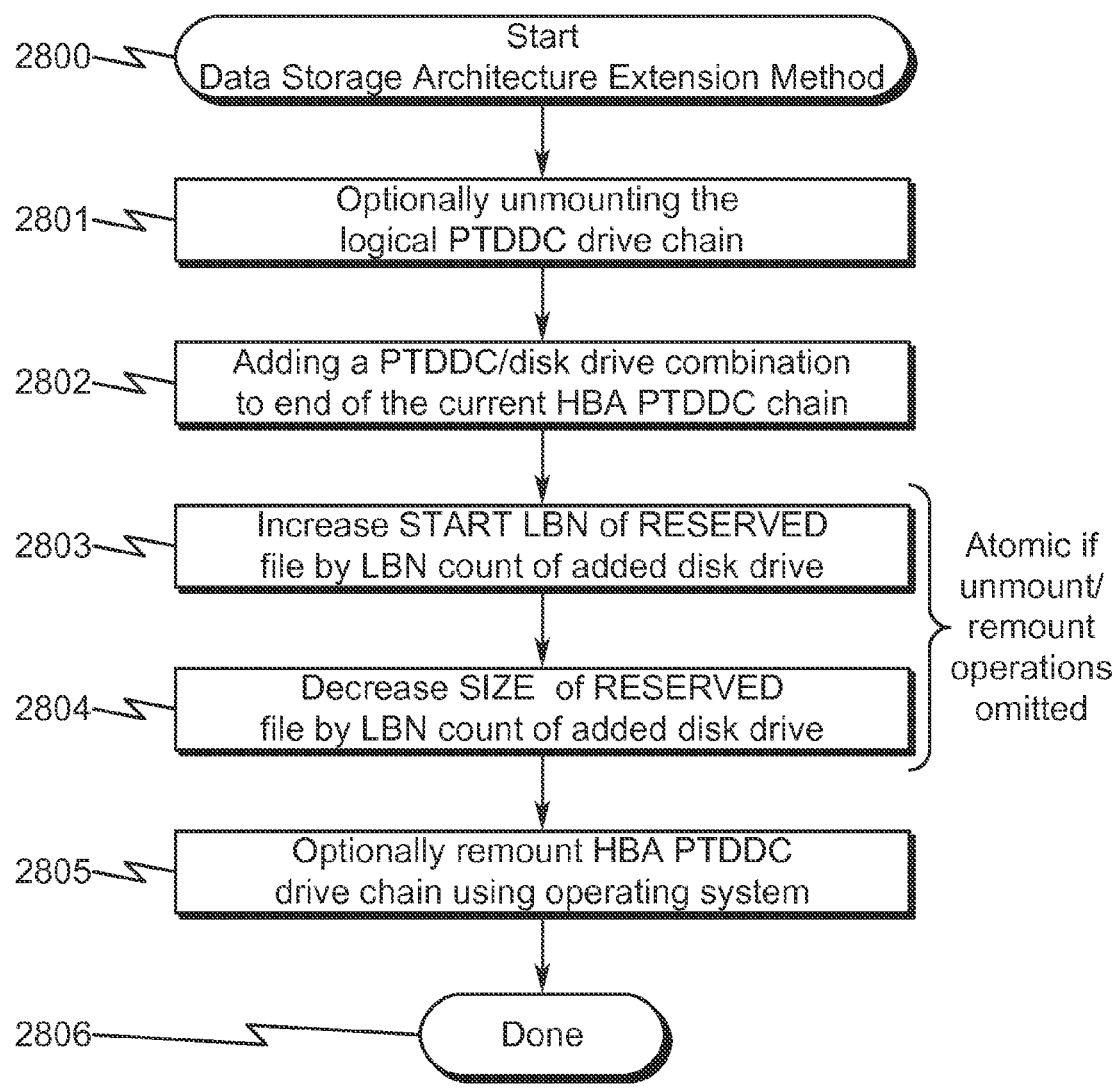
FIG. 28 illustrates a generalized method flowchart illustrating a data storage architecture extension volume insertion methodology utilized in some preferred exemplary embodiments of the present invention.

One present invention data storage extension method embodiment variation can be generally illustrated by the preferred exemplary embodiment illustrated in FIG. 28 (2800). The general steps of this method comprise the following:

- Optionally unmounting the HBA PTDDC logical drive chain (2801);
- Adding a PTDDC/disk drive combination to end of the current HBA PTDDC chain (2802);
- Increasing START LBN of RESERVED file by LBN count of added disk drive (2803);
- Decreasing SIZE of RESERVED file by LBN count of added disk drive (2804);
- Optionally remount HBA PTDDC logical drive chain using operating system (2805).

This general method variation as illustrated in FIG. 28 (2800) may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

It is interesting to note that in some configurations the utilization of "hot swap" disk drive HBA interfaces (such as SATA, eSATA, microSATA) can permit this extension of disk drive physical storage to occur without the need for the unmounting operation (step (1) (2801)) or the remounting operation (step (5) (2805)) because the operating system already recognizes the logical drive size of the mounted drive as MAXVOL, with the only caveat that any space above MAXLBN is allocated to the RESERVED file(s) that may not be used by applications within the operating system. The only requirement for this method to work without the need for unmount/remount operations is that step (3) (2803) and step (4) (2804) be atomically interlocked in implementation.

Operating System Independence

A significant detriment to NFS and other attached storage systems that are managed by internal operating systems is that the on-disk file structure created by these specialized NFS systems often does not match that of the native file system used by the operating system on the host computer using the NFS system for data storage. Specialized features within the host operating system on-disk file system may or may not have equivalent mappings to the on-disk file system supported by the NFS.

The present invention, by making the logical PTDDC daisy-chained disk drives appear as one logical disk drive with a standard host HBA interface permits the native operating system to format/partition/initialize an on-disk file system that has all the native capabilities supported by the host operating system. For this reason the system is extremely efficient with respect to the on-disk file system implementation in that no abstraction layers or file system translators are necessary to interface to the host operating system.

Compatibility with Port Multipliers/Port Selectors

Figure 6:
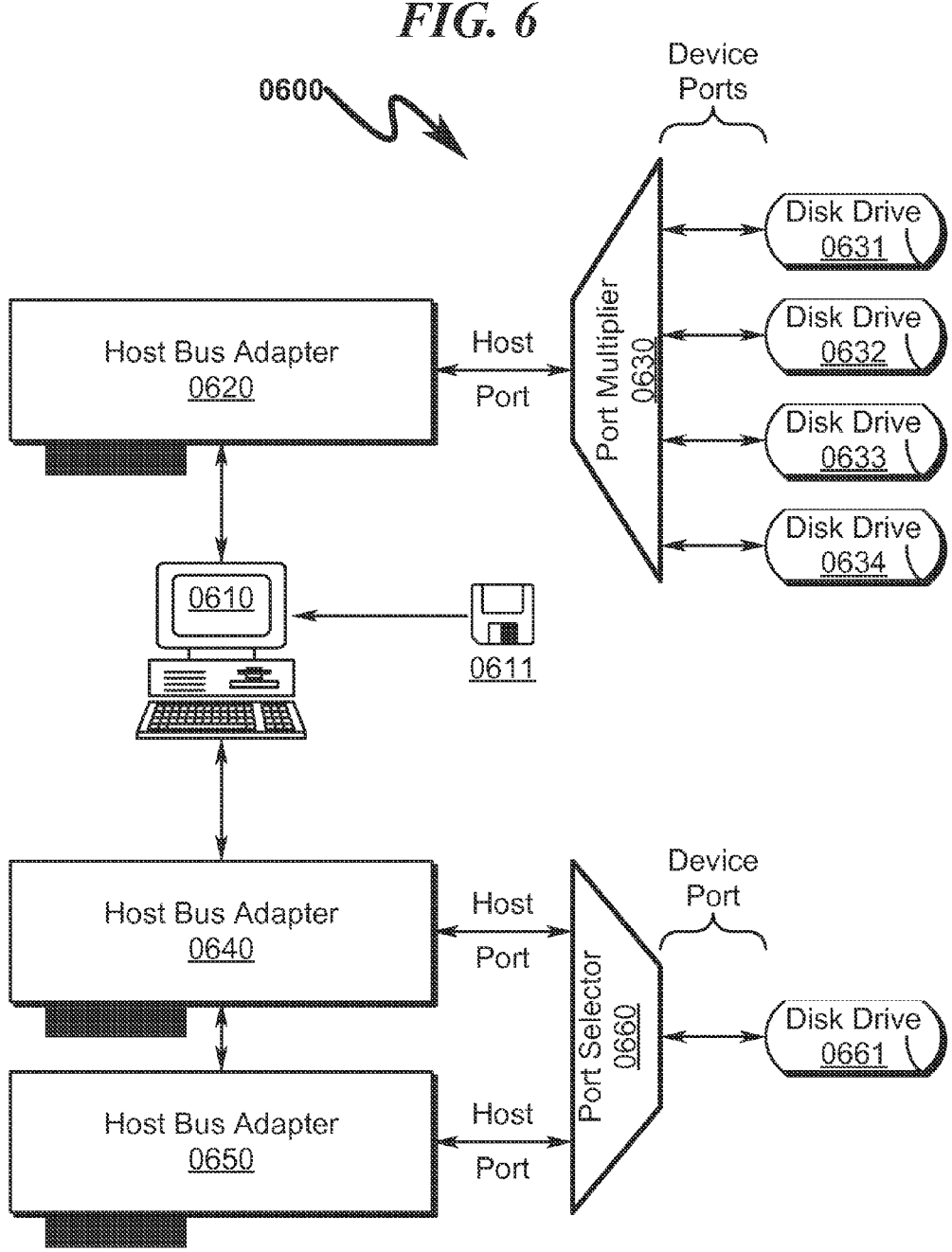
FIG. 6 illustrates a prior art port multiplier/port selector concept.
Figure 7:
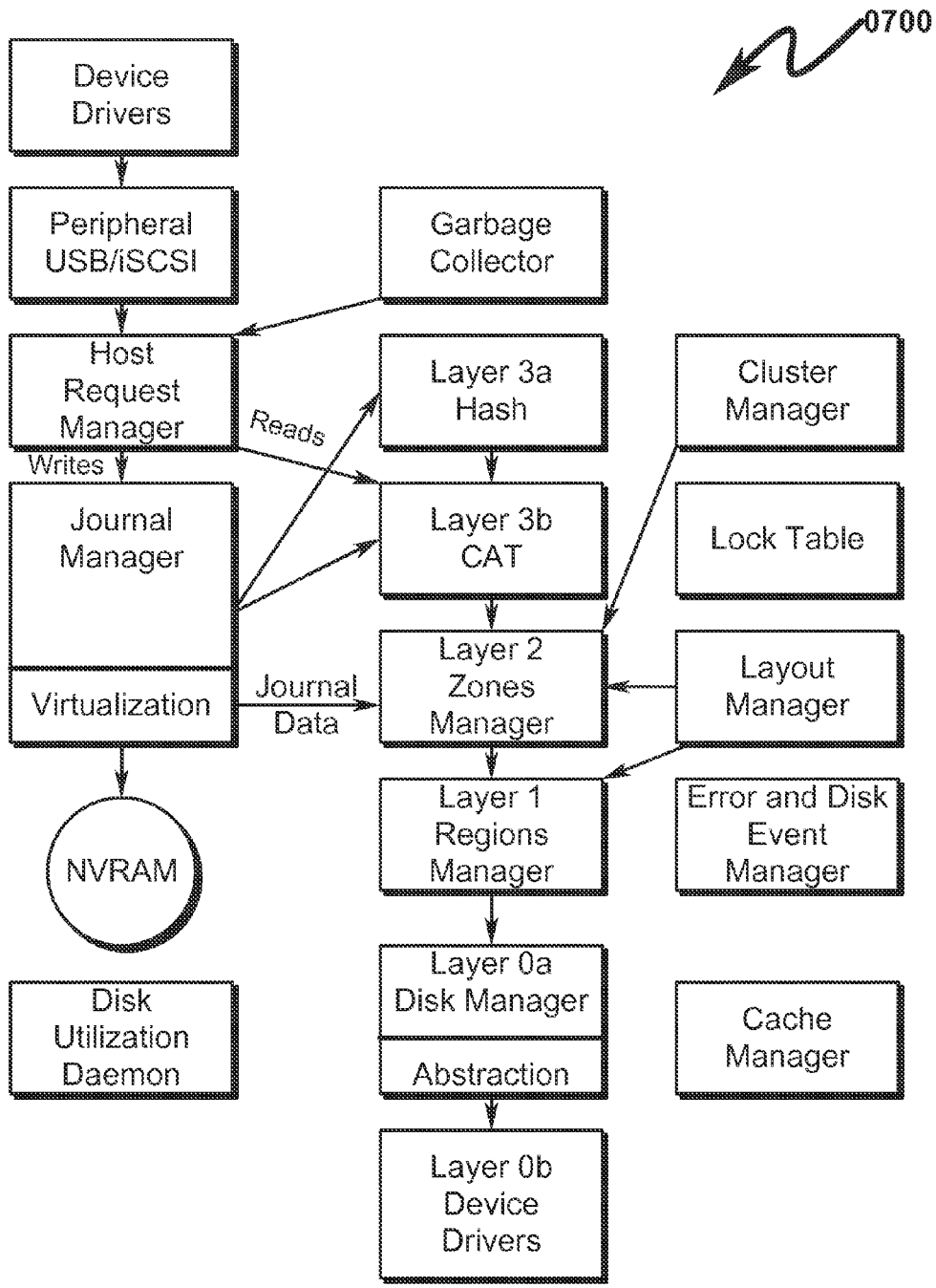
FIG. 7 illustrates a prior art data storage extension system as taught by U.S. Pat. No. 7,814,272.
Figure 8:
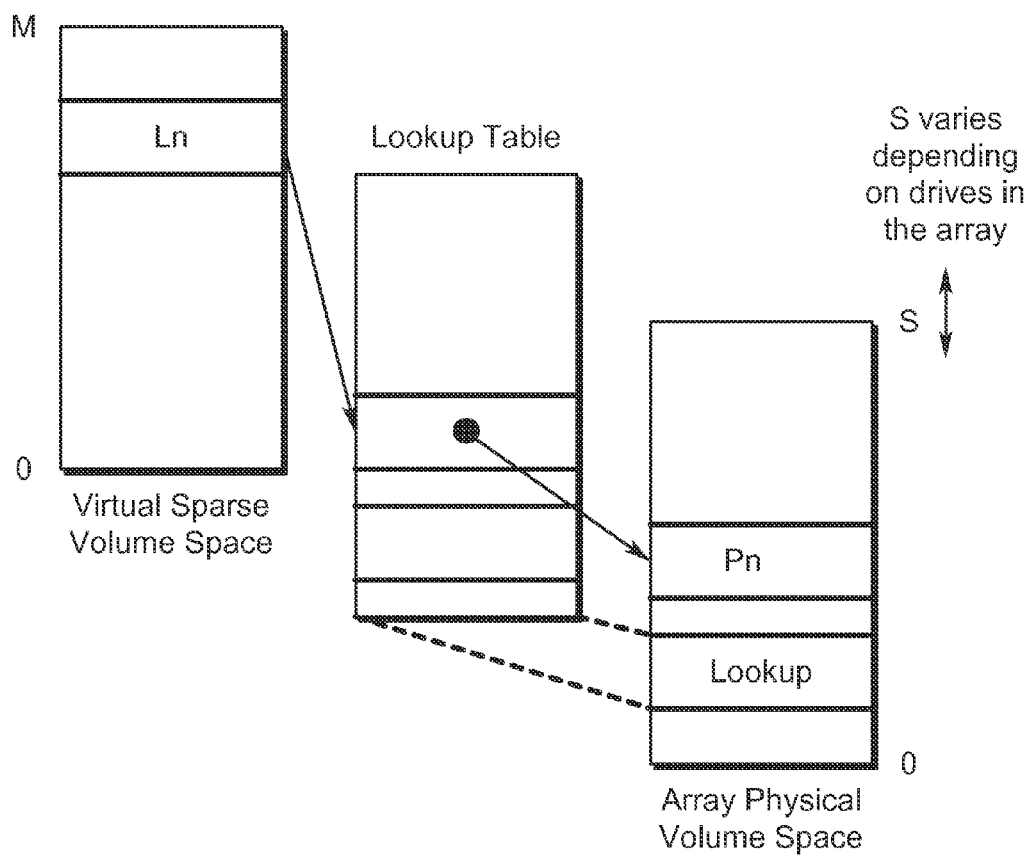
FIG. 8 illustrates a prior art data storage extension system incorporating logical block address remapping as taught by U.S. Pat. No. 7,814,272.
Figure 9:
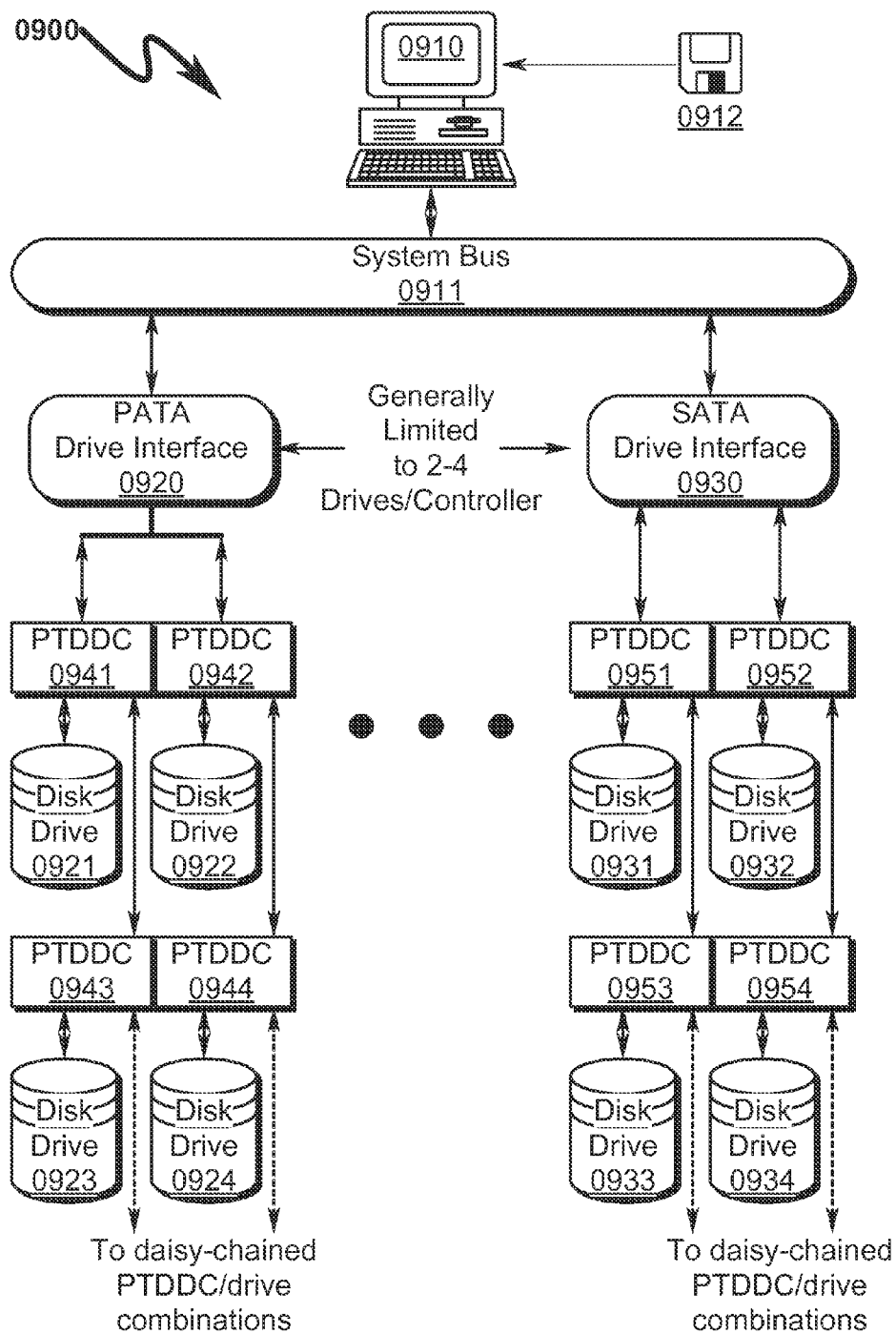
FIG. 9 illustrates a data storage application system utilizing an exemplary system embodiment of the present invention, contrasting the prior art data storage architecture of FIG. 1.

The present invention as exemplified by the PTDDC concept is totally compatible with existing port multiplier/port selector techniques described in the SATA specification and generally depicted in FIG. 6 (0600). This compatibility permits rapid integration of the present invention into "cloud" computing environments where vast arrays of data storage are implemented for the support of a plethora of computers and associated computer users. The advantage of the present invention as implemented in these environments is a significant cost reduction in overall data storage costs at the enterprise level as compared to the prior art and detailed below.

SATA Port Multiplier Integration (2900)

Figure 29:
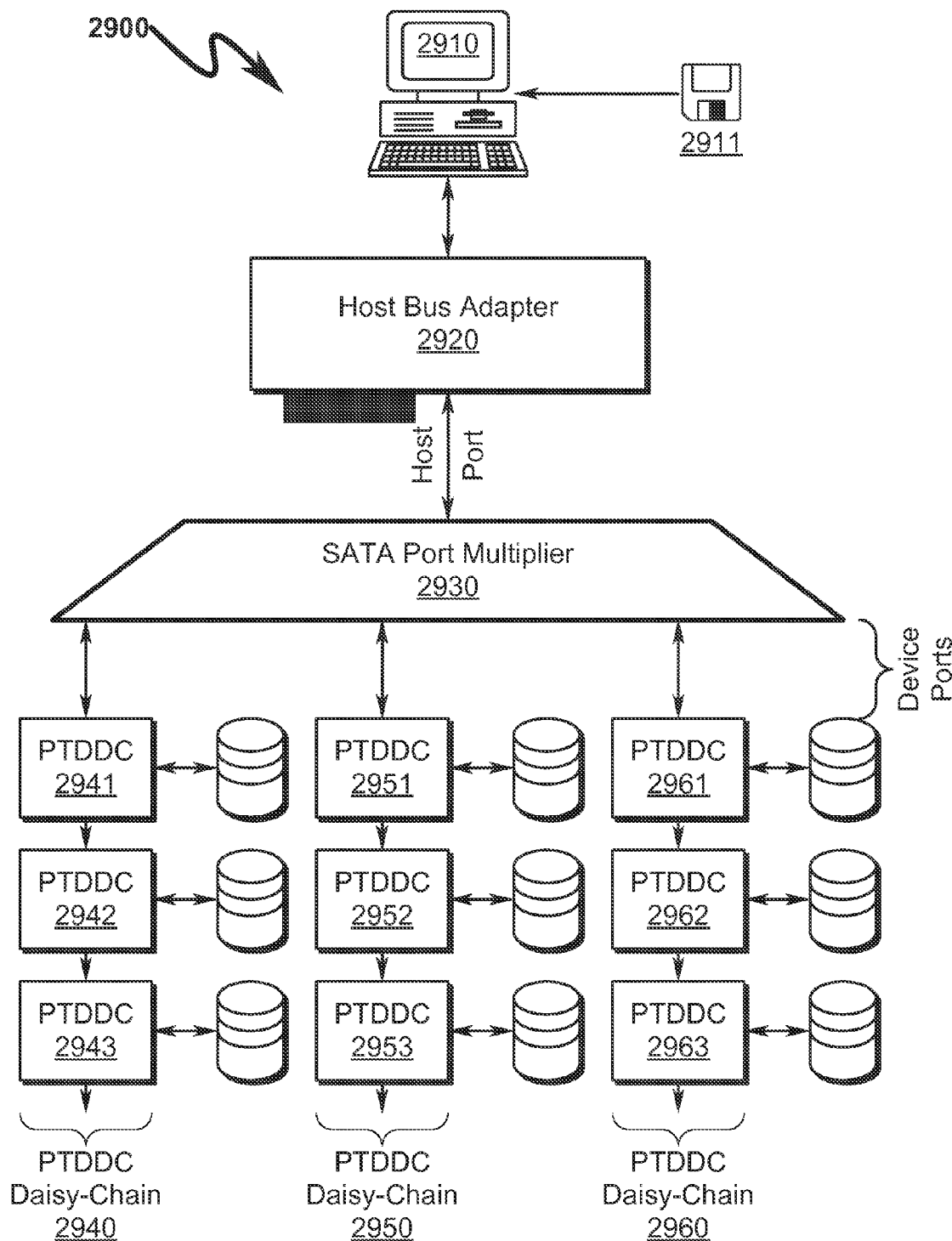
FIG. 29 illustrates an exemplary SATA port multiplier integration application using PTDDC-configured SATA disk drives.

As generally depicted in FIG. 29 (2900), the present invention may be easily integrated with traditional SATA port multiplier expansion architectures. As herein depicted in contrast to the prior art depicted in FIG. 6 (0600), the host computer system (2910) running under control of software read from a computer readable medium (2911) interfaces to a host bus adapter (2920) that connects to a SATA port multiplier (2930). As stated previously from the SATA specification, Port multipliers cannot be nested or cascaded (per the SATA specification, "A Port Multiplier shall not be connected to another Port Multiplier (i.e. no cascading)".

Port multipliers are limited to 15 connected disk drives.

Thus, one SATA port multiplier is capable of supporting a maximum of 15 "SATA disk drives" from a single HBA port (2930).

However, in the configuration depicted in FIG. 29 (2900), these rules can be violated at will via the use of the PTDDC technology described herein. In this example, each "SATA disk drive" as seen by the SATA port multiplier (2930) consists of a PTDDC-enabled daisy-chain (2940, 2950, 2960) that may have an indefinite number of daisy-chained SATA disk drives. Thus, while the SATA port multiplier (2930) is still limited to 15 physical drive port disk interfaces, each of these physical drive ports may contain a plurality of SATA disk drives (2940, 2950, 2960) each configured by the PTDDC to appear as one large logical disk drive.

Figure 121:
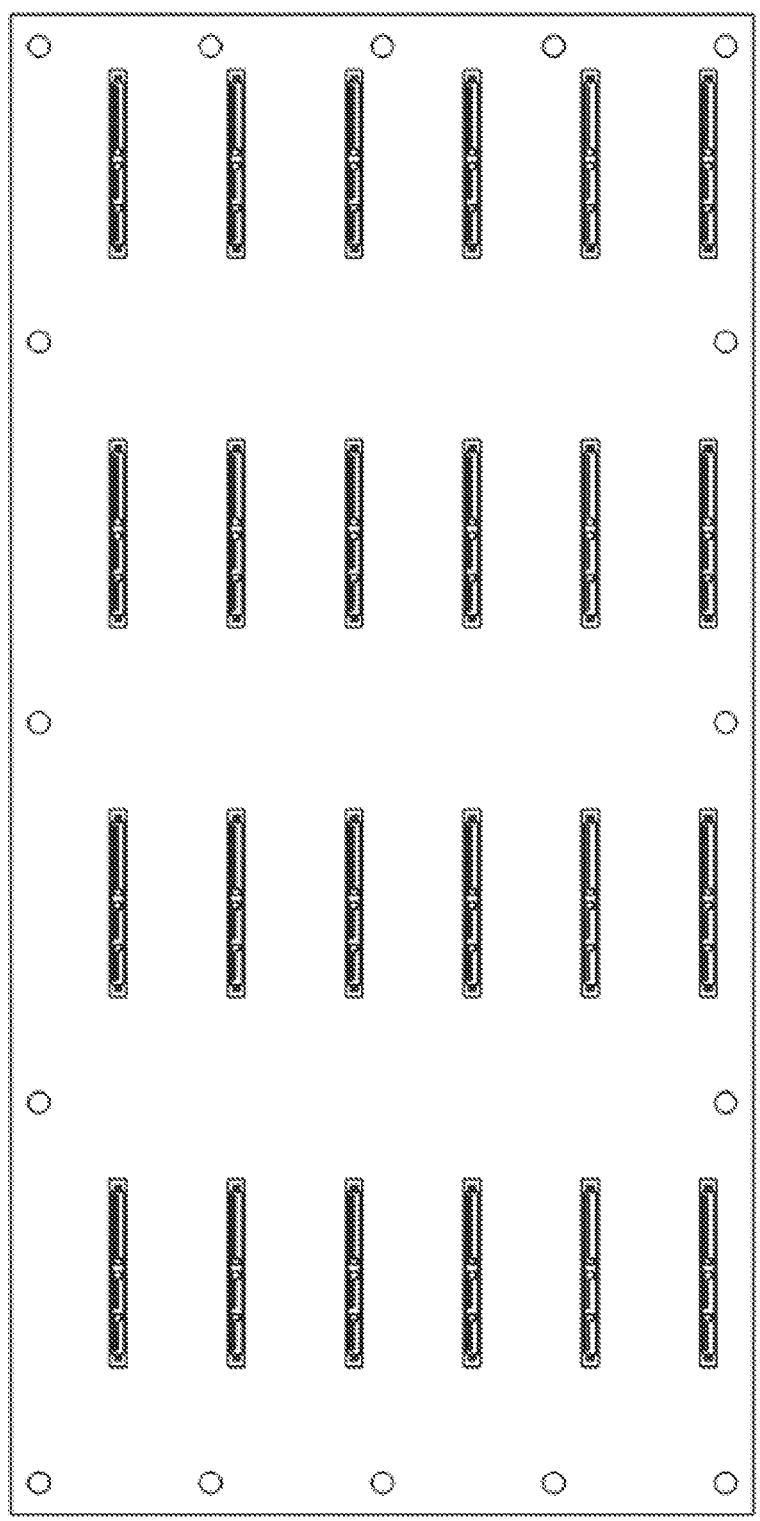

This architecture is very useful in situations where the capacity of an existing storage array needs to be increased but there is insufficient rack space to support additional SATA port multipliers. In this scenario, ESATA interfaces to PTDDC daisy-chains may be utilized to increase the overall storage array capacity with no additional SATA port multiplier hardware. The ability of the PTDDC to logically combine drives within the daisy-chain and appear as a singular large disk drive via the HBA/PTI port makes this an ideal retrofit for many existing storage arrays. Additional detail of how arrays of these PTDDC-connected disks may be configured is depicted in FIG. 121 (12100) and following.

SATA Port Selector Integration (3000)

Figure 30:
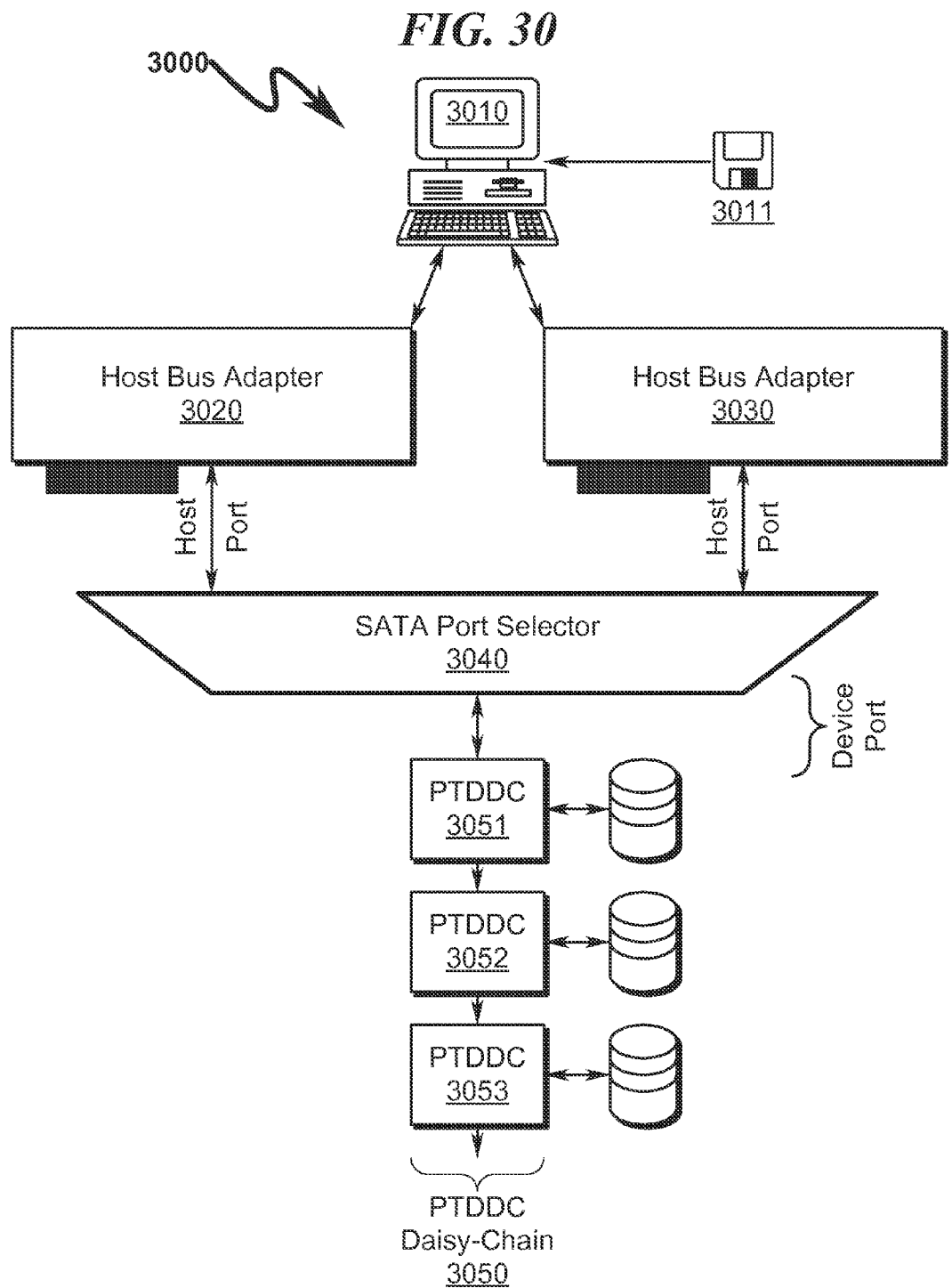
FIG. 30 illustrates an exemplary SATA port selector application using PTDDC-configured SATA disk drives.

As generally depicted in FIG. 30 (3000), the present invention may be easily integrated with traditional SATA port selector expansion architectures. As herein depicted in contrast to the prior art depicted in FIG. 6 (0600), the host computer system (3010) running under control of software read from a computer readable medium (3011) interfaces to host bus adapters (3020, 3030) that connect to a SATA port selector (3040) designed to provide a redundant path to a SATA disk drive. These SATA port selector (3040) are restricted to connection with a single SATA disk drive or port multiplier and are limited as follows:

Port multipliers cannot be nested or cascaded (per the SATA specification, "A Port Multiplier shall not be connected to another Port Multiplier (i.e. no cascading)".

Port multipliers are limited to 15 connected disk drives.

Thus, one SATA port selector tied to a port multiplier is capable of supporting a maximum of 15 "SATA disk drives" from a single HBA port (3040).

However, in the configuration depicted in FIG. 30 (3000), these rules can be violated at will via the use of the PTDDC technology described herein. In this example, the "SATA disk drive" being switched between the two HBAs (3020, 3030) by the port selector (3030) consists of a PTDDC-enabled daisy-chain (3050) that may have an indefinite number of daisy-chained SATA disk drives. Thus, while the SATA port selector (3040) is still limited to a single drive port disk interface, this single physical drive port may contain a plurality of SATA disk drives configured by the PTDDC to appear as one large logical disk drive.

SATA port selectors are often used to provide redundant access to a SATA disk drive for the purposes of increasing overall storage system reliability. This capability is transparently applicable to the PTDDC-enabled SATA daisy-chain storage arrays encompassed by the present invention teachings. However, when used with RAID-1 drive mirroring as described herein the existing SATA port selector concept can be enhanced by ensuring that the PTDDC-connected SATA drive tied to the port selector is configured in a high-reliability RAID-1 storage architecture. This capability is not present with any existing combination of the prior art without the use of costly and inefficient nesting of entire NAS servers and their associated computer system support infrastructure.

Ethernet-Based NAS (3100)-(3200)

Figure 31:
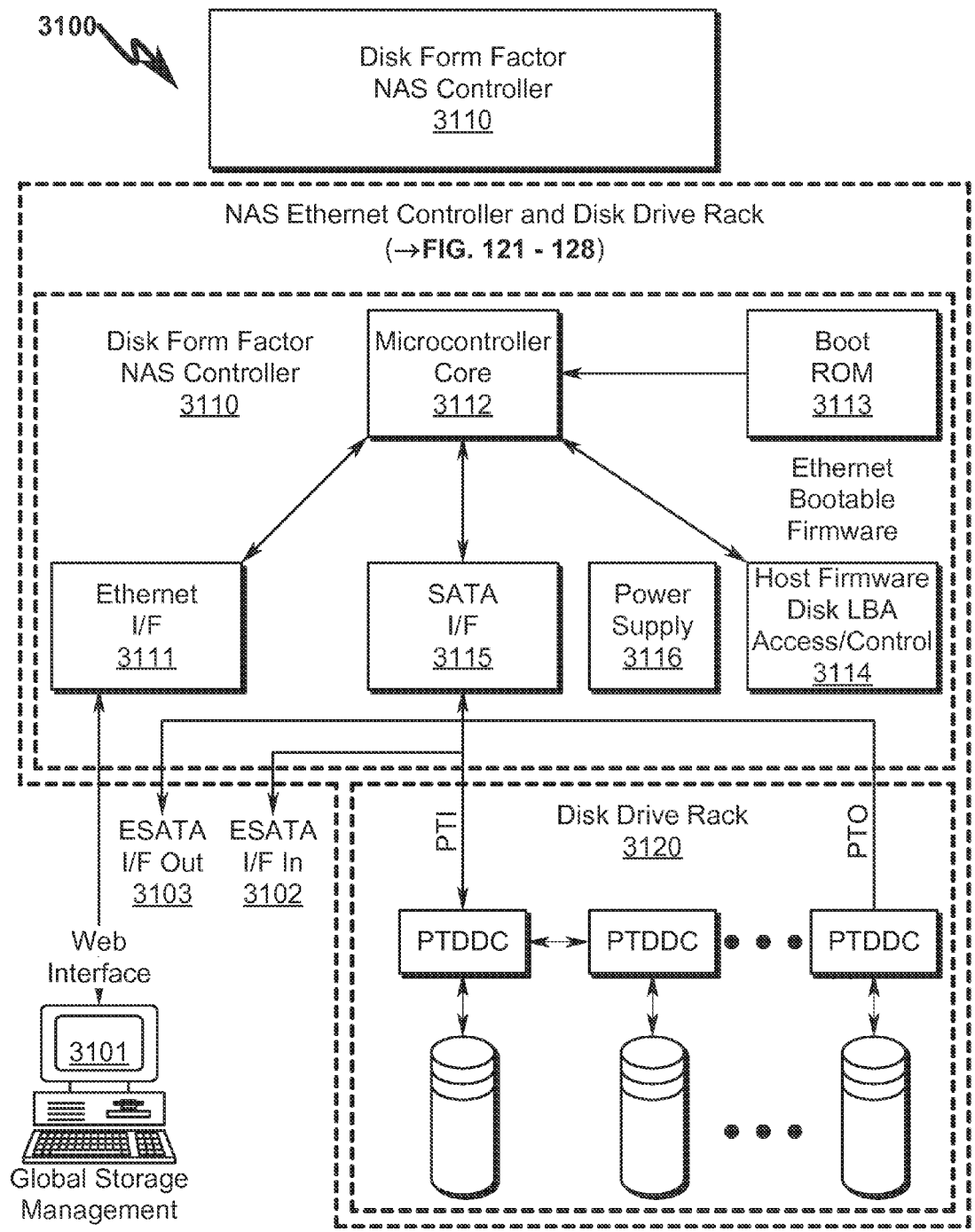
FIG. 31 illustrates a preferred exemplary disk form factor NAS controller and PTDDC-enabled storage array useful in many inexpensive embodiments of the present invention.
Figure 32:
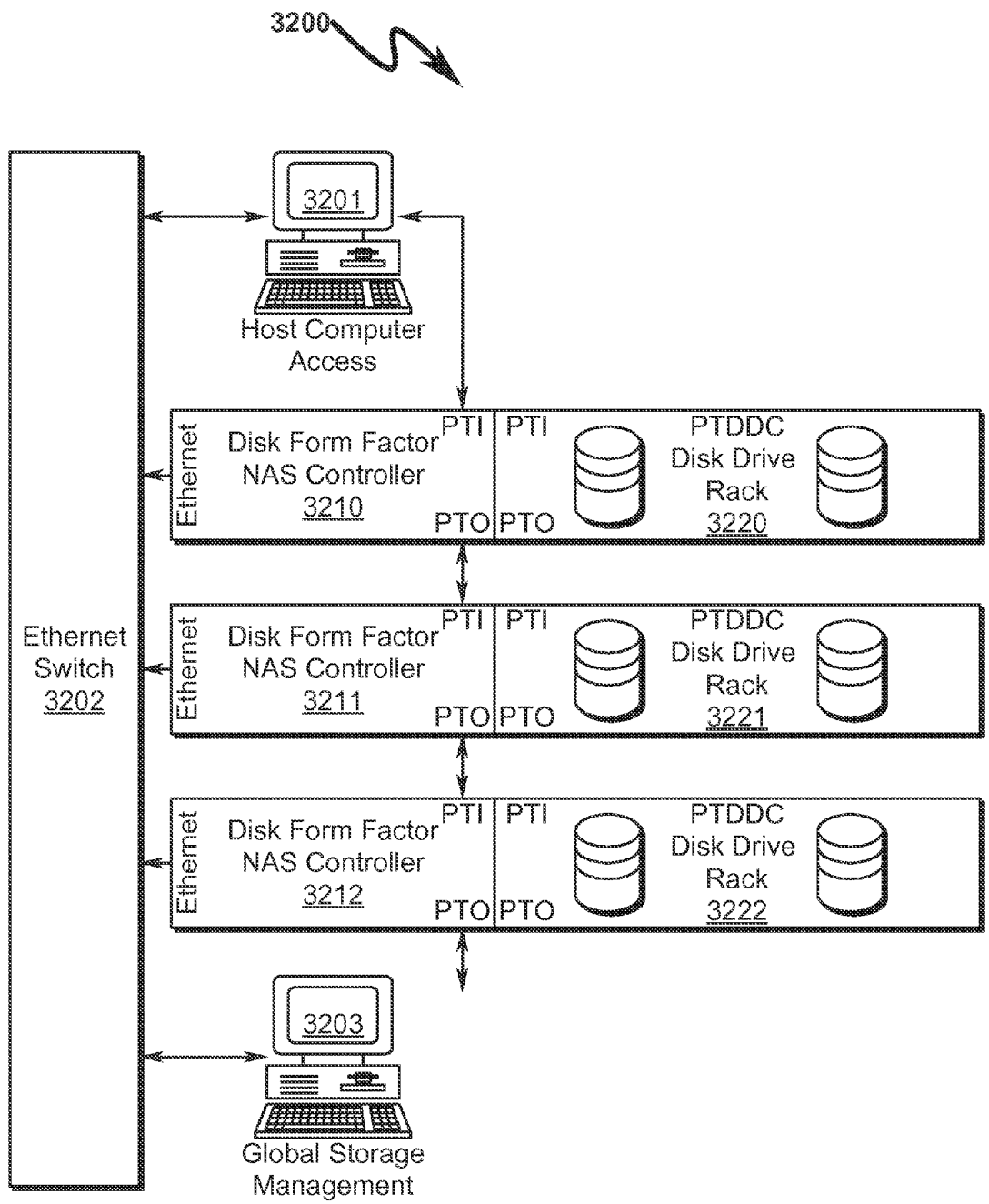
FIG. 32 illustrates preferred exemplary disk form factor NAS controllers connected in daisy-chain configuration and connected to an Ethernet switch to support web-based global storage management.

The present invention may be advantageously applied to the creation of very inexpensive NAS-based storage arrays as generally depicted in FIG. 31 (3100)-FIG. 32 (3200). Here a computer system (3101) is connected to a NAS system controller (3110) that supervises a PTDDC disk drive chain (3120) housed in a conventional rack-based enclosure. The NAS controller (3110) interfaces with the computer system (3101) using an Ethernet controller (3111) under control of a microcontroller (3112). The microcontroller (3112) executes machine instructions from a boot ROM (3113) that may be loaded over an Ethernet/Internet connection. These microcontroller machine instructions stored in the boot ROM (3113) comprise NAS access control and protocols (3114) necessary to allow remote access to the PTDDC chained disk drives (3120). This configuration may also incorporate a power supply (3116) integrated into the form factor of the disk drive bay to enable easy integration into a rack-based disk drive enclosure.

A SATA interface (3115) is used by the microcontroller (3112) to interface to the PTDDC disk drive chain (3120) and allows the remote computer (3101) access to the PTDDC chain (3120) as if it were a singular large disk drive. All of the features discussed herein with respect to functionality of the PTDDC disk drive chain applies to this configuration. A significant aspect of this configuration is very low cost in that the NAS controller (3110) can be very inexpensive to construct yet be capable of supporting a large number of storage elements within PTDDC disk drive chain (3120). For example, a variety of solutions as detailed below are possible in which the NAS controller (3110) subsystem can be constructed for under USD$30.

Exemplary implementations of this system may incorporate an 8051-class microcontroller in conjunction with an Ethernet interface and SATA controller. Typical configurations may incorporate a Silicon Labs CP220X class Ethernet interface in conjunction with any number of SATA hardware interfaces from Texas Instruments. Other embodiments may integrate most if not all the components of the NAS controller in a single integrated circuit such as the MICROCHIP® ENC424J600 Ethernet interface (Microchip Technologies, Chandler, Ariz.) or the AX11015 Single Chip Microcontroller with TCP/IP and 10/100M Fast Ethernet MAC/PHY (incorporating 512K Flash, EMI, Local Bus, MII, 32GPIOs in a LQFP-128 package) from ASIX Electronics, 4F, No. 8, Hsin Ann Rd., Hsinchu Science Park, Hsinchu, Taiwan 300. Of course, one skilled in the art will recognize that most if not all the electronics on the NAS controller (3110) may be implemented in a custom application specific integrated circuit (ASIC).

FIG. 32 (3200) depicts several disk form factor NAS controllers cascaded in a daisy-chain configuration and tied to bays of SATA disk drives that are daisy-chained with PTDDC ASICs. This configuration presents several advantages over the prior art. Specifically, each disk form factor NAS controller (3210, 3211, 3212) may interface with the host computer access (3201) via either an indirect Ethernet interface tied to an Ethernet switch (3202) or directly via the PTI port associated with the internal PTDDC ASICs. This capability provides for faster access than is currently available using prior art disk aggregation techniques. If the PTI port is used for computer access, these may be daisy-chained between each NAS controller (3210, 3211, 3212) to allow all the PTDDC disk drive racks (3220, 3221, 3222) to appear as a singular logical volume. Within this context the NAS controllers NAS controller (3210, 3211, 3212) may each be capable of performing drive diagnostics and other maintenance functions on the individual PTDDC disk drive racks (3220, 3221, 3222) under control of a global storage management interface (3203) that is web-enabled over the Internet.

Figure 128:
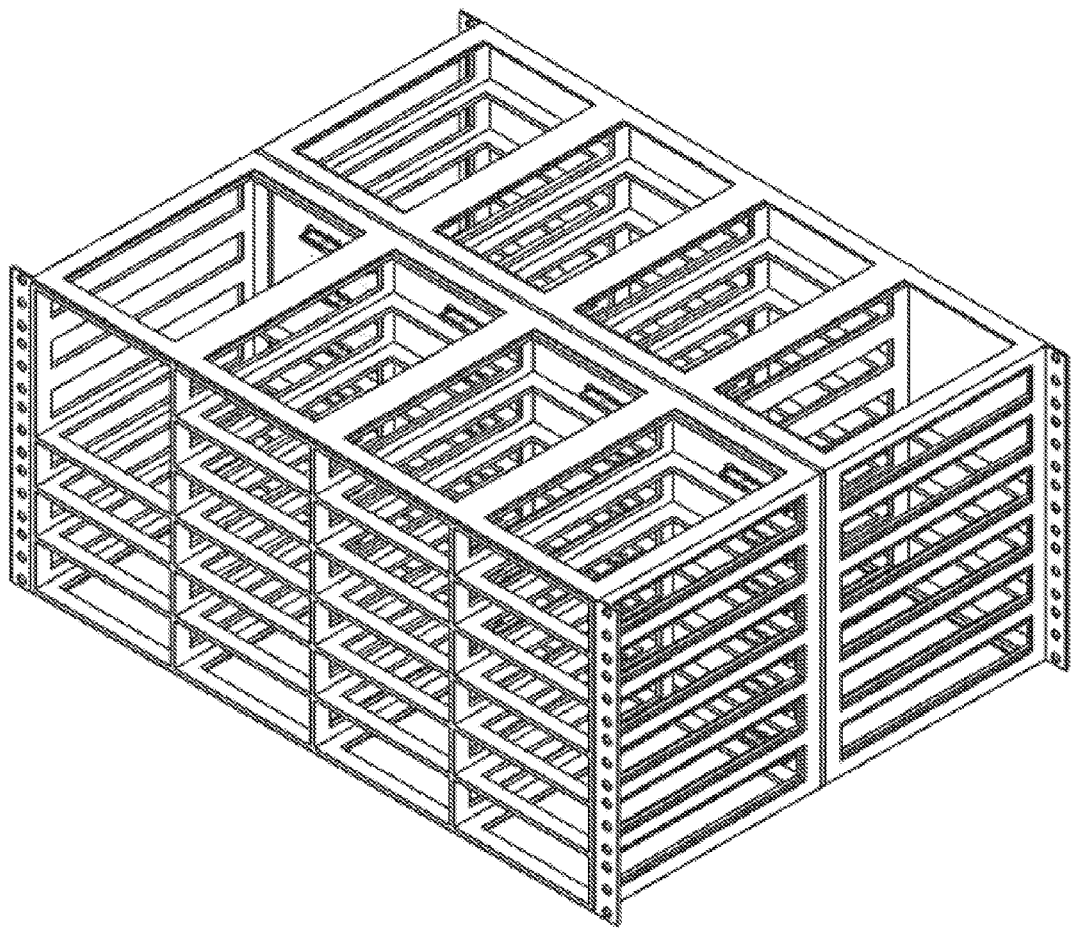

FIG. 121 (12100)-FIG. 128 (12800) depict various views of a typical rack system incorporating the NAS controller (3110) and PTDDC disk drive chain (3120). Note that the individual rack systems may be chained (using the daisy-chaining feature of the PTDDC) to form storage arrays of arbitrary size. This is a significant advantage over conventional NAS systems that use Ethernet switches to control data traffic to individual NAS servers in a storage network. This approach permits full SATA bus speed to be used to communicate to all of the PTDDC-chained disk drives in the array, thus eliminating Ethernet traffic (and associated protocol overhead) in switches that would normally be flooded with individual disk drive data traffic. The data speed along modern SATA busses is 6 Gb/s, exceeding that of the fastest Ethernet switches if Ethernet protocol overhead is accounted for in determining overall transfer speed.

PTDDC SATA Drive Bypass (3300)-(4000)

Figure 89:
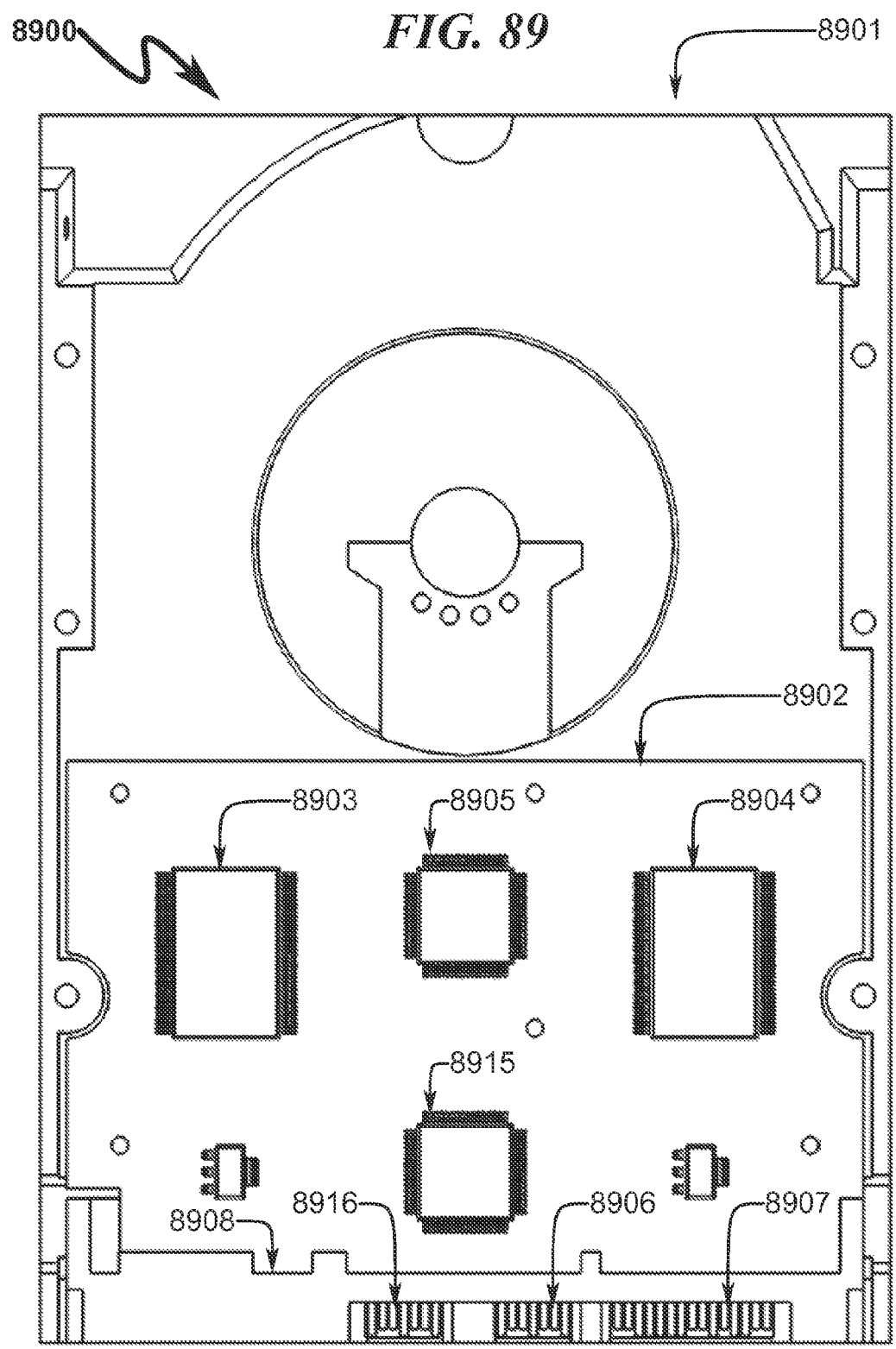
FIG. 89 illustrates a bottom component view of a preferred exemplary invention embodiment disk drive incorporating a SATA electrical interface and PTDDC functionality.

The present invention anticipates a wide variety of methods by which the PTDDC-enabled disk drives may be daisy-chained together. Several of these preferred application contexts may include "racking" SATA disk drives that have been augmented with PTDDC logic (via an ASIC) as generally depicted in FIG. 89 (8900)-FIG. 112 (11200). In this preferred context, large numbers of SATA disk drives that have been PTDDC-enabled may be plugged into PCB backplanes as depicted in FIG. 121 (12100) and following. In these configurations a fully passive or partly passive PCB backplane may be used. With a fully passive PCB backplane, there are only traces connecting the PTI port of one disk drive to the PTO port of another disk drive. In this approach, a drive slot that is not populated will by necessity break the PTI/PTO daisy-chain to remaining disks in the daisy-chain.

Semi-Active Backplane (3300)-(3400)

To solve this problem, a semi-active backplane incorporating bypass differential transceivers (3301, 3302) as depicted in FIG. 33 (3300) may be utilized. Here as a PTDDC-enabled disk (3310) is inserted into the backplane, the transceivers (3301, 3302) which are normally enabled, are disabled by grounding their pullup (3303) enable. In the disabled state, the transceivers are configured for tri-state (hi-Z) operation, thus not loading the PTI/PTO ports of the newly inserted PTDDC-enabled disk drive (3310).

Figure 34:
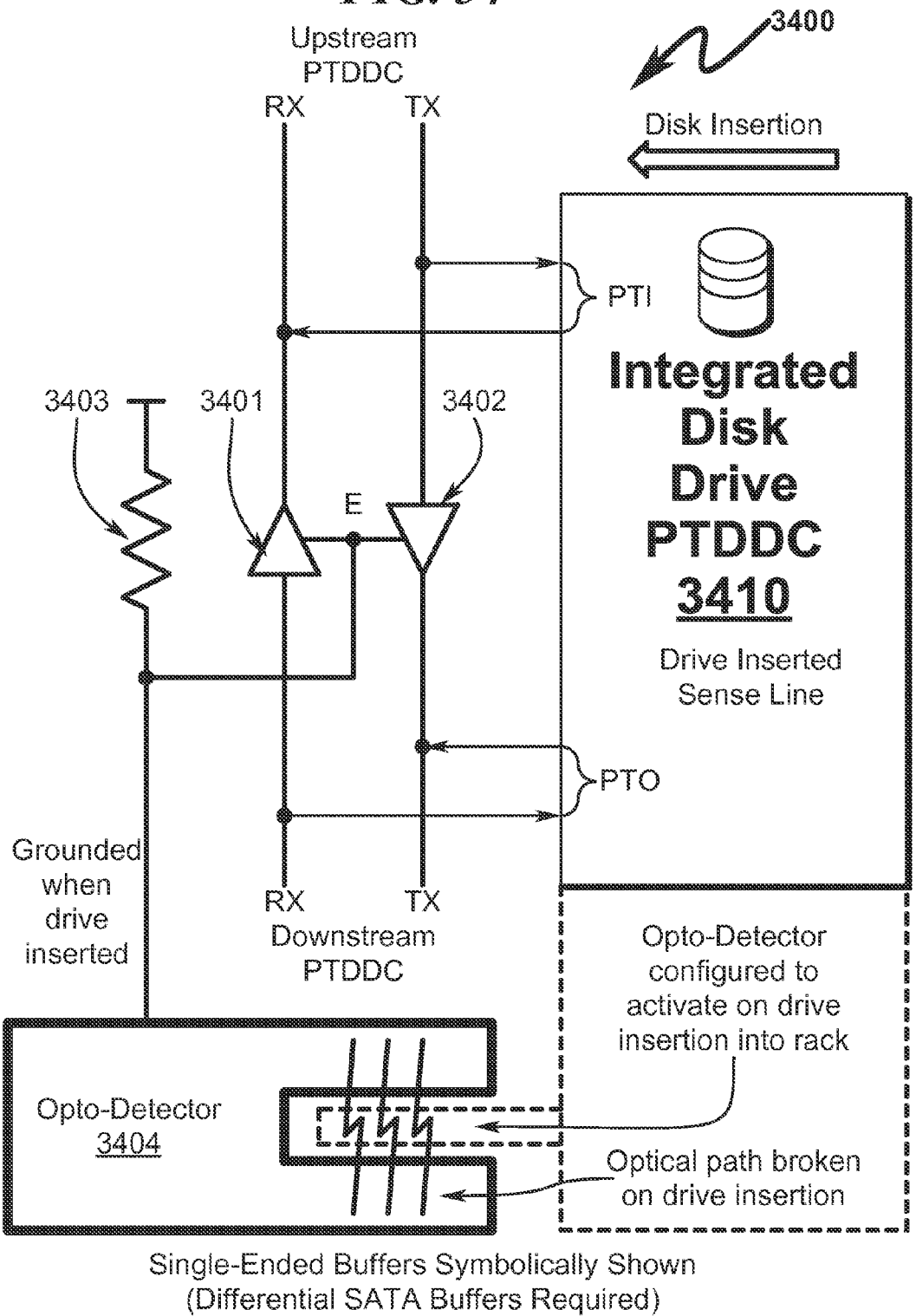
FIG. 34 illustrates an exemplary semi-passive backplane utilizing optical slot bypass methodology useful in some preferred invention embodiments.

As generally depicted in FIG. 34 (3400), this general concept can be utilized in configurations that do not require the PTDDC-enabled SATA disk drive (3410) to electrically couple with the bypass transceivers (3401, 3402). In this alternate configuration, an opto-detector (3404) is used to detect when the PTDDC-enabled SATA disk drive (3410) has been inserted into the rack and disable the bypass transceivers (3401, 3402) when this event is detected. One skilled in the art will recognize that this is exemplary of a wide variety of equivalent methods to activate the per-slot bypass of the PTDDC daisy-chain.

Bypass Carrier PCB (3500)-(4000)

Figure 35:
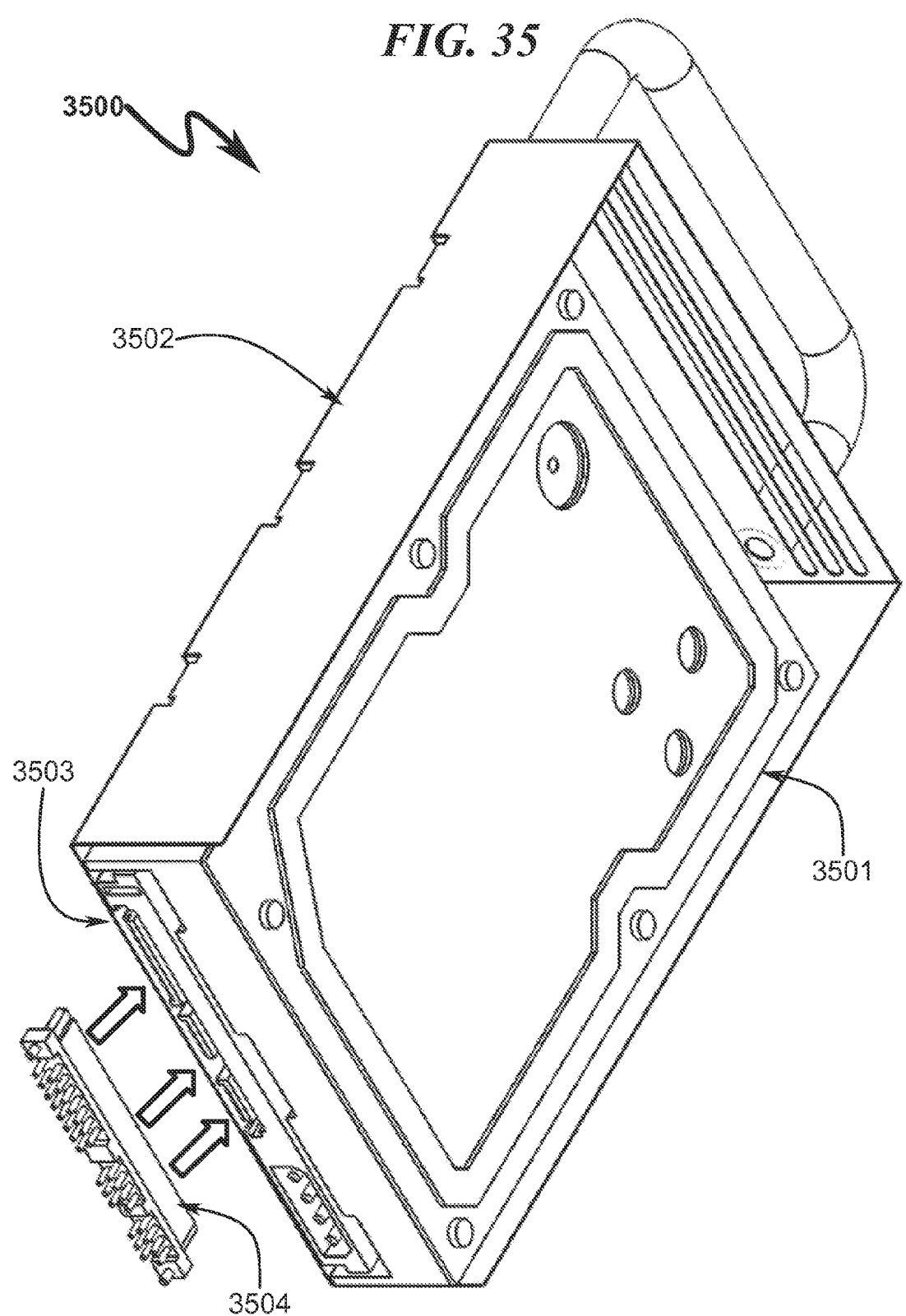
FIG. 35 illustrates a perspective view of a preferred exemplary invention embodiment integrating a PTDDC-enabled SATA disk drive and a disk drive carrier frame.
Figure 40:
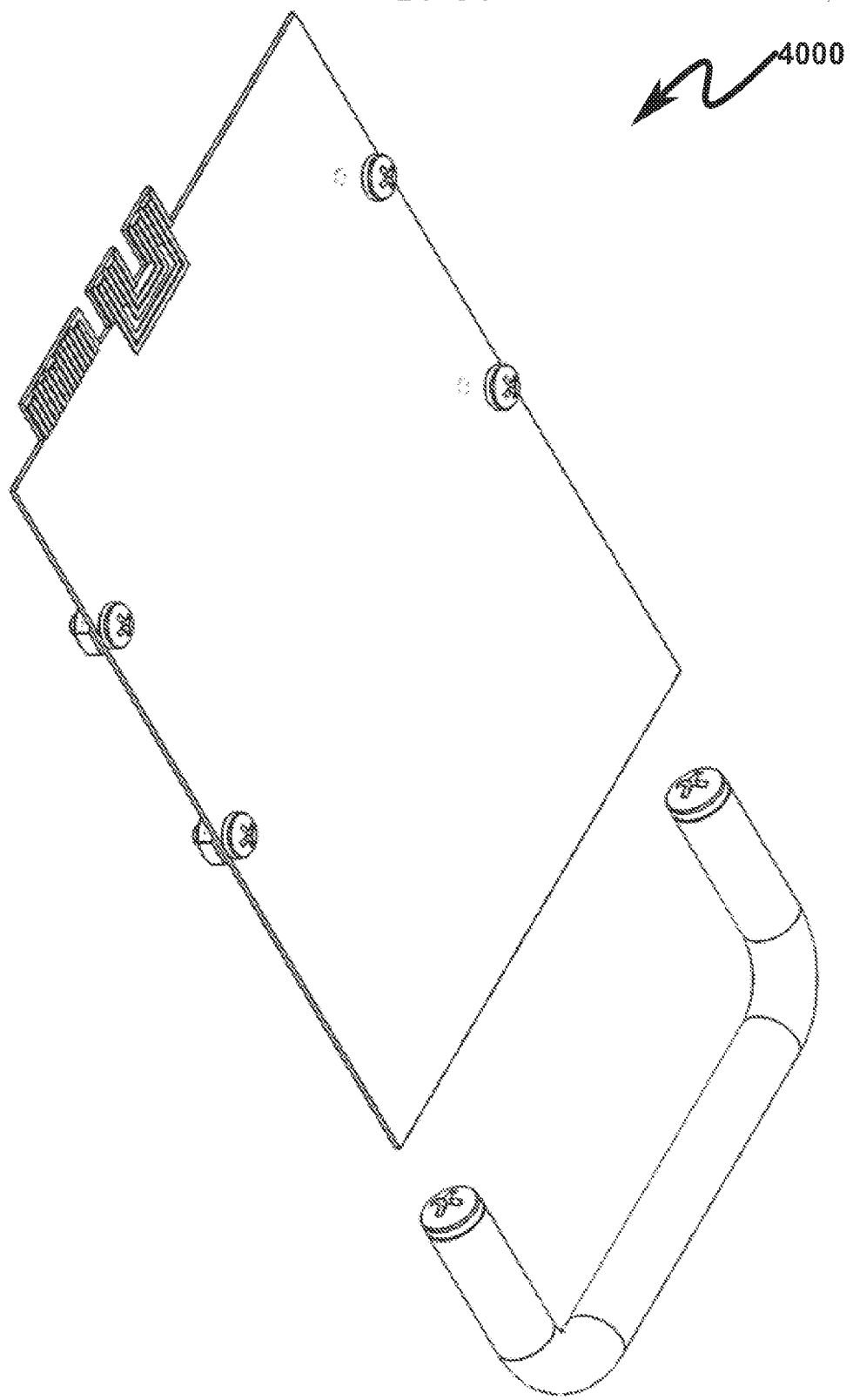
FIG. 40 illustrates a bottom perspective assembly view of a disk drive carrier with bypass carrier PCB illustrated and disk drive carrier frame suppressed.

In circumstances where a fully passive backplane is desirable, the present invention may utilize a bypass carrier PCB as generally depicted in FIG. 35 (3500)-FIG. 40 (4000) to achieve a per-slot bypass of the backplane. As generally depicted in FIG. 35 (3500), a PTDDC-enabled disk drive (3501) may be mated with a carrier (3502) that enables registration of the disk drive connector (3503) with a modified SATA power/signal connector (3504). Since the PTDDC-enabled disk drive (3501) contains PTI/PTO port daisy-chaining, the removal of the disk carrier as depicted in FIG. 35 (3500) from a drive bay slot breaks the PTDDC daisy-chain.

Figure 37:
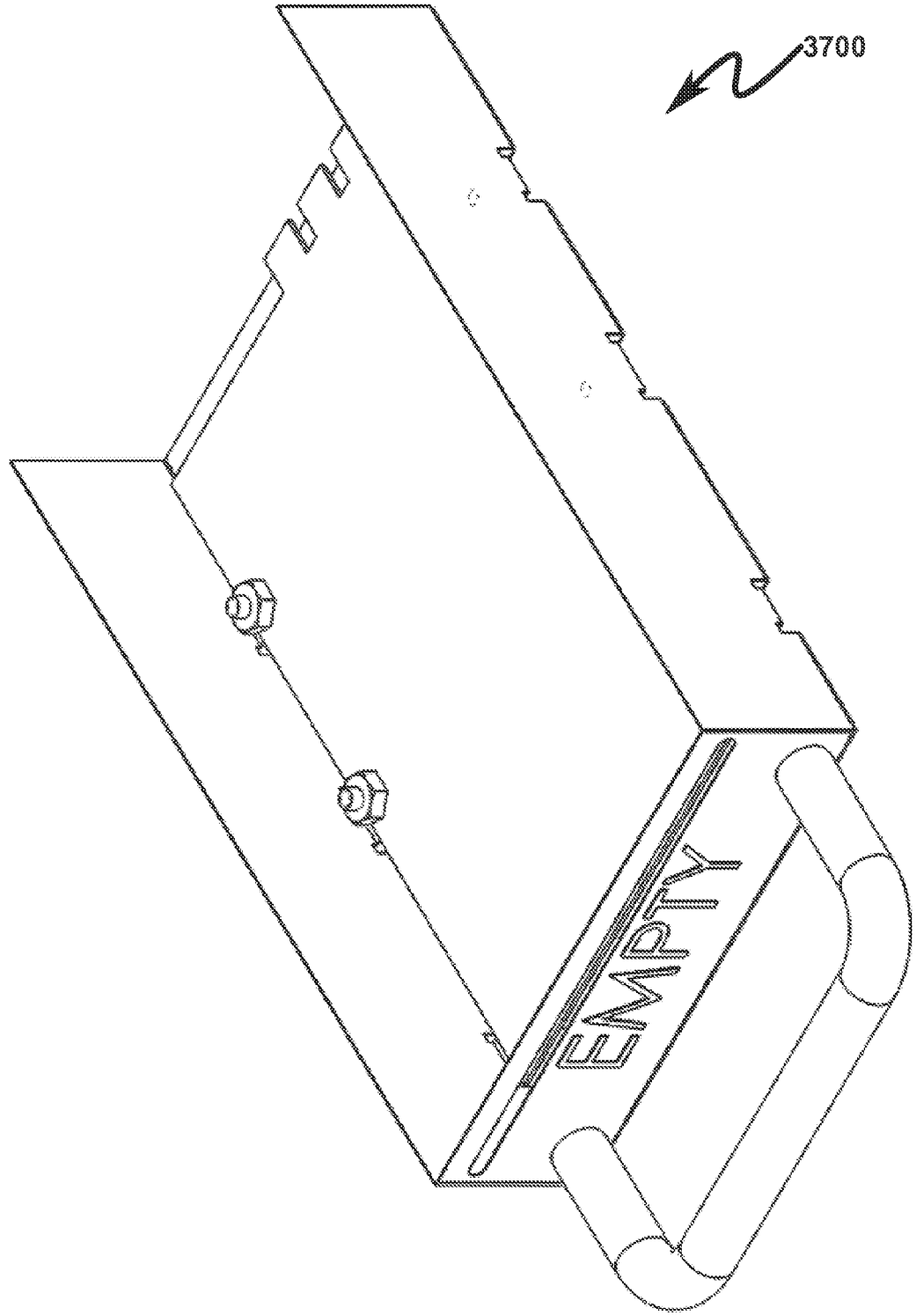
FIG. 37 illustrates a top perspective view of a disk drive carrier with bypass carrier PCB installed.
Figure 38:
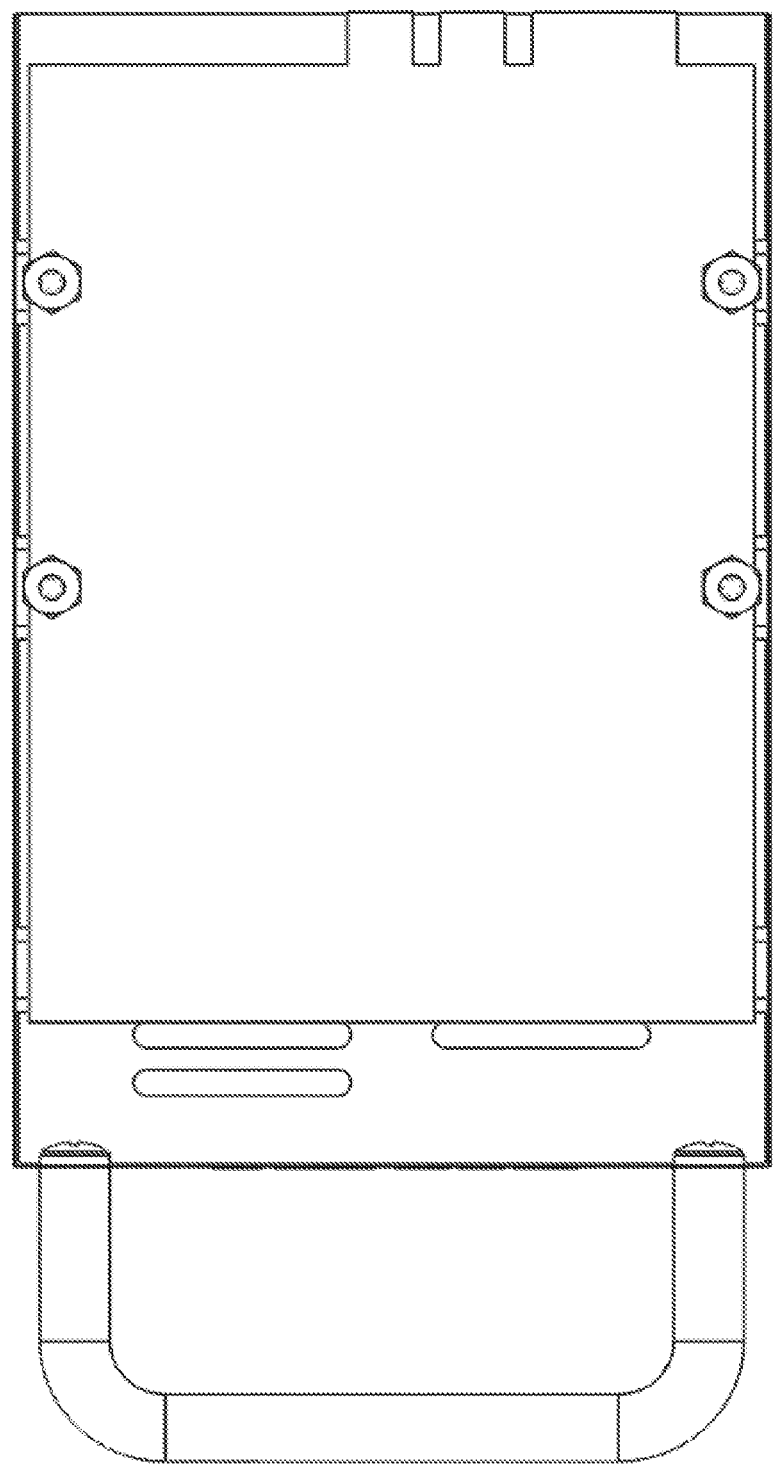
FIG. 38 illustrates a top view of a disk drive carrier with bypass carrier PCB installed.
Figure 39:
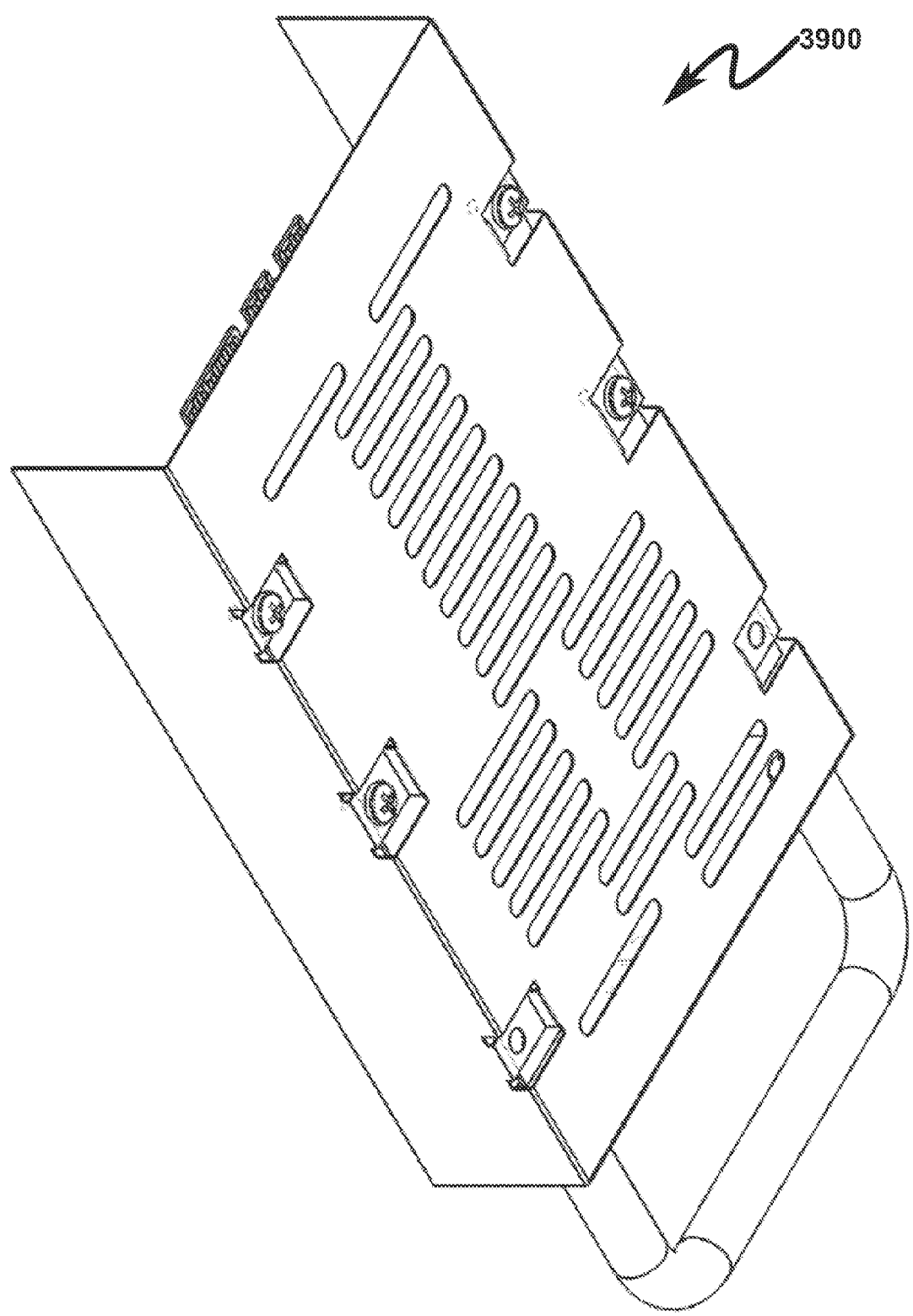
FIG. 39 illustrates a bottom perspective view of a disk drive carrier with bypass carrier PCB installed.

As a replacement for this active PTDDC pass-thru, a passive PCB bypass may be used instead as depicted in the detail of FIG. 36 (3600). Here the bypass carrier PCB (3601) is configured with PCB traces (3602) that connect the HBA/PTI port (3603) to the PTO port (3604) thus bypassing the disk drive slot. Various views of this exemplary PCB bypass carrier configuration are depicted in FIG. 37 (3700)-FIG. 40 (4000). These PCB bypass carriers are also illustrated in various views of FIG. 121 (12100) and following. Unused traces in this depiction are generally connected to GROUND to improve signal integrity. Some SATA connector implementations may utilize GROUND traces between each SATA signal line for additional signal integrity.

Daisy-Chain Interruption

During the insertion/removal of a disk carrier containing either a PTDDC-enabled SATA disk drive or a PCB bypass carrier, the PTDDC daisy-chain is by necessity disrupted and communication is broken during the insertion/removal process. To prevent disruption of communication to the daisy-chained storage array during this process it is anticipated that the PTDDC ASICs will support a STALL function that can be initiated either via a hardware input to the ASIC and/or via software command to the PTDDC daisy-chain that will stall data transfers along the daisy-chain for a brief period so that a disk carrier frame (containing either a SATA disk or PCB bypass) can be replaced within the storage array. Once the removal/insertion is accomplished, the ASIC exits the STALL mode and returns to ACTIVE operation with data transfers flowing normally up and down the PTI/PTO daisy-chain.

RAID-0 Support (4100)

Figure 41:
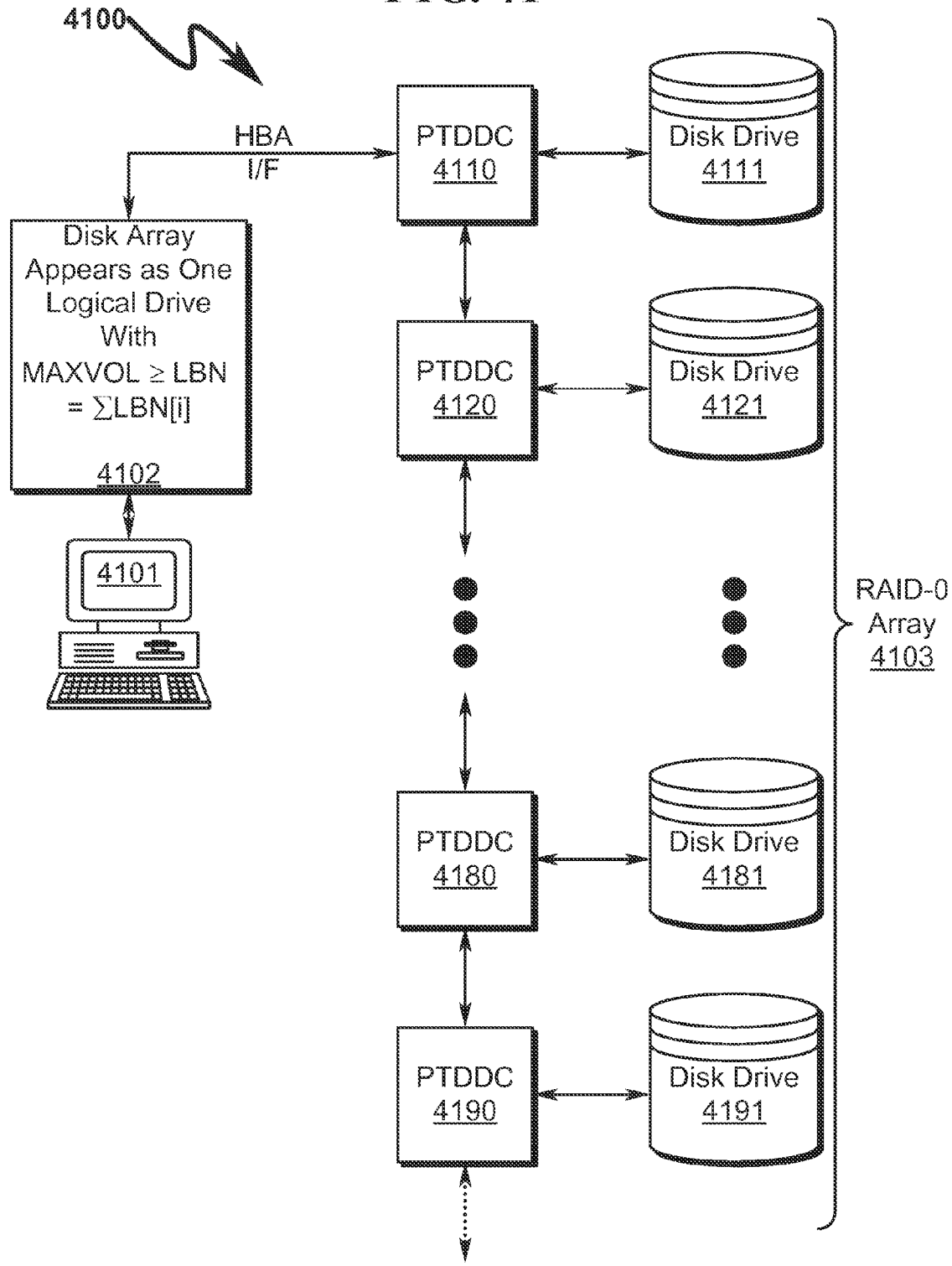
FIG. 41 illustrates a preferred exemplary invention embodiment implementing a RAID-0 storage array.

As generally illustrated in FIG. 41 (4100), the present invention when configured to concatenate the LBN counts of disk drives that are attached to daisy-chained PTDDCs (4110, 4120, 4180, 4190) as described herein nominally implements a RAID-0 storage array (4103), sometimes referred to as a JBOD ("just a bunch of disks") array. In this configuration the daisy-chained PTDDCs are viewed as one large disk drive (4102) with a maximum LBA equivalent to at least the sum of LBN maximums from all disk drives attached (4111, 4121, 4181, 4191) to the daisy-chained PTDDCs (4110, 4120, 4180, 4190).

RAID-0 arrays generally do not contain any data redundancy and are thus susceptible to failure should one or more of the disk drives fail. However, in circumstances where data storage capacity is paramount, RAID-0 arrays can provide a useful mechanism to overcome the single-drive capacity limitations present with conventional disk drive technologies. Furthermore, in situations where data is mirrored across separate computer systems that each incorporate RAID-0 support in their storage architectures, the use of RAID-0 in conjunction with redundant computer system processor hardware can provide high availability should either a single drive fail or a computer system related component fail.

In contrast to traditional RAID-0 configurations, the present invention presents the storage system to the computer (4101) simply as a conventional disk drive having characteristics of a very large disk drive. The advantage to this approach is that no software modifications to the computer system need be made, no additional BIOS firmware is required to support the storage system, and the system can be expanded incrementally as necessary without replacing existing storage elements. For systems that are limited in their number of disk drive interfaces, this permits storage expansion within the existing computer enclosure without the need for external disk drive cabling, the use of slower NAS storage, or the complete replacement of existing disk drives with more costly higher density units. For systems that require a small form factor and high storage capability, the architecture taught by the present invention is superior to existing storage architectures because it permits additional disk drives to be incorporated in a computer tower case without the need to resort to more exotic storage solutions.

RAID-1 Support (4200)

Figure 42:
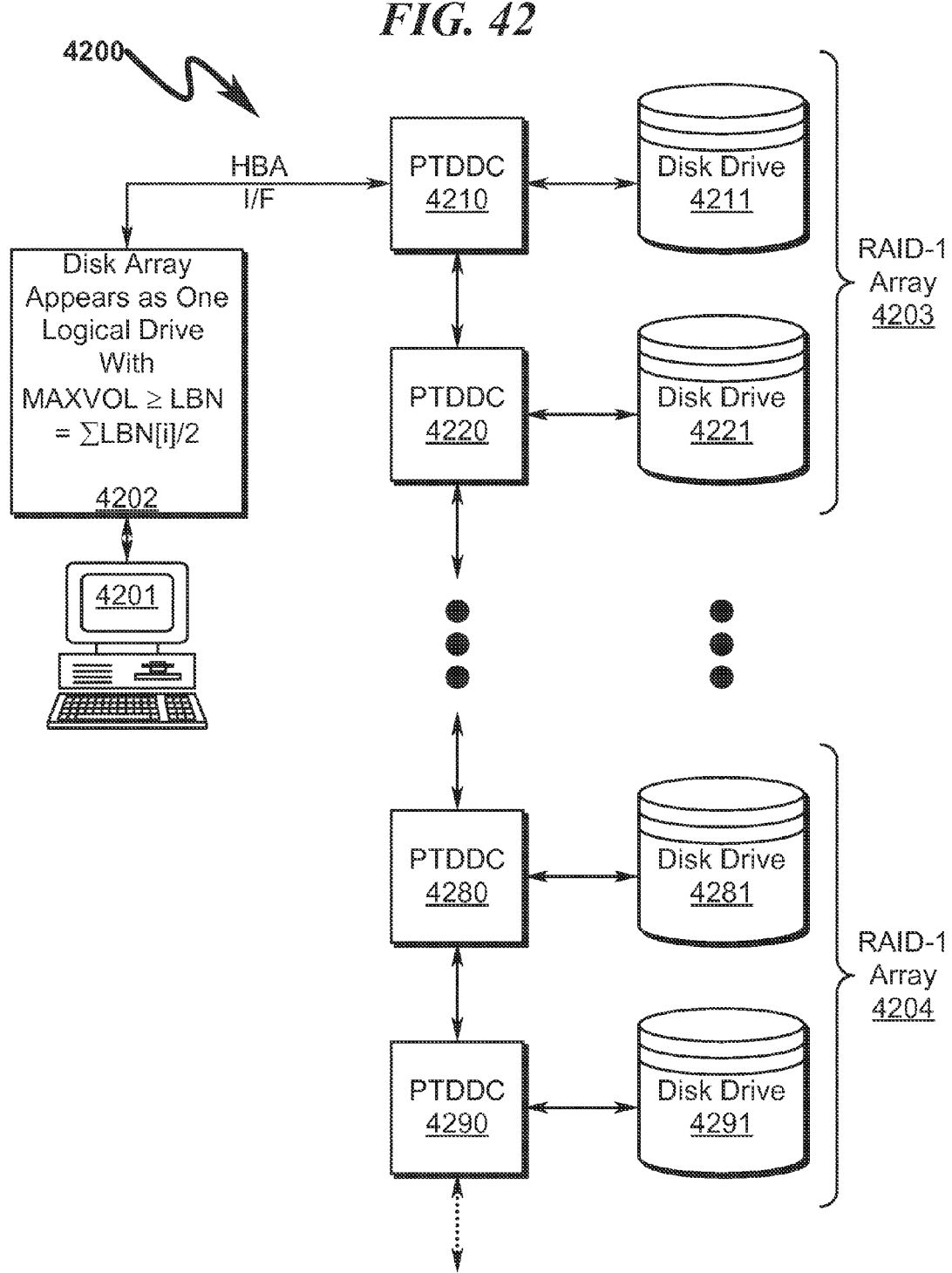
FIG. 42 illustrates a preferred exemplary invention embodiment implementing a RAID-1 storage array.

As generally illustrated in FIG. 42 (4200), the present invention may also be configured to overlap the LBN counts of paired disk drives (4211, 4221) (4281, 4291) that are attached to corresponding daisy-chained PTDDCs (4210, 4220) (4280, 4290) as described herein to nominally implement a RAID-1 storage array (4203, 4204), providing single disk failure recovery capability. In this configuration the daisy-chained PTDDCs are viewed as one large disk drive (4202) with a maximum LBA equivalent to half the sum of LBN maximums from all disk drives attached (4211, 4221) (4281, 4291) to the daisy-chained PTDDCs (4210, 4220) (4280, 4290).

RAID-1 arrays generally contain data redundancy to support the failure of a single drive. Generally speaking, however, support for this type of redundancy must be supported in software (within the computer operating system) and/or within the HBA disk controller. In either scenario, retrofitting systems to include this support can be both difficult and expensive. The present invention presents a uniform HBA interface to the computer system that is transparent to the functions of the operating system and thus can be implemented in any system that requires the RAID-1 functionality, even in retrofit situations where the hardware and/or software cannot be modified to support RAID-1 capabilities.

Implementation of the RAID-1 functionality is quite straightforward using the PTDDC disk drive approach. The PTDDCs in the chain (4210, 4220) (4280, 4290) are configured so that the LBA mapping of the drives is duplicated for each pair of RAID-1 drives, such that a given pair (4210, 4220) (4280, 4290) of PTDDCs maps the same LBN address space. Thus, when a disk drive write operation takes place, it is written to both drives attached to the PTDDC pairs. Similarly, a read operation reads data from both PTDDC pairs, with only one copy of the data returned to the HBA, the remaining data transfer discarded (unless the first PTDDC-attached drive in the RAID-1 pair fails, in which the secondary data copy is returned to the HBA). RAID-1 consistency in the case of a disk drive replacement may be accomplished by background transfers between paired PTDDCs.

Thus, in contrast to traditional RAID-1 configurations, the present invention presents the storage system to the computer (4201) simply as a conventional disk drive having characteristics of a very large disk drive. The advantage to this approach is that no software modifications to the computer system need be made, no additional BIOS firmware is required to support the storage system, and the system can be expanded incrementally as necessary without replacing existing storage elements. For systems that are limited in their number of disk drive interfaces, this permits storage expansion within the existing computer enclosure without the need for external disk drive cabling, the use of slower NAS storage, or the complete replacement of existing disk drives with more costly higher density units. For systems that require a small form factor and high storage capability, the architecture taught by the present invention is superior to existing storage architectures because it permits additional disk drives to be incorporated in a computer tower case without the need to resort to more exotic storage solutions.

Optimized Access RAID-1 Storage (4300)-(4400)

Figure 43:
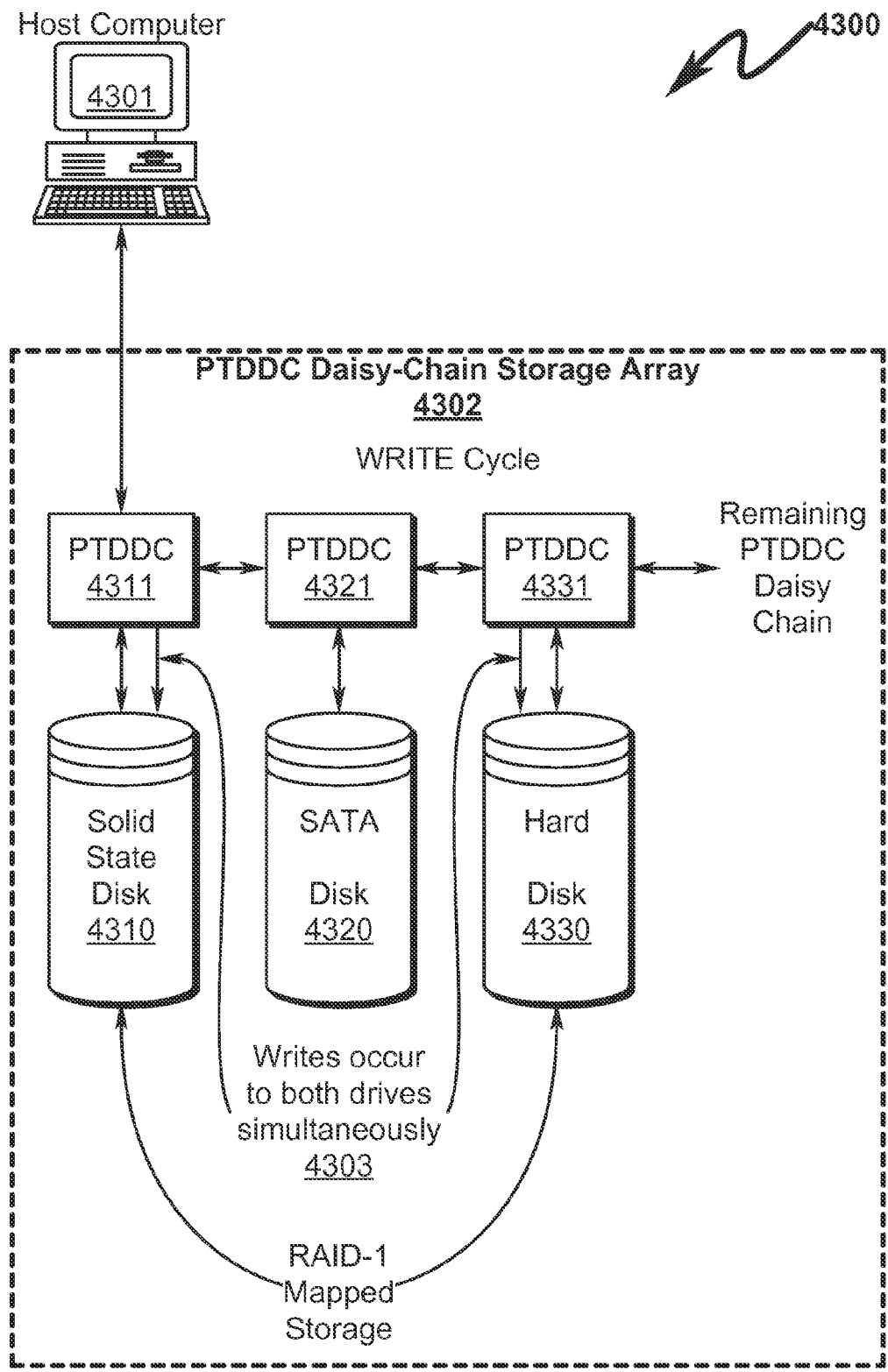
FIG. 43 illustrates an exemplary optimized access RAID-1 storage array utilizing SSD and conventional SATA hard drives and depicts simultaneous WRITE operation to both drives in the RAID-1 pairing.
Figure 44:
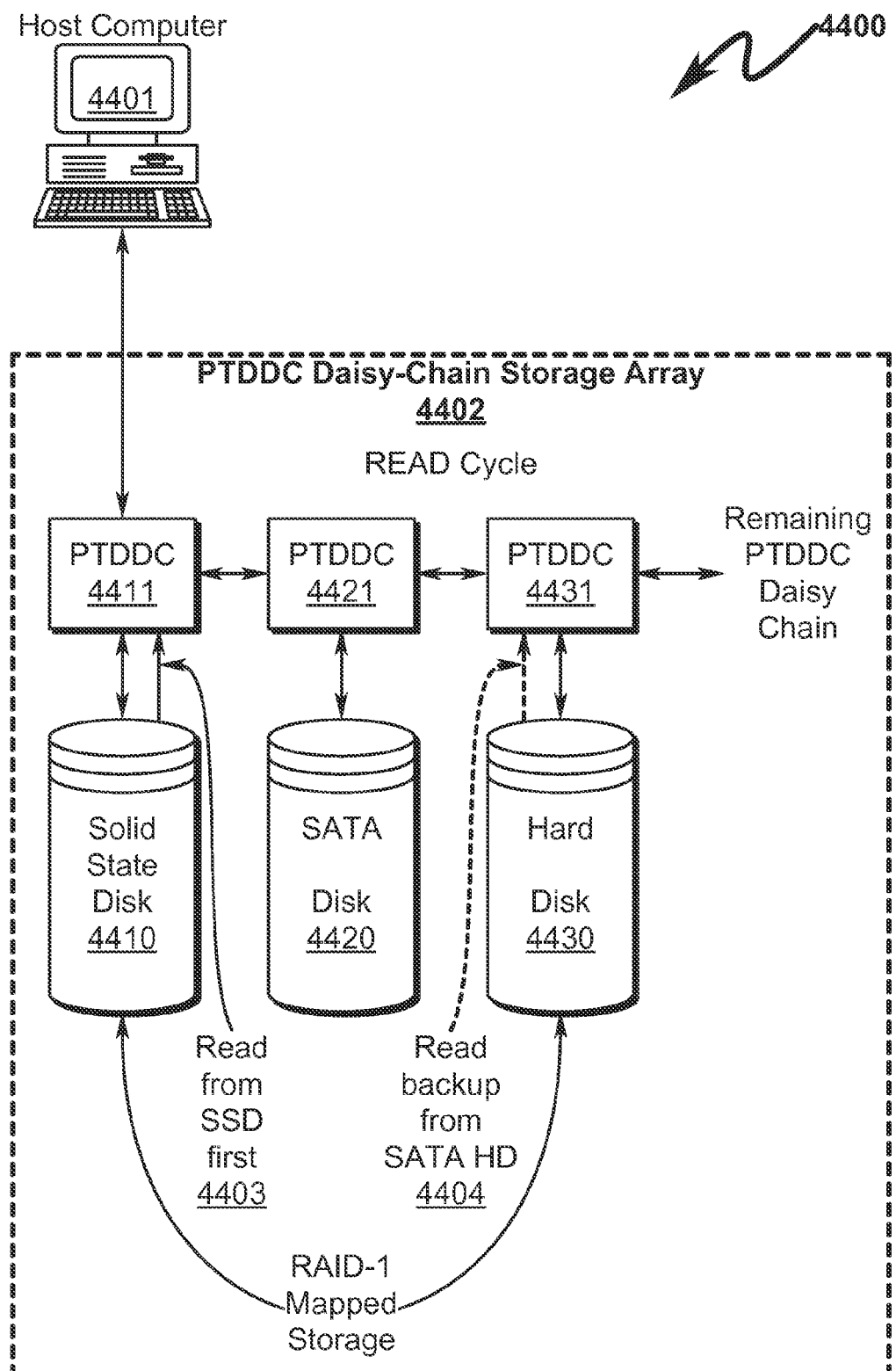
FIG. 44 illustrates an exemplary optimized access RAID-storage array utilizing SSD and conventional SATA hard drives and depicts selective READ operation to a primary SSD drive in the RAID-1 pairing with optional failover READ operations to secondary RAID-1 drives in the RAID-1 pairing.

The RAID-1 concepts depicted in FIG. 42 (4200) may be applied to an optimized storage array as depicted in FIG. 43 (4300)-FIG. 44 (4400) wherein a computer system (4301, 4401) communicates with a PTDDC daisy-chained storage array (4302, 4402) in which disk drives (4310, 4320, 4330, 4410, 4420, 4430) are collectively combined in a RAID-1 array by PTDDC ASICs (4311, 4321, 4331, 4411, 4421, 4431). Note, however, in this particular RAID-1 configuration that the RAID-1 disk pairings combine a solid-state disk (SSD) (4310, 4410) with a conventional hard drive (4330, 4430). This configuration provides several operational advantages:

As depicted in FIG. 43 (4300), both the solid-state disk (4310) and conventional hard drive (4330) can be simultaneously written (4303) along the PTDDC daisy-chain, thus eliminating one write cycle associated with conventional RAID-1 systems that independently connect the RAID-1 drives to the host computer system. Conventional RAID-1 systems must queue a write request to each disk drive independently in order to achieve RAID-1 functionality. This double-write operation is time consuming and reduces overall storage array transfer bandwidth.

As depicted in FIG. 44 (4400), during a read cycle, the solid-state disk (4410) can be configured as the "primary" respondent and return data to the host immediately (4403), and the conventional hard drive (4430) can be configured as the "secondary" respondent and return data in a fallback mode (4404) to the host only if the solid-state disk (4410) is unavailable or inoperative.

Note that the primary solid-state disk (4310, 4410) may be positioned at the front of the PTDDC daisy-chain and thus incur less communication latency to the host computer (4301, 4401). Similarly, the conventional SATA disk drives (4330, 4430) that form the RAID-1 backing store for the SSDs (4310, 4410) may be placed further down the PTDDC daisy-chain as they are read only in a failover mode where the primary SSDs (4310, 4410) are unavailable.

As depicted in these diagrams, the remaining disk drives (4320, 4420) not associated with the RAID-1 mapping between the primary (4310, 4410) and secondary disks (4330, 4430) do not participate in the READ/WRITE operations, but may act as pass-thrus for data flowing up and down the PTDDC daisy-chain.

The configurations in FIG. 43 (4300) and FIG. 44 (4400) illustrate the concept that when implementing RAID-1 storage in a PTDDC daisy-chain, the mapped RAID-1 disk drives need not be adjacent to one another in the daisy-chain. Furthermore, it should be noted that while a single SATA disk drive (4330, 4430) is used for backing-store failover in these examples, there may be any number of backup SATA drives mapped to the primary drive (4310, 4410), thus permitting a tiered redundancy in which if a primary drive fails (4310, 4410), a secondary drive takes over (4330, 4430), and if this secondary drive fails, a tertiary drive within the PTDDC daisy-chain takes over, etc. This failover can be repeated for any number of PTDDC-attached disk drives in the daisy-chain.

Asymmetric RAID-1 Storage (4500)-(4600)

Figure 45:
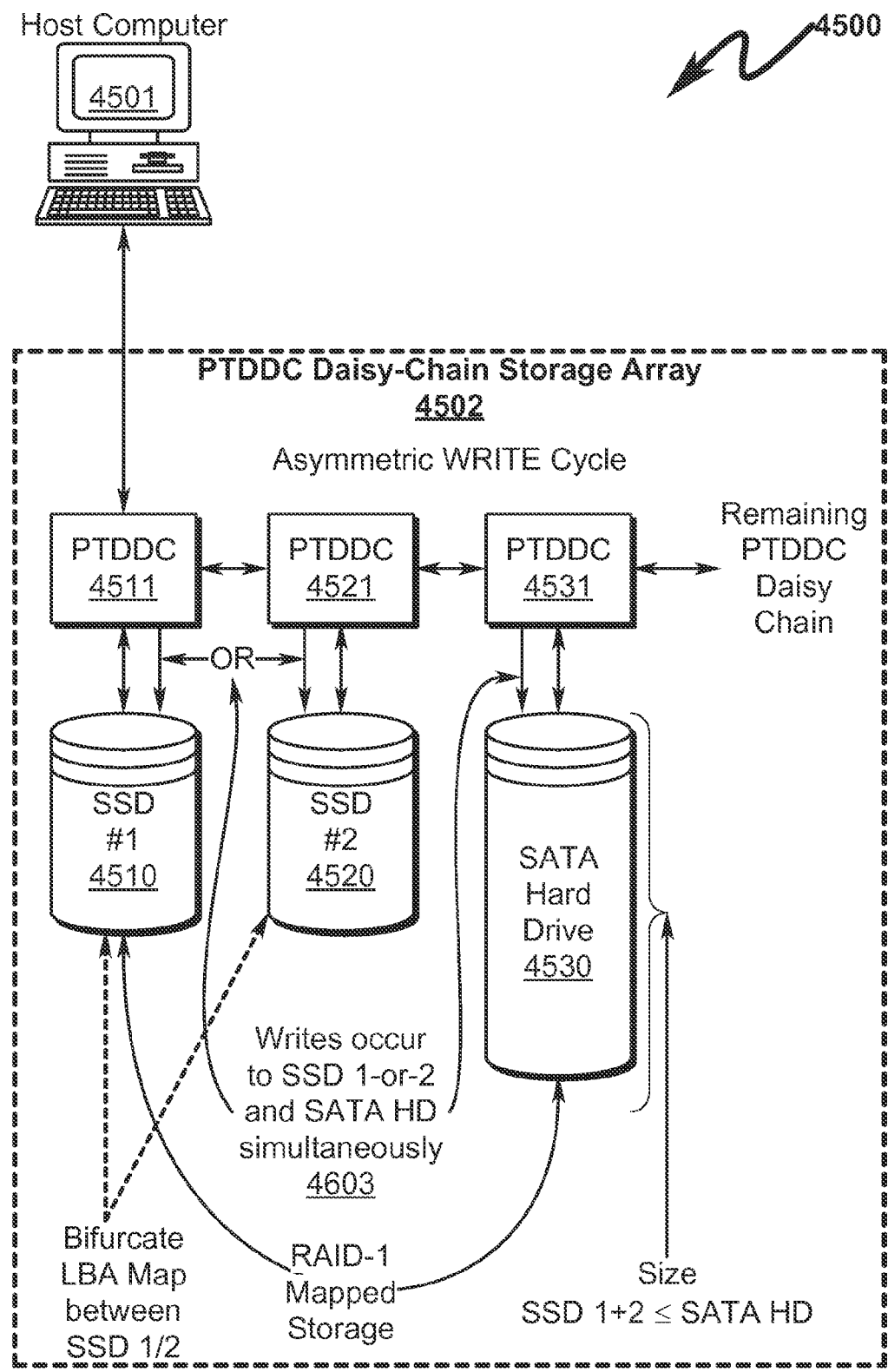
FIG. 45 illustrates an exemplary asymmetric access RAID-1 storage array utilizing SSDs and a conventional SATA hard drive and depicts asymmetric simultaneous WRITE operations to the drives in the asymmetric RAID-1 pairing.
Figure 46:
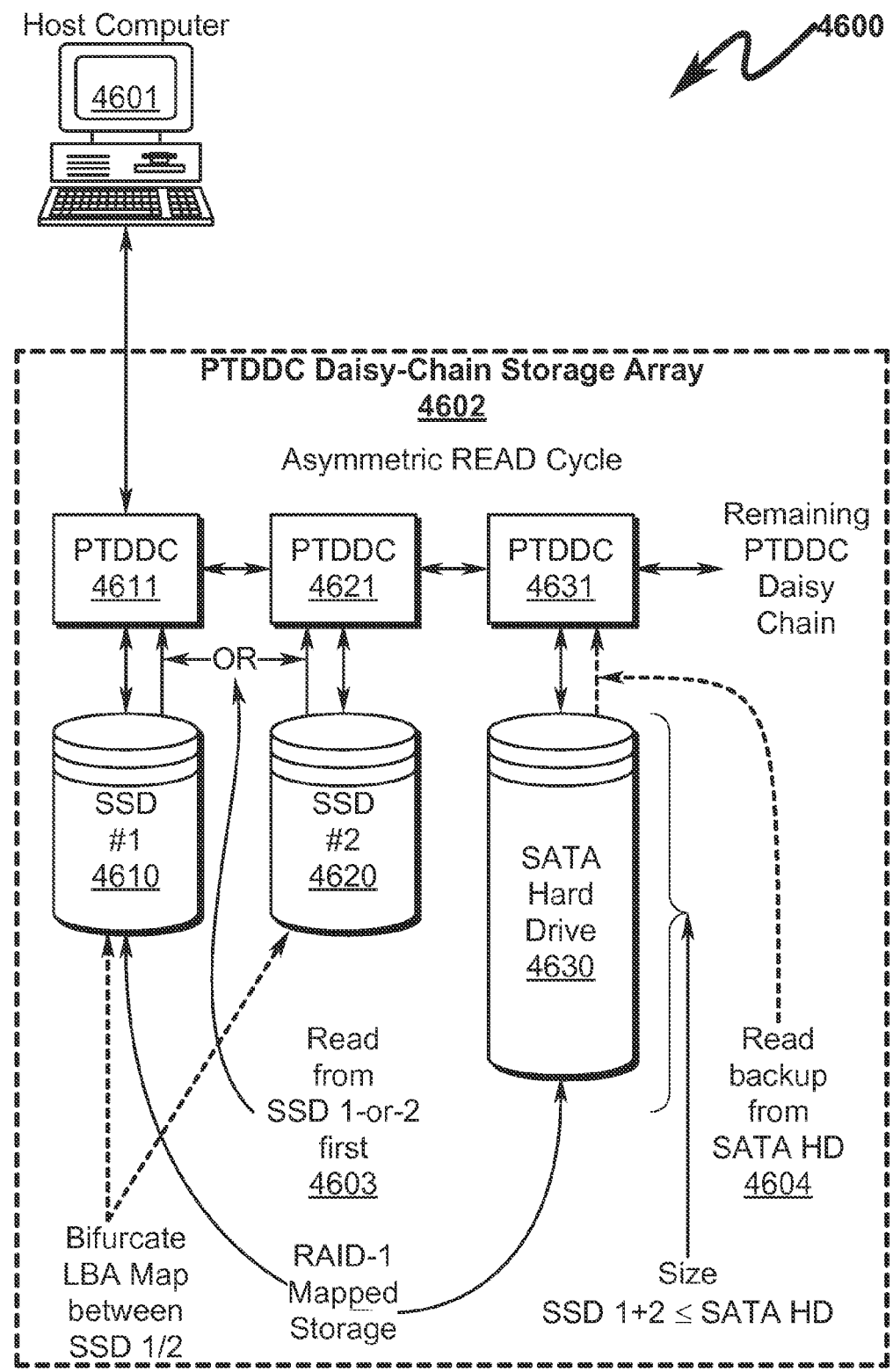
FIG. 46 illustrates an exemplary asymmetric access RAID-1 storage array utilizing SSDs and a conventional SATA hard drive and depicts selective READ operations to a one of two primary SSD drives in the RAID-1 pairing with optional failover READ operations to a secondary SATA RAID-1 drive in the asymmetric RAID-1 pairing.

The RAID-1 concepts depicted in FIG. 42 (4200)-FIG. 44 (4400) may be applied to an asymmetric storage array as depicted in FIG. 45 (4500)-FIG. 46 (4600) wherein a computer system (4501, 4601) communicates with a PTDDC daisy-chained storage array (4502, 4602) in which disk drives (4510, 4520, 4530, 4610, 4620, 4630) are asymmetrically combined in a RAID-1 array by PTDDC ASICs (4511, 4521, 4531, 4611, 4621, 4631). In contrast to the configuration depicted in FIG. 43 (4300)-FIG. 44 (4400), in this particular RAID-1 configuration the RAID-1 disk pairings asymmetrically combine multiple solid-state disk (SSD) (4510, 4520, 4610, 4620) with a conventional hard drive (4530, 4630). In this manner, high-cost low-capacity SSD storage (4510, 4520, 4610, 4620) may be combined with low-cost high-capacity conventional backup storage (4530, 4630) to form economical RAID-1 storage arrays. This configuration provides several operational advantages:

As depicted in FIG. 45 (4500) exemplary asymmetric WRITE configuration, both the solid-state disks (4510, 4520) and conventional hard drive (4530) can be simultaneously written (4503) along the PTDDC daisy-chain, thus eliminating one write cycle associated with conventional RAID-1 systems that independently connect the RAID-1 drives to the host computer system. In this exemplary configuration the SSD disks (4510, 4520) are combined to form a logical address space that is less than or equal to the storage capacity of the SATA hard drive (4530). Note, however, that since each PTDDC ASIC (4511, 4521, 4531) contains individual LBA mapping registers, the backing storage responsibilities may occur among several SATA hard drives (4530) in the PTDDC daisy-chain, and thus while this configuration is thought to be optimal, it is not necessarily the only SSD-to-SATA mapping that may occur in this context. The key concept here is that expensive and fast SSD storage may be associated with inexpensive slower SATA storage within the PTDDC daisy-chain to optimize performance and cost of RAID-1 systems.

As depicted in FIG. 46 (4600) exemplary asymmetric READ configuration, both the solid-state disks (4610, 4620) and conventional hard drive (4630) are available for READ access but the SSD drives (4610, 4620) are configured as primary data delivers and will be accessed first in response to a READ request, with the slower SATA hard drive (4630) being accessed in a backup or failover capacity. Here the SSD to SATA sizing may be optimally be as shown, but as detailed above these sizing guidelines may be modified based on application context. Furthermore, while only two SSD drives (4610, 4620) are illustrated, any number of SSD units may be RAID-1 mapped to any number of SATA hard disk drives used as backing store for the system.

The asymmetric WRITE/READ scenarios depicted in FIG. 45 (4500) and FIG. 46 (4600) anticipate that the SATA backing store (4530, 4630) may be positioned at the daisy-chain and only activated in situations where one or more of the SSD drives (4510, 4520, 4610, 4620) has failed or has been replaced and is being restored to a recovery point by data derived from the SATA backing store (4530, 4630).

RAID-1 WRITE Method Overview (4700)

Figure 47:
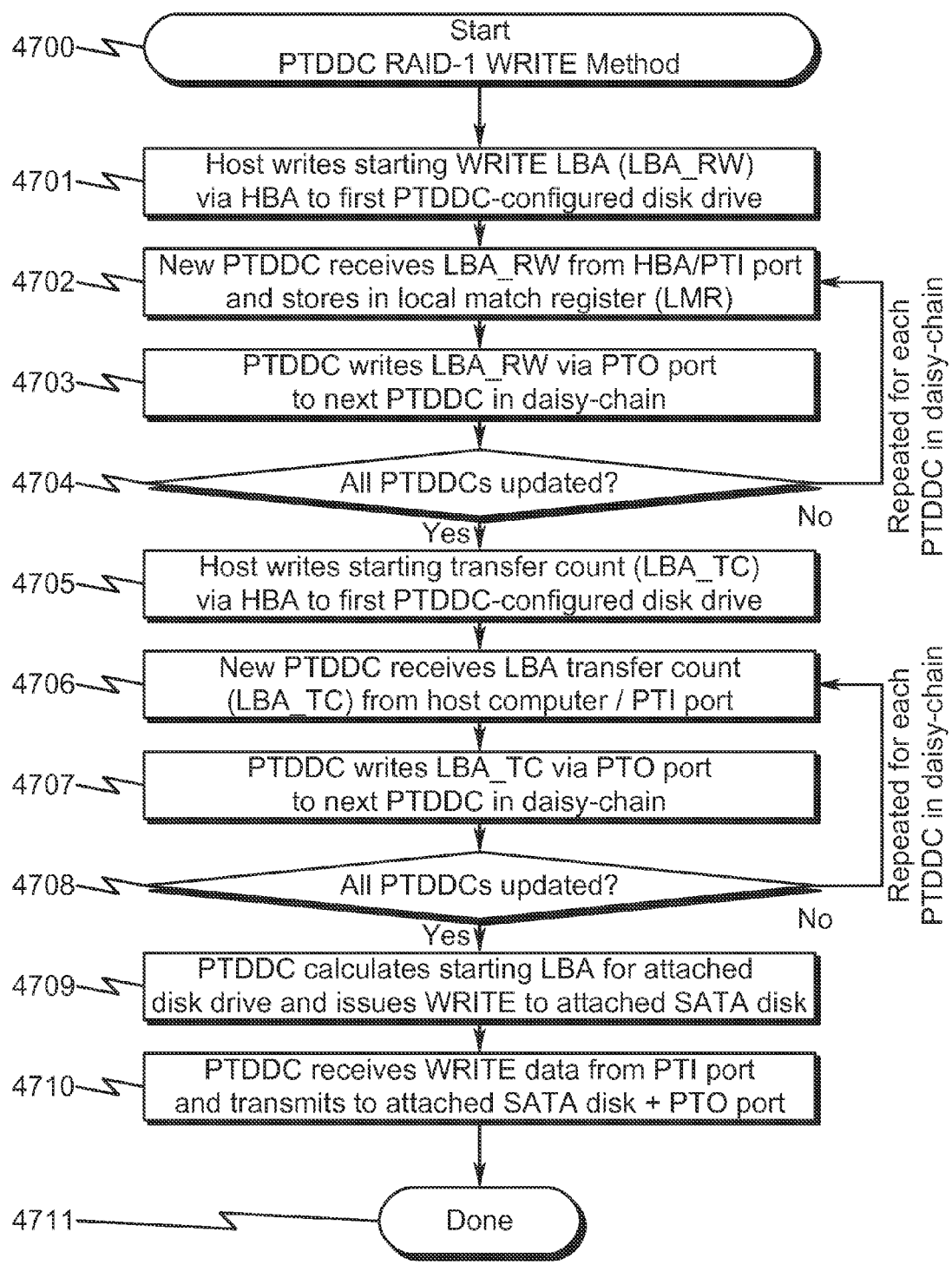
FIG. 47 illustrates a flowchart depicting an exemplary RAID-1 WRITE method associated with a preferred exemplary invention embodiment.

The RAID architectures depicted in FIG. 41 (4100)-FIG. 46 (4600) may be associated with a RAID-1 WRITE method as depicted in the flowchart of FIG. 47 (4700). This method describes how data is written to two or more disk drives in a PTDDC daisy-chain and can be generally described in the flowchart of FIG. 47 (4700) as incorporating the following steps:

(1) Host writes starting WRITE LBA (LBA_RW) via HBA to first PTDDC-configured disk drive (4701);
(2) The currently selected PTDDC receives LBA_RW from HBA/PTI port and stores in local match register (LMR) (4702);
(3) PTDDC writes LBA_RW via PTO port to next PTDDC in daisy-chain (4703);
(4) If all PTDDCs have not been updated then proceed to step (2) to continue updating the PTDDC chain (4704);
(5) Host writes starting transfer count (LBA_TC) via HBA to first PTDDC-configured disk drive (4705);
(6) The currently selected PTDDC receives LBA transfer count (LBA_TC) from host computer/PTI port (4706);
(7) PTDDC writes LBA_TC via PTO port to next PTDDC in daisy-chain (4707);
(8) If all PTDDCs have not been updated then proceed to step (6) to continue updating the PTDDC chain (4708);
(9) PTDDC calculates starting LBA for attached disk drive and issues a WRITE to attached SATA disk (4709); and

(10) PTDDC receives WRITE data from PTI port and transparently transmits this WRITE data to both the attached SATA disk and the PTO port (4710).

It should be noted in some circumstances that step (10) may be optimized to only transfer WRITE data to subsequent PTDDCs in the daisy-chain that was not written to the current PTDDC in the chain. In this manner bus traffic may be reduced along the daisy-chain.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

RAID-1 READ Method Overview (4800)

Figure 48:
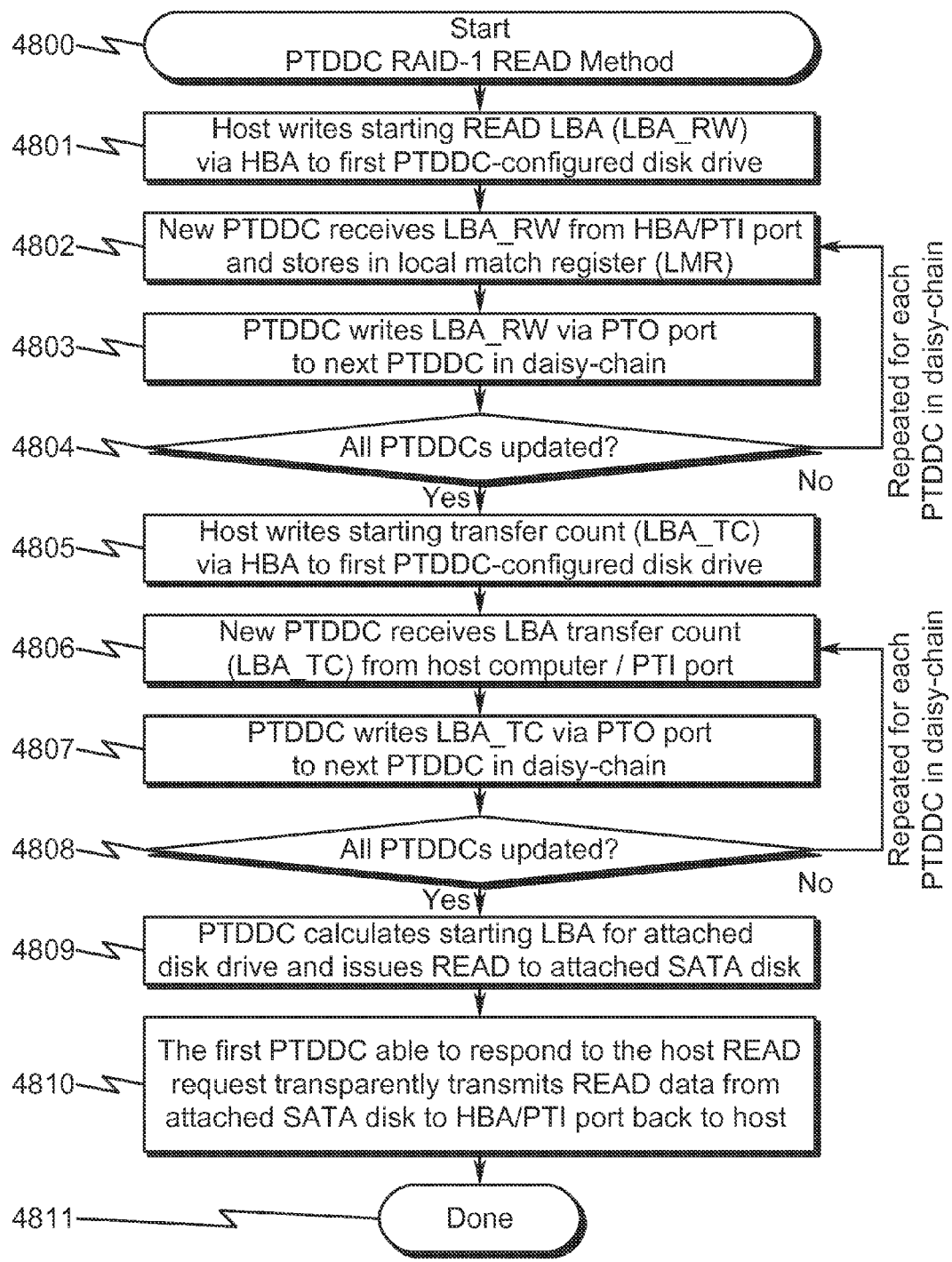
FIG. 48 illustrates a flowchart depicting an exemplary RAID-1 READ method associated with a preferred exemplary invention embodiment.

The RAID architectures depicted in FIG. 41 (4100)-FIG. 46 (4600) may be associated with a RAID-1 READ method as depicted in the flowchart of FIG. 48 (4800). This method describes how data is read from one or more disk drives in a PTDDC daisy-chain and can be generally described in the flowchart of FIG. 48 (4800) as incorporating the following steps:
  (1) Host writes starting READ LBA (LBA_RW) via HBA to first PTDDC-configured disk drive (4801);
  (2) The currently selected PTDDC receives LBA_RW from HBA/PTI port and stores in local match register (LMR) (4802);
  (3) PTDDC writes LBA_RW via PTO port to next PTDDC in daisy-chain (4803);
  (4) If all PTDDCs have not been updated then proceed to step (2) to continue updating the PTDDC chain (4804);
  (5) Host writes starting transfer count (LBA_TC) via HBA to first PTDDC-configured disk drive (4805);
  (6) The currently selected PTDDC receives LBA transfer count (LBA_TC) from host computer/PTI port (4806);
  (7) PTDDC writes LBA_TC via PTO port to next PTDDC in daisy-chain (4807);
  (8) If all PTDDCs have not been updated then proceed to step (6) to continue updating the PTDDC chain (4808);
  (9) PTDDC calculates starting LBA for attached disk drive and issues a READ to attached SATA disk (4809); and
  (10) The first PTDDC able to respond to the host READ request transparently transmits READ data from the attached SATA disk to the HBA/PTI port back to the host (4810).

It should be noted in some circumstances that step (10) may be optimized to disable downstream PTDDCs from responding to the READ request such that only the first PTDDC capable of responding to the READ request actually issues this request to their attached SATA disk drive. In this manner, power consumption in downstream SATA disk drives is minimized as they are only activated on a READ operation in circumstances where the first PTDDC-attached SATA disk is unavailable or malfunctioning.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

RAID-2/RAID-3/RAID-4/RAID-5/RAID-6 Support

One skilled in the art will recognize that the above examples also permit support of RAID-2, RAID-3, RAID-4, RAID-5, and RAID-6 arrays using the PTDDC architecture.

Exemplary PTDDC Mapping Functionality (4900)- (5600)

Figure 49:
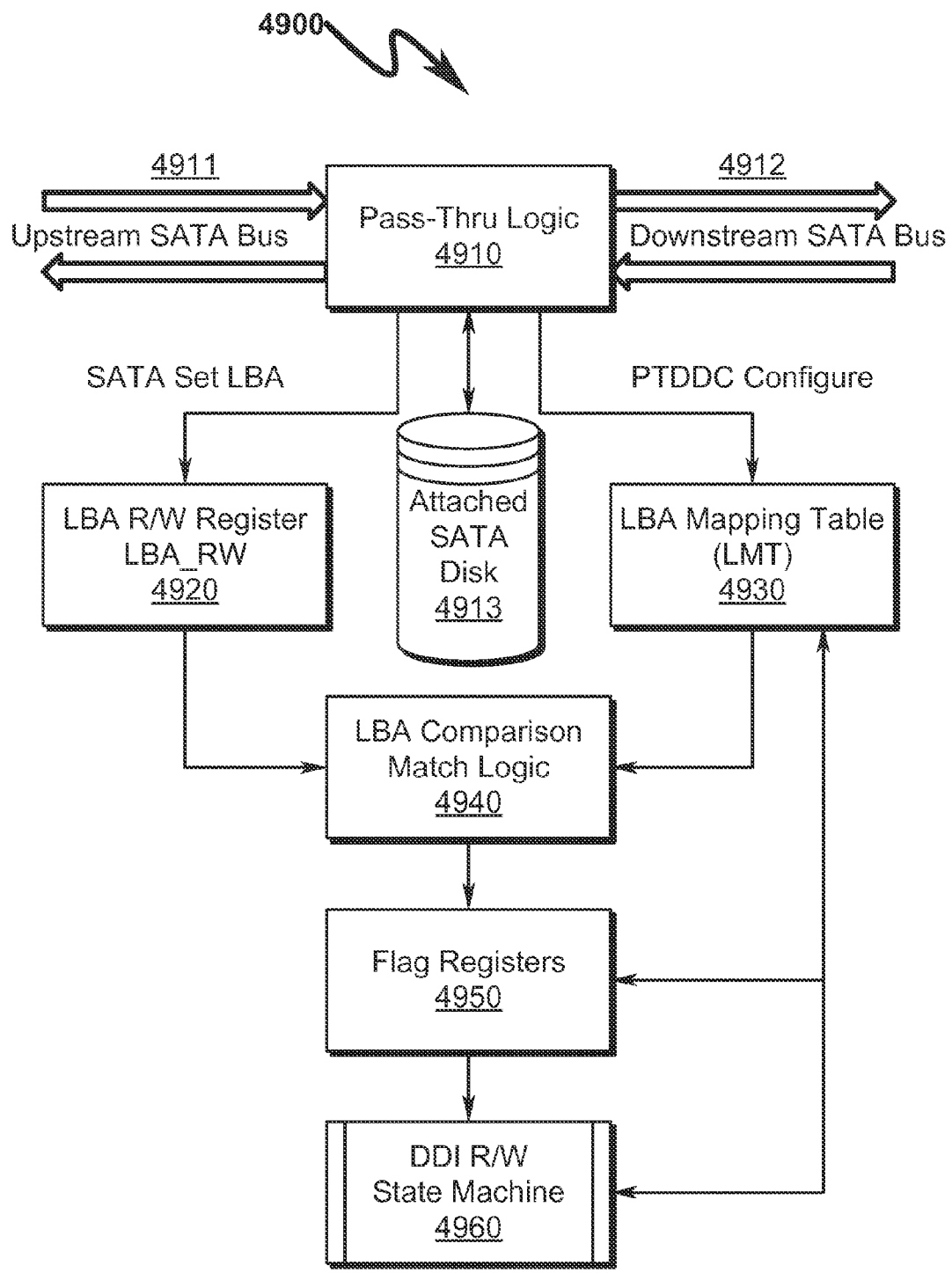
FIG. 49 illustrates an overview of a LBA mapping table (LMT) structure useful in some preferred invention embodiments.

The LBA comparison logic operation depicted in FIG. 18 (1800) including the disk LBA R/W address (1816), LBA mapping table (1817), and LBA mapping comparator (1818) may take a single-entry form or may as depicted in FIG. 49 (4900) involve a multiple number of entries that permit LBA mapping within a single PTDDC-attached SATA disk drive to be fragmented. While a simple mapping table may include just a single HBA-to-LBA map, more complex embodiments of the present invention may use multiple maps within a given PTDDC. Further information on how this may be accomplished is provided below.

LBA Matching Overview (4900)

While there are a variety of methods to implement the PTDDC daisy-chain functionality, one preferred system implementation is depicted in FIG. 49 (4900) wherein the PTDDC pass-thru hardware logic (4910) ties an upstream (PTI) (4911) SATA data stream to a downstream (PTO) (4912) SATA data stream. Within this context an attached SATA disk drive (4913) is connected via the PTDDC DDI port. As depicted in this diagram, any WRITE by the host to the LBA start register (4920) is written internally to the PTDDC. This internal register is then compared to a LBA mapping table (LMT) (4930) by hardware match logic (4940) that then configures a number of FLAG registers (4950) depending on the results of the match. Information from these matches is then used by a DDI R/W state machine (4960) to determine what data is transferred to/from the attached SATA disk (4913) and under what circumstances this data is transferred.

LBA Mapping Table (LMT) Detail (5000)

Figure 50:
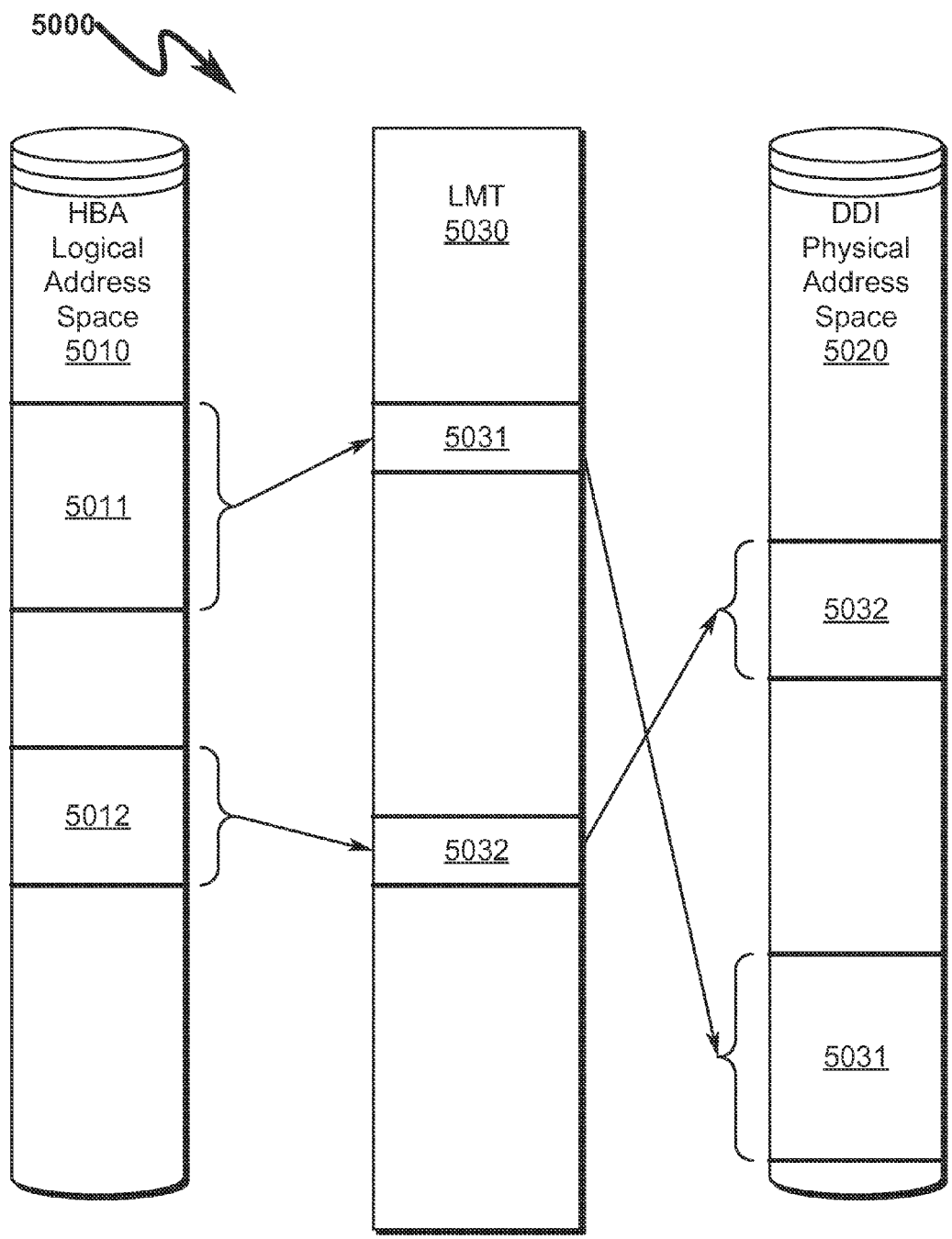
FIG. 50 illustrates a detail view of a LBA mapping table (LMT) structure useful in some preferred invention embodiments.
Figure 51:
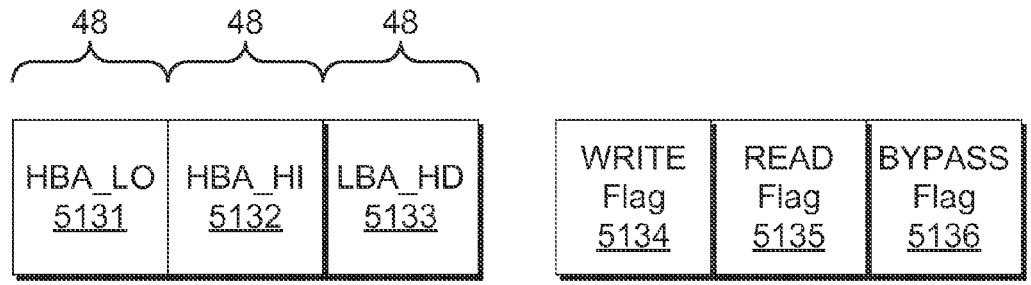
FIG. 51 illustrates a detail view of LBA mapping table (LMT) record structure useful in some preferred invention embodiments.

An exemplary LBA mapping table is depicted in FIG. 50 (5000) with record detail presented in FIG. 51 (5100). In FIG. 50 (5000) the HBA logical address space (5010) (as seen from the HBA/PTI ports) is mapped to the locally attached SATA DDI physical address space (5020) via the LMT (5030). Portions (5011, 5012) of the HBA address space (5010) are matched via the LMT (5030) record entries (5031, 5032) to the DDI (5020) physical address space (5021, 5022). As depicted in the diagram, the mappings may overlap and not necessarily be contiguous within either of the entities (5010, 5020, 5030).

LBA Mapping Table (LMT) Record Detail (5100)

Additional detail of the LMT is presented in FIG. 51 (5100) that depicts a LMT record. Each LMT record in this preferred embodiment contains a LOW (HBA_LO) (5131) and HIGH (HBA_HI) (5132) mapping address tied to the HBA address map and a corresponding DDI HD (LBA_HD) (5133) LBA address associated with the attached SATA disk drive. Within this exemplary application context, the LBA_HD starting physical address corresponds to the HBA_LO logical HBA address. As depicted, the HBA_LO, HBA_HI, and LBA_HD entries are 48-bits in length, corresponding to the width of a traditional SATA LBA register.

Associated with the LBA record is a WRITE flag (5134) that indicates that HBA writes are to be processed by this mapping record. Note in some circumstances (such as RAID implementations), the DDI writes may be processed from downstream data. A READ flag (5135) permits reading of data from this DDI port. As with the WRITE flag (5134), this data may be sourced from other drives in the PTDDC chain, as in the case where a master/slave are written, but only the master is read by the HBA. A BYPASS flag (5136) indicates that HBA commands are to be ignored and merely passed through the PTDDC for this LBA map range (HBA_LO-HBA_HI).

LMT Parallel Comoarison Logic (5200)

Figure 52:
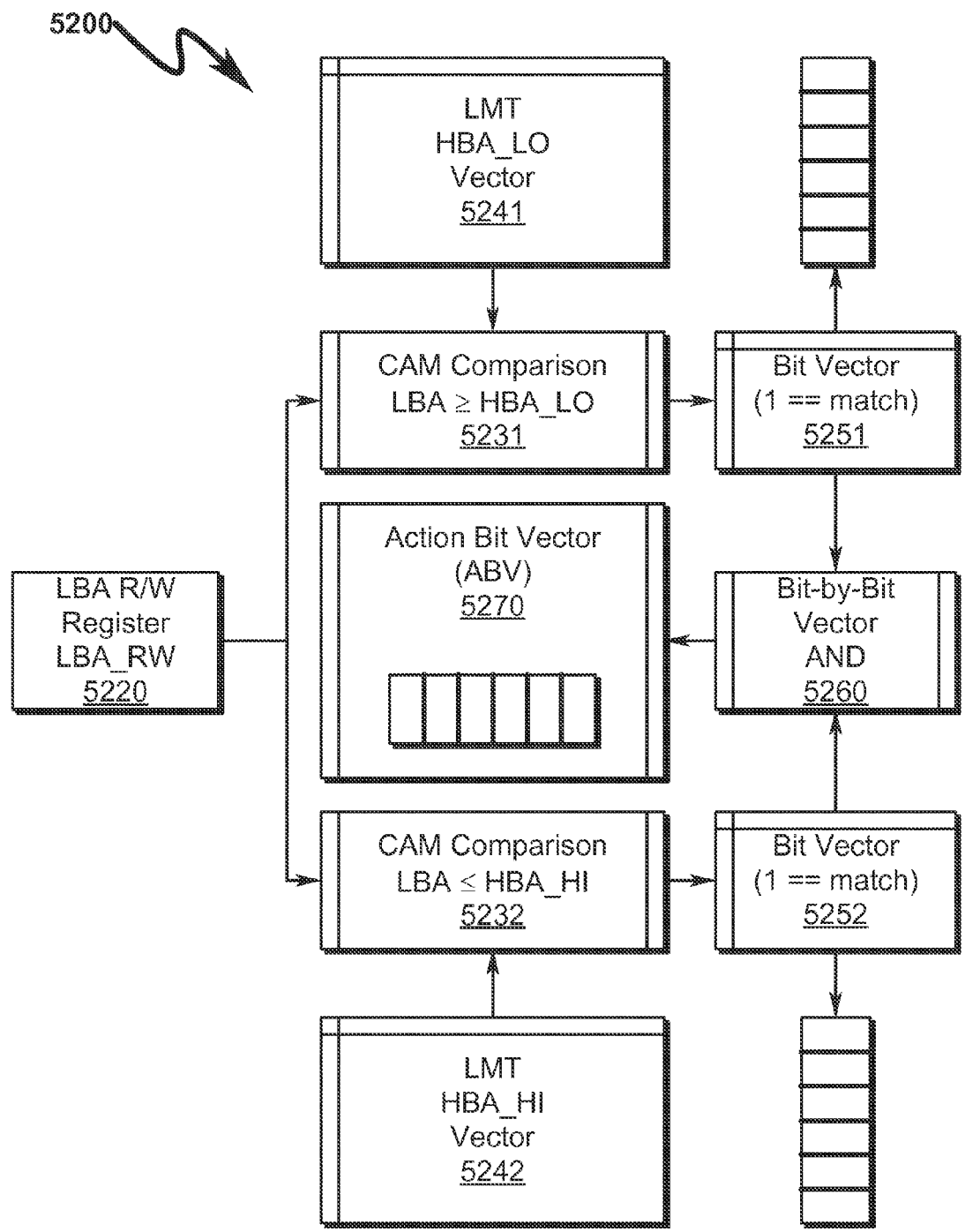
FIG. 52 illustrates an exemplary schematic depicting parallel LMT comparison logic.
Figure 53:
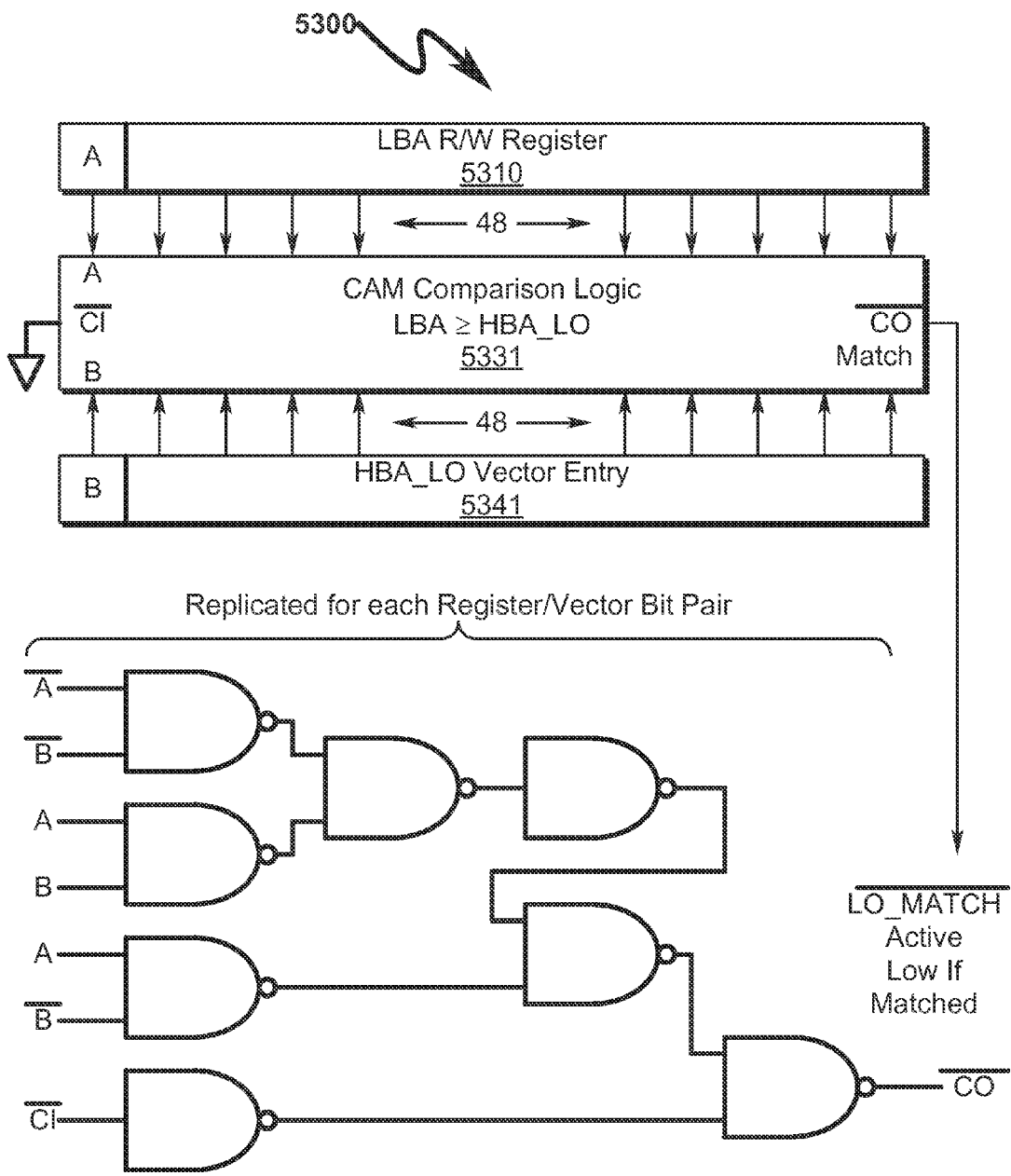
FIG. 53 illustrates an exemplary schematic depicting CAM comparison logic.

It is anticipated that in many preferred invention embodiments the LBA to which the next disk read/write will occur will be matched in parallel with entries in the LMT. An exemplary parallel LMT comparison logic schematic is provided in FIG. 52 (5200) wherein the LBA R/W register (loaded form the HBA/PTI SATA input port) is placed through a context associative memory (CAM) to perform a simultaneous base comparison (5231) against the HBA_HI mapping vector (5241) and an upper limit comparison (5232) against the HBA_HI mapping vector (5242). CAM memories are known to those skilled in the art. As an example, a preferred CAM comparison logic implementation that compares the active base LBA (the LBA to which the next disk read/write will occur) against the HBA_LO (5241) and HBA_HI (5242) limits is generally depicted in FIG. 53 (5300) and FIG. 54 (5400) respectively. The results of these CAM comparisons are two bit vectors (5251, 5252) that indicate if the comparison operations were matched within the appropriate LBA ranges. These bit vectors (5251, 5252) are then simultaneously compared bit-by-bit (5260) to form an action bit vector (ABV) (5270) which indicates whether the requested LBA R/W register falls within the mapping range of the PTDDC.

CAM Comparison Logic (5300)-(5400)

Figure 54:
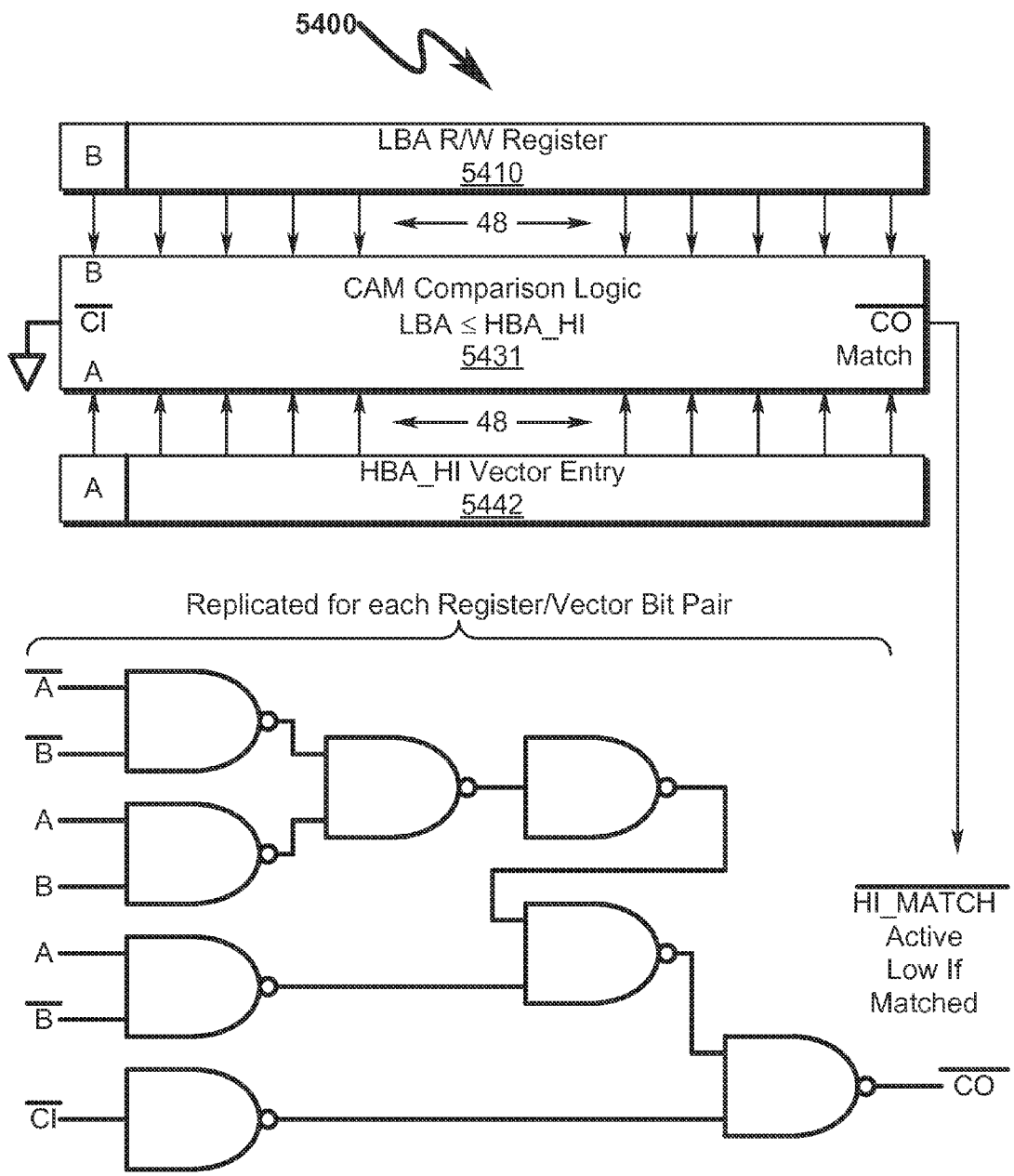
FIG. 54 illustrates an exemplary schematic depicting CAM comparison logic.

FIG. 53 (5300) and FIG. 54 (5400) depict preferred LBA comparison logic for the HBA_LO and HBA_HI limits. These comparison logic blocks generate an active low signal (LO_MATCH, HI_MATCH) corresponding to the match results between the LBA R/W register (5310, 5410) and the corresponding HBA_LO register (5341) and HBA_HI register (5441). In each of these figures the bit-by-bit comparison logic function is provided as an example circuit implementation of this function. These active low signals (LO_MATCH, HI_MATCH) are then inverted before being combined (5260) to form the ABV (5270). One skilled in the art will recognize that this function could equivalently be accomplished by NORing the active-low (LO_MATCH, HI_MATCH) signals.

CAM Sequencer Logic (5500)

Figure 55:
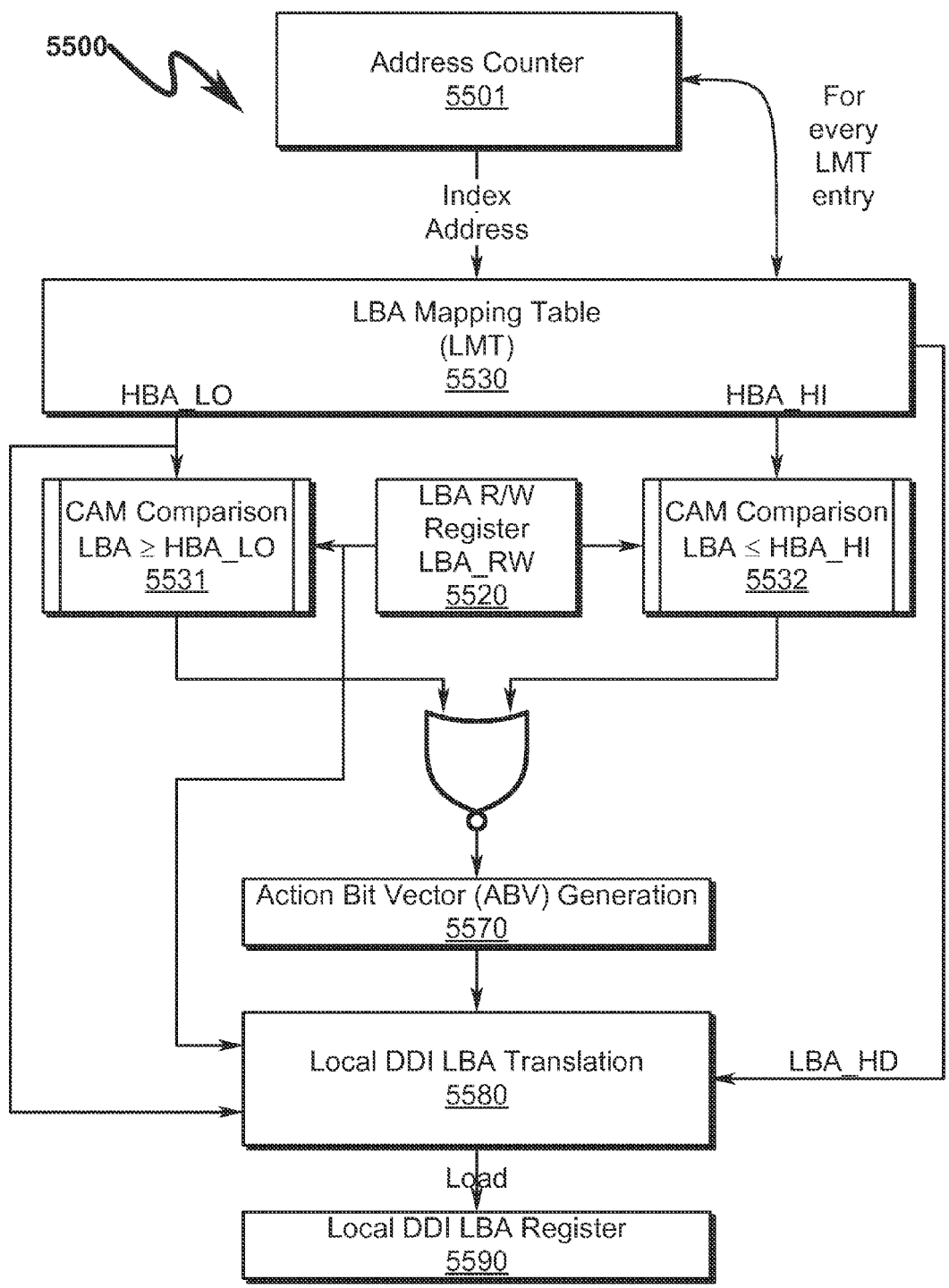
FIG. 55 illustrates an exemplary schematic depicting CAM sequencer logic.

The generation of the action bit vector (ABV) is detailed in FIG. 55 (5500). Here an address counter (5501) sequences through each entry in the LMT (5530) which retrieves the HBA_LO and HBA_HI addresses. This information is applied to the CAM comparison blocks (5531, 5532) that compare this mapping information against the LBA R/W (LBA_RW) register (5520). The results of this comparison are placed in the ABV (5570) and associated with mappings of the LBA_HD index which maps the LBA_LO value to a portion of the attached SATA disk drive. A local DDI LBA translation block (5580) associates the LBA to be read/written (LBA_RW) (5520) with a local DDI LBA value (5590) by adjusting the requested LBA (LBA_RW) (5520) by the offsets associated with the HBA_LO data (representing the offset into the LBA logical address space mapped by the PTDDC) and the LBA_HD data (representing the mapped offset into the locally attached SATA disk drive). The resulting local DDI LBA value (5590) is then written to the local disk via the PTDDC DDI port to setup the next read/write operation if the ABV indicates a match to the locally attached disk drive for one entry in the LMT.

Address Translation Logic (5600)

Figure 56:
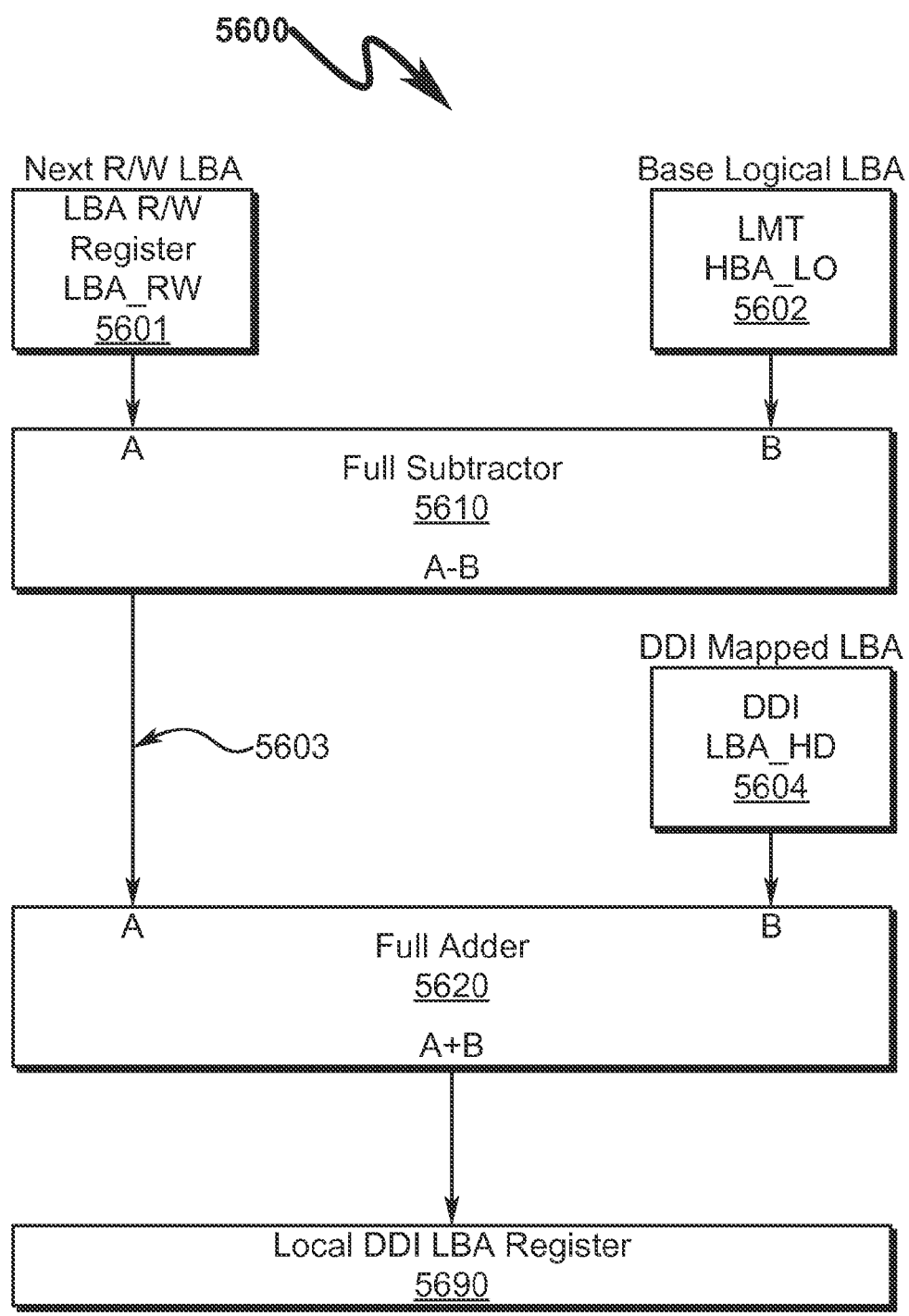
FIG. 56 illustrates an exemplary address translation logic schematic useful in some preferred invention embodiments.

The Local DDI LBA Translation logic (5580) depicted in FIG. 55 (5500) may be more clearly understood by inspecting FIG. 56 (5600) wherein the next R/W LBA register (5601) is compared by a full subtractor (5610) with the base logical LBA (5602) from the LMT that is mapped by the PTDDC and the difference between these quantities is generated. This represents the logical offset (5603) into the base mapping associated with the current PTDDC instance. This logical offset (5603) is then added to the DDI base LBA (5604) stored in the LMT by a full adder (5620) to generate the local DDI LBA register (5690) value that is sent to the locally attached SATA disk drive for the next read/write operation. Note that the ABV controls whether the local DDI LBA register (5690) is loaded depending on whether the next R/W LBA register (5601) is within the mapping range of the locally attached SATA disk drive. Thus, no loading of the locally attached SATA disk drive LBA register is necessary if the next logical LBA to be read/written is outside the mapping range of the disk drive as determined by the LMT. Schematic details of the full subtractor (5610) and full adder (5620) have not been provided as they are well known in the art.

RAID-1 Recovery Functionality (5700)-(6400)

The present invention anticipates that PTDDC connected SATA disk drives may be daisy-chained to form RAID-1 arrays. In these application contexts the present invention anticipates a variety of methods by which two or more PTDDC-connected SATA disk drives will be maintained in a coherent state during read and write operations. Details associated with maintaining data coherency during read/write operations are generally depicted in FIG. 41 (4100)-FIG. 48 (4800). However, there are situations in which one slave disk (within a RAID-1 set has failed and is removed from the RAID-1 pairing with the other master. Additionally, there must be some mechanism to initially pair a slave data disk to a master data disk to initiate RAID-1 pairing of the two disk drives.

Prior Art RAID-1 Recovery Architecture (5700)

Figure 57:
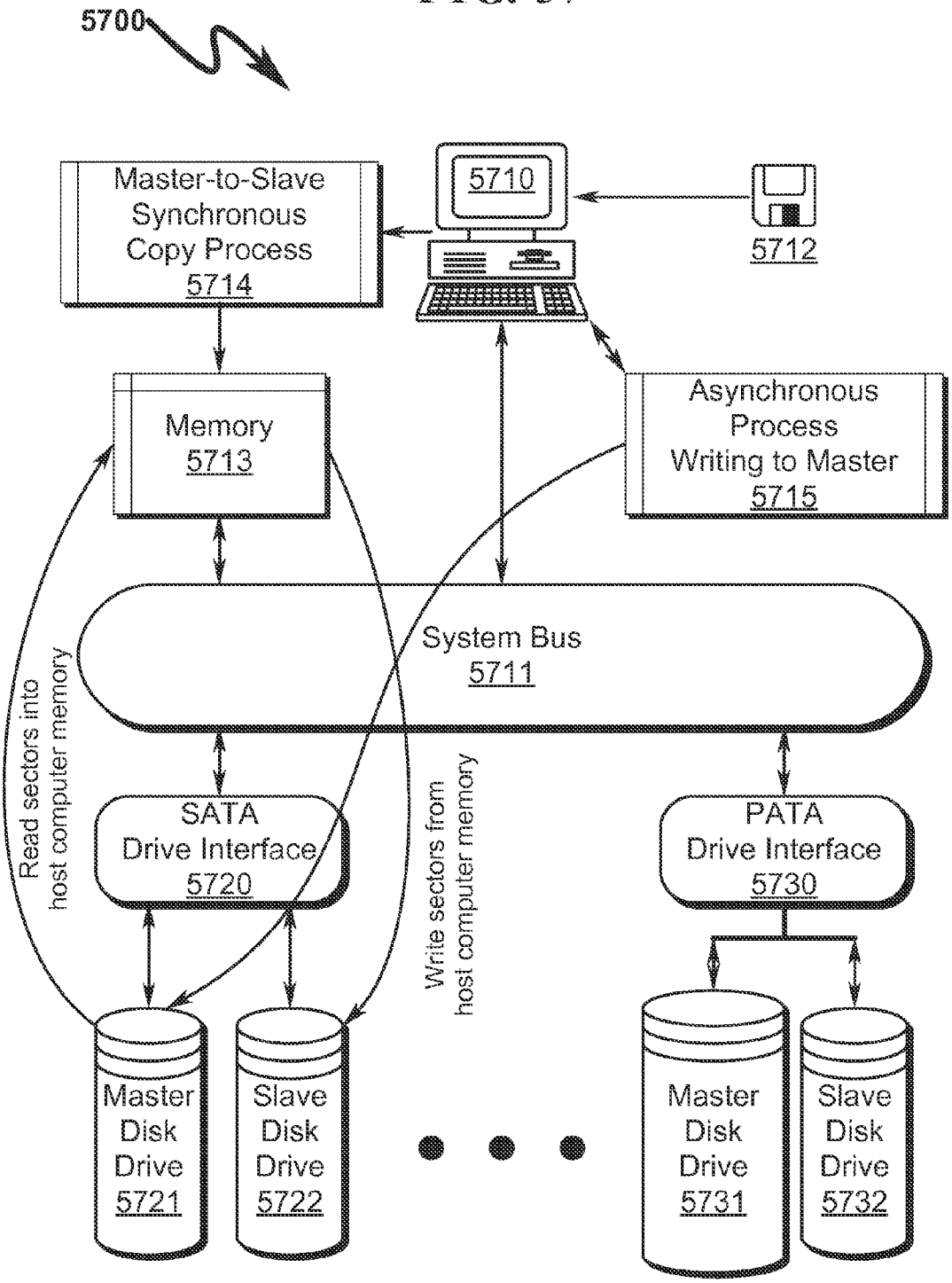
FIG. 57 illustrates a system block diagram depicting a prior art RAID-1 recovery scenario.

As depicted in FIG. 57 (5700), the prior art approaches the initial pairing operation by executing a process (typically software read from a computer readable medium (5712) on the host computer (5710) to copy the contents of a master disk (5721) to a slave disk (5722). Each of these disk drives (5721, 5722) may be connected to a SATA drive interface (5720, 5730) that is connected to a system bus (5711) to which the computer system (5710) communicates. Note that the computer system (5710) may be a NAS file server, but always communicates with the disk drives (5721, 5722) via some form of direct interface (5720, 5730). While the following discussion assumes a SATA disk interface, the limitations listed also are applicable to PATA disk systems.

A significant problem with this coherency approach is that it is difficult to perform the copy operation (5714) in real-time between the master (5721) and slave (5722) drives because while this copy is occurring there may be other unsynchronized write operations (5715) to the master (5721) disk that are occurring asynchronously with respect to the master-to-slave copy operation (5714). Thus, it is possible for data to be updated on the master (5721) and this updated data not to be properly written to the slave (5722). This data coherency and synchronization problem is exacerbated if the computer system (5710) is executing a multi-user, multi-process, multi-tasking, or multi-threaded operating system, as it is difficult to coordinate writes to different hardware with these types of systems to ensure data consistency across the master and slave.

Another problem with this architecture is that the master-to-slave copy operation is relatively compute intensive for the computer system (5710), and can consume considerable memory resources (5713) while the copy operation is in progress. Since the computer system (5710) may be tasked with many other things such as processing actual user applications, this burden on computer system resources is undesirable.

Finally, in many cases the data coherency problems mentioned above cannot be properly addressed without "locking" the file system on the computer system (5710) to prohibit writes or updates during the master-to-slave copy operation. This methodology of addressing data coherency between the master (5712) and slave (5722) is common and essentially shuts down access to the master (5712) while the copy operation is in progress. This would not be a significant burden absent the long time delays associated with performing the copy operation in a variety of RAID configurations that are currently promoted within large storage arrays. For example, a 32 TB NAS storage array utilizing RAID-5 redundancy might take one (1) hour per terabyte to perform a disk recovery operation to properly replace a failed disk drive that must be synced with a master volume. This 32-hour delay is totally unacceptable for many high availability computer applications.

Present Invention PTDDC RAID-1 Recovery Architectures (5800)

Figure 58:
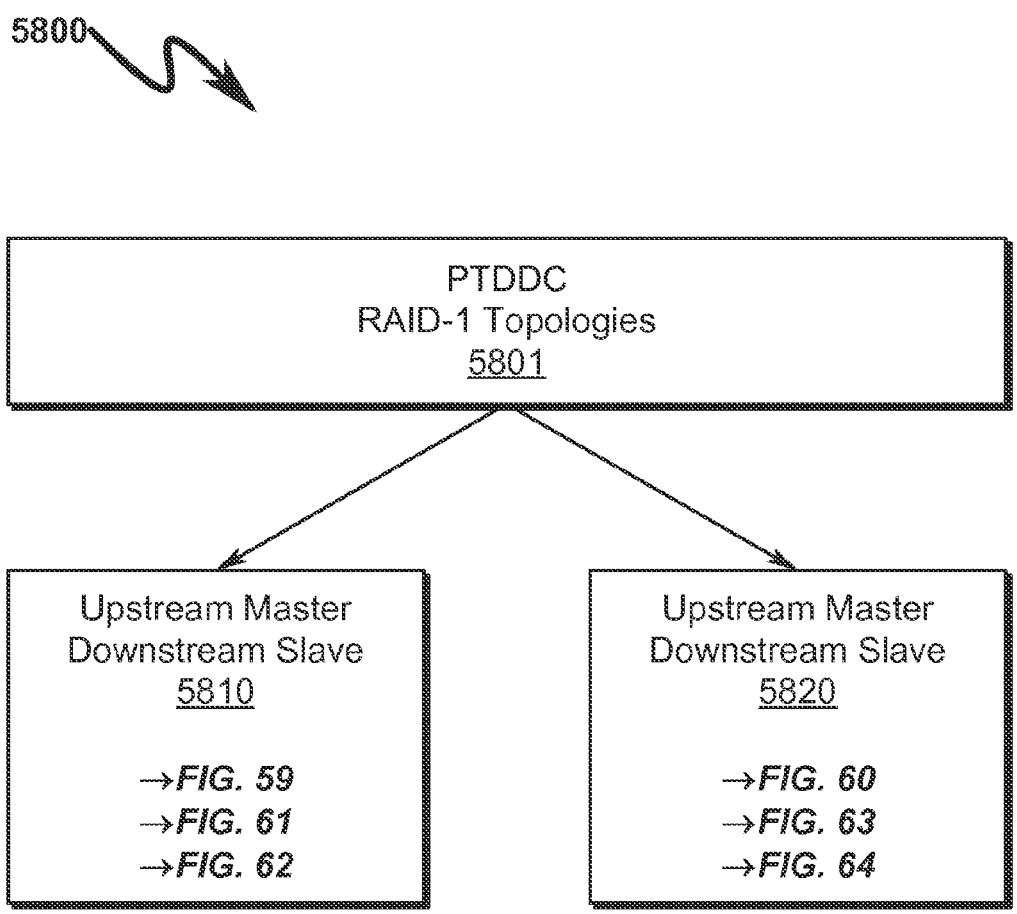
FIG. 58 illustrates a system block diagram depicting several present invention RAID-1 recovery scenarios.

An overview of several present invention PTDDC RAID-1 recovery architectures is presented in FIG. 58 (5800). Here it is seen that two basic architectures (5801) useful in implementing RAID-1 redundancy along the PTDDC daisy-chain are presented: upstream master/downstream slave (5810) and downstream master/upstream slave (5820). While the details of these two paradigms depict only a single master-slave relationship, it should be clear to one of skill in the art that the techniques may be equally applied to multiple slaves per master, thus providing a higher degree of redundancy than normally available with RAID-1 topologies. These RAID-1 topologies and their associated recovery methodologies are discussed below in further detail.

Upstream Master/Downstream Slave RAID-1 Configuration (5900)

Figure 59:
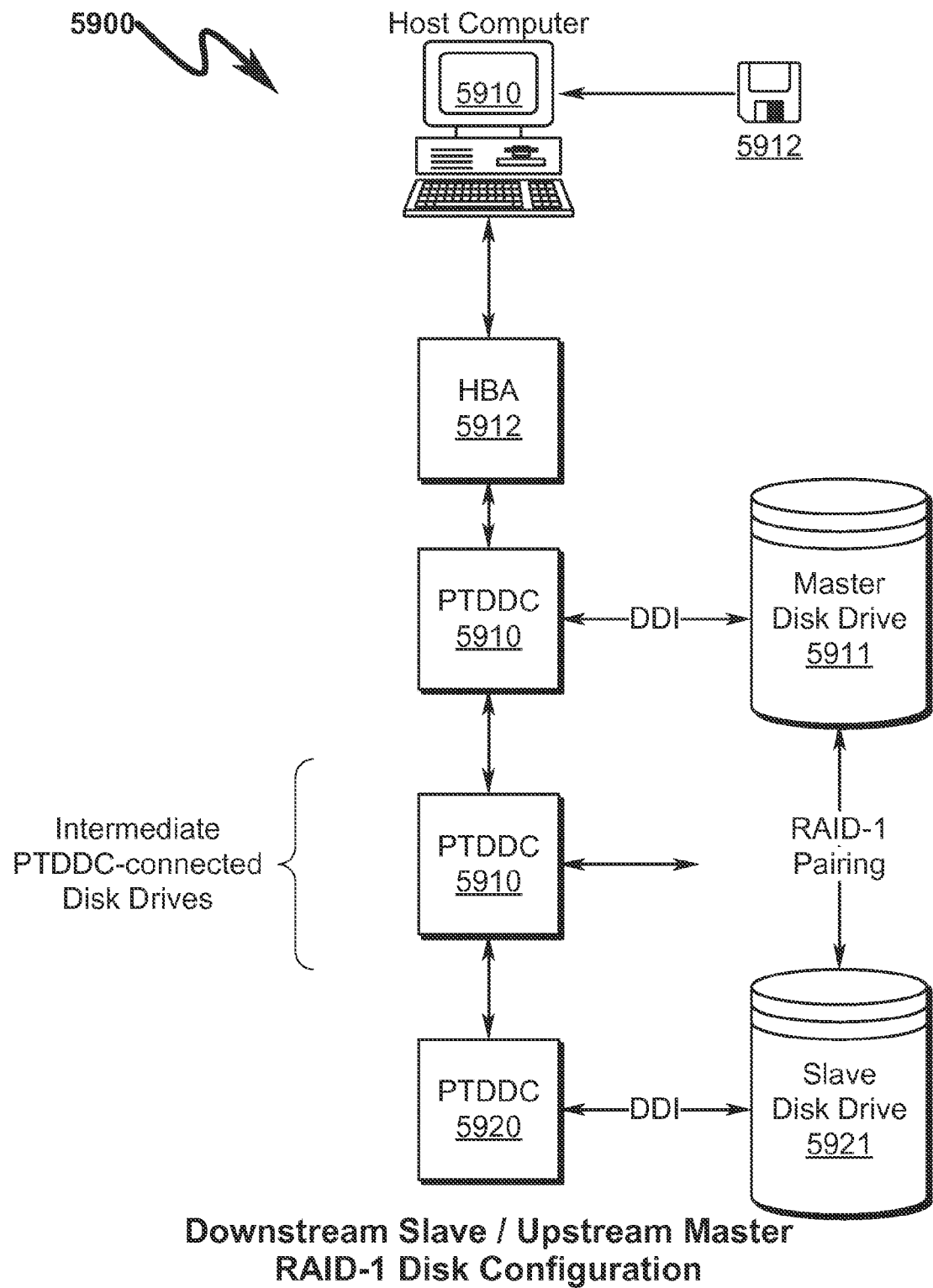
FIG. 59 illustrates an exemplary upstream master/downstream slave RAID-1 configuration.

FIG. 59 (5900) depicts a RAID-1 scenario in which the master PTDDC (5910) and master disk (5911) are positioned upstream of the downstream slave PTDDC (5920) and slave disk (5921). This scenario can occur when the disks are initially RAID paired with the master being designated as upstream from the slave. Alternatively, a scenario in which the slave has failed can occur, in which case the upstream master disk will be tasked with reloading the content of the replacement slave drive.

Upstream Slave/Downstream Master RAID-1 Configuration (6000)

Figure 60:
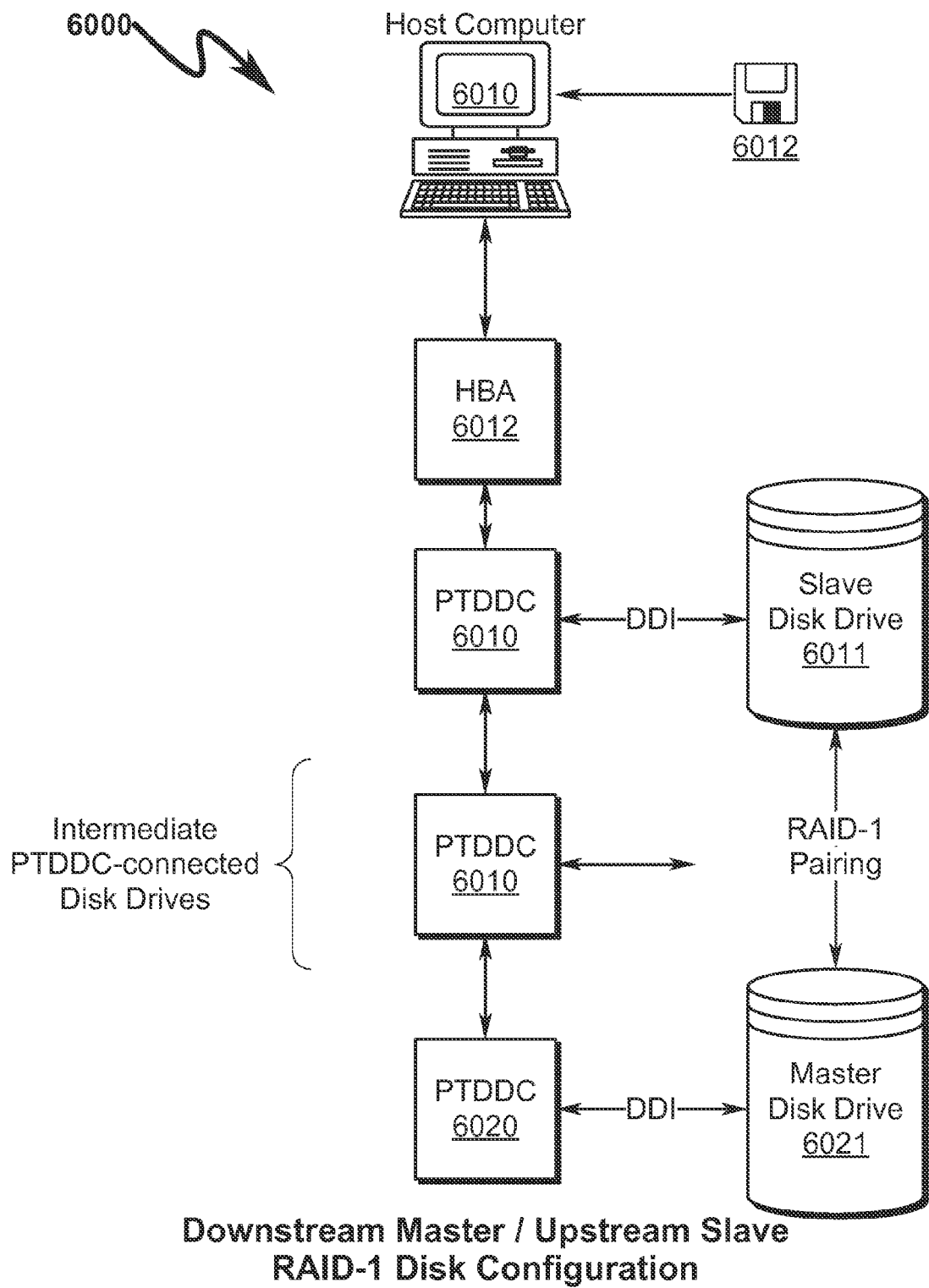
FIG. 60 illustrates an exemplary upstream slave/downstream master RAID-1 configuration.

FIG. 60 (6000) depicts a RAID-1 scenario in which the slave PTDDC (6010) and slave disk (6011) are positioned upstream of the downstream master PTDDC (6020) and master disk (6021). This scenario can occur when the disks are initially RAID paired with the master being designated as downstream from the slave. Alternatively, a scenario in which the master has failed can occur, in which the downstream slave disk will redesignated as the master disk and be tasked with reloading the content of the replacement drive for the originally failing master.

While having the slave upstream of the master is non-optimal in many circumstances, it is necessary for this configuration to be supported to enable reloading of replaced upstream masters that have failed. In these scenarios, the tasks of a failing upstream master are assumed by the downstream slave, who becomes a temporary slave-master until the replacement master disk can be installed and fully loaded with content provided the by the slave-master.

RAID-1 Reconfiguration—Primary Master/Secondary Slave (6100)-(6200)

Figure 61:
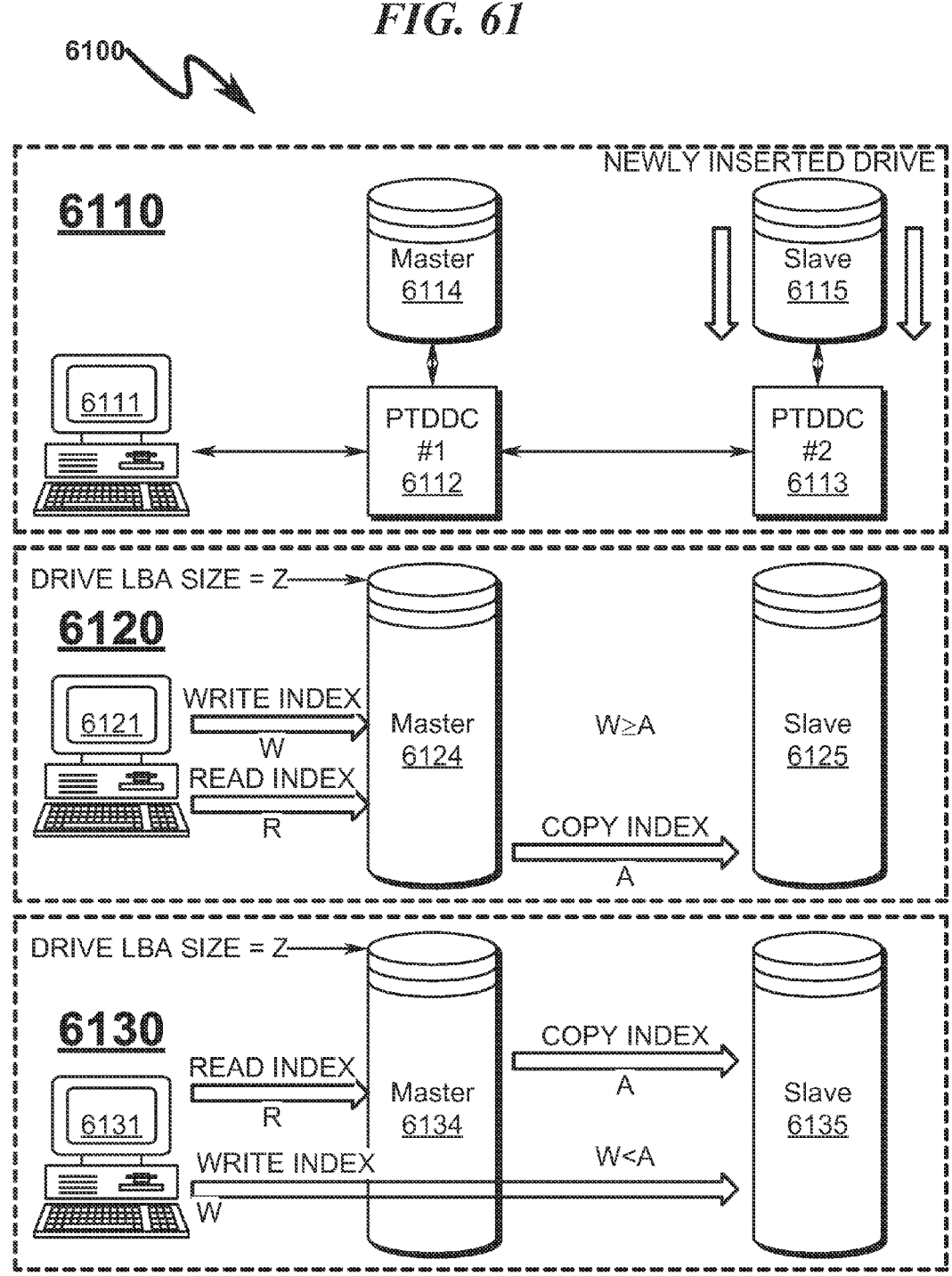
FIG. 61 illustrates an exemplary PTDDC daisy-chain downstream RAID recovery scenario.

In some preferred embodiments of the present invention, a RAID-1 array is generate using two disk drives connected in a serial Primary Master/Secondary Slave daisy-chain PTDDC string as generally illustrated in FIG. 61 (6100). For purposes of illustration, a two-disk RAID-1 array is presented for discussion (6110), with the host computer (6111) connected to two PTDDC controllers (6112, 6113), each having an associated attached disk drive (6114, 6115). In this exemplary scenario the master drive (6114) is located closest to the host (6111) in the PTDDC string. For situations in which the slave drive (6115) is to be replaced due to a failure (or initially mirrored by the master disk (6114)), data must be copied from the master disk drive (6114) to the downstream slave disk drive (6115).

Figure 62:
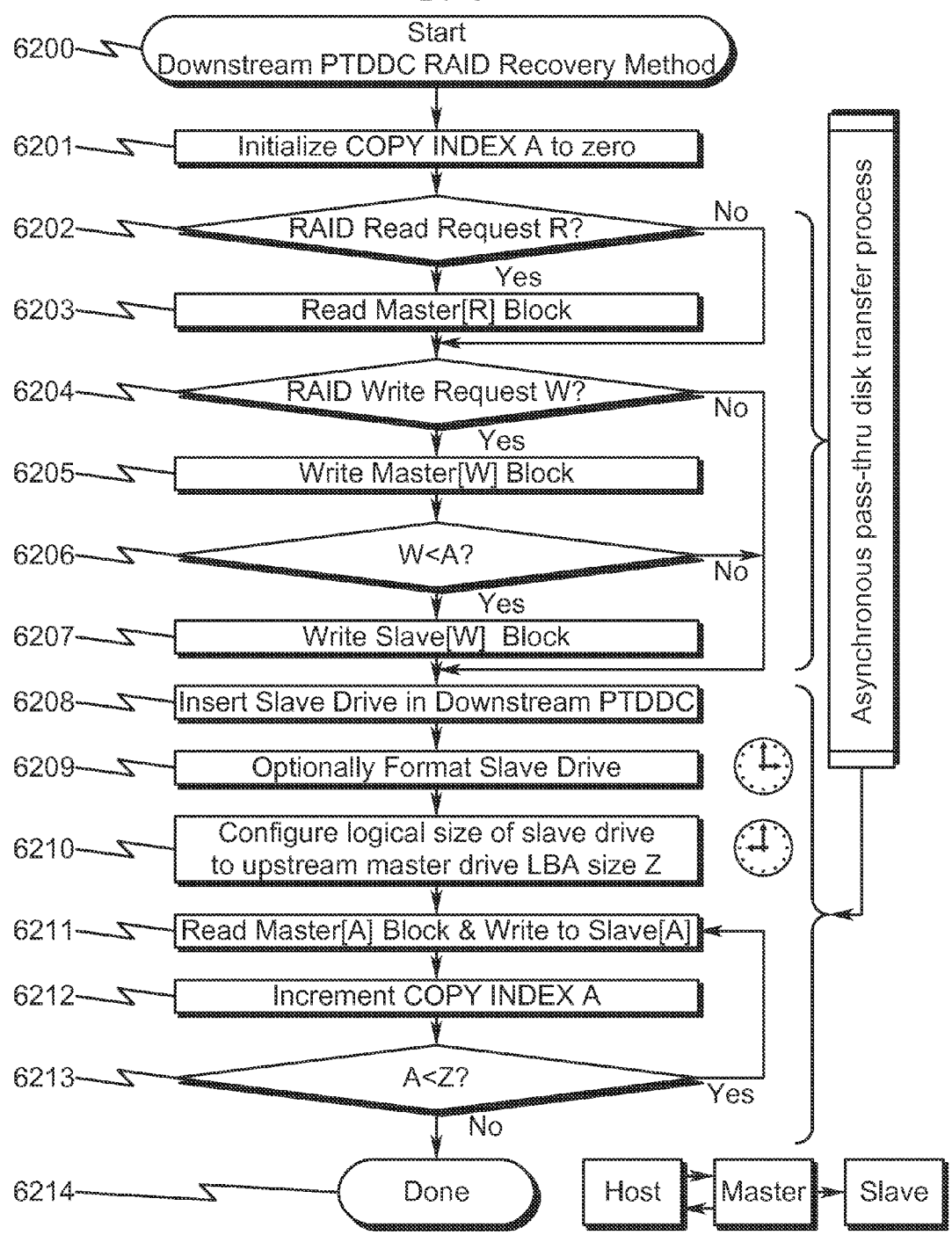
FIG. 62 illustrates a flowchart depicting a preferred exemplary PTDDC daisy-chain downstream RAID recovery method.

To accomplish the mirroring/reconfiguration function for a RAID-1 array in this scenario, two scenarios must be accommodated. The first scenario is illustrated in FIG. 61 (6120) wherein a COPY INDEX A indexes copy operations from the master disk (6124) to the slave disk (6125). During these copy operations, if the host (6121) requests a disk read or write operation that has a LBA value (R or W) equal to or greater than A, then the operation is directed to and serviced by the master disk drive (6124). In the second scenario, if a host (6131) write operation is directed to a LBA value (W) that is less than A, the write operation targets BOTH the master disk drive (6134) and the slave disk drive (6135) as illustrated in FIG. 61 (6130). Host read operations are always directed towards the master disk drive (6124, 6134). An exemplary flowchart depicting this behavior is provided in FIG. 62 (6200). Here the copy operation functions in the background while asynchronous R/W operations may occur down the PTDDC daisy-chain from the host computer.

RAID-1 Reconfiguration—Primary Slave/Secondary Master (6300)-(6400)

Figure 63:
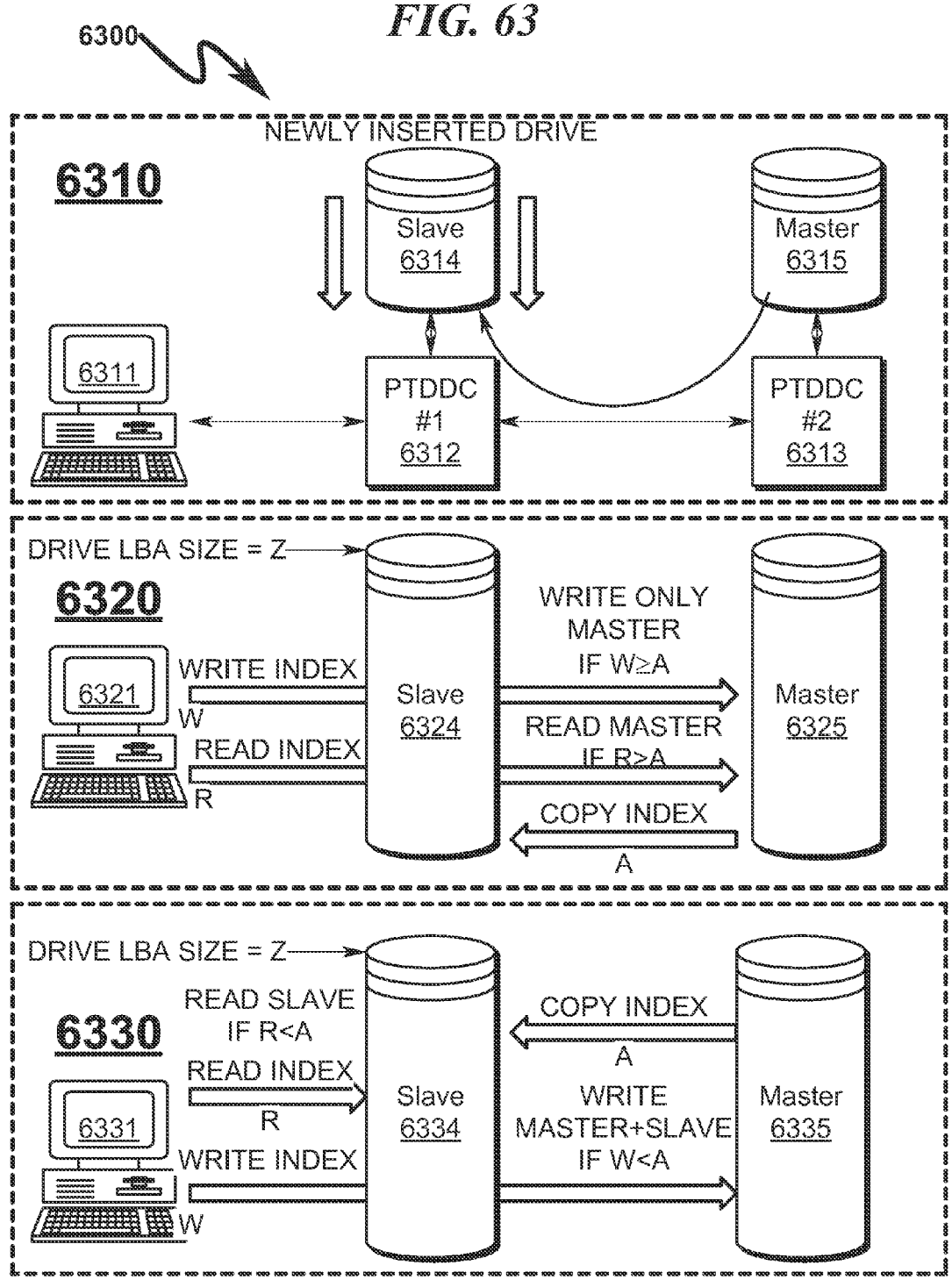
FIG. 63 illustrates an exemplary PTDDC daisy-chain upstream RAID recovery scenario.

In some preferred embodiments of the present invention, a RAID-1 array is generate using two disk drives connected in a serial Primary Slave/Secondary Master daisy-chain PTDDC string as generally illustrated in FIG. 63 (6300). For purposes of illustration, a two-disk RAID-1 array is presented for discussion (6310), with the host computer (6311) connected to two PTDDC controllers (6312, 6313), each having an associated attached disk drive (6314, 6315). In this exemplary scenario the slave drive (6314) is located closest to the host (6311) in the PTDDC string. For situations in which the slave drive (6314) is to be replaced due to a failure (or initially mirrored by the master disk (6315)), data must be copied from the master disk drive (6315) to the upstream slave disk drive (6314).

Figure 64:
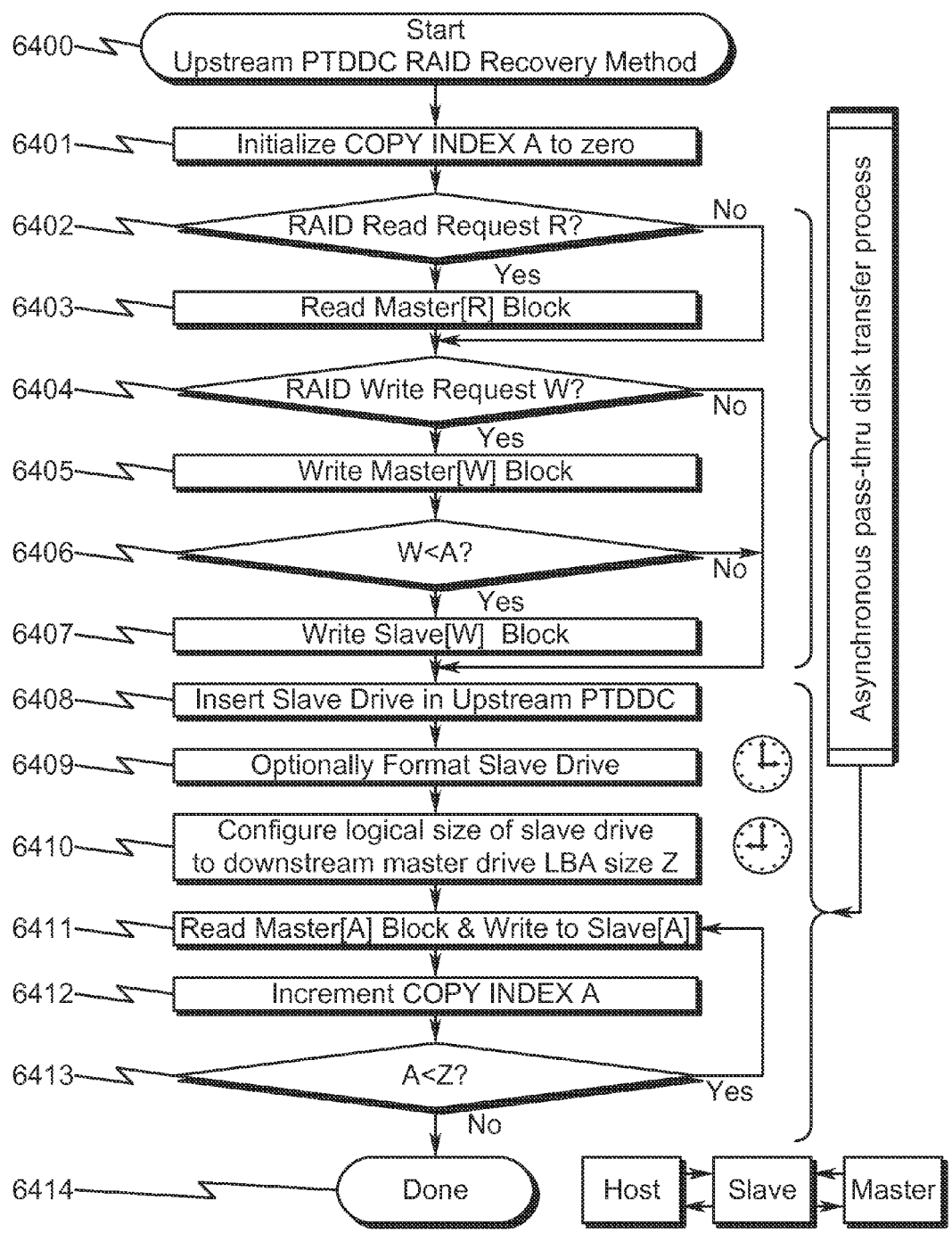
FIG. 64 illustrates a flowchart depicting a preferred exemplary PTDDC daisy-chain upstream RAID recovery method.

To accomplish the mirroring/reconfiguration function for a RAID-1 array in this scenario, two scenarios must be accommodated. The first scenario is illustrated in FIG. 63 (6320) wherein a COPY INDEX A indexes copy operations from the master disk (6325) to the slave disk (6324). During these copy operations, if the host (6321) requests a disk read or write operation that has a LBA value (R or W) equal to or greater than A, then the operation is directed to and serviced by the master disk drive (6325). In the second scenario, if a host (6331) write operation is directed to a LBA value (W) that is less than A, the write operation targets BOTH the master disk drive (6335) and the slave disk drive (6334) as illustrated in FIG. 63 (6330). Host read operations are always directed towards the master disk drive (6325, 6335). An exemplary flowchart depicting this behavior is provided in FIG. 64 (6400). Here the copy operation functions in the background while asynchronous R/W operations may occur down the PTDDC daisy-chain from the host computer.

The bidirectional SATA PTI/PTO interface between the downstream master (6313) and upstream slave (6312) PTDDC permit data to be copied from the master disk drive (6315, 6325, 6335) and the slave disk drive (6314, 6324, 6334). This data transfer can occur during host access to the PTDDC daisy-chain, as this is a separate data path in the SATA interface.

PTDDC RAID-1 System Performance Advantages

One skilled in the art will recognize that an advantage to this RAID-1 architecture is that a disk write operation is performed only once within the mirrored RAID-1 disk array, as the write request is channeled down the PTDDC chain and processed by multiple disk drives with only one host HBA write request (and only one associated host bus transfer request). This can significantly improve the overall bus throughput for host systems implementing RAID functionality.

It should be noted that even in situations where the host computer utilizes direct memory access (DMA) to perform data transfers to/from the SATA disk drives, the host computer only as a limited amount of bus and/or memory bandwidth to accommodate read/write requests to a RAID-1 array comprising two or more disks. Thus, the only method to ensure that host CPU resources are conserved is to eliminate extraneous disk drive operations to the RAID-1 array. The present invention achieves this by optimizing the read and write logic to ensure that these operations are only performed ONCE down the PTDDC-enabled daisy-chain. Within the present invention context, the RAID-1 functions normally performed by the host computer (and associated operating system) are distributed along the PTDDC daisy-chain and this results in a corresponding improvement in overall system performance.

This performance improvement is even more pronounced in situations where multiple RAID-1 copies of a master disk drive are to be constructed. In these circumstances it might be advantageous to keep multiple slave copies of a master disk in case of a SATA disk failure. Here the multiple write operations necessary to maintain this plurality of slave drives can be automatically achieved using the PTDDC architecture without any changes in host performance or operating system function.

PTDDC RAID-1 Price/Performance Ratio

As mentioned elsewhere in this document, most of the cost in constructing traditional petabyte class storage arrays is not in the actual disk drive storage, but rather the interconnections required to aggregate and coordinate the storage for presentation to a host computer system or server farm. This statement is especially true for RAID class arrays using traditional server-based disk aggregation. As such, most petabyte class arrays that use RAID do not utilize RAID-1 architectures because of the cost of interconnecting the disk drives to achieve the required level of redundancy. Instead, RAID-5 or RAID-6 architectures are common in this application.

However, the present invention when using the PTDDC-enabled SATA disk drives provides a price/performance point that makes RAID-1 a cost competitive solution to the need for large storage arrays incorporating RAID recovery. As an example, a typical PTDDC-enable storage array can implement RAID-1 storage at less than 25% of the cost of a conventional RAID-5/6 array using prior art technologies. This statement is true even assuming that the RAID-1 array incorporates 75% more hard disks than the RAID-5/6 prior art system. The reduction in overall cost is due to the elimination of interconnection costs and also the elimination of expensive server computer hardware and software necessary to implement the RAID functionality. While the RAID-1 approach is simple, it provides a very robust and fast alternative to existing RAID-5/6 methodologies.

Piggy-Back Construction Application Context
(6500)-(8000)

The PTDDC concept discussed herein may be applied to a variety of construction techniques based on specific application contexts. One preferred context is a situation in which a "piggy-back" PCB is constructed to mate with a conventional SATA disk drive and provide for the necessary connector/cabling and PTDDC functionality to allow the SATA disk drive to be daisy-chained in a PTDDC manner. This allows conventional SATA disk drives to be individually daisy-chained with the addition of a small inexpensive "piggy-back" PCB assembly that provides power supply and cable management.

Prior Art Piggy-Back Construction Example (6500)-(7200)

Figure 65:
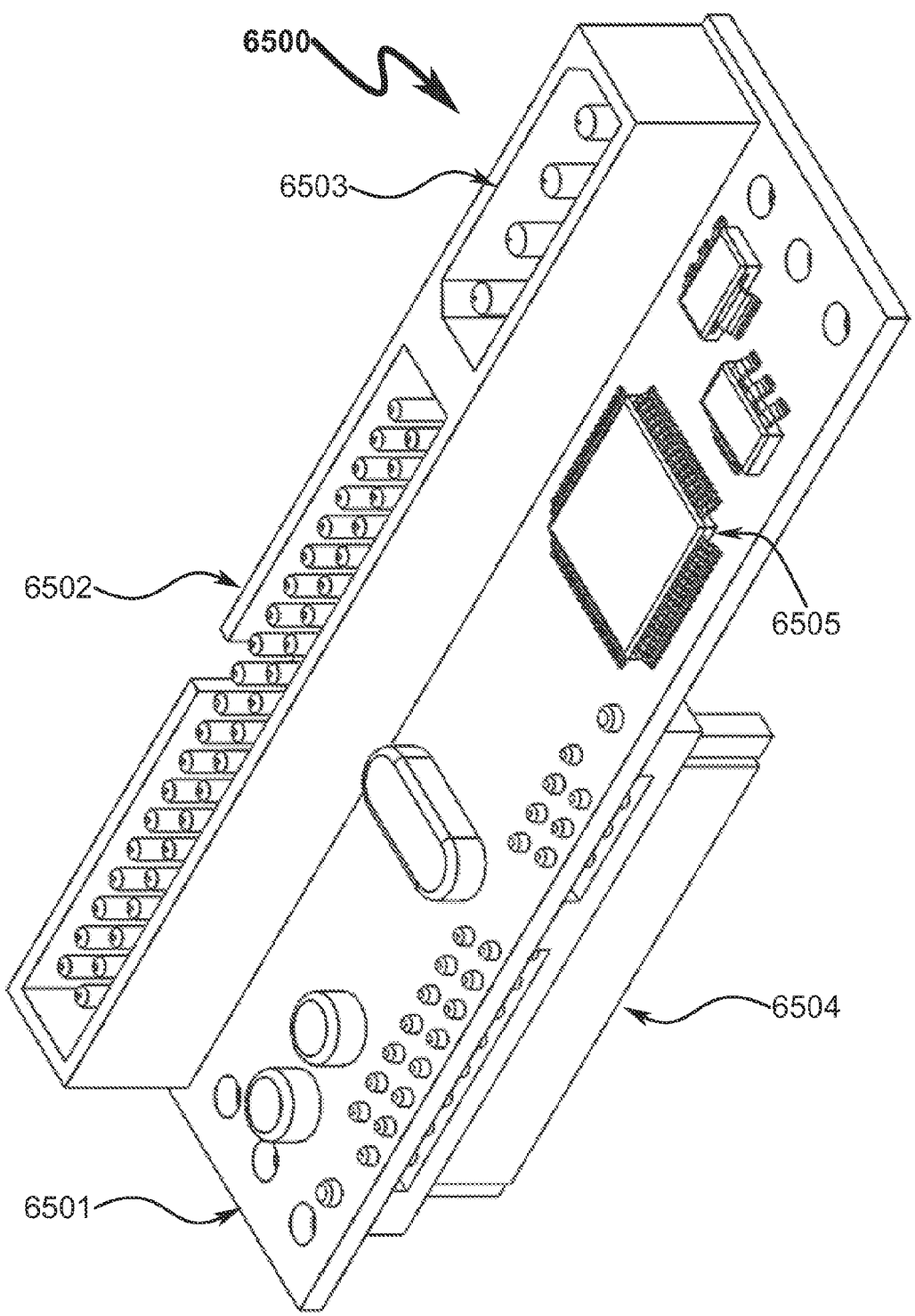
FIG. 65 illustrates a front right perspective view of a prior art piggy-back IDE-to-SATA converter PCB assembly.
Figure 66:
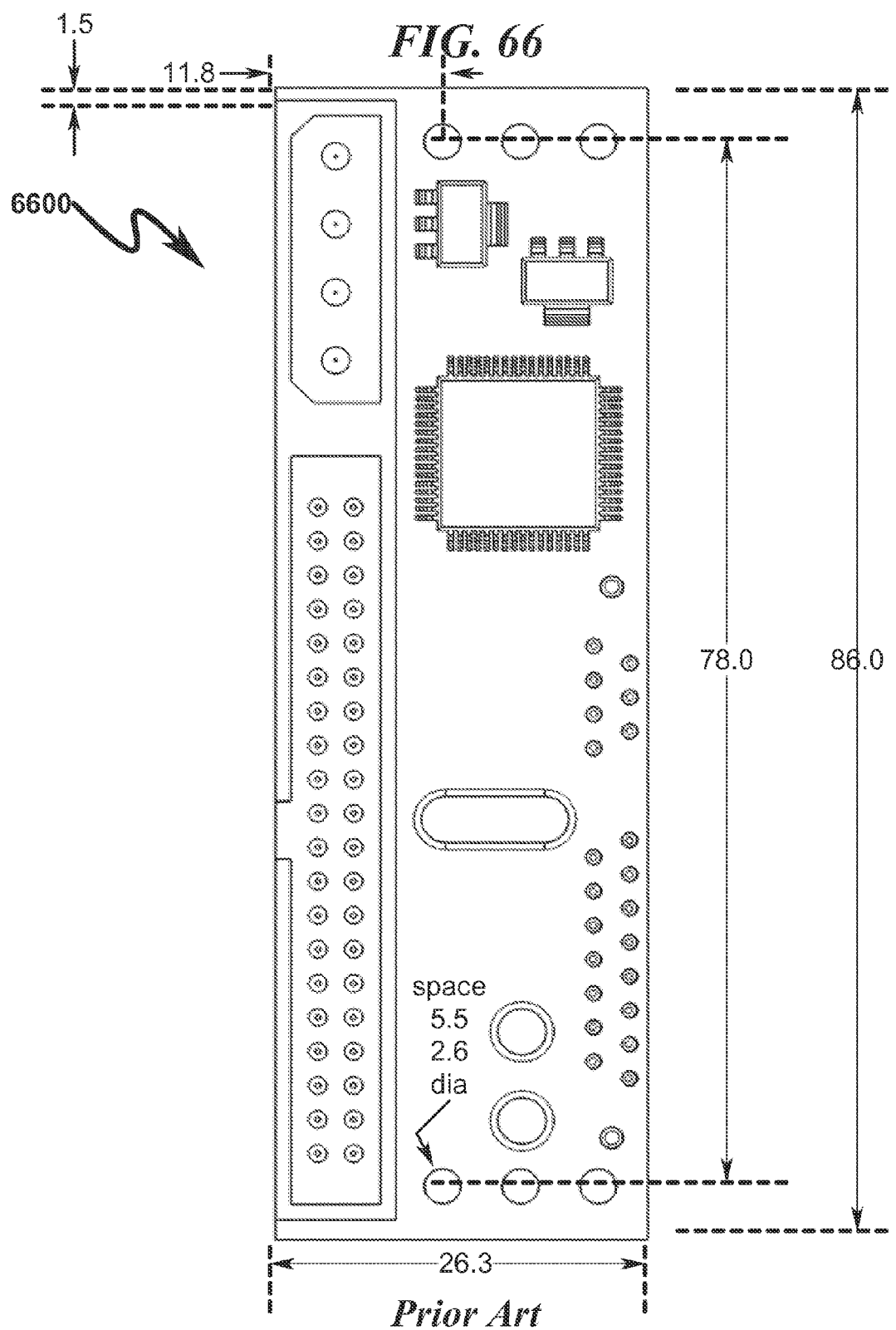
FIG. 66 illustrates a front view of a prior art piggy-back IDE-to-SATA converter PCB assembly.
Figure 67:
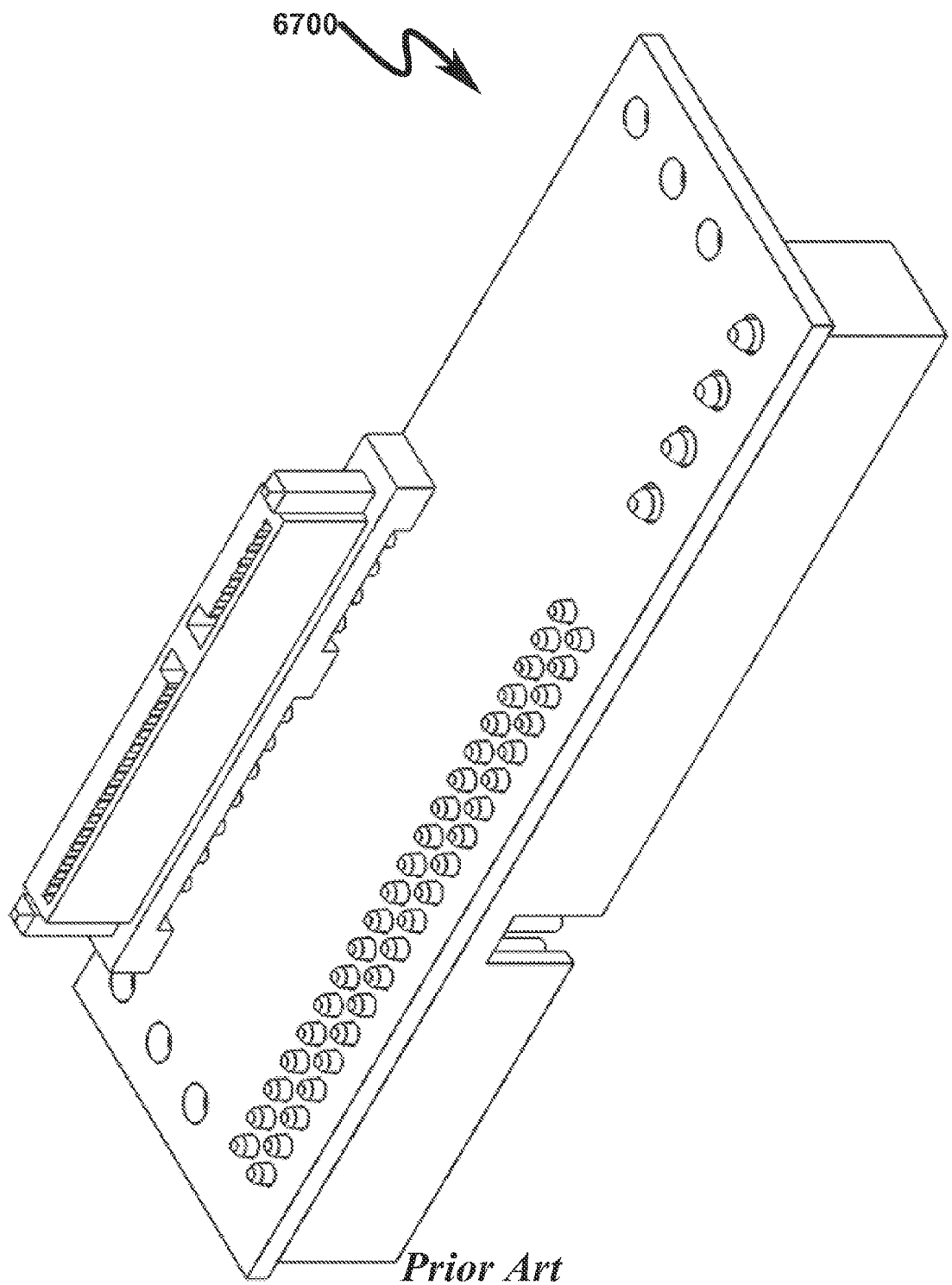
FIG. 67 illustrates a rear right perspective view of a prior art piggy-back IDE-to-SATA converter PCB assembly.
Figure 68:
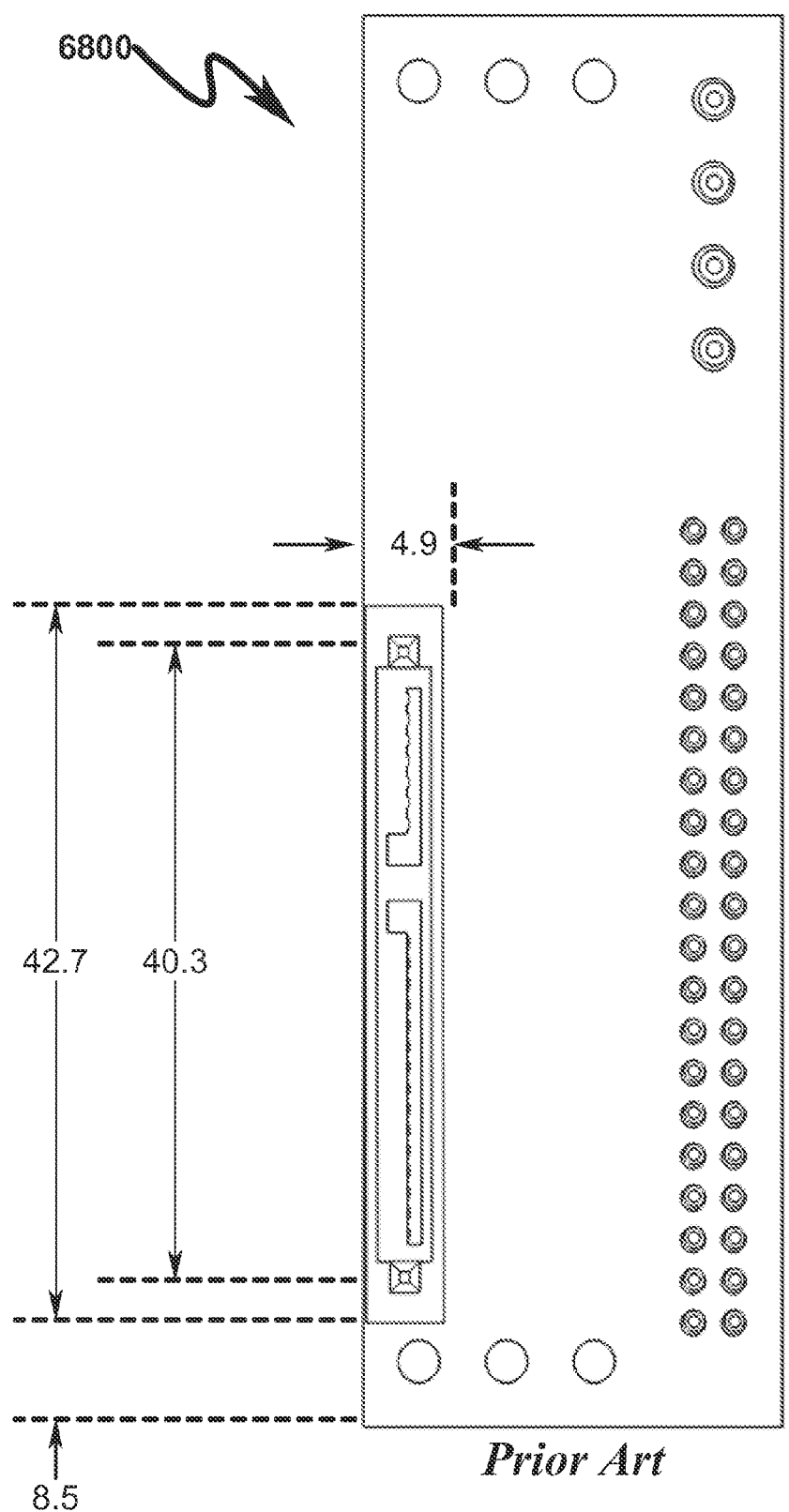
FIG. 68 illustrates a rear view of a prior art piggy-back IDE-to-SATA converter PCB assembly.
Figure 69:
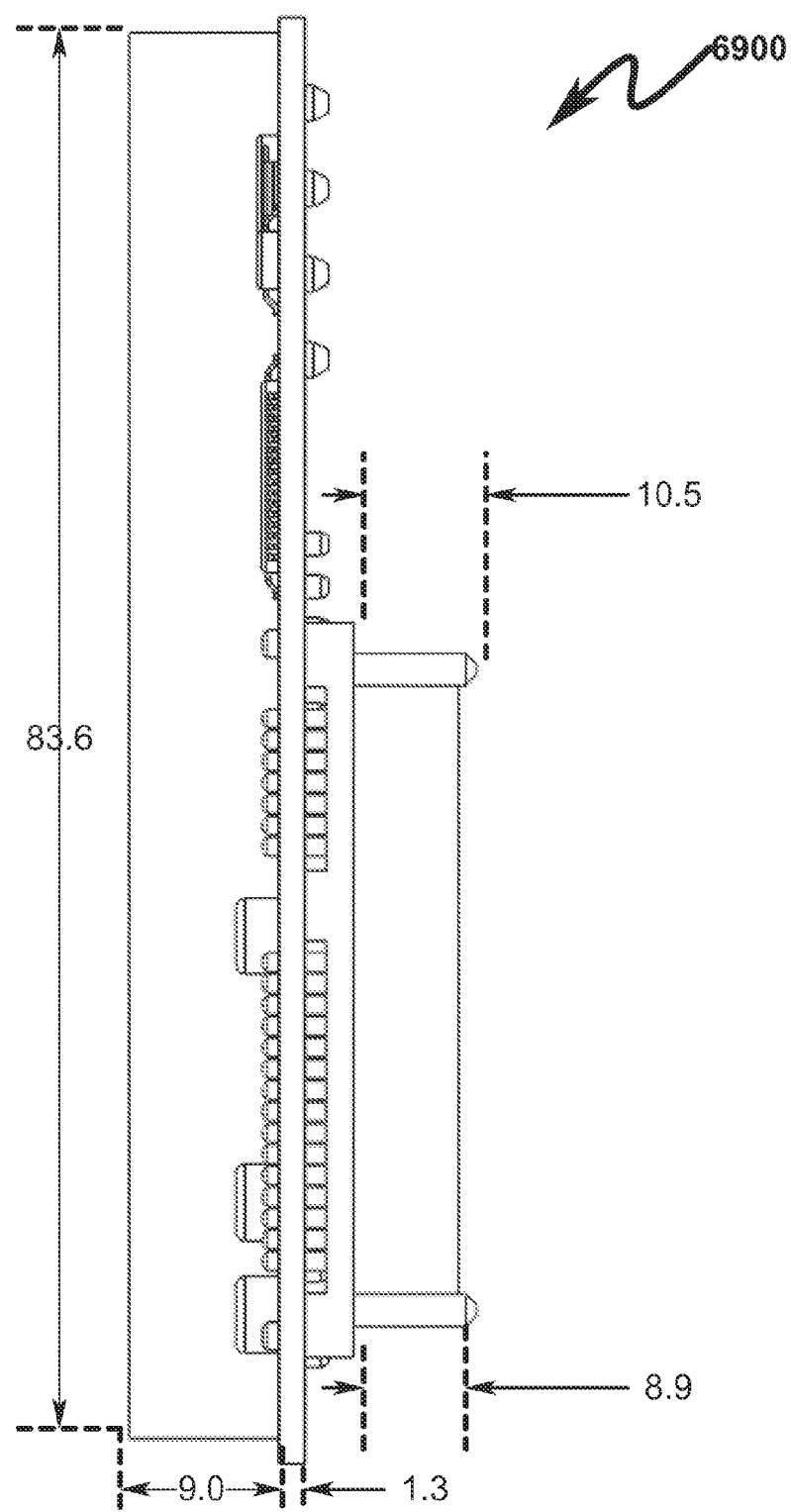
FIG. 69 illustrates a right side view of a prior art piggy-back IDE-to-SATA converter PCB assembly.
Figure 70:
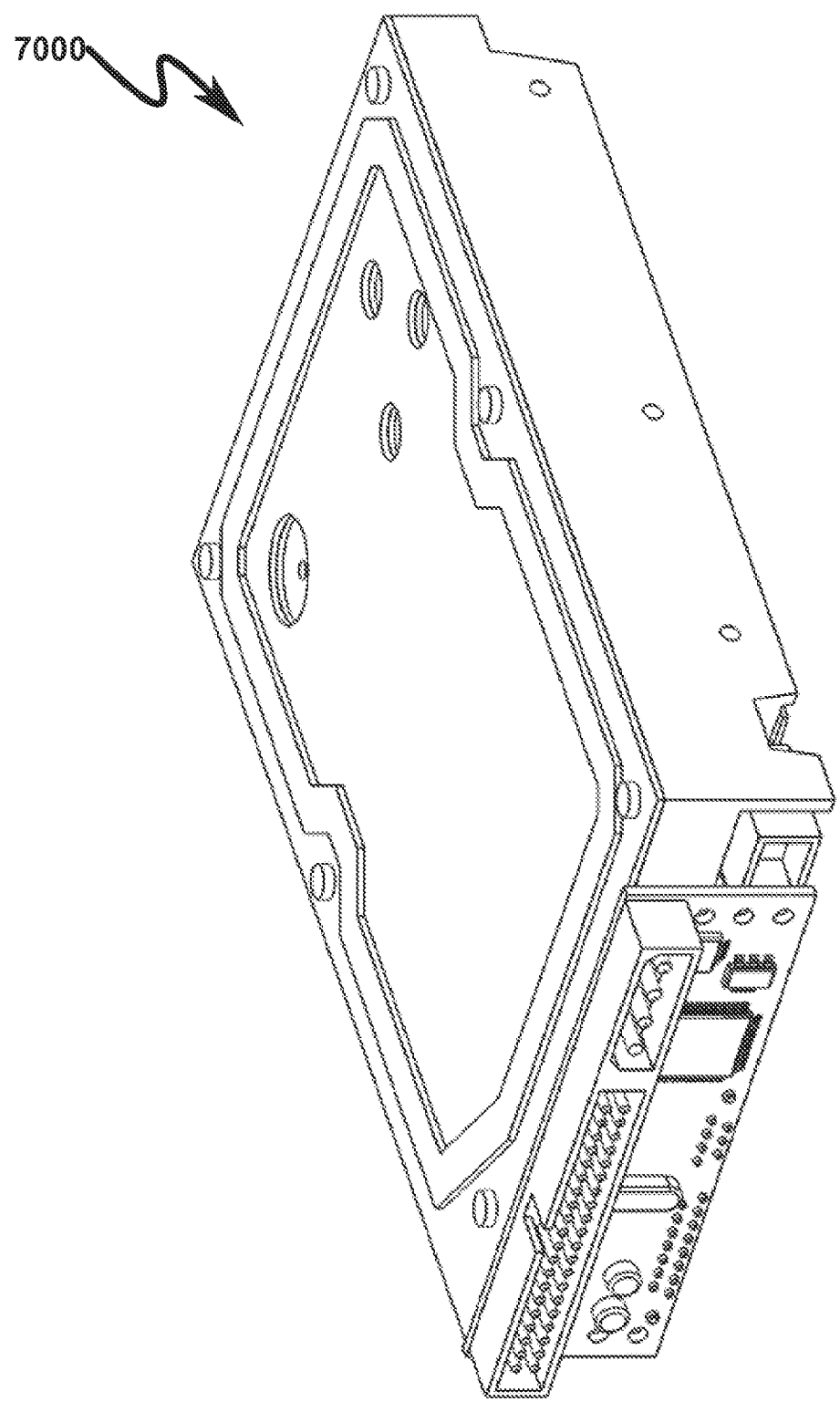
FIG. 70 illustrates a top right rear perspective view of a prior art SATA disk drive mated with a prior art piggy-back IDE-to-SATA converter PCB assembly.
Figure 71:
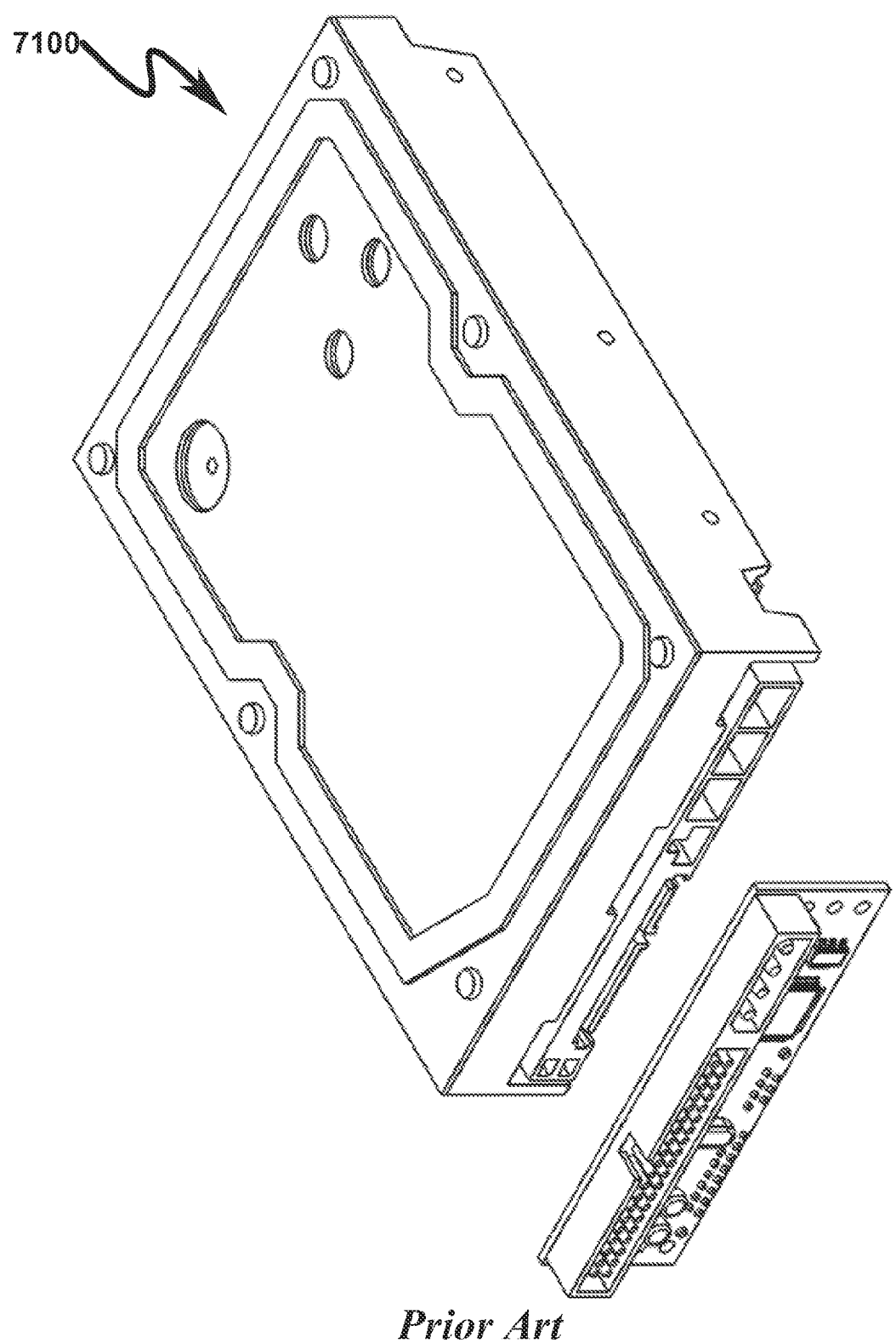
FIG. 71 illustrates a top right rear perspective assembly view of a prior art SATA disk drive mated with a prior art piggy-back IDE-to-SATA converter PCB assembly.

An example of this physical construction as implemented within a SATA-to-IDE converter/adapter was generally illustrated and described in U.S. patent application Ser. No. 13/200,242 (see FIG. 29 (2900) within this included reference). As generally illustrated in further detail in FIG. 65 (6500)-FIG. 69 (6900), this prior art PATA-to-SATA piggy-back converter/adapter is illustrated in front views (6500, 6600), rear views (6700, 6800), side view (6900), and perspective views (6500, 6700) with nominal dimensions in millimeters. In this example, the converter operates by integrating on a PCB (6501) a PATA IDE interface (6502) in addition to a drive power connector (6503). This PCB (6501) also contains a combination SATA data/power connector (6504) that is connected to a SATA disk drive. The PCB (6501) also contains an ASIC (6505) that electrically interfaces the PATA IDE interface (6502) to the SATA disk drive interface (6504). Examples of this IDE style piggy-back arrangement in use are depicted in FIG. 70 (7000)-FIG. 72 (7200).

This piggy-back arrangement does not provide any provision for daisy-chaining IDE or SATA disk drives, but is merely used as a platform for the IDE-to-SATA ASIC (6505) and associated connectors to operate and mechanically couple the IDE ribbon cable to the SATA disk drive. However, the piggy-back concept as presented here is thought to be useful in implementing a PTDDC daisy-chain as described below when used with other concepts taught by the present invention.

Exemplary PTDDC Piggy-Back Construction (7300)-(8000)

The present invention may be embodied in many physical implementations, but several preferred exemplary embodiments utilize a "piggy-back" printed circuit board (PCB) that mates with the disk drive to provide a mechanical platform for an application specific integrated circuit (ASIC) to implement the disclosed PTDDC functionality. Examples of this are provided in FIG. 73 (7300)-FIG. 80 (8000).

Figure 72:
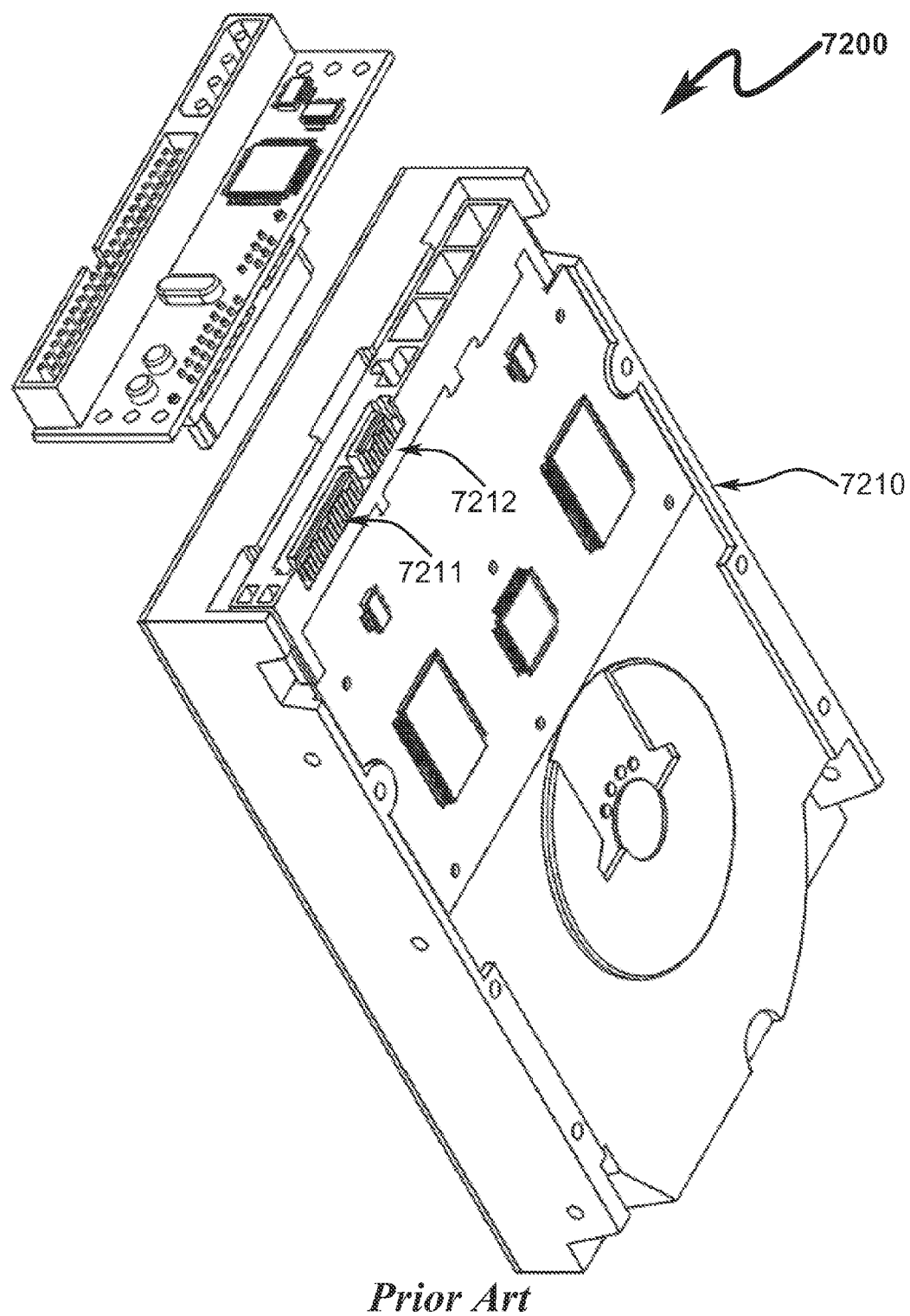
FIG. 72 illustrates a bottom right rear perspective view of a prior art SATA disk drive mated with a prior art piggy-back IDE-to-SATA converter PCB assembly.
Figure 73:
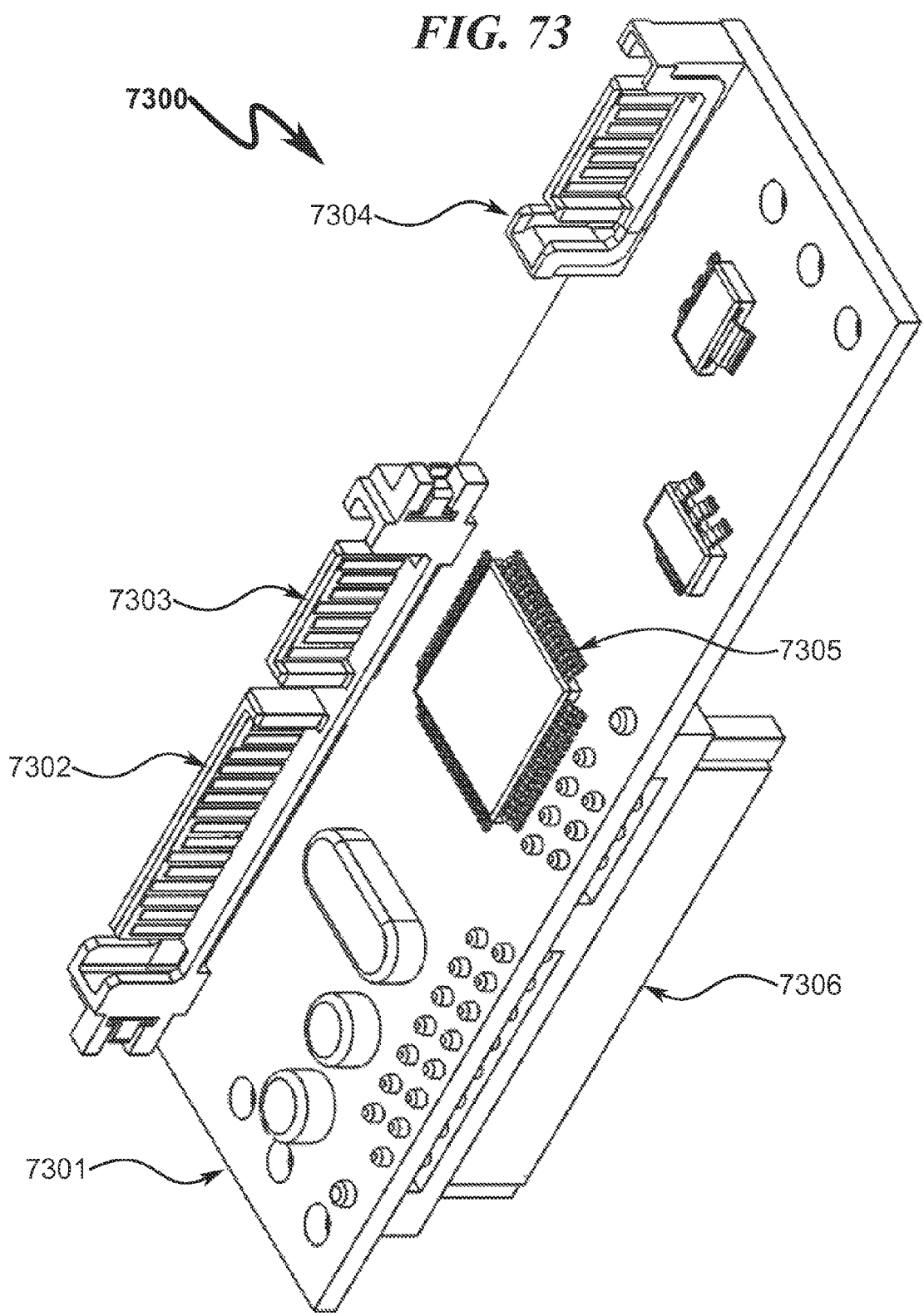
FIG. 73 illustrates a front right perspective view of a preferred exemplary embodiment of a present invention piggy-back PTDDC PCB assembly.
Figure 74:
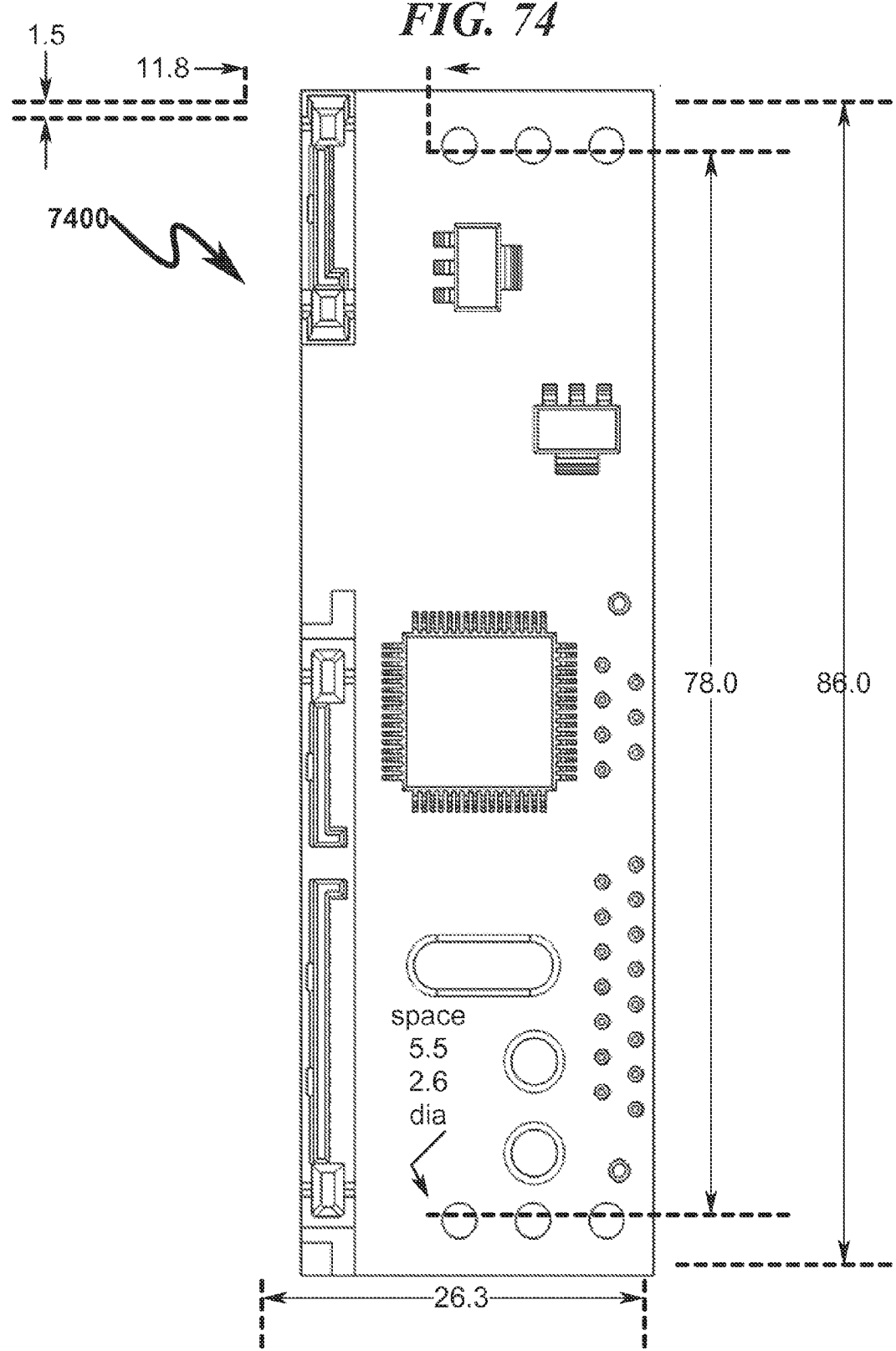
FIG. 74 illustrates a front view of a preferred exemplary embodiment of a present invention piggy-back PTDDC PCB assembly.
Figure 75:
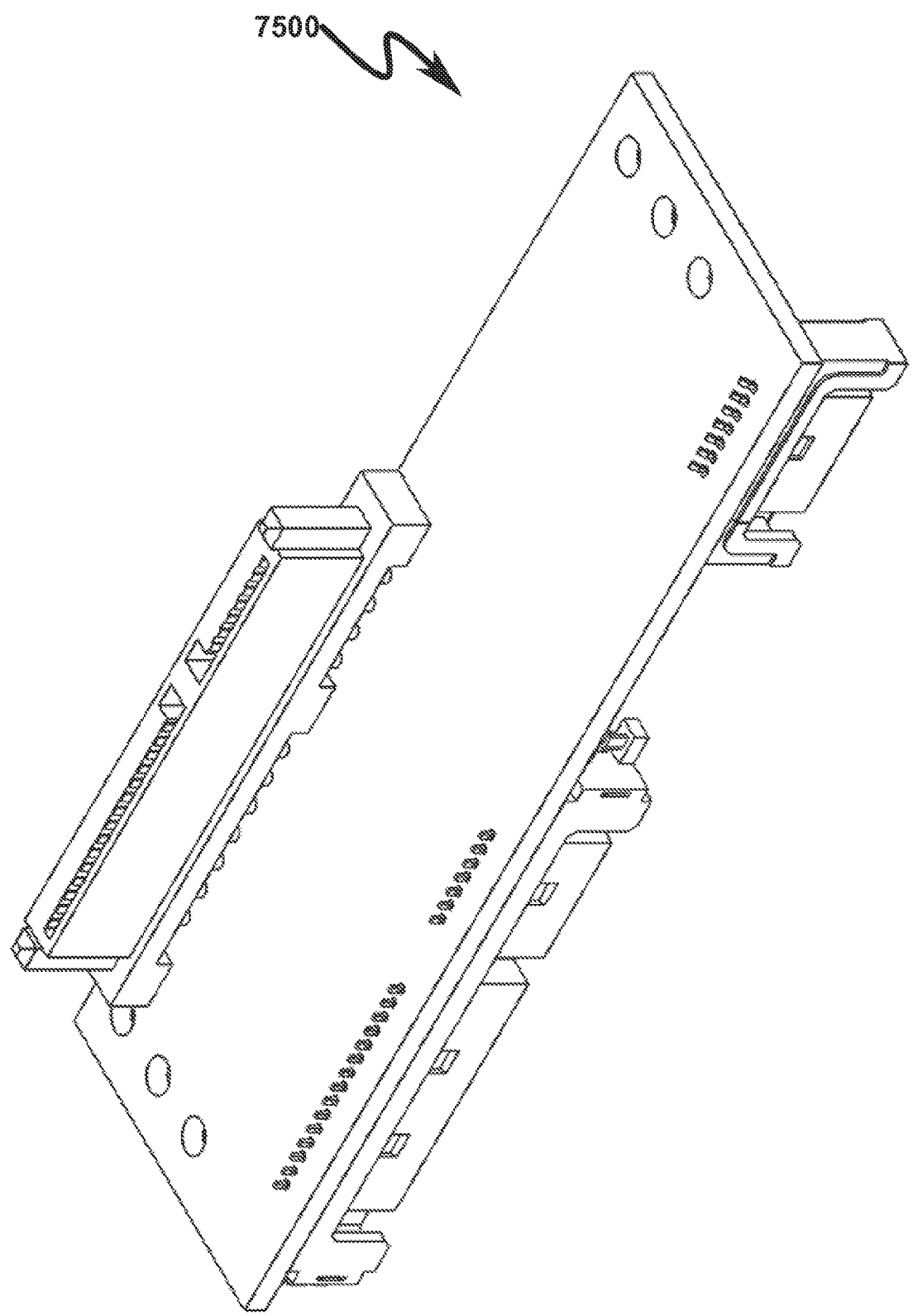
FIG. 75 illustrates a rear right perspective view of a preferred exemplary embodiment of a present invention piggy-back PTDDC PCB assembly.
Figure 76:
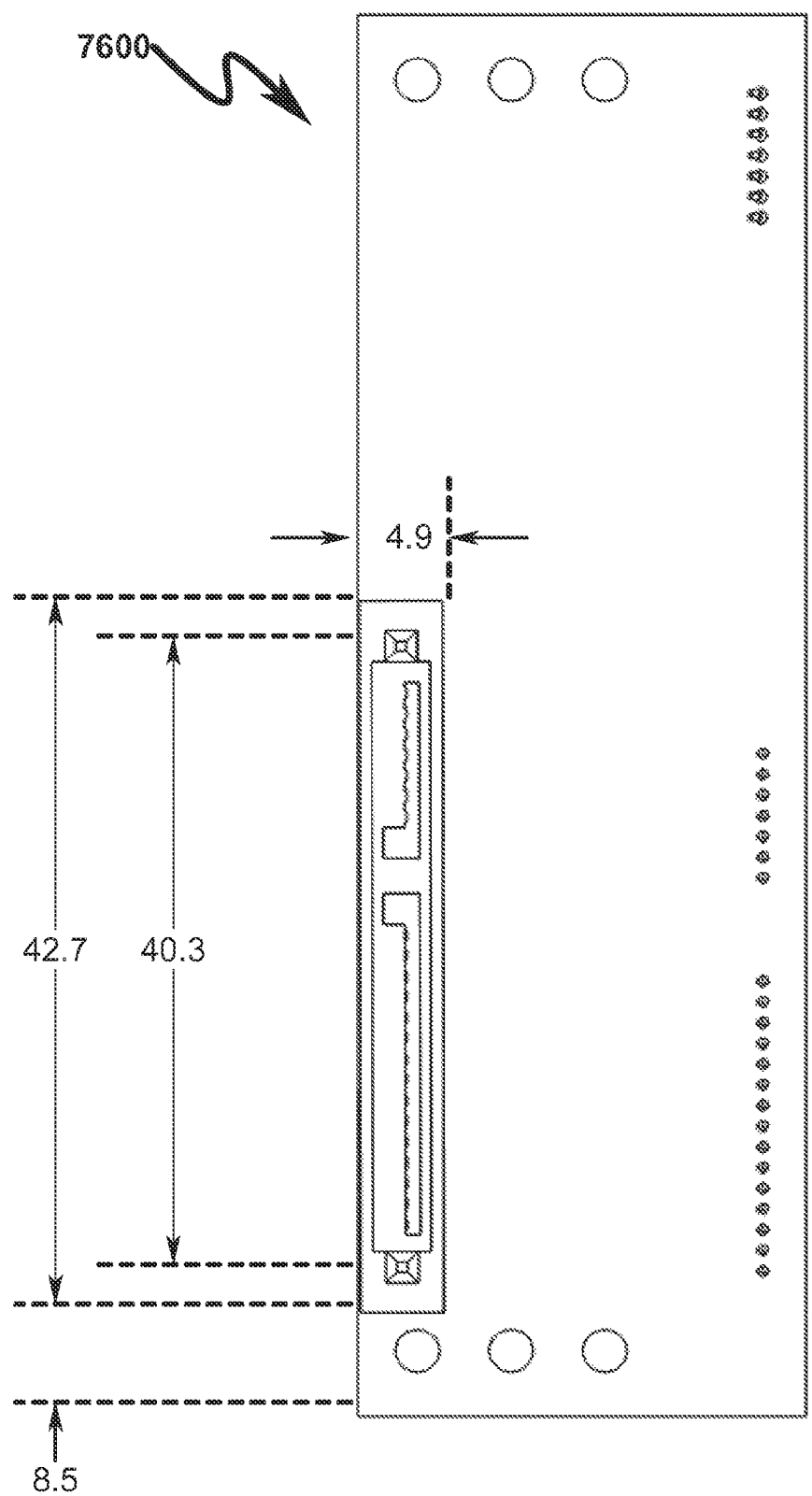
FIG. 76 illustrates a rear view of a preferred exemplary embodiment of a present invention piggy-back PTDDC PCB assembly.
Figure 77:
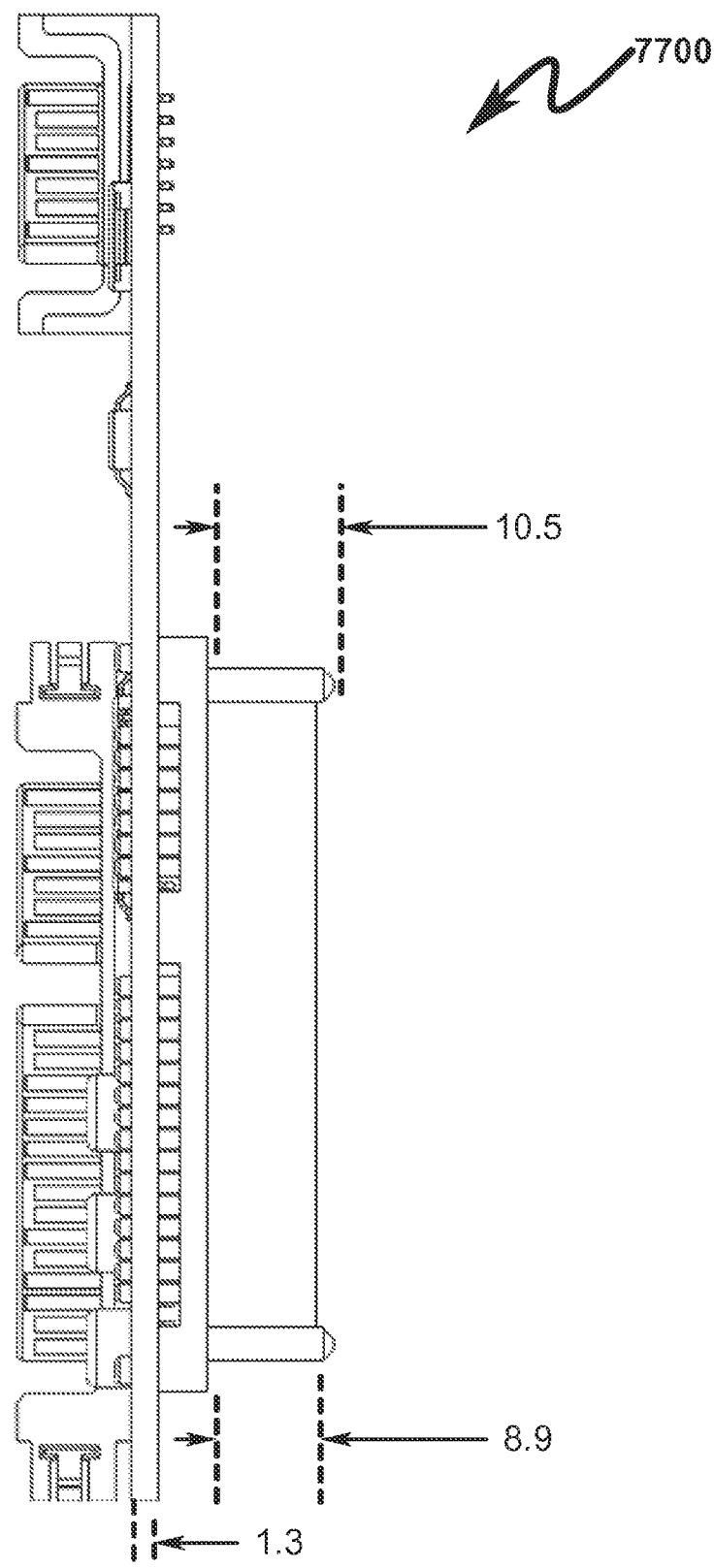
FIG. 77 illustrates a right side view of a preferred exemplary embodiment of a present invention piggy-back PTDDC PCB assembly.
Figure 78:
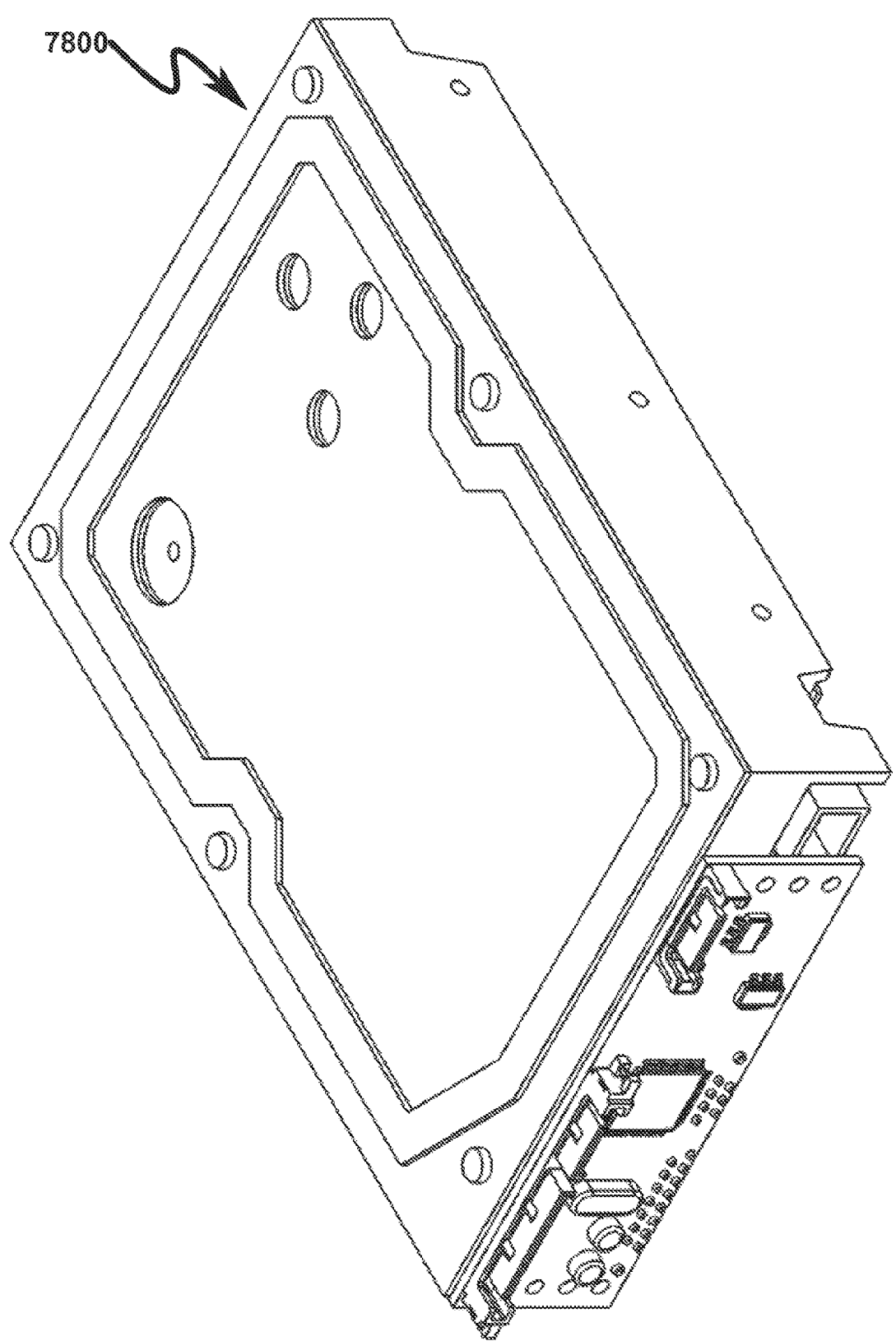
FIG. 78 illustrates a top rear perspective view of a preferred exemplary embodiment of a present invention piggy-back PTDDC PCB assembly.

As mentioned in U.S. patent application Ser. No. 13/200, 242 (and depicted in FIG. 30 (3000) of this referenced patent application), this piggy-back PCB adapter architecture may be used as a framework to provide a physical platform for the present invention implementing a PTDDC as generally illustrated in FIG. 73 (7300). In this preferred exemplary embodiment, the target disk drive (as depicted in FIG. 72 (7210)) comprises a SATA interface having SATA power (7211) and SATA data connectors (7212). This standard SATA disk drive (7210) is interfaced to the present invention preferred embodiment as depicted in FIG. 73 (7300) via the use of a PCB or other substrate (7301) having SATA power (7302) and SATA data (HBA/PTI) (7303) connectors as well as a daisy-chain SATA PTO connector (7304) as generally illustrated in the top view of the preferred exemplary embodiment in FIG. 73 (7300).

The PCB or other substrate (7301) will generally also incorporate pass-thru input (HBA/PTI) (7303) and pass-thru output (PTO) (7304) connections that are used to pass data and control information between daisy-chained PTDDC subsystems. The HBA/PTI (7303) connection is provided to permit a direct interface by the first piggy-back board in the daisy-chain to the computer disk drive interface via a cable, in this implementation a SATA data cable. The PCB (7301) will generally also support the integration of the ASIC (7305) used to implement the PTDDC functionality. Note in this exemplary implementation that the PTO connector (7304) will generally be constructed to permit daisy-chaining of one PTDDC unit PTO connection to a subsequent PTDDC unit PTI connection.

Figure 79:
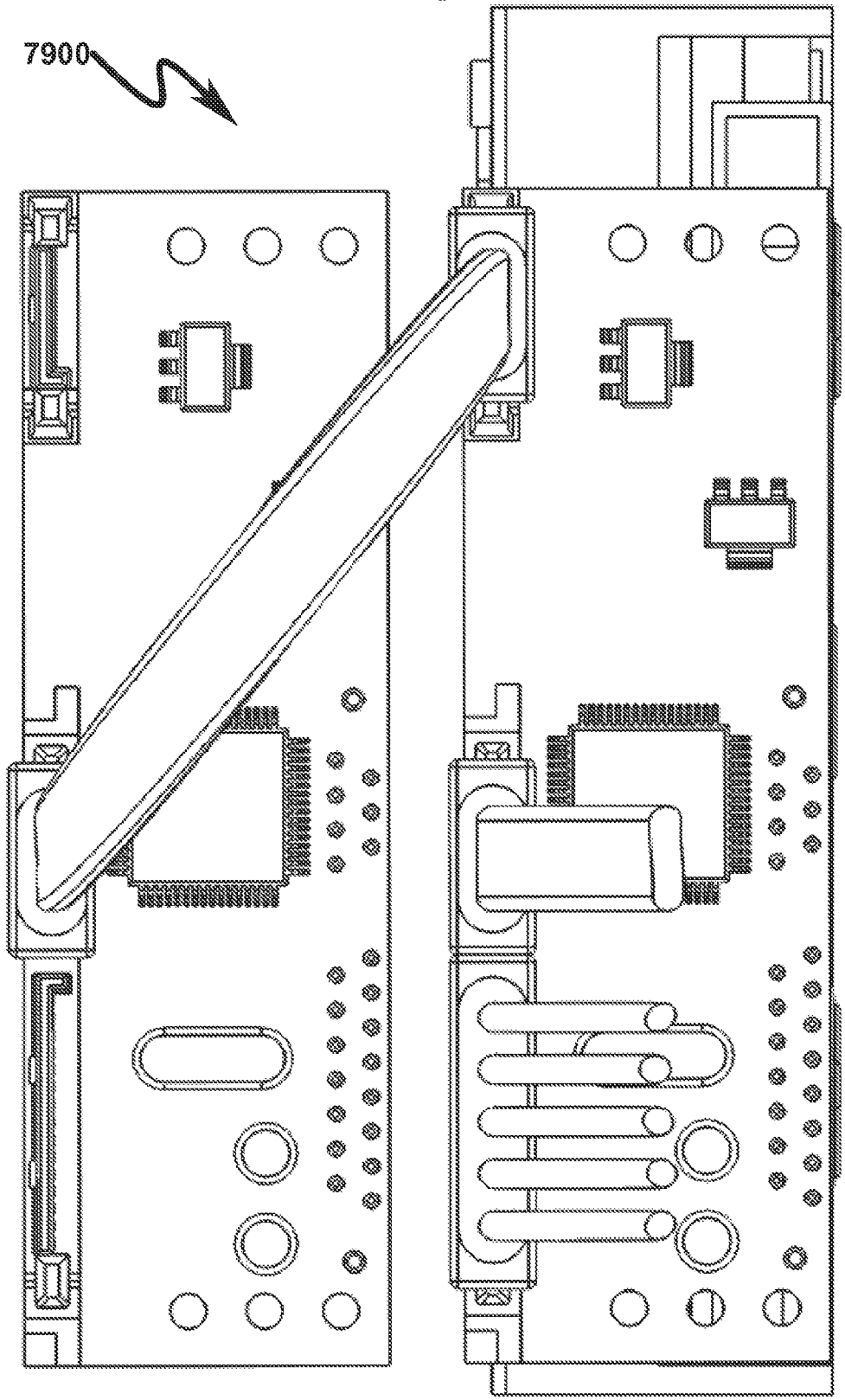
FIG. 79 illustrates a rear view of a preferred exemplary embodiment of two present invention piggy-back PTDDC PCB assemblies connected in a daisy-chain configuration.
Figure 80:
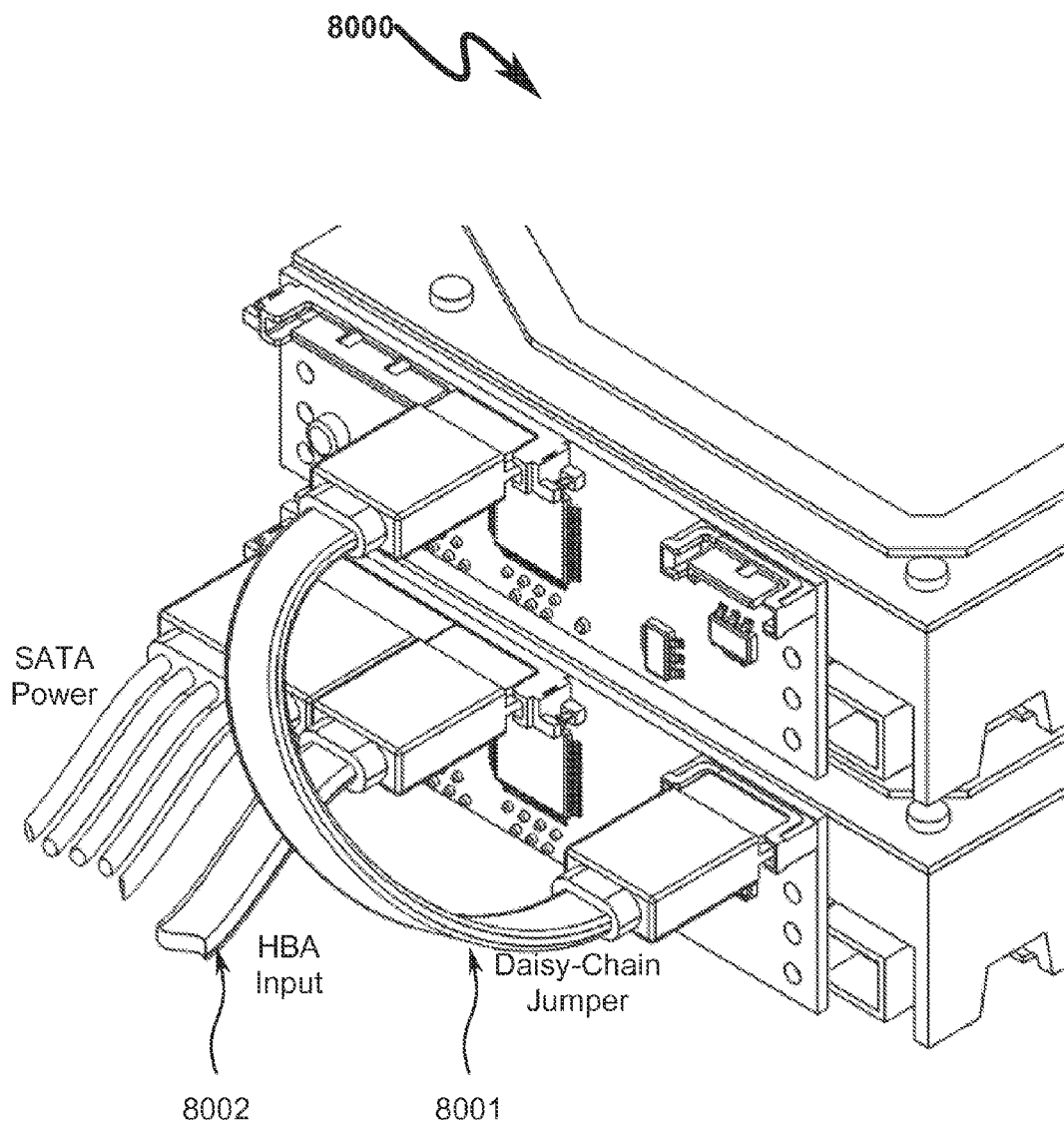
FIG. 80 illustrates a top left rear perspective view of a preferred exemplary embodiment of two present invention piggy-back PTDDC PCB assemblies used to daisy-chain two disk drives.

As generally illustrated in FIG. 73 (7300), the PTDDC as implemented on a piggy-back PCB substrate may orient the PTI and PTO connectors in a manner to permit daisy-chaining of the PTDDC modules if these modules (and their associated disk drives) are stacked vertically on top of one another as generally depicted in the views of FIG. 79 (7900) and FIG. 80 (8000). As depicted in FIG. 79 (7900) and FIG. 80 (8000), the connectors used in this configuration may be of the standard SATA jumper cable type (8001) to support full data speed SATA data transfers.

One optimization that may take place in this configuration is that the HBA/PTI port (7303) may be configured to accept HBA input from a computer system or PTO input from another PCB module in the PTDDC daisy-chain. In this configuration, the ASIC (7305) need only have three SATA ports: a combined HBA/PTI port, a PTO port having SATA electrical characteristics, and a SATA drive interface port (7306). This optimization permits the use of reduced-cost interconnects between the PTO/PTI connectors that daisy-chain the SATA drives while still permitting interfacing to the computer system drive interface bus using a standard SATA data interface cable (8002).

SATA Disk Drive with Integrated PTDDC (8100)-(9600)

Overview

Figure 81:
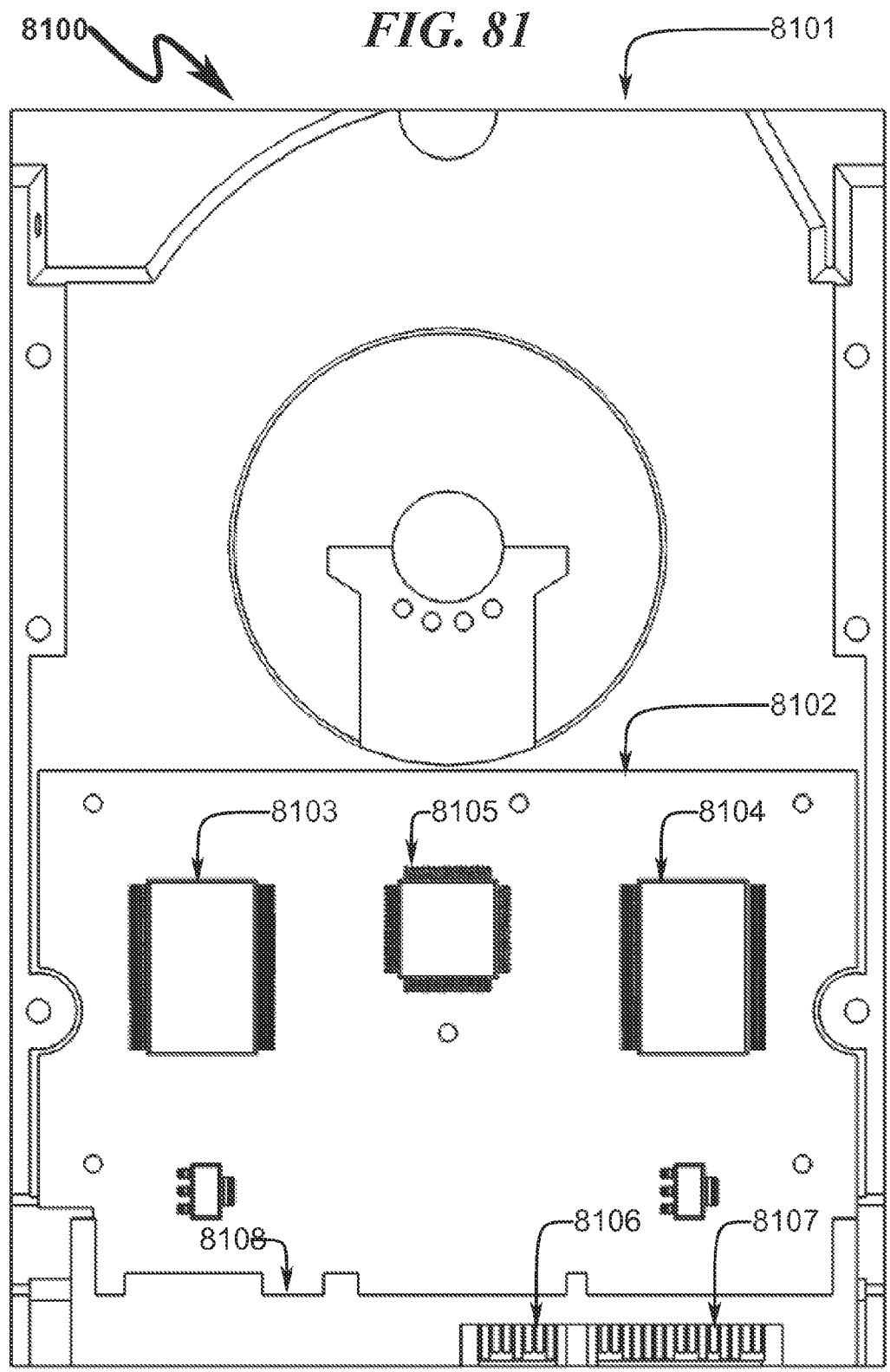
FIG. 81 illustrates a bottom component view of a conventional prior art disk drive incorporating a SATA electrical interface.
Figure 82:
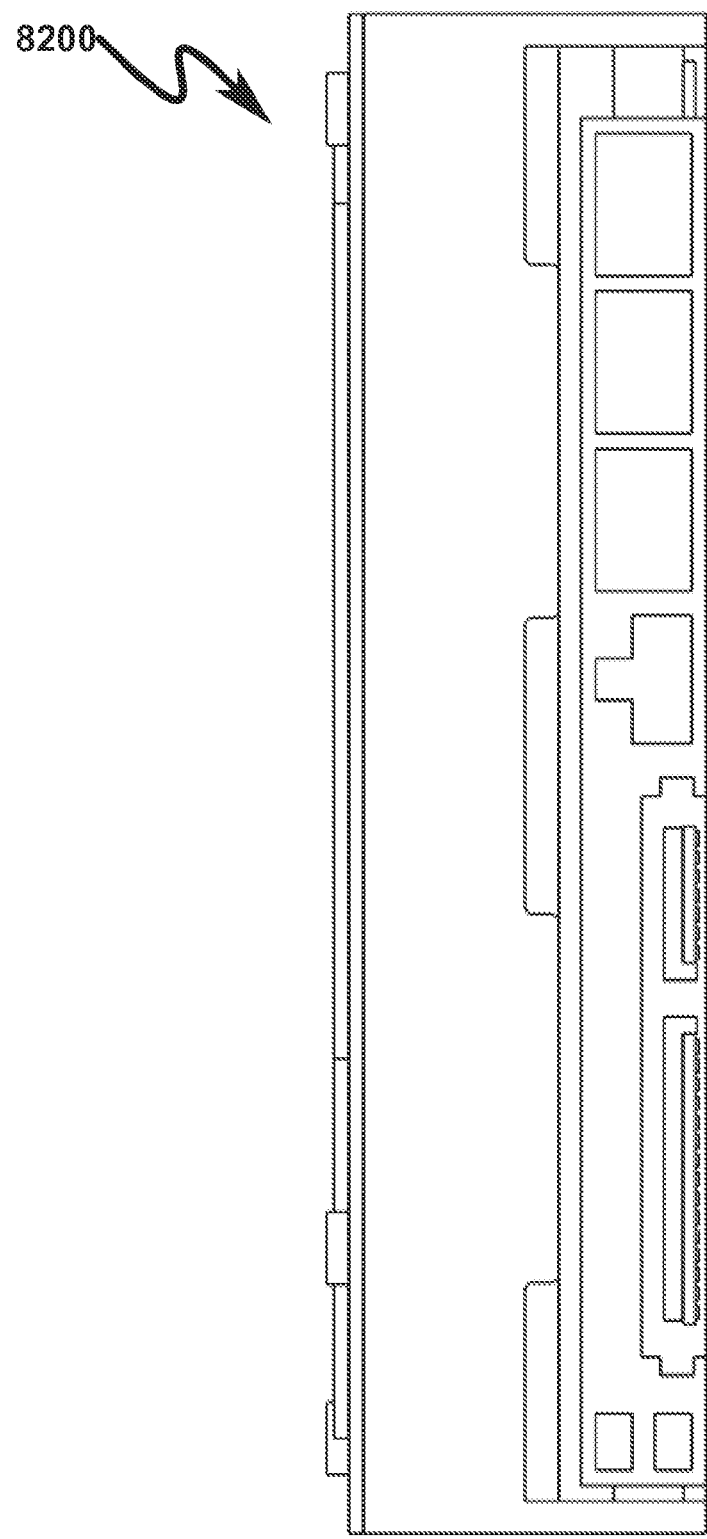
FIG. 82 illustrates an electrical connector back view of a conventional prior art disk drive incorporating a SATA electrical interface.
Figure 83:
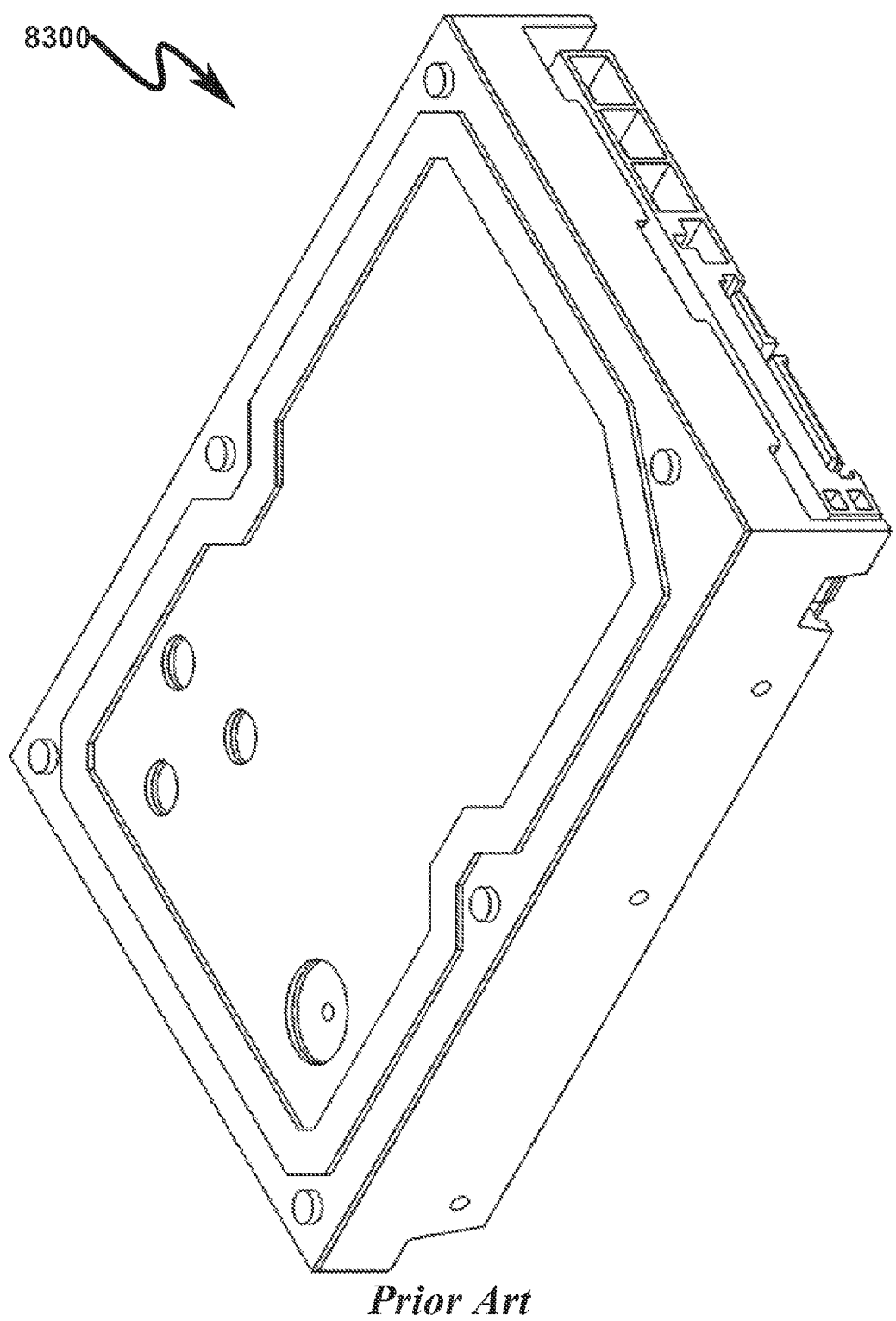
FIG. 83 illustrates a top left back perspective view of a conventional prior art disk drive incorporating a SATA electrical interface.

As mentioned in U.S. patent application Ser. No. 13/200, 242 (and depicted in FIG. 32 (3200) of this referenced patent application), the PTDDC daisy-chain concept may be applied to and integrated within individual SATA disk drives. FIG. 81 (8100)-FIG. 88 (8800) depict the standard way in which conventional SATA disk drives are configured and FIG. 89 (8900)-FIG. 96 (9600) depict how the present invention modifies this standard configuration to create a new class of SATA disk drive that supports daisy-chaining via use of the PTDDC concepts taught herein. It should be noted that this new class of SATA disk drive that supports daisy-chaining is designed to specifically violate the limitations on SATA port multipliers, as the SATA specification is clear that port multipliers cannot be nested or cascaded (per the SATA specification, "A Port Multiplier shall not be connected to another Port Multiplier (i.e. no cascading)." The following discussion will provide an exemplary mechanical implementation of a PTDDC-enabled disk drive that permit daisy-chaining of multiple drives via the use of a standard SATA drive interface cable and no additional hardware.

Conventional SATA Connectivity (8100)-(8800)

Figure 88:
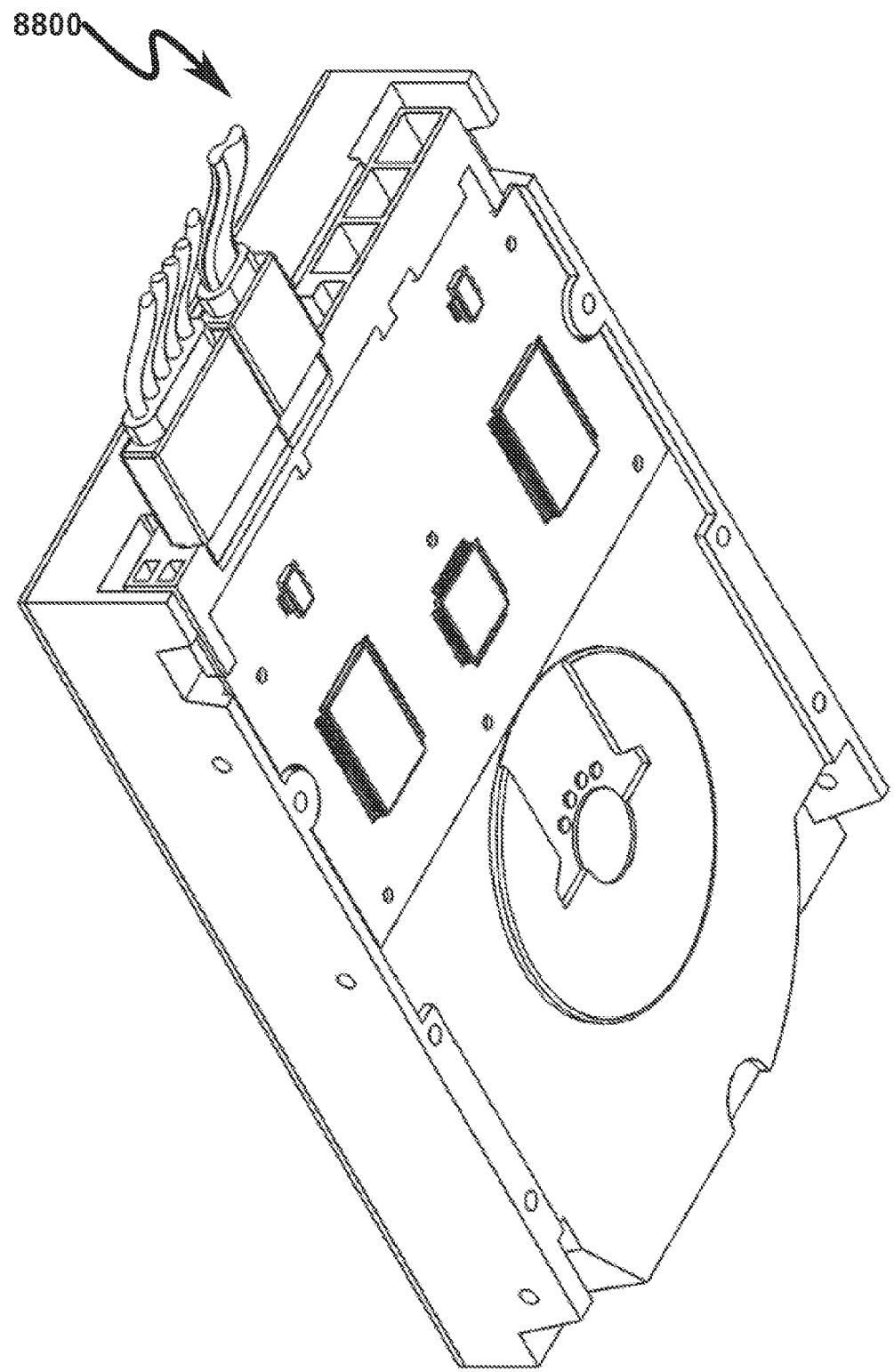
FIG. 88 illustrates a bottom left back perspective view of a conventional prior art disk drive incorporating a SATA electrical interface with power and SATA interface cables attached.

FIG. 81 (8100)-FIG. 88 (8800) depict various views of a standard SATA disk drive in which the drive case (8101) containing the disk platters is attached to a PCB (8102) that typically includes a digital interface integrated circuit (8103) (responsible for controlling data transfers to/from the SATA interface and the disk), memory (8104) (to buffer data between the host and the disk drive), and analog read/write interface integrated circuit (8105) (to interface with the read/write heads within the disk drive case (8101). These individual integrated circuits may in some applications be combined to form one or more integrated circuits to reduce the PCB (8102) component count. The physical interface between the digital interface integrated circuit (8103) and the host computer is provided via a standard SATA interface connection (4-wire signal+grounds (3)) (8106) with corresponding power connector (8107) integrated within a plastic connector housing (8108).

Figure 84:
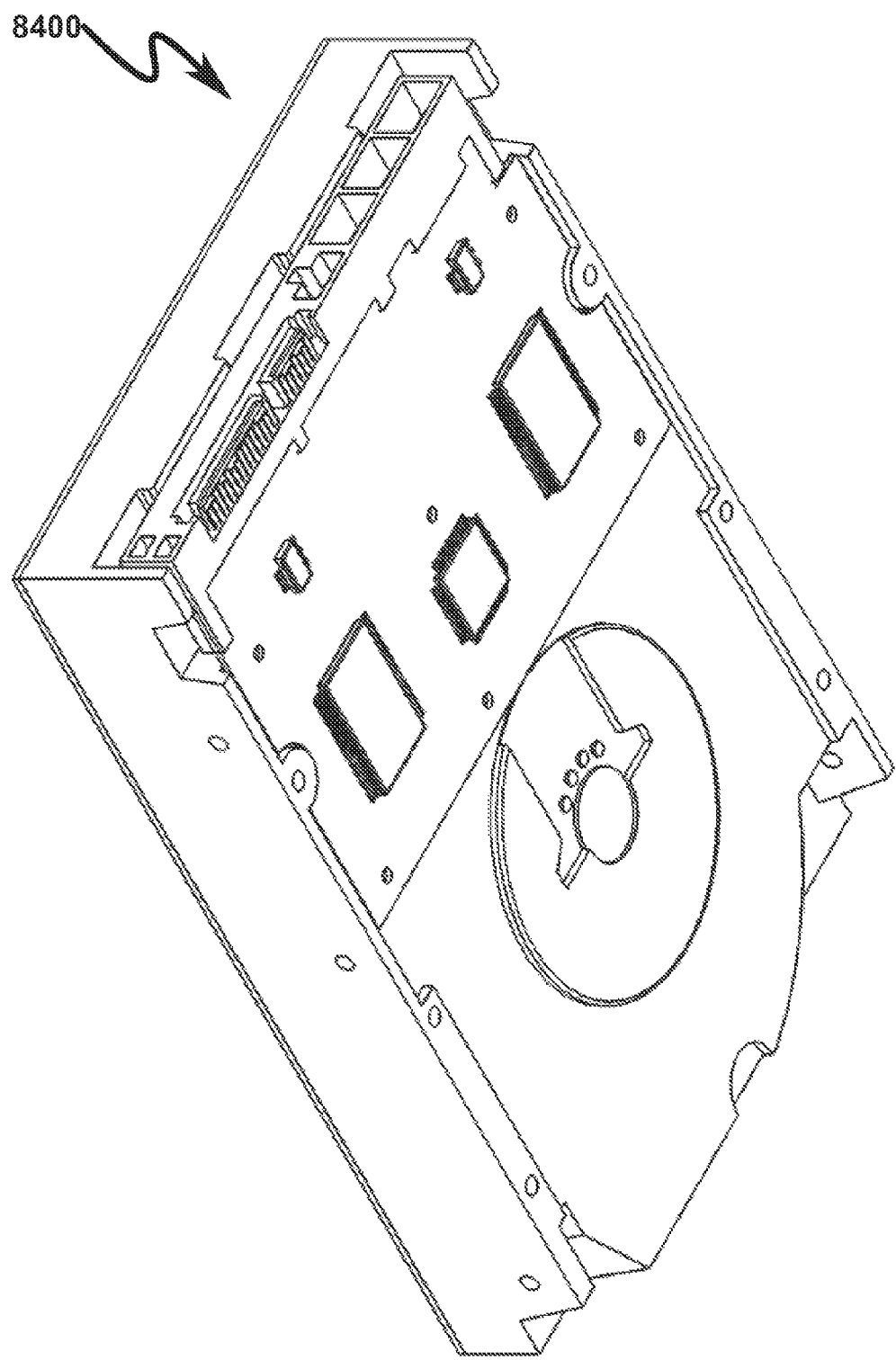
FIG. 84 illustrates a bottom left back perspective view of a conventional prior art disk drive incorporating a SATA electrical interface.
Figure 85:
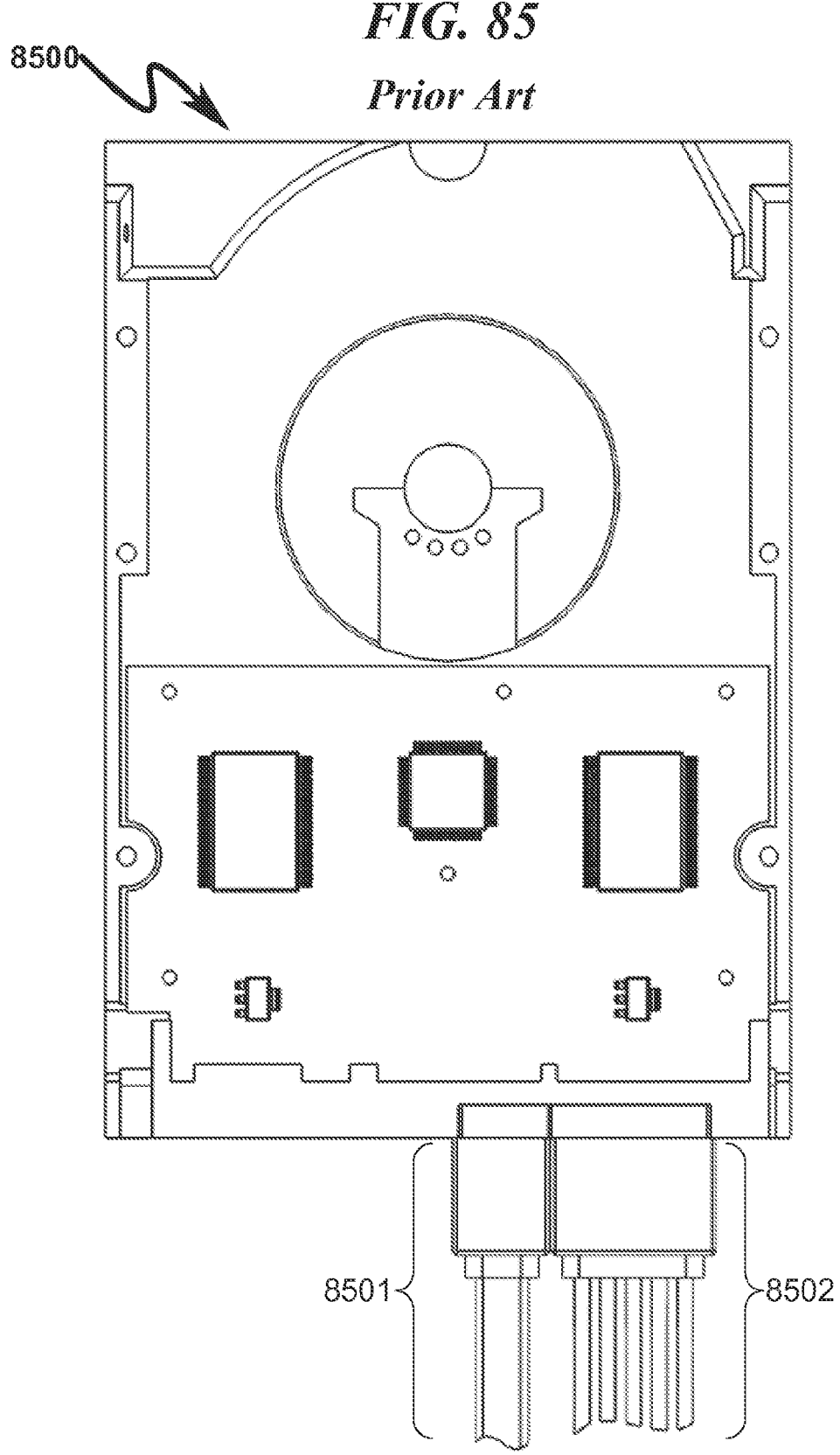
FIG. 85 illustrates a bottom component view of a conventional prior art disk drive incorporating a SATA electrical interface with power and SATA interface cables attached.
Figure 87:
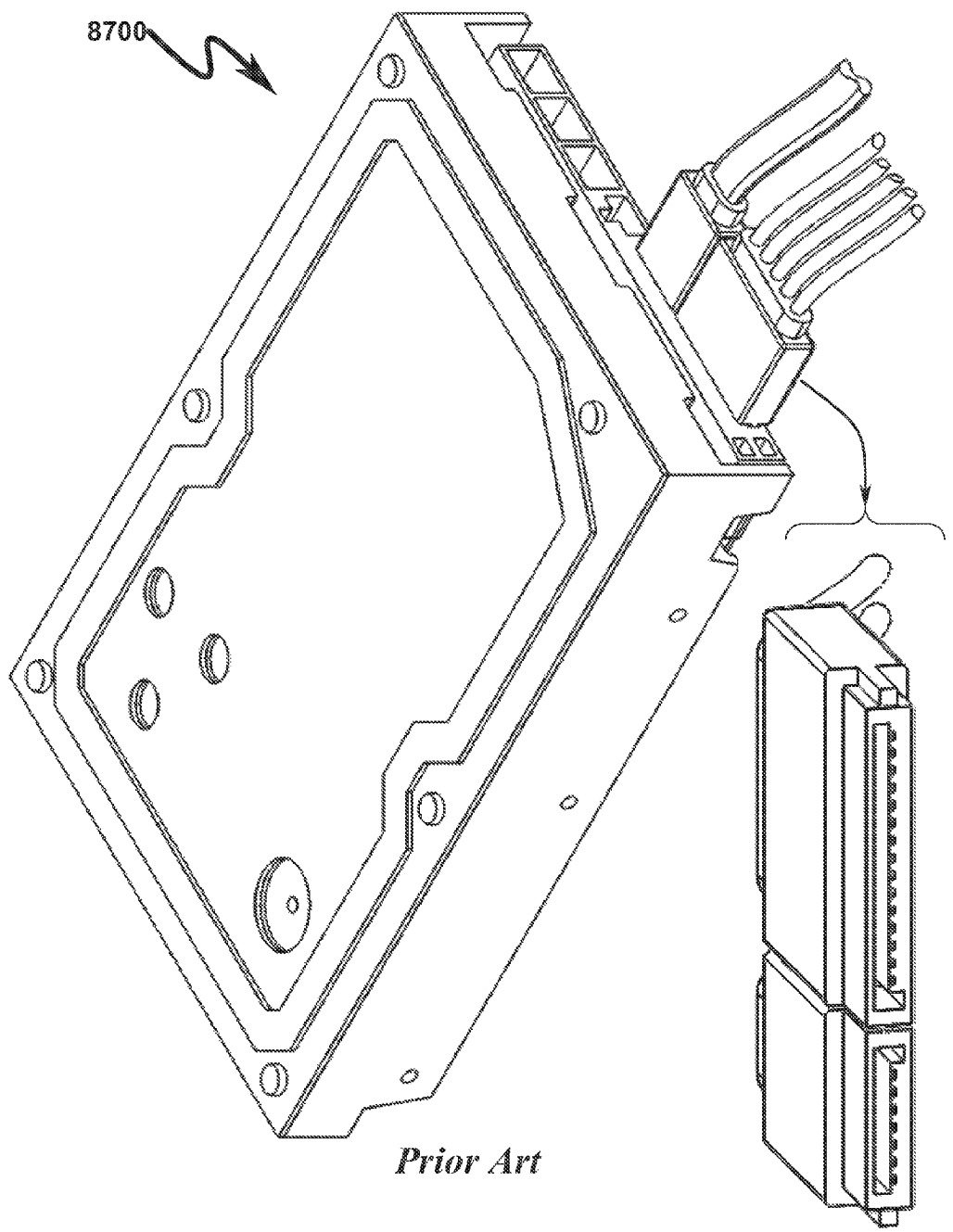
FIG. 87 illustrates a top left back perspective view of a conventional prior art disk drive incorporating a SATA electrical interface with power and SATA interface cables attached.

FIG. 85 (8500)-FIG. 88 (8800) depict how the standard SATA disk drive depicted in FIG. 81 (8100)-FIG. 84 (8400) is connected to the host HBA via a SATA data cable (8501) and provided power via a standard SATA power cable (8502). The SATA data cable (8501) contains seven signal wires: GROUND (3), A+, A−, B+, and B−. All information to the SATA drive is transmitted over this electrical interface.

Exemplary Embodiment

Integrated Drive Stacking (8900)

As mentioned in U.S. patent application Ser. No. 13/200, 242 (and depicted in FIG. 32 (3200) of this referenced patent application), the present invention may be embodied in many physical implementations, but several preferred exemplary embodiments integrate the PTDDC on the PCB of the disk drive and expand the connector complement on the disk drive to permit disk drives to be "stacked" within drive enclosures and serviced by a single HBA drive interface cable. Many existing disk drives incorporate a single chip integrated circuit controller (ASIC) that serves as the HBA interface as well as controlling most if not all functions associated with the disk drive. The present invention anticipates that the additional PTDDC functionality detailed herein may be rolled into the existing ASIC disk drive controller circuitry to provide an optimal and cost effective methodology to promote data storage extension with off-the-shelf hard disk drive components.

Many preferred exemplary embodiments of the present invention will utilize this technique incorporated into disk drives having SATA interfaces, as this will present economies and optimizations for cable management that may not be present in other disk drive interfaces. A typical hardware configuration for such a system is generally illustrated in the SATA disk drive outline of FIG. 89 (8900), wherein the PCB (8902) is anticipated to integrate both the disk drive electronics and the proposed PTDDC functionality. Note that the PTI/PTO port functionality as generally depicted in FIG. 73 (7300) would by necessity be augmented into the connector complement (8906, 8907, 8916) of this hardware configuration to implement the necessary pass-thru functionality utilized in the present invention. Additional information regarding this preferred embodiment is provided below.

PTDDC-Enabled SATA Disk Drive (8900)-(9600)

Figure 90:
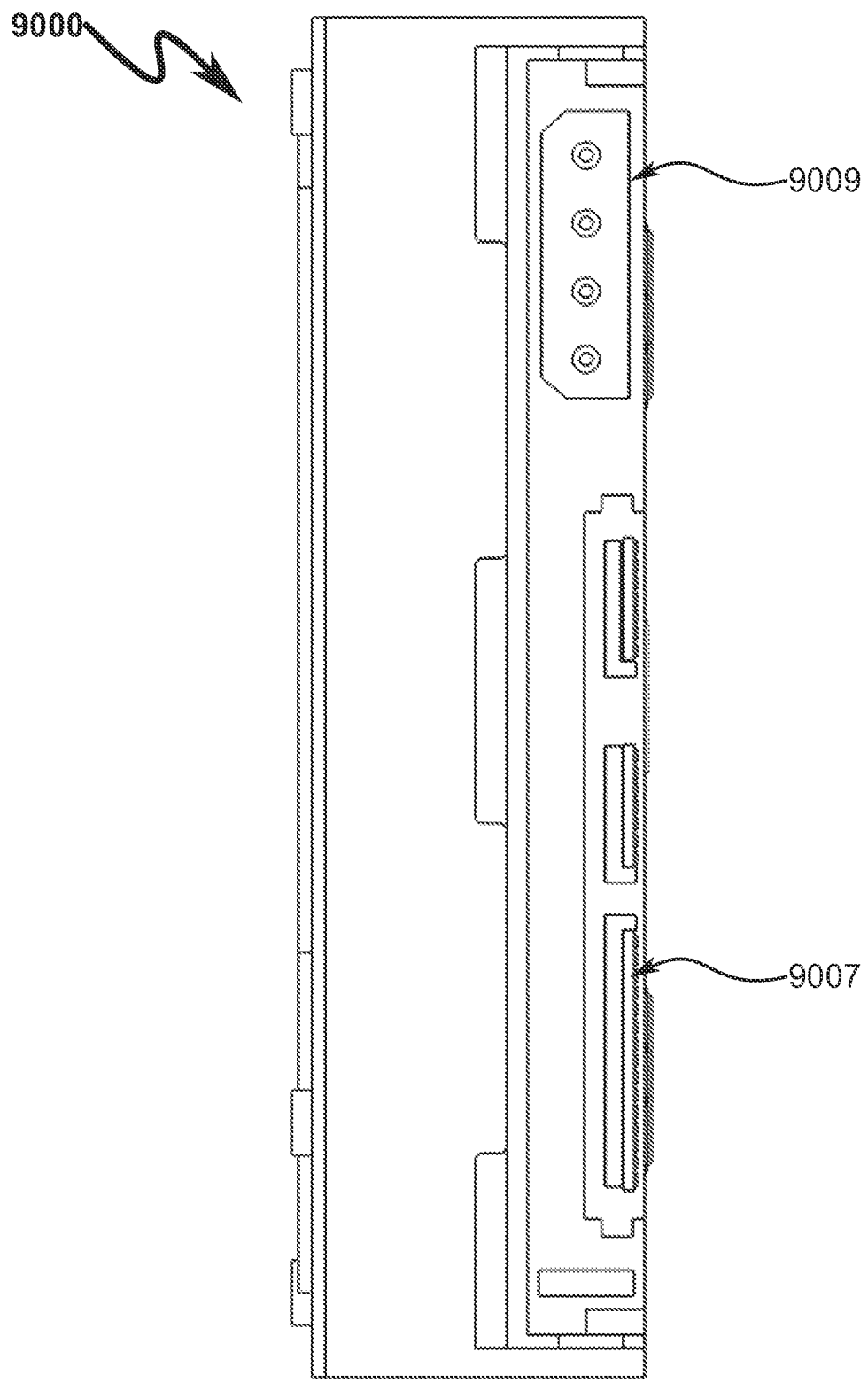
FIG. 90 illustrates an electrical connector back view of a preferred exemplary invention embodiment disk drive incorporating a SATA electrical interface and PTDDC functionality.
Figure 91:
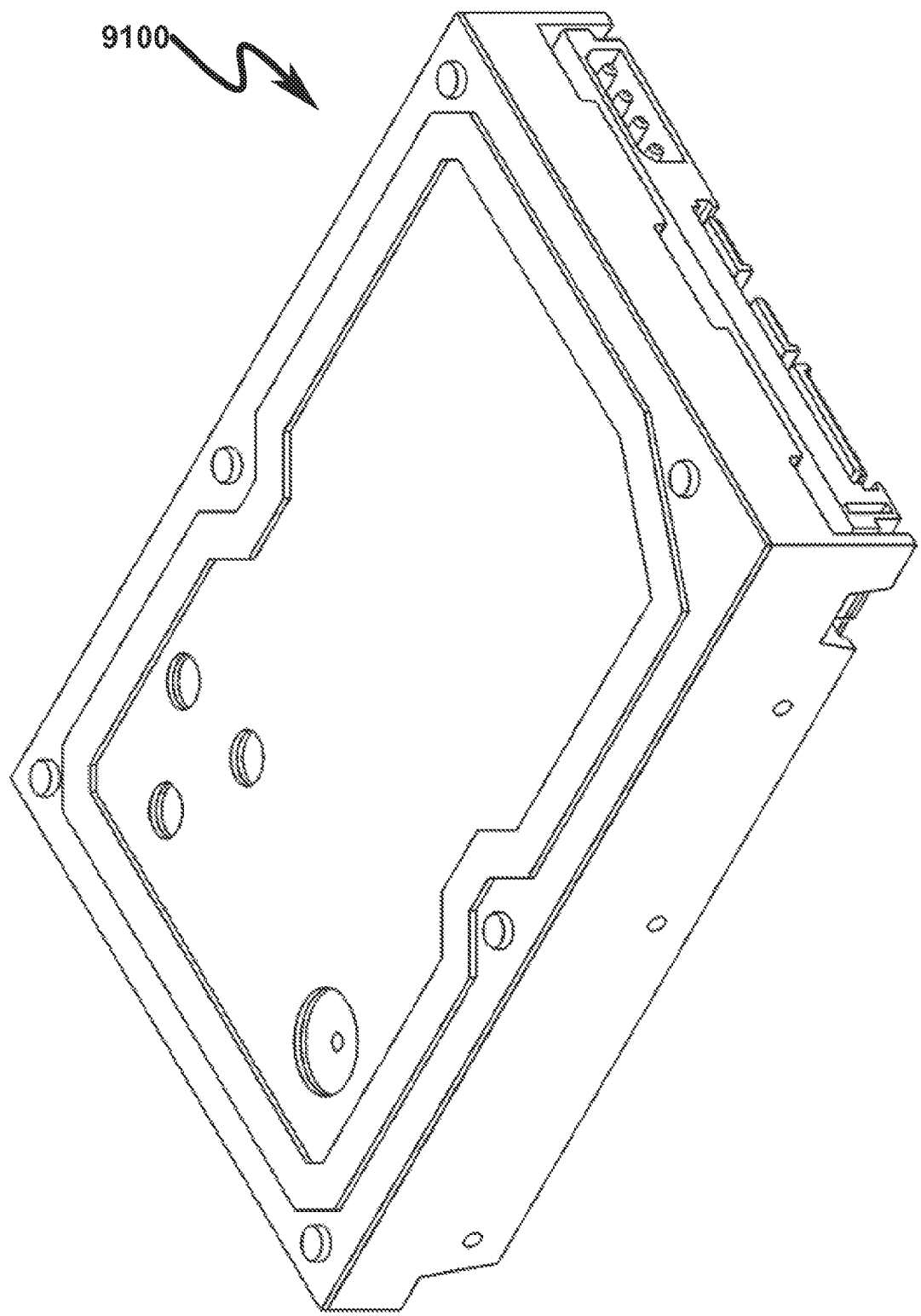
FIG. 91 illustrates a top left back perspective view of a preferred exemplary invention embodiment disk drive incorporating a SATA electrical interface and PTDDC functionality.
Figure 92:
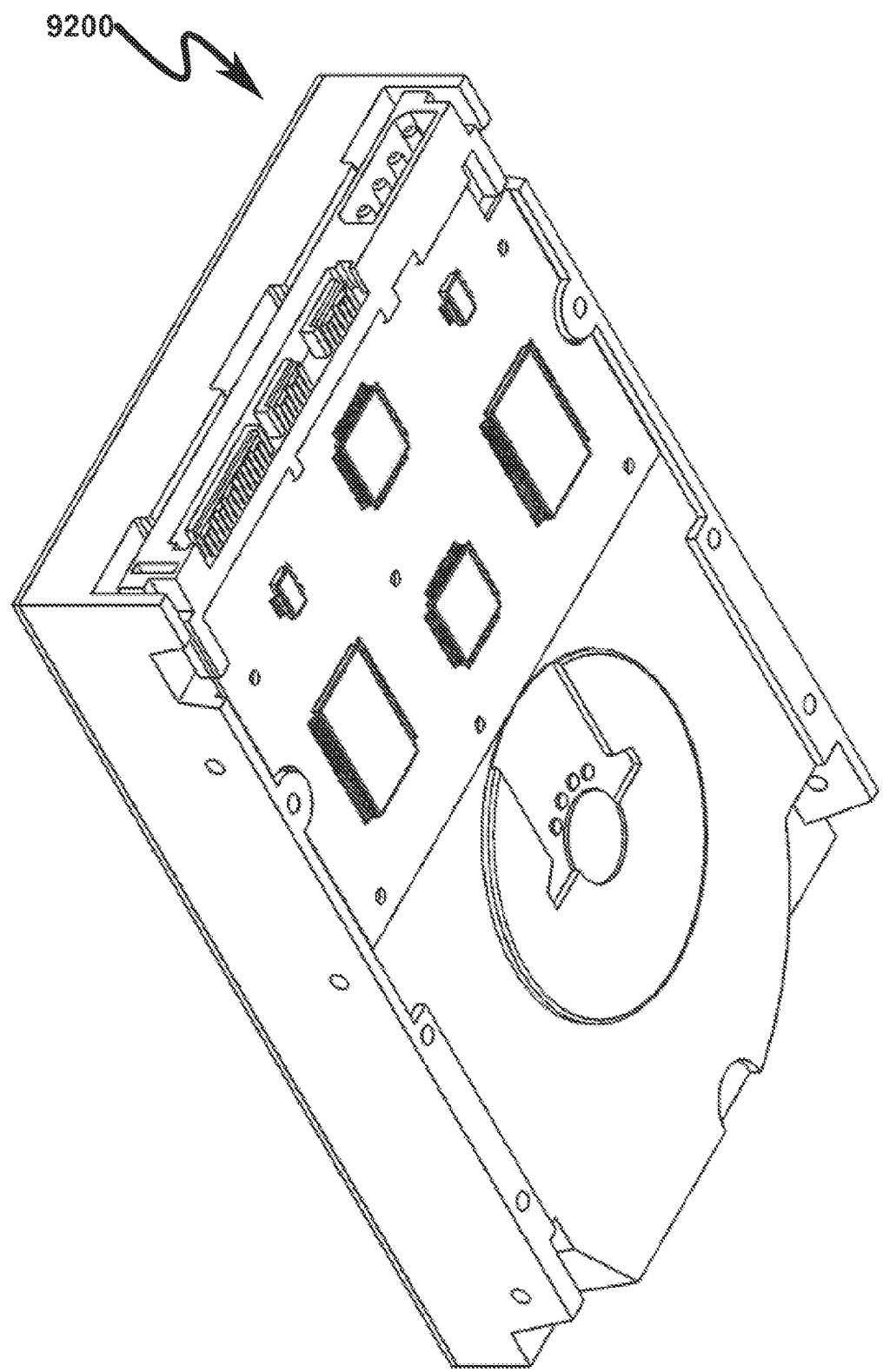
FIG. 92 illustrates a bottom left back perspective view of a preferred exemplary invention embodiment disk drive incorporating a SATA electrical interface and PTDDC functionality.
Figure 96:
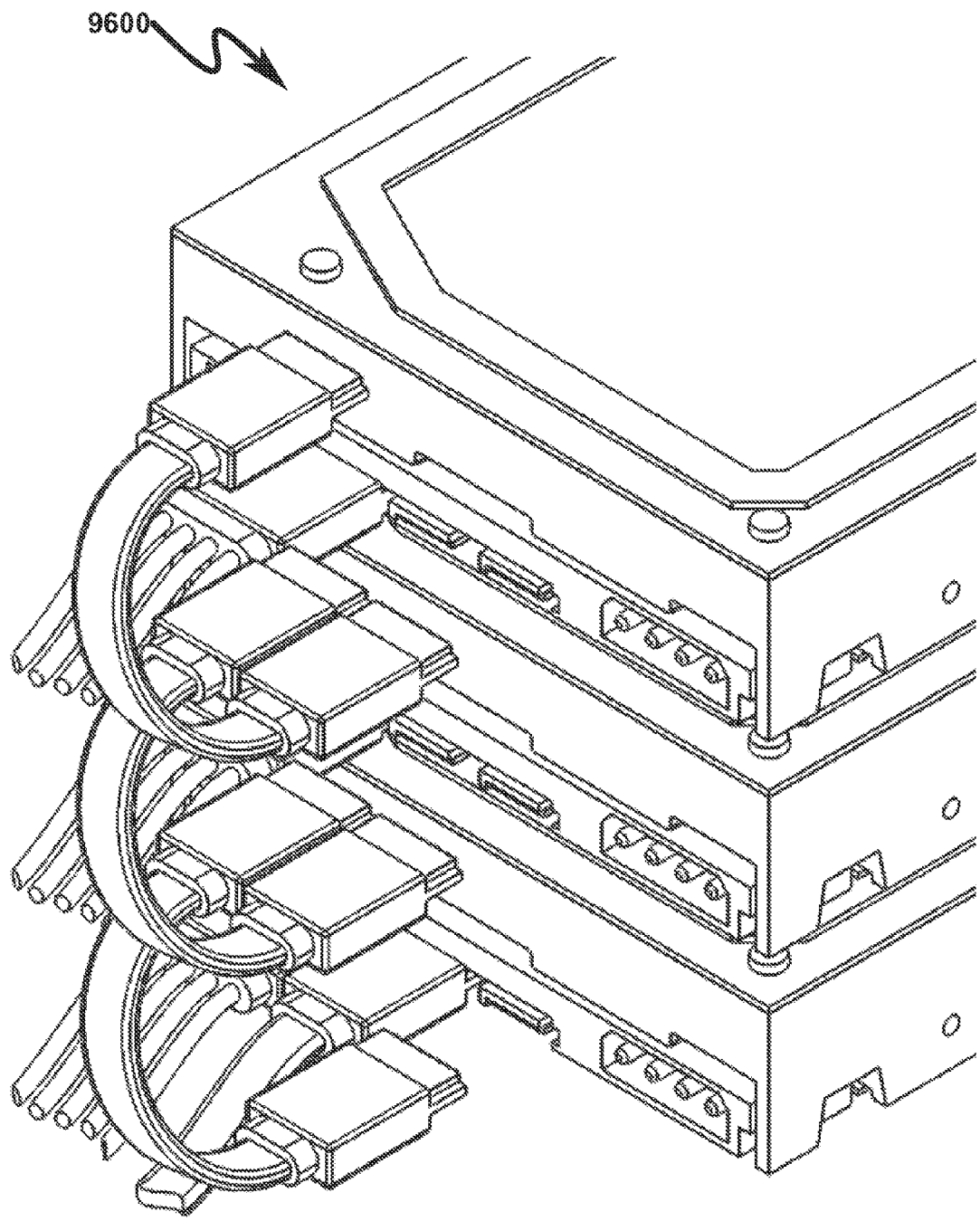
FIG. 96 illustrates a top right back perspective assembly view of a preferred exemplary invention embodiment disk drive array incorporating a SATA electrical interface and PTDDC daisy-chain functionality with SATA daisy-chain cables detached.

The present invention purposely violates a firm principle of construction in the SATA electrical specification by enabling PTDDC-chaining when used in conjunction with a properly configured SATA disk drive that has been modified as depicted in FIG. 89 (8900)-FIG. 96 (9600). As generally depicted in FIG. 89 (8900)-FIG. 96 (9600), this modified SATA disk drive comprises several aspects of a conventional SATA disk drive including drive case (8901), PCB (8902), digital interface integrated circuit (8903), memory (8904), analog read/write interface integrated circuit (8905), standard SATA interface input connection (4-wire+ground) (8906), power connector (8907), and plastic connector housing (8908). As depicted in FIG. 90 (9000), the SATA power connector (9007) may be augmented and/or replaced by a standard MOLEX® 4-pin power connector (9009) typically associated with disk drive power supply arrangements. In typical operation only one of the power inputs (9007, 9009) is used to power the disk drive. While the examples provided do not make use of the auxiliary power connector (9009), in some embodiments these power connectors may be used to supply power to the SATA disk drive.

This configuration of SATA disk drive differs from that depicted in FIG. 81 (8100)-FIG. 89 (8900) in several significant ways. In this modified SATA disk drive embodiment, each SATA disk drive comprises an additional PTDDC ASIC (8915) that provides the daisy-chaining functionality without the need for other electrical information other than the standard SATA 7-wire input electrical interface (8906) which corresponds to the PTDDC HBA/PTI bi-directional input port. The plastic connector housing (8908) is augmented with an additional SATA connector (8916) corresponding to the PTDDC PTO bi-directional output port.

The PTO bi-directional output port will typically be configured with a mirrored SATA signaling configuration so that a standard SATA signal patch cable (9311, 9321, 9331) may be used to connect the PTO port of one SATA disk drive to the HBA/PTI port of the next SATA disk drive in the chain. Thus, the PTI/PTO port signal mapping may take the following form:

| Signal Segment Name | PTI/HBA Standard SATA Type | Description | PTO (PTDDC input) Type |
|---|---|---|---|
| S1 | GND | | GND |
| S2 | A+ | Differential | B+ |
| S3 | A− | Signal Pair A | B− |
| S4 | GND | | GND |
| S5 | B+ | Differential | A+ |
| S6 | B− | Signal Pair B | A− |
| S7 | GND | | GND |

The modified SATA disk drive as depicted in these drawings incorporates an additional SATA interface for the disk drive that permits the PTO port (8916) to be connected to the HBA/PTI port (8915) of the next SATA disk drive in the daisy-chain. As depicted in the daisy-chain depictions in FIG. 93 (9300)-FIG. 96 (9600), this allows multiple SATA disk drives (9310, 9320, 9330) to be racked and connected in a daisy-chain without the need for additional HBA controllers or additions to the computer system hosting the storage array. Furthermore, additional SATA disks may be added to the end of the daisy-chain without disturbing the SATA disks that are already connected to the chain.

Figure 93:
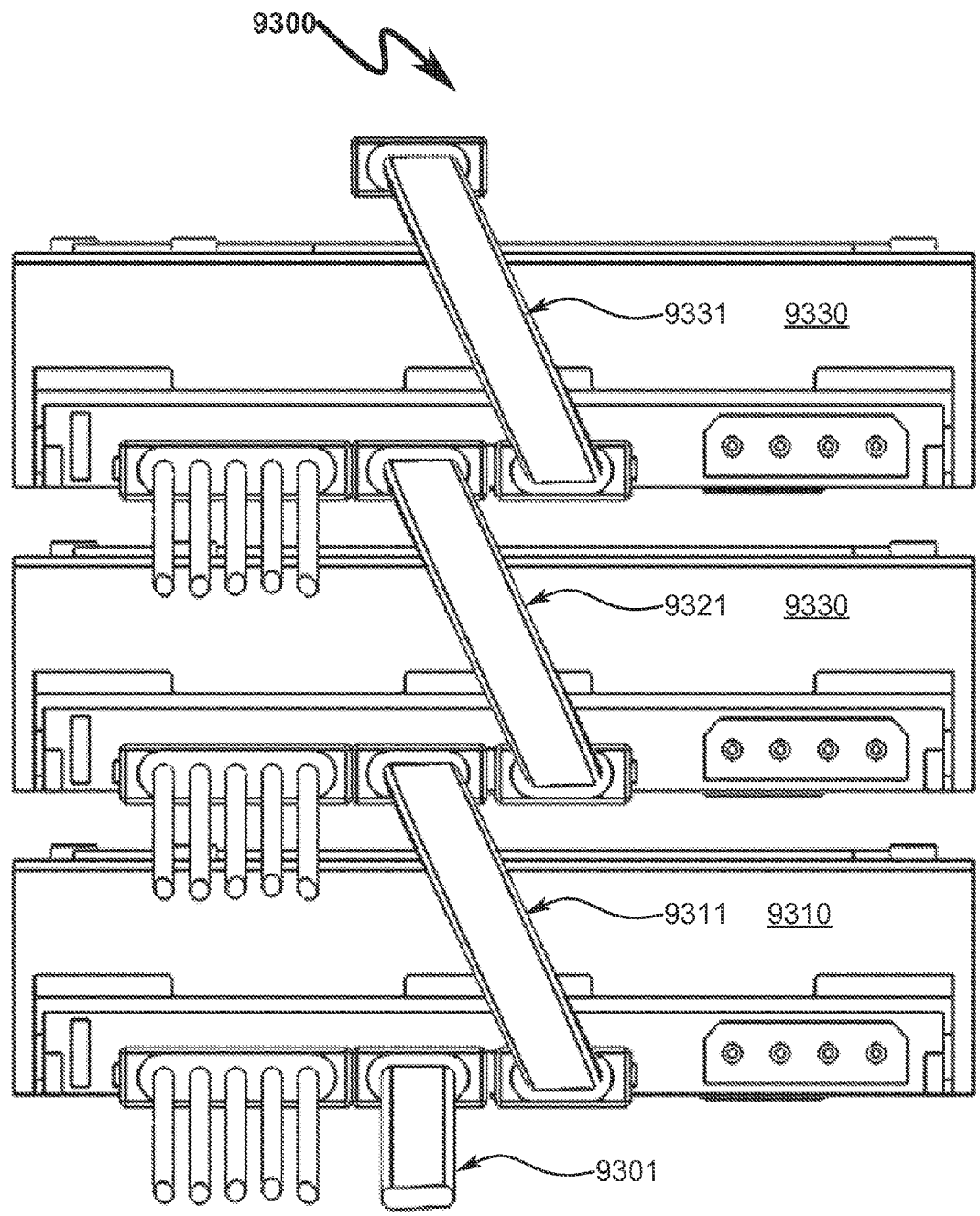
FIG. 93 illustrates an electrical connector back view of a preferred exemplary invention embodiment disk drive array incorporating a SATA electrical interface and PTDDC daisy-chain functionality.
Figure 94:
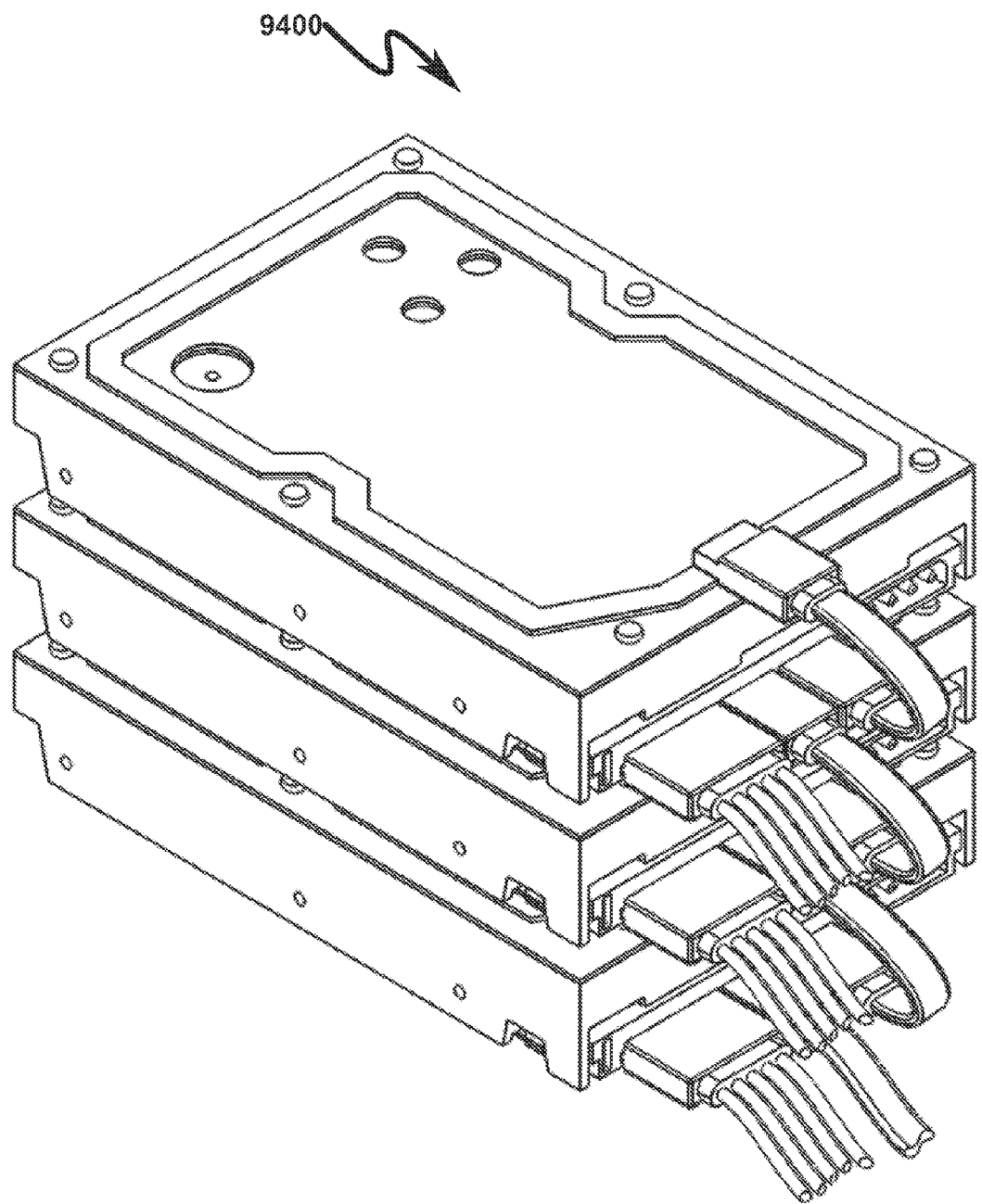
FIG. 94 illustrates a top left back perspective view of a preferred exemplary invention embodiment disk drive array incorporating a SATA electrical interface and PTDDC daisy-chain functionality.
Figure 95:
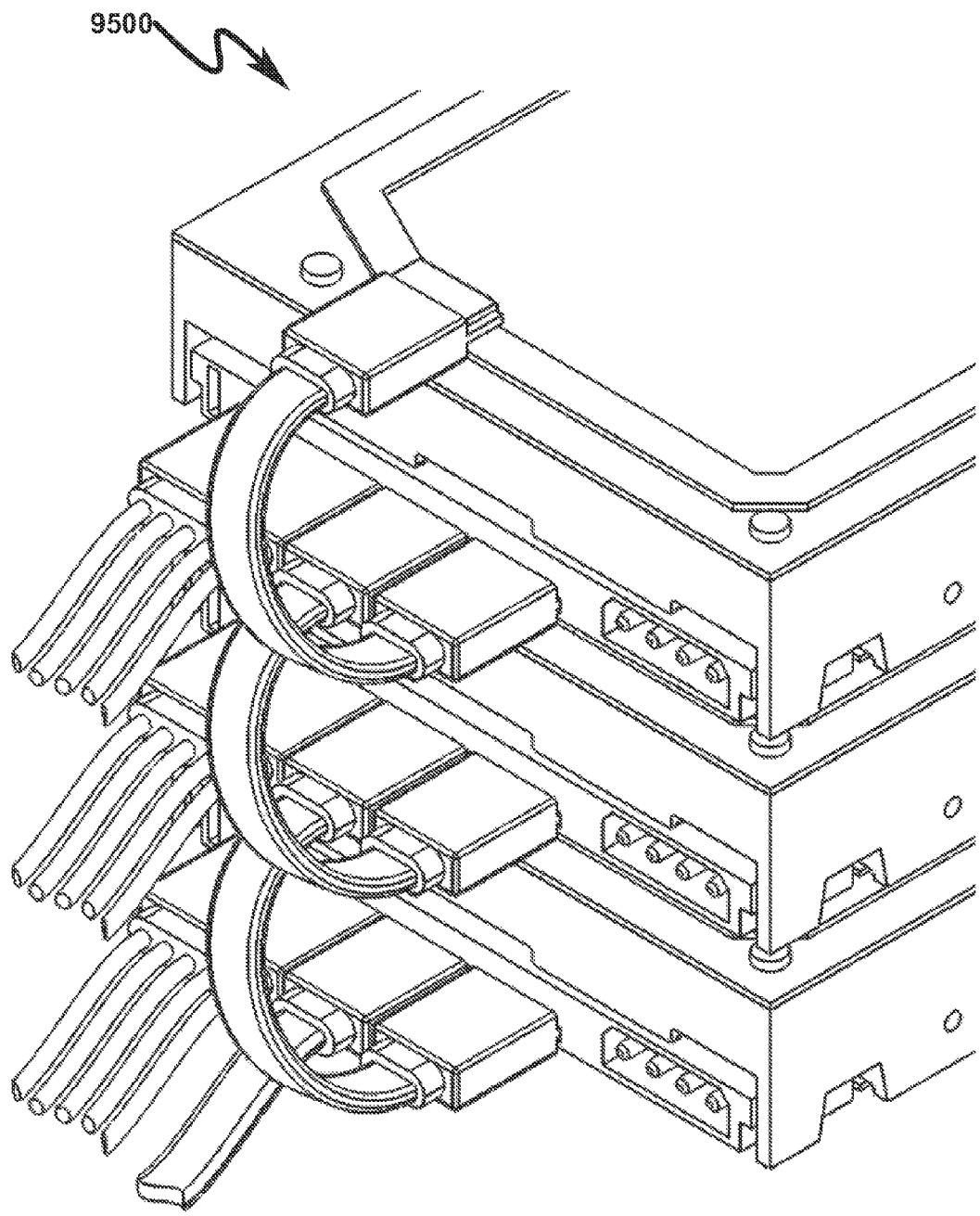
FIG. 95 illustrates a top right back perspective view of a preferred exemplary invention embodiment disk drive array incorporating a SATA electrical interface and PTDDC daisy-chain functionality.

The three-disk daisy-chain example provided in FIG. 93 (9300)-FIG. 96 (9600) cascades three disk drives (9310, 9320, 9330) wherein the first disk drive (9310) communicates with a computer HBA port (not shown) via an incoming HBA/PTI port cable (9301). Pass-thru communication between the first disk drive (9310) and the second disk drive (9320) is accomplished using a first standard SATA cable (9311). Similarly, pass-thru communication between the second disk drive (9320) and the third disk drive (9330) is accomplished using a second standard SATA cable (9321). Expansion to yet a fourth disk drive (not shown) (or any number of other disk drives in the chain) can be accomplished by use of third standard SATA cable (9331). As can be seen from this example, communication between each SATA disk drive occurs between the PTO port of one disk drive to the HBA/PTI port of the subsequent disk drive in the daisy-chain.

Note that this configuration of disk drive hardware fully integrates the daisy-chaining functionality of the PTDDC within the SATA disk drive itself, permitting individual disk drives to be cascaded in large arrays without the need for additional hardware. As mentioned elsewhere in this document and in patent application Ser. No. 13/200,242, appropriate configuration of these disk drives permits their expansion transparent of operating system software restrictions on individual disk drive sizing.

Passive Backplane Storage Array (9700)-(10400)

Figure 97:
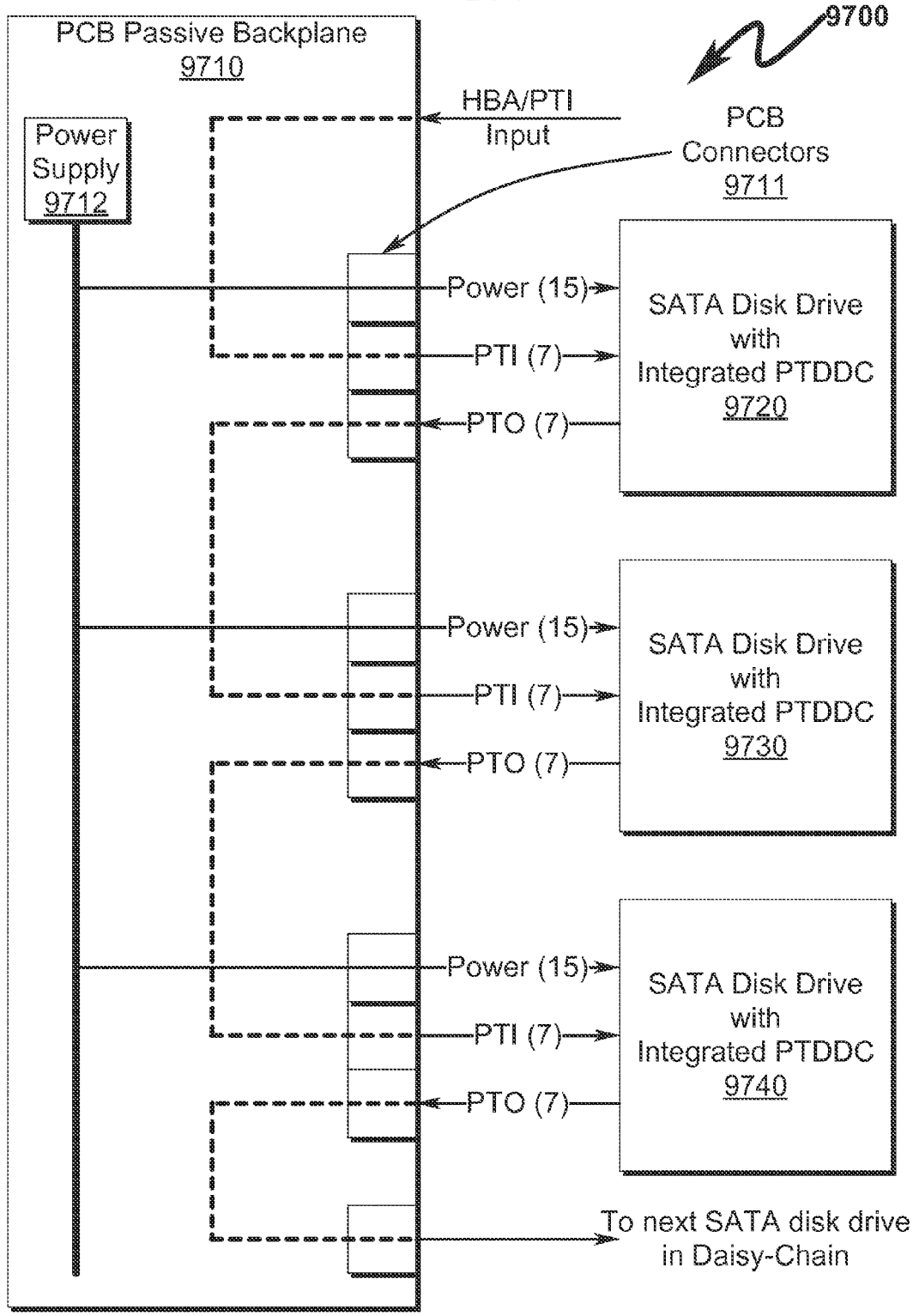
FIG. 97 illustrates a preferred exemplary system embodiment block diagram schematic depicting a PTDDC-enabled SATA disk drive connected in a storage array using a passive PCB backplane.

The SATA disk drives integrating the PTDDC technology as depicted in FIG. 89 (8900)-FIG. 96 (9600) may be easily integrated into a passive backplane configured for rack mounting of disk drives as depicted generally in FIGS. 97 (9700)-(10400). As depicted in FIG. 97 (9700), this configuration schematically can be depicted as a passive PCB backplane (9710) that supplies power (via an optional power supply (9712) and associated power bus) and interconnecting traces that interlink PCB connectors (9711) with individual SATA disk drives (9720, 9730, 9740) configured with integrated PTDDC logic as depicted in FIG. 89 (8900)-FIG. 96 (9600).

Figure 98:
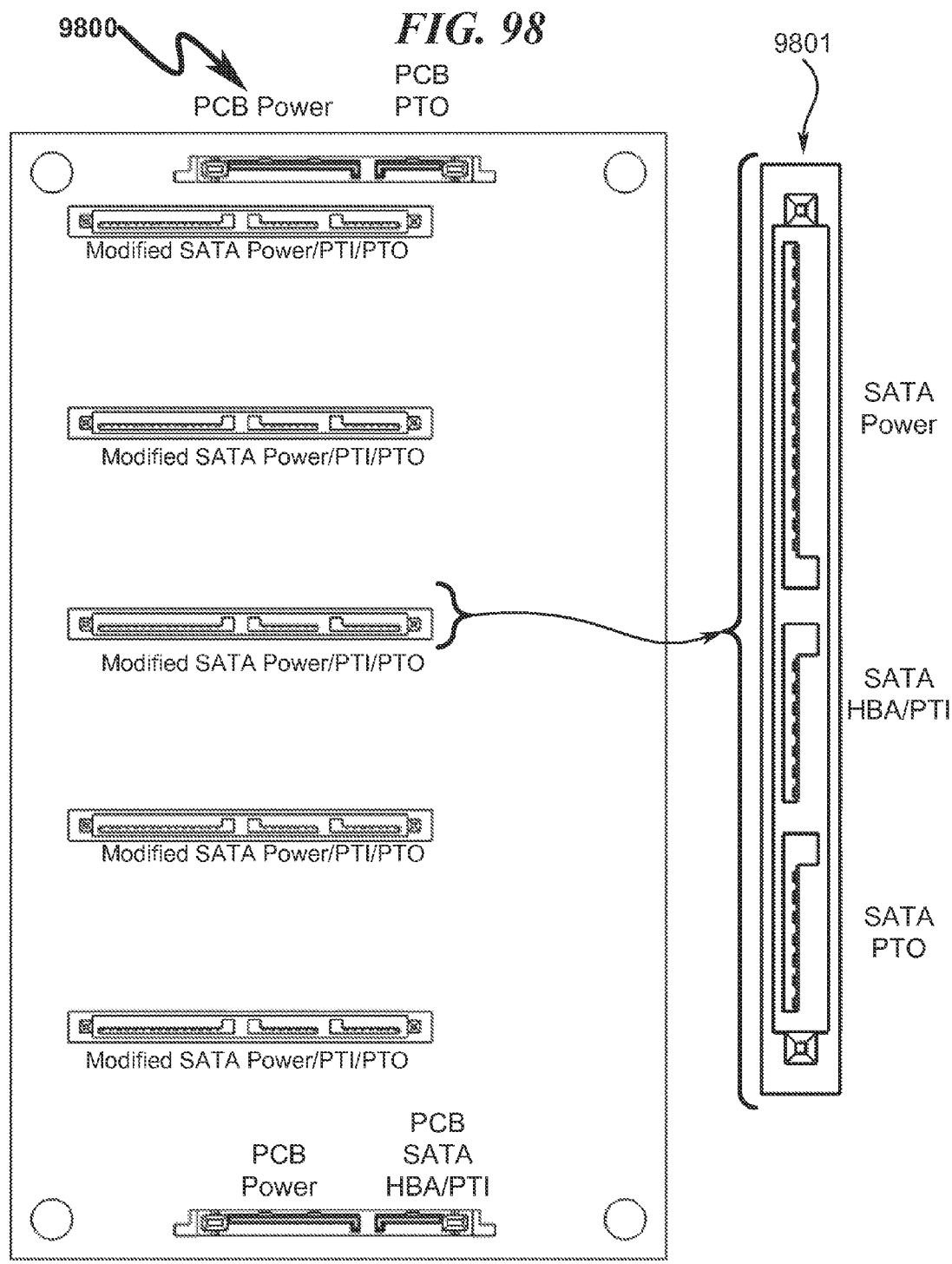
FIG. 98 illustrates a front view of a preferred exemplary system embodiment passive PCB backplane with detail of a modified SATA interface connector.
Figure 99:
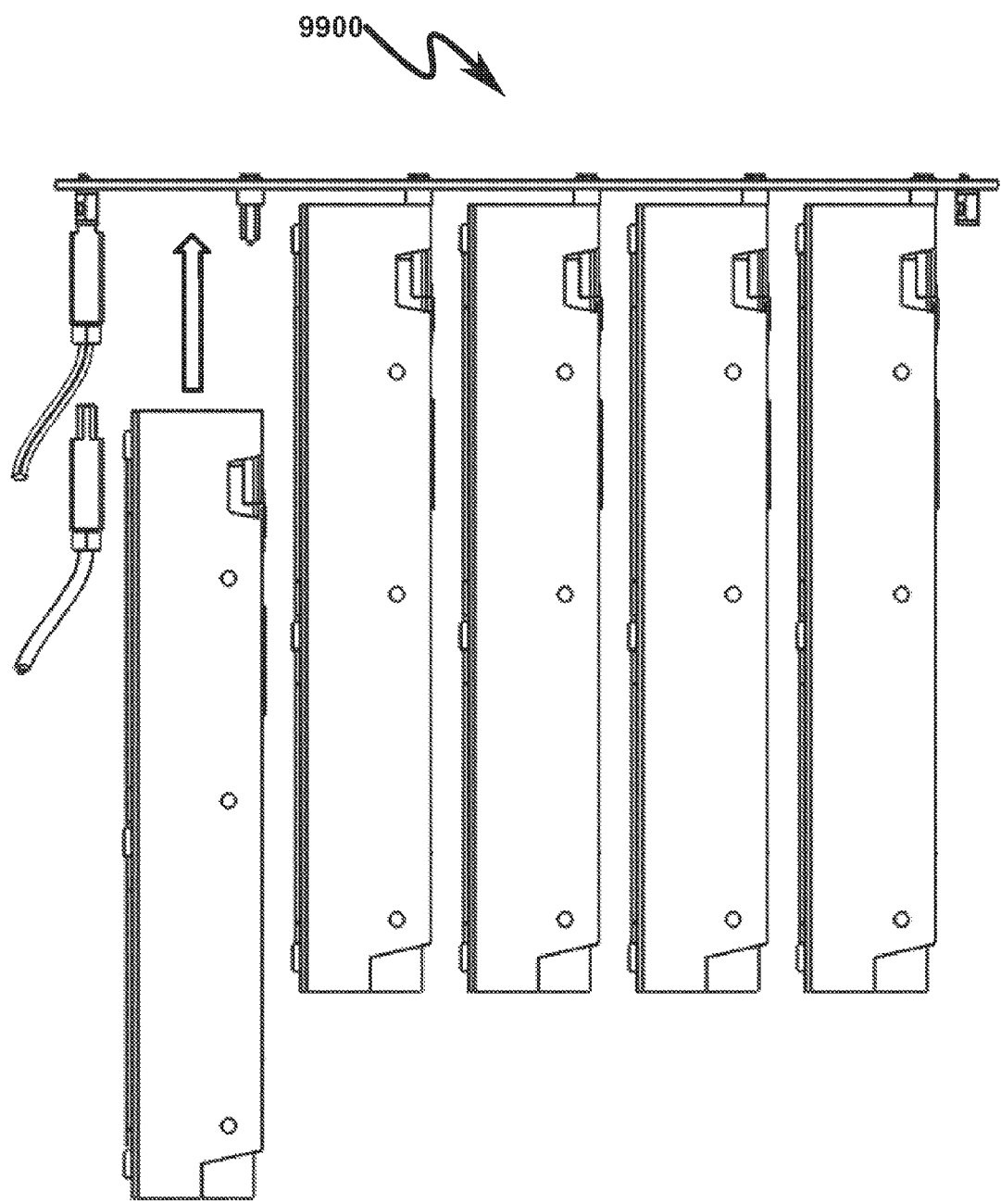
FIG. 99 illustrates a top view of a preferred exemplary system embodiment passive PCB backplane with SATA disk drives installed and one SATA disk drive and SATA power connector positioned for insertion into the backplane.
Figure 100:
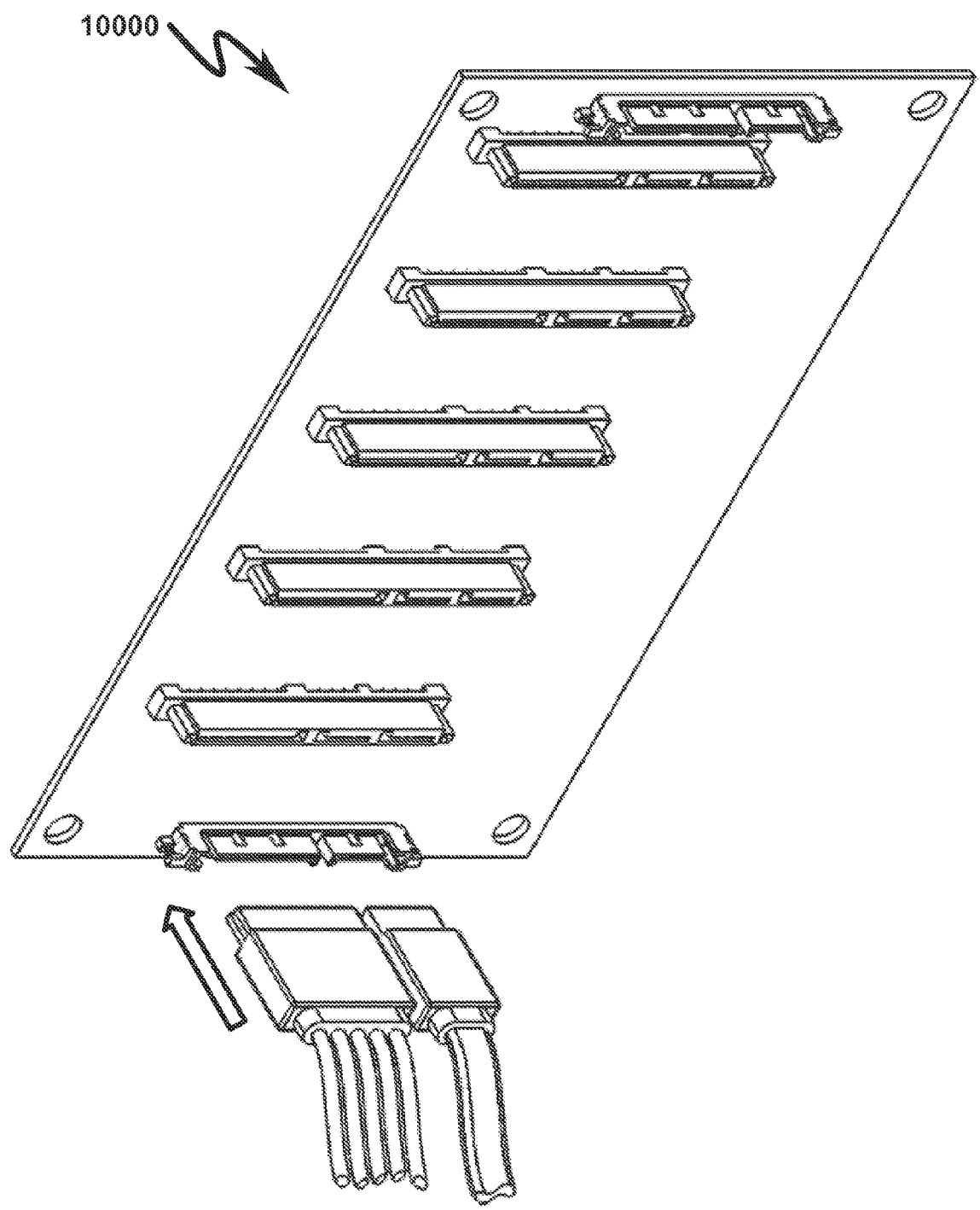
FIG. 100 illustrates a front right perspective view of a preferred exemplary system embodiment passive PCB backplane with SATA power and data cables positioned for insertion into the backplane.
Figure 104:
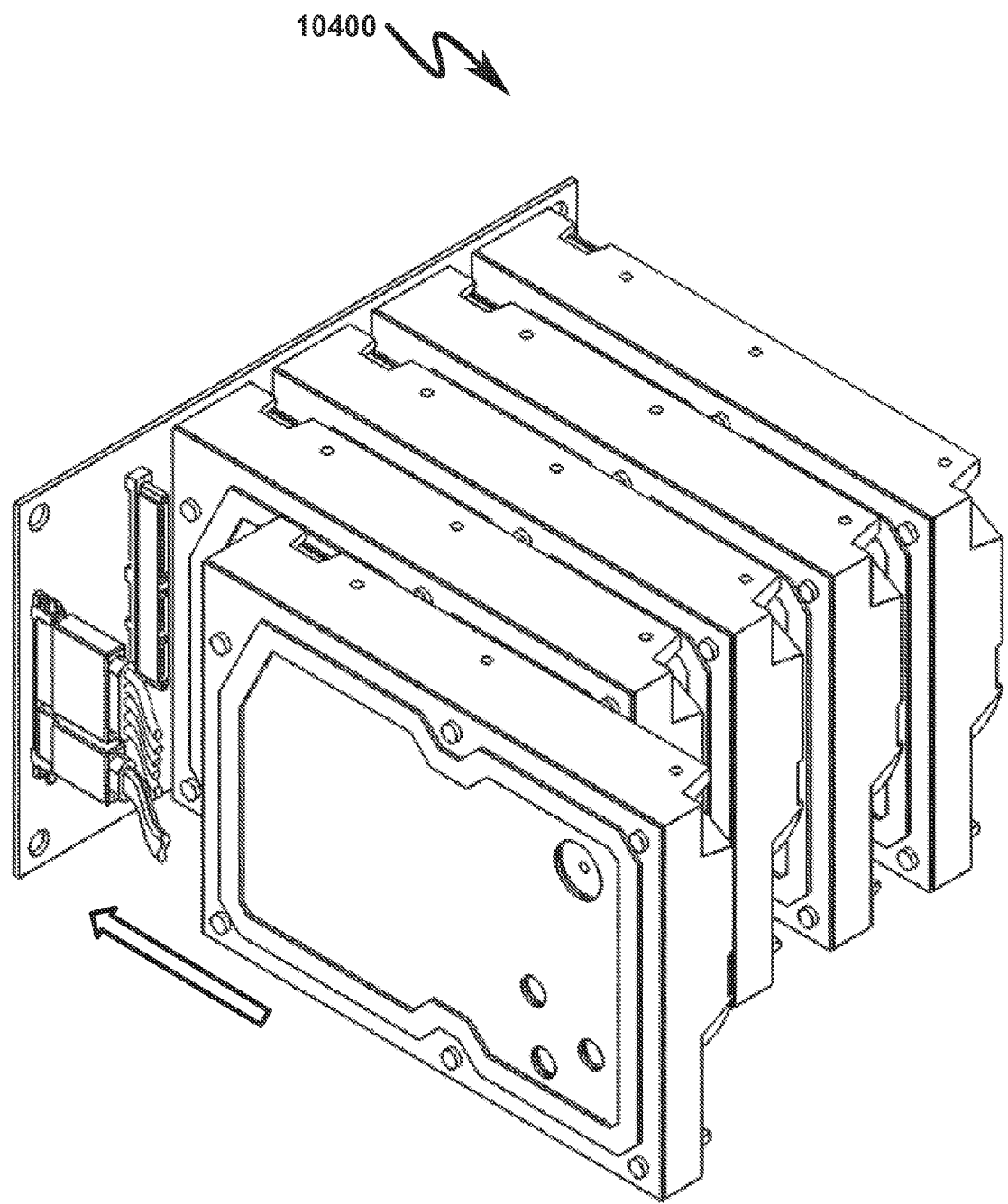
FIG. 104 illustrates a front left perspective view of a preferred exemplary system embodiment passive PCB backplane with multiple PTDDC-enabled SATA disk drives inserted into the PCB backplane and the first SATA disk drive removed for connector viewing.

An exemplary embodiment of this mechanical structure using this passive backplane technique is depicted in FIG. 98 (9800)-FIG. 104 (10400). It should be noted that since the PTDDC logic is integrated into each SATA disk drive there is no active circuitry on the PCB backplane (9710) with the possible exception of optional power supply (9712) integration. This makes for a substantially more reliable disk storage array system than systems that integrate logic onto the backplane of the PCB. However, it should be noted that this configuration restricts the placement of PTDDC-enabled SATA disk drives to consecutive adjacent slots within the PCB backplane, as there is no logic to jumper signaling from one empty SATA slot to the next slot, as all pass-thru functionality is contained in the PTDDC logic within each SATA disk drive.

As depicted in FIG. 97 (9700), the PCB traces connecting each modified SATA disk drive connector slot only comprise power supply connections (standard 15-pin SATA power connector), a HBA/PTI SATA connection (7-pin SATA signaling connector), and a PTO SATA connection (7-pin SATA signaling connector). The 7-pin SATA connectors comprise two differential pairs (A+; A−; B+; B−) and a ground conductor, and the 15-pin SATA power connector comprises power (3.3V, 5.0V, 12.0V, ground) and device activity signals/disable staggered spinup signals (DAS/DSS). Details of the modified SATA interface connector are depicted in FIG. 98 (9800).

Figure 1:
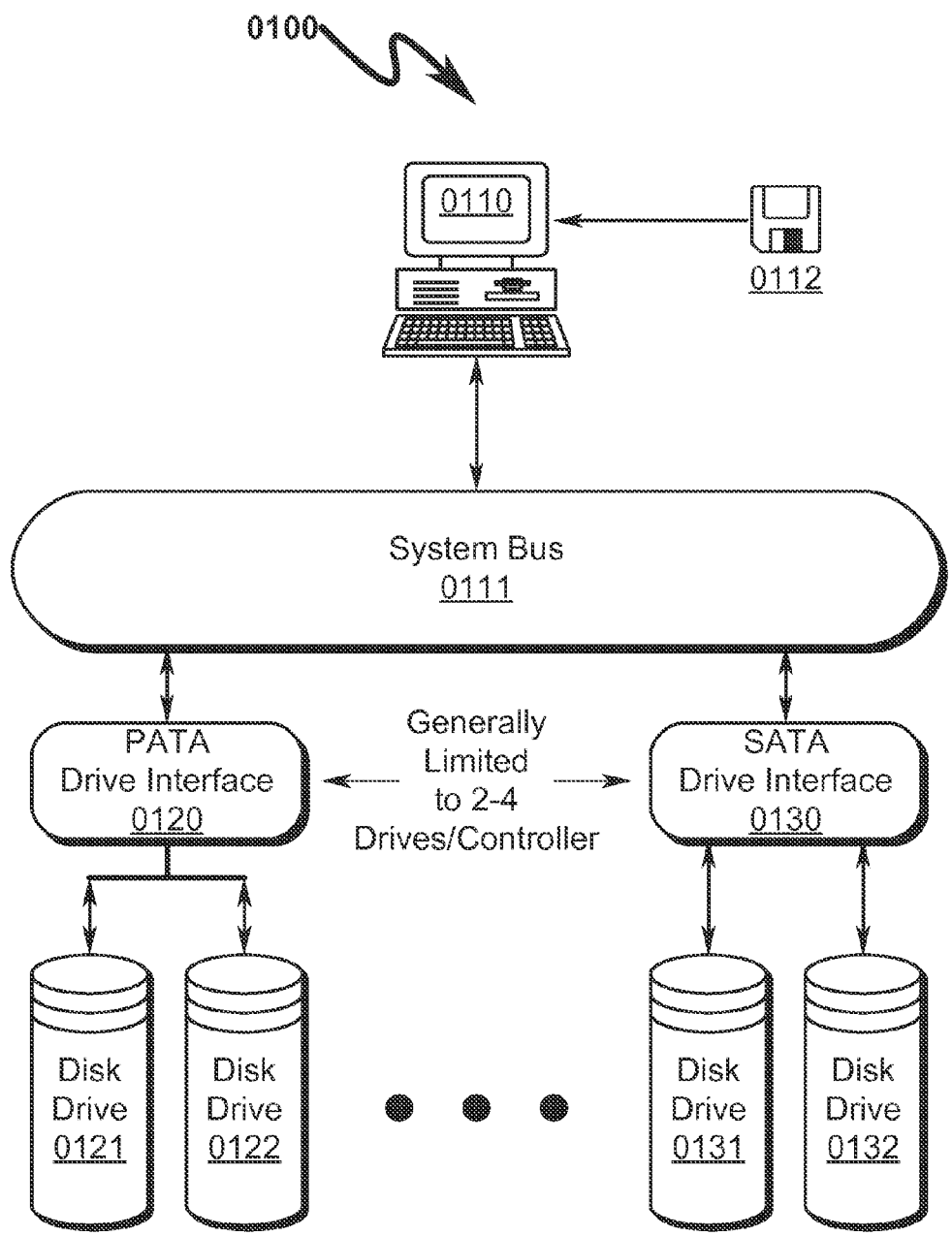
FIG. 1 illustrates a prior art conventional data storage architecture.
Figure 2:
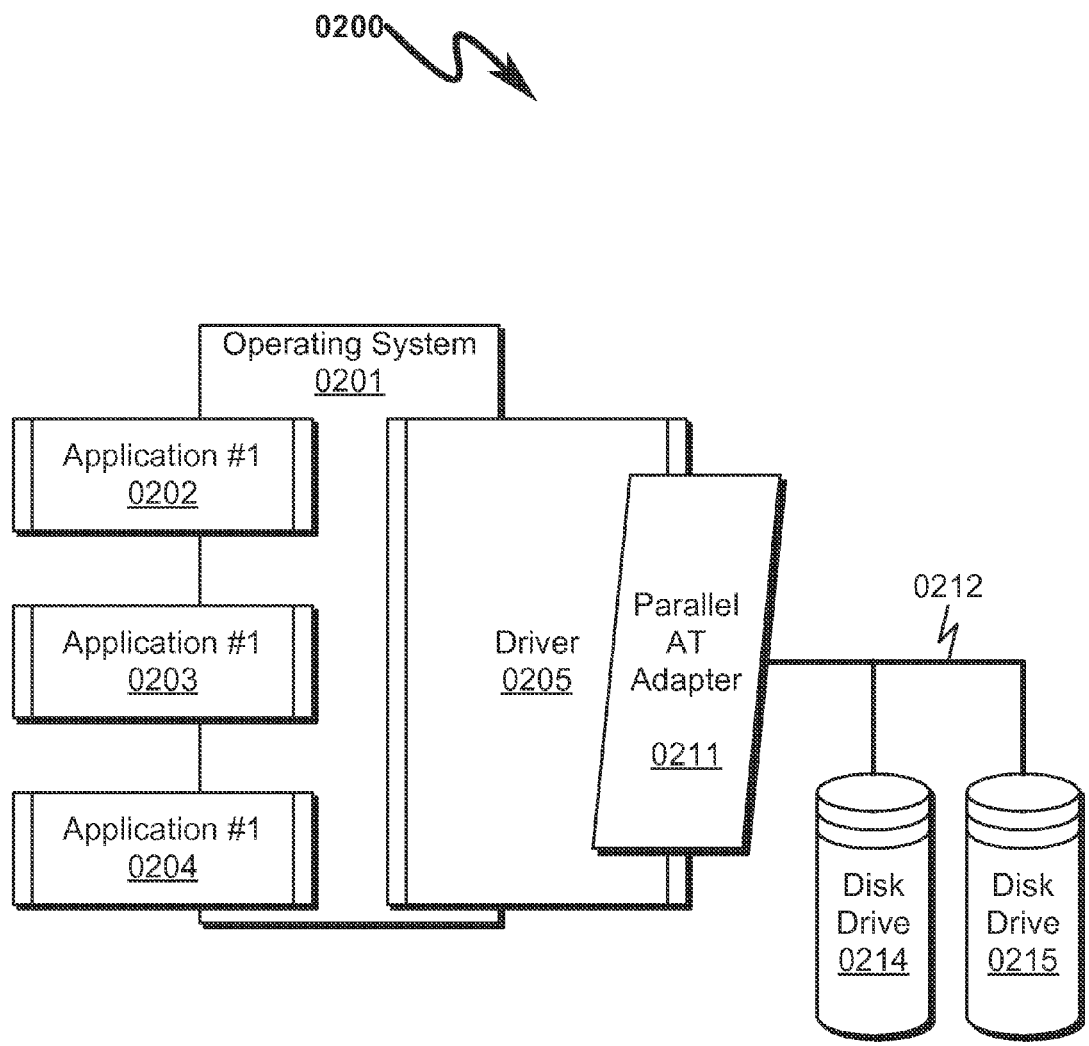
FIG. 2 illustrates a prior art parallel ATA (PATA) data storage architecture.
Figure 3:
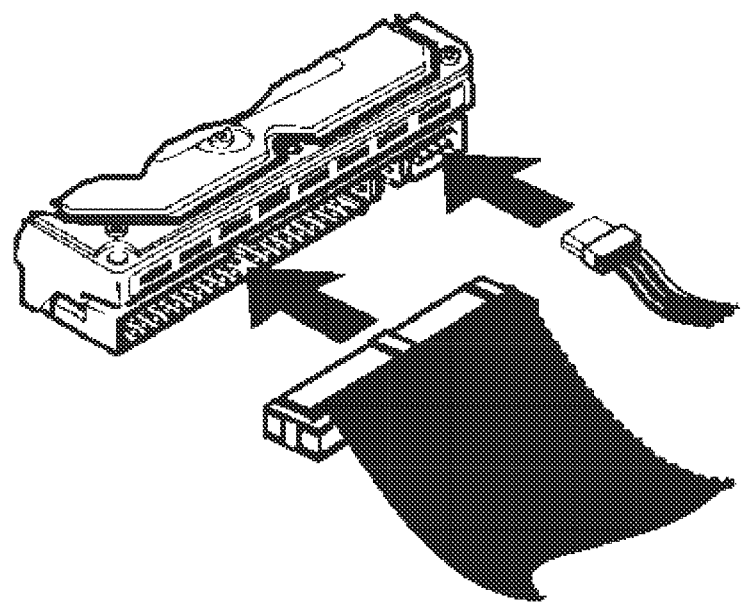
FIG. 3 illustrates a prior art parallel ATA (PATA) data storage architecture physical interface.
Figure 4:
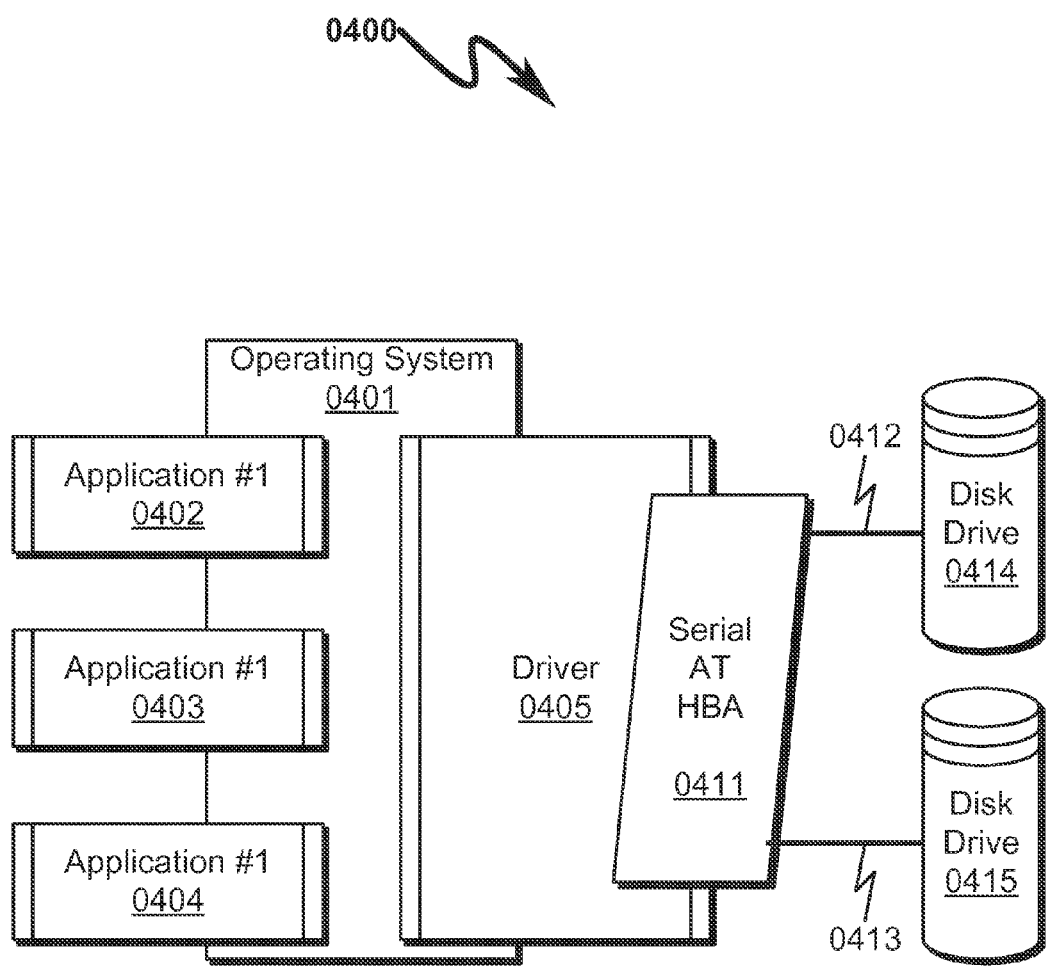
FIG. 4 illustrates a prior art serial ATA (SATA) data storage architecture.
Figure 5:
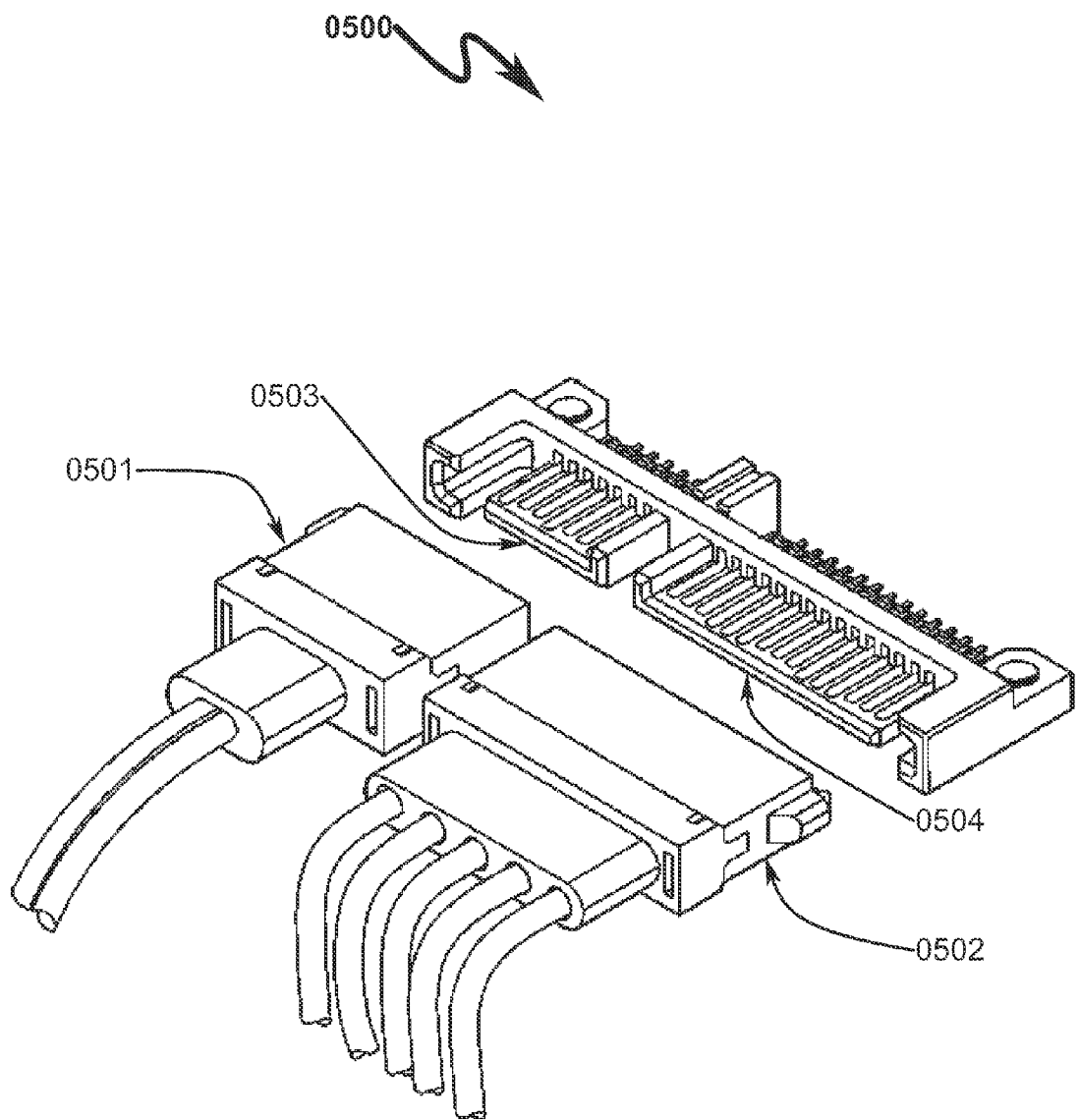
FIG. 5 illustrates a prior art serial ATA (SATA) data storage architecture physical interface.

The front PCB view of FIG. 98 (9800) and associated SATA connector detail (9801) illustrate the use of a modified SATA PCB interface connector (9801) that includes power, HBA/PTI SATA input (corresponding to the traditional SATA interface port), and an additional PTO SATA interface that permits connection to the HBA/PTI port of the next SATA disk drive in the daisy-chain. It should be noted that while this connector is considered optimal, other variations can be implemented wherein a standard power/SATA connector combination (as depicted in FIG. 5 (0500, 0503, 0504) or in FIG. 65 (6500, 6504)) may be utilized in conjunction with a single SATA data interface connector to perform the functions described herein. In this circumstance the mechanical form of the modified SATA disk drive interface (FIG. 89 (8900, 8908, 8916)) will be modified accordingly. One skilled in the art will recognize that this modification can be made with ease given the teachings of the present invention as depicted in FIG. 89 (8900) and FIG. 98 (9800).

Figure 101:
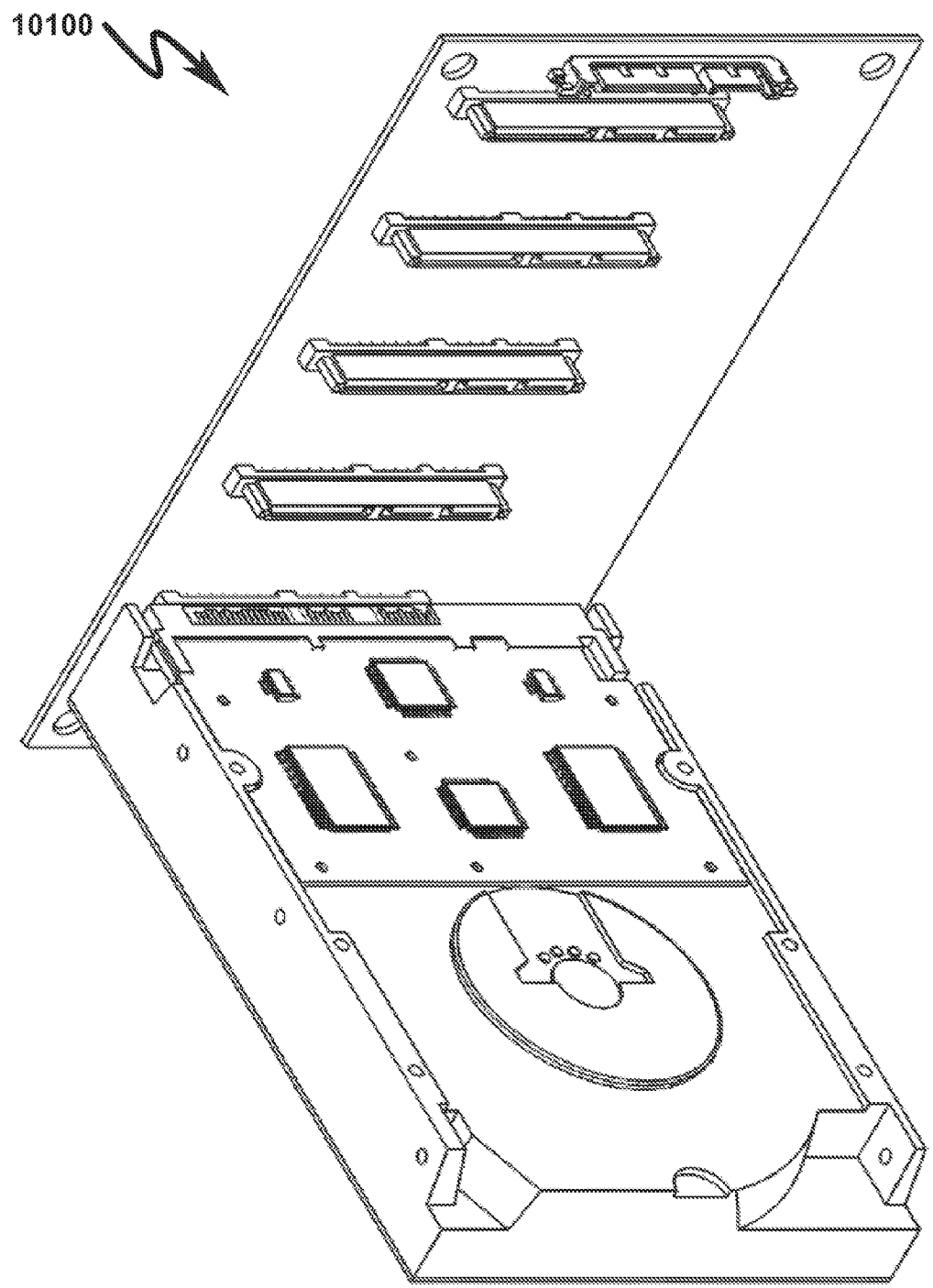
FIG. 101 illustrates a front right perspective view of a preferred exemplary system embodiment passive PCB backplane with a PTDDC-enabled SATA disk drive positioned for insertion into the PCB backplane.
Figure 102:
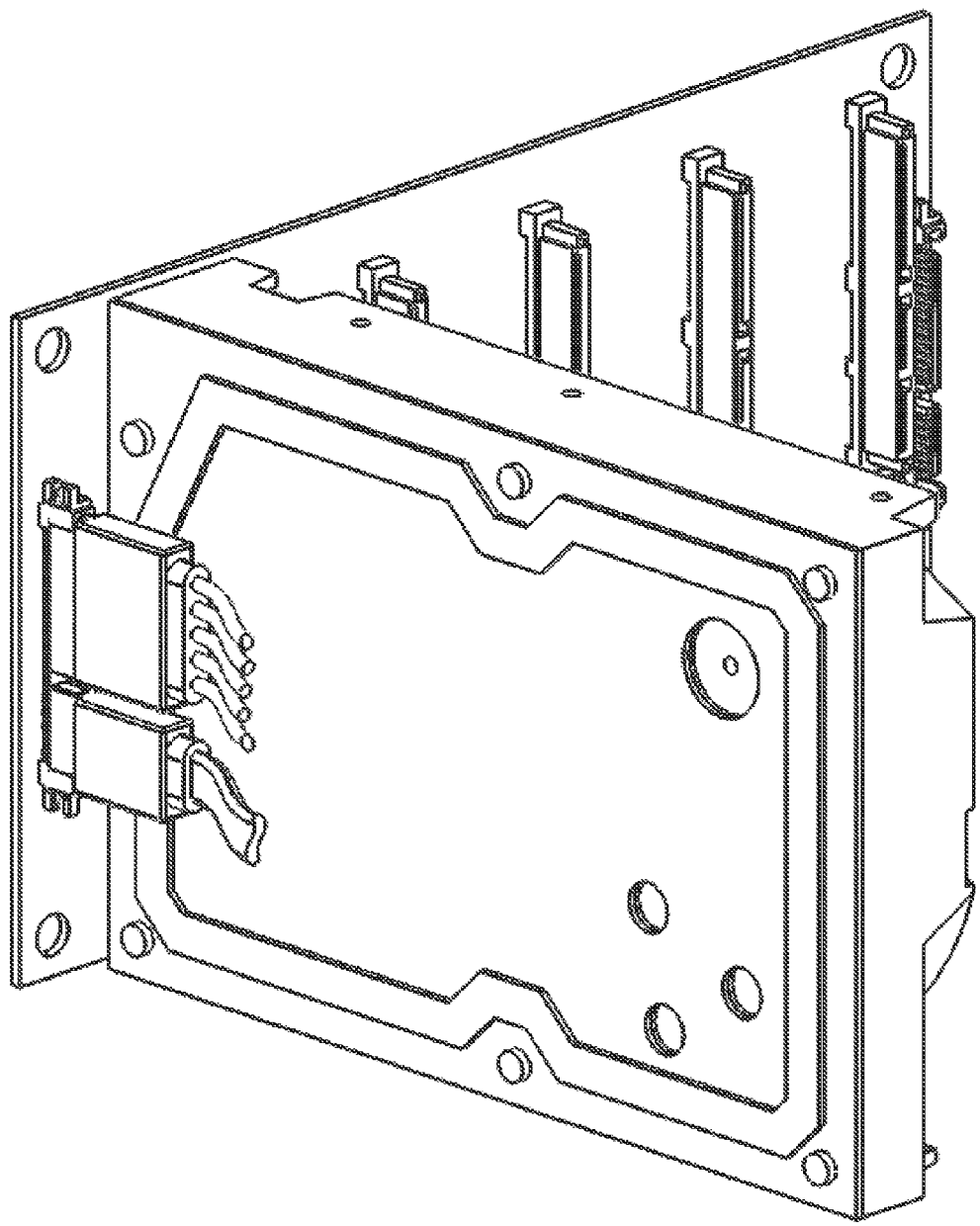
FIG. 102 illustrates a front left perspective view of a preferred exemplary system embodiment passive PCB backplane with a PTDDC-enabled SATA disk drive inserted into the PCB backplane.
Figure 103:
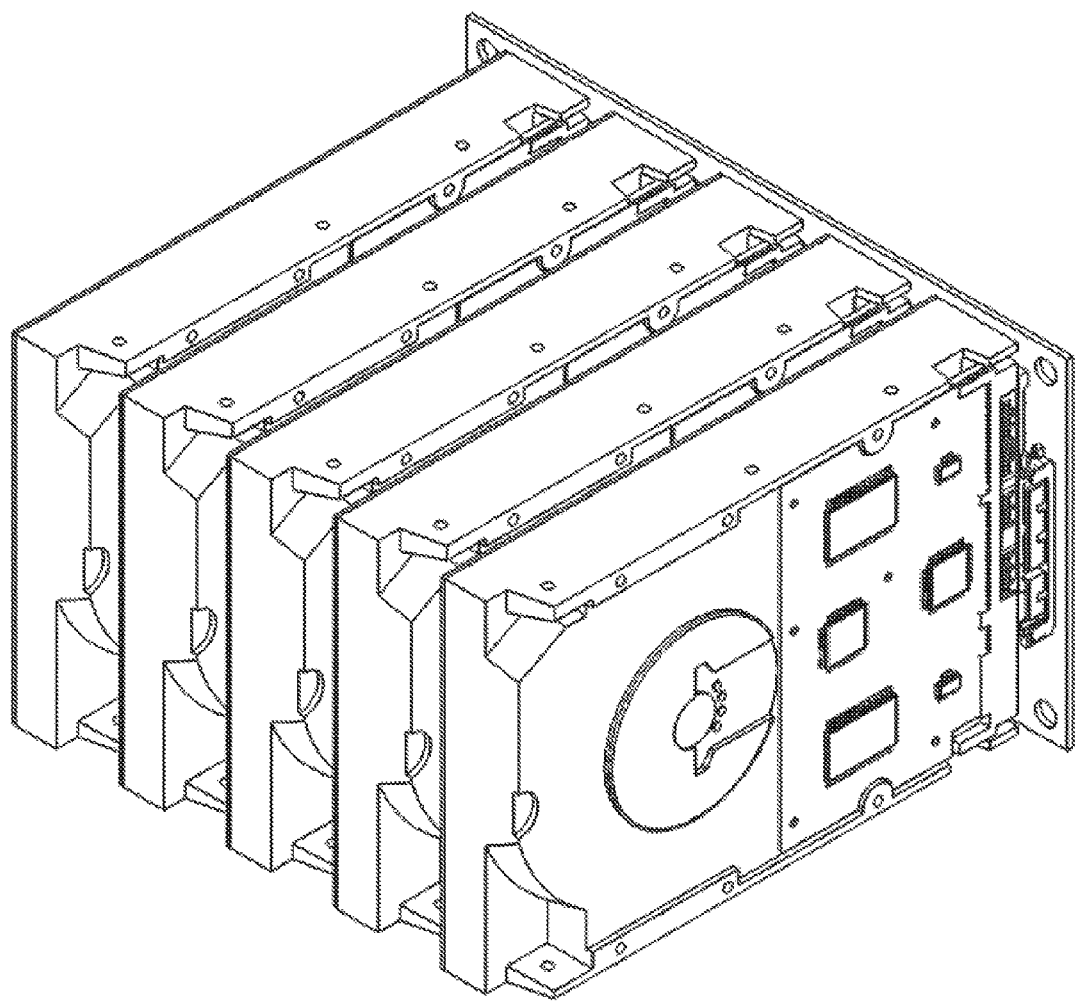
FIG. 103 illustrates a front right perspective view of a preferred exemplary system embodiment passive PCB backplane with multiple PTDDC-enabled SATA disk drives inserted into the PCB backplane.

FIG. 101 (10100)-FIG. 104 (10400) depict various views of the passive PCB backplane with one or more modified PTDDC-enabled SATA disk drives inserted into the passive PCB backplane or removed for viewing the modified SATA interface connector arrangement. Note that individual traces between the SATA connectors are not shown, as these will typically be contained within inner PCB layers to improve signal integrity. However, since the SATA data signals need only traverse from one SATA connector to another SATA connector (a very short distance), there is little need for robust signal protection in this invention embodiment. Also, it should be noted that external power and SATA connectors that are shown on the PCB for illustration purposes and may comprise a wide variety of connectors that interface the passive PTI/PTO PTDDC daisy-chain of the SATA disk drives installed in the backplane. These connector configurations will vary widely based on individual application of this exemplary embodiment.

Semi-Passive Backplane Storage Array (10500)-(11200)

Figure 105:
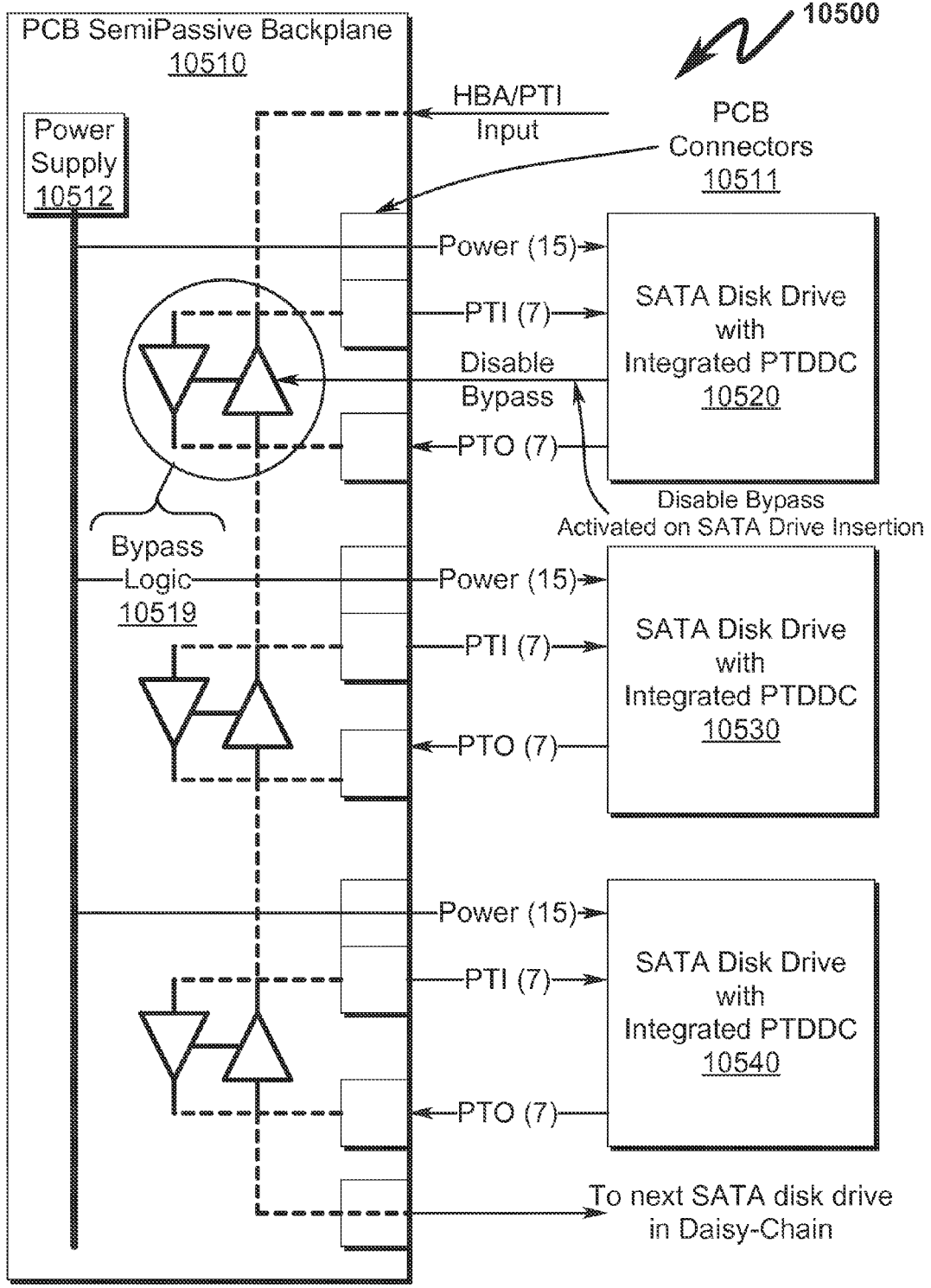
FIG. 105 illustrates a preferred exemplary system embodiment block diagram schematic depicting a PTDDC-enabled SATA disk drive connected in a storage array using a semi-passive PCB backplane.

The SATA disk drives integrating the PTDDC technology as depicted in FIG. 89 (8900)-FIG. 96 (9600) may be easily integrated into a semi-passive backplane configured for rack mounting of disk drives as depicted generally in FIGS. 105 (10500)-(11200). As depicted in FIG. 105 (10500), this configuration schematically can be depicted as a semi-passive PCB backplane (10510) that supplies power (via an optional power supply (10512) and associated power bus) and interconnecting traces with bypass logic (10519) that interlink PCB connectors (10511) with individual SATA disk drives (10520, 10530, 10540) configured with integrated PTDDC logic as depicted in FIG. 89 (8900)-FIG. 96 (9600).

Figure 106:
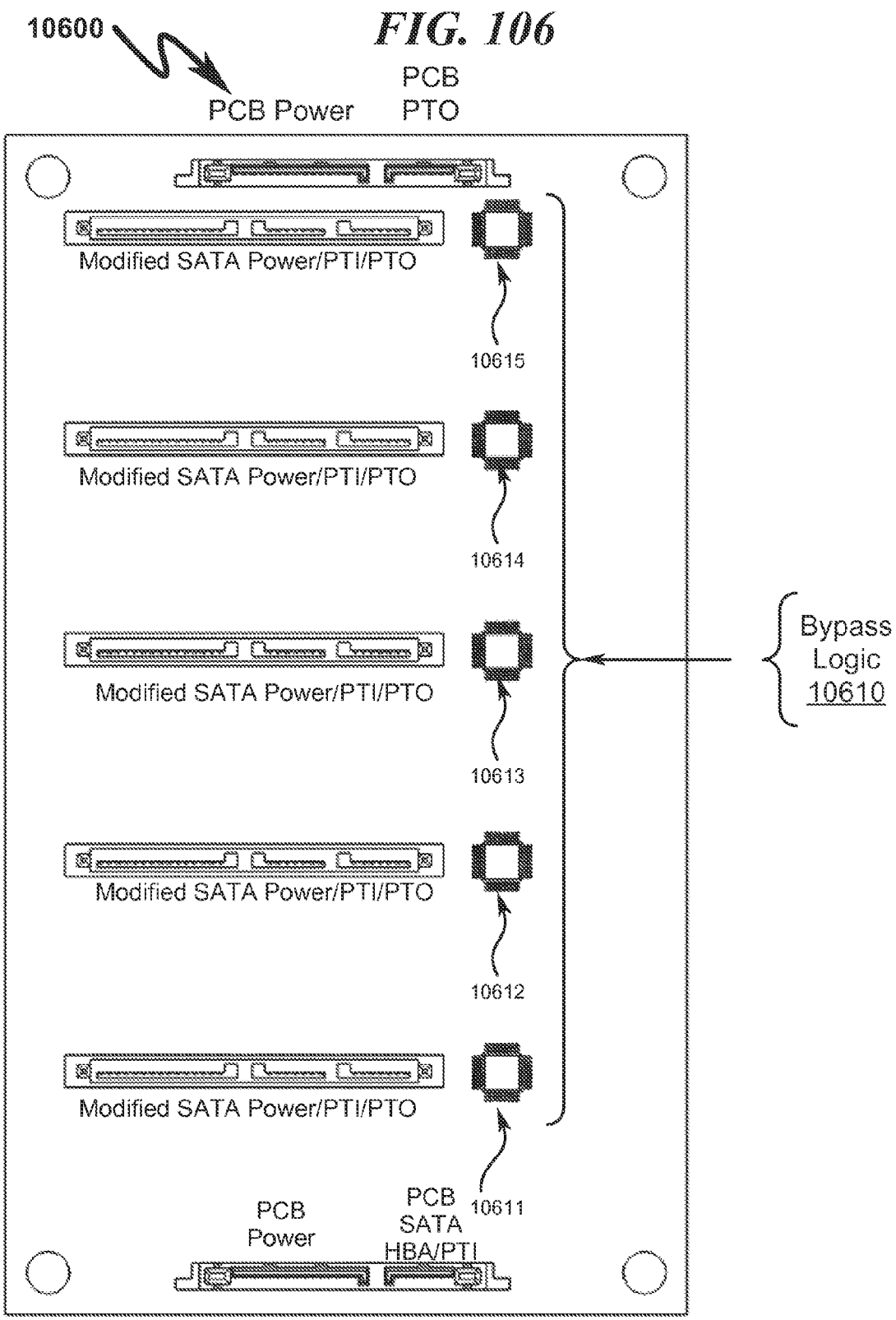
FIG. 106 illustrates a front view of a preferred exemplary system embodiment semi-passive PCB backplane with detail of a modified SATA interface connector.
Figure 107:
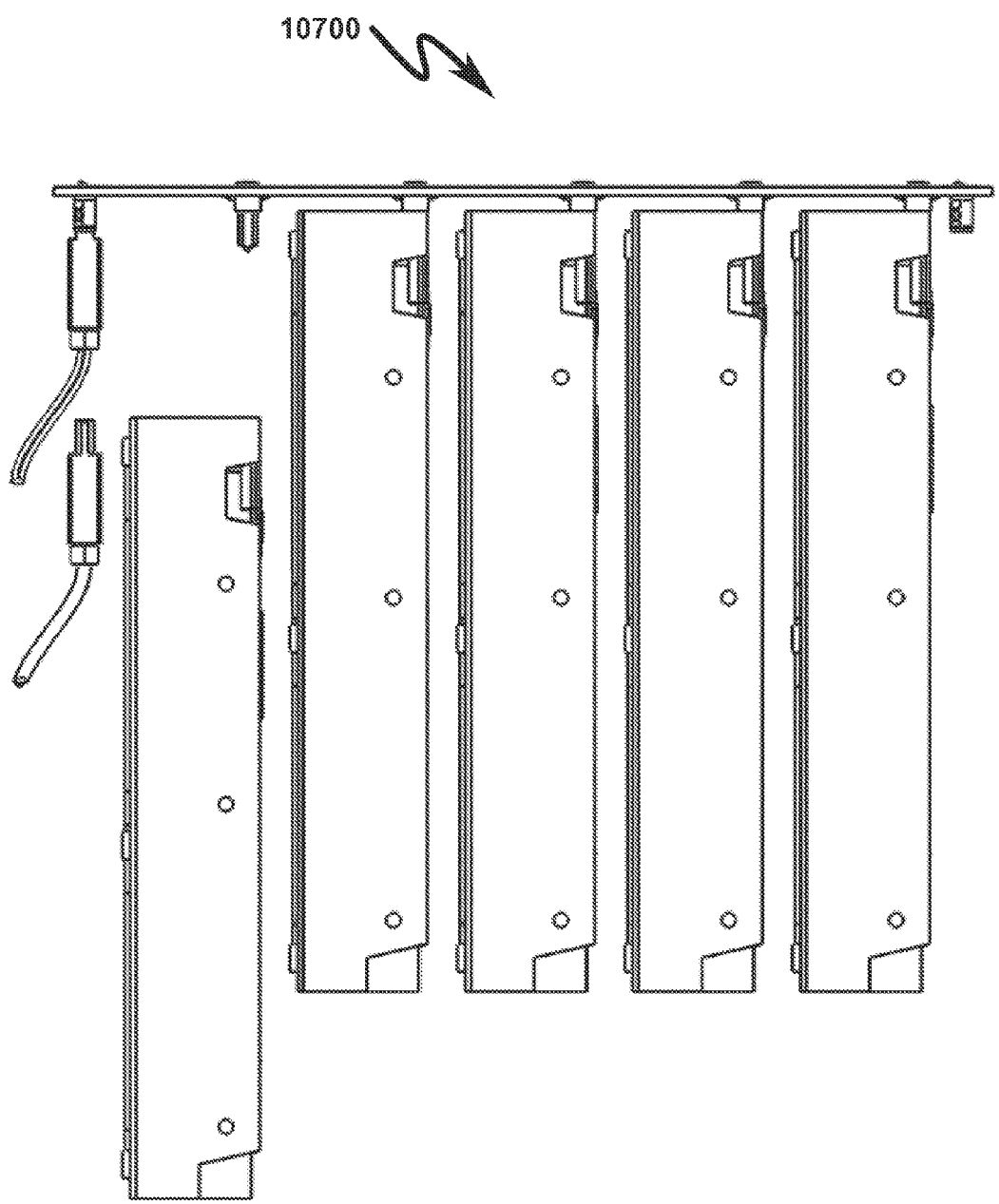
FIG. 107 illustrates a top view of a preferred exemplary system embodiment semi-passive PCB backplane with SATA disk drives installed and one SATA disk drive and SATA power connector positioned for insertion into the backplane.
Figure 108:
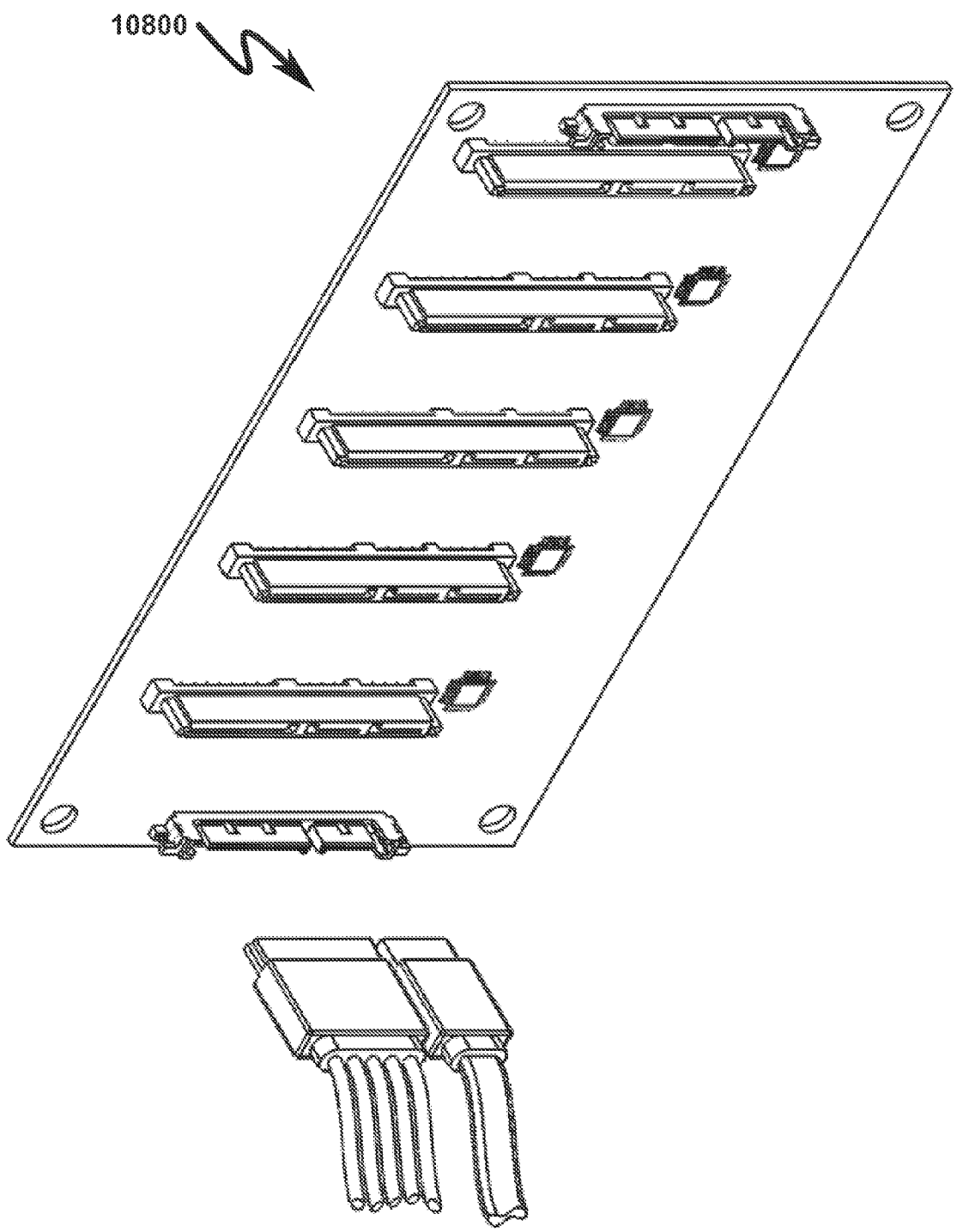
FIG. 108 illustrates a front right perspective view of a preferred exemplary system embodiment semi-passive PCB backplane with SATA power and data cables positioned for insertion into the backplane.
Figure 109:
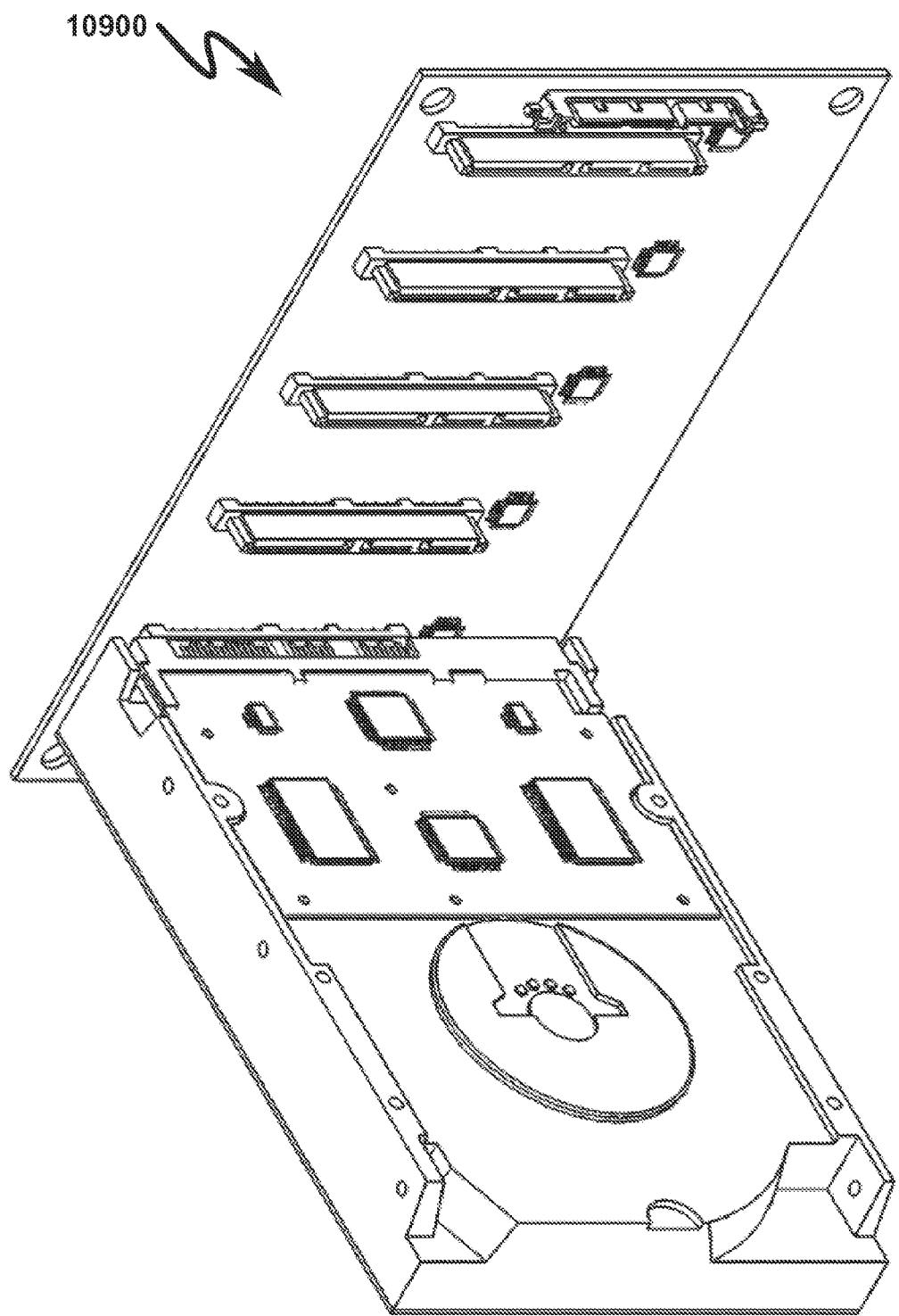
FIG. 109 illustrates a front right perspective view of a preferred exemplary system embodiment semi-passive PCB backplane with a PTDDC-enabled SATA disk drive positioned for insertion into the PCB backplane.
Figure 110:
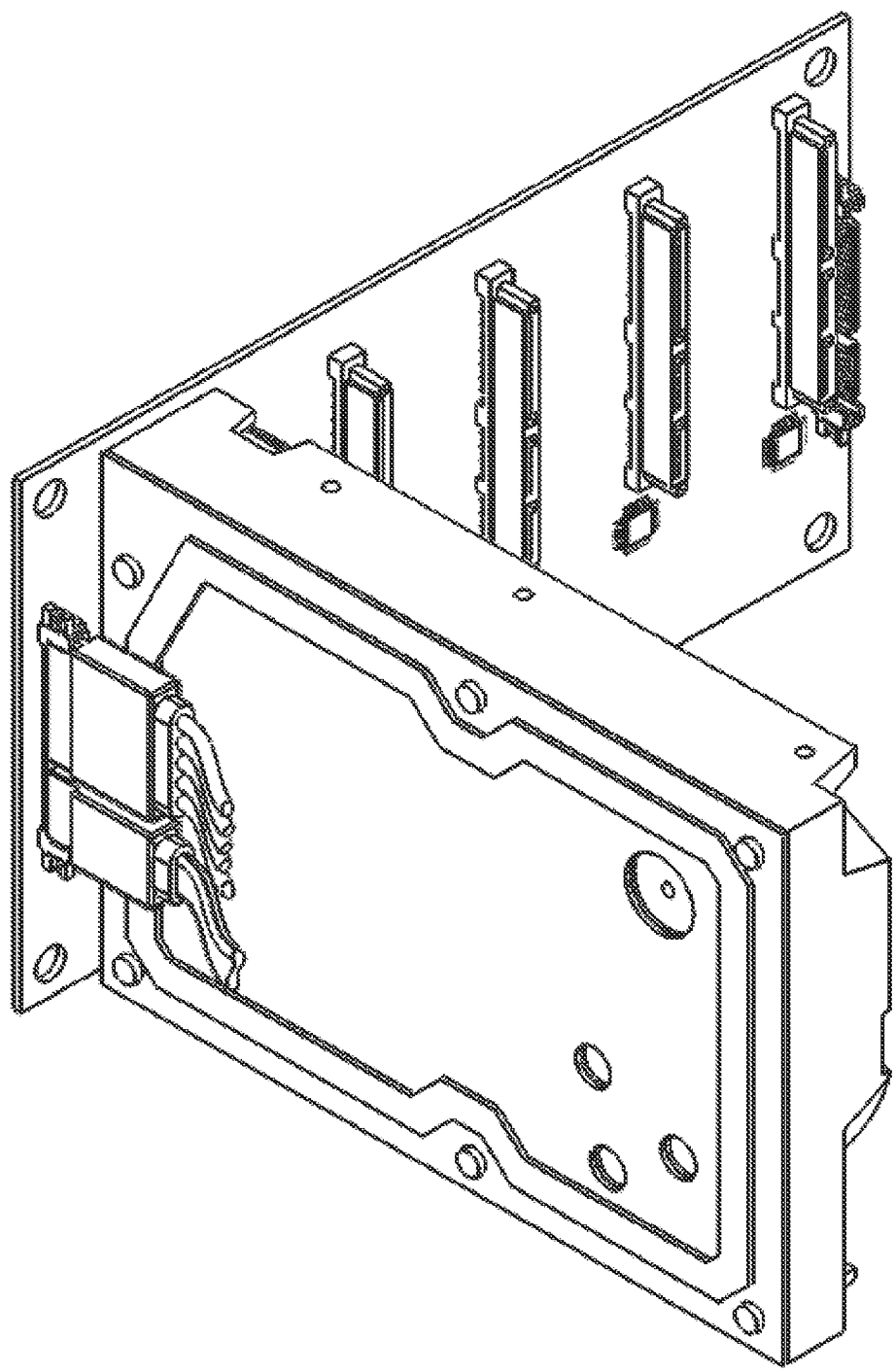
FIG. 110 illustrates a front left perspective view of a preferred exemplary system embodiment semi-passive PCB backplane with a PTDDC-enabled SATA disk drive inserted into the PCB backplane.
Figure 111:
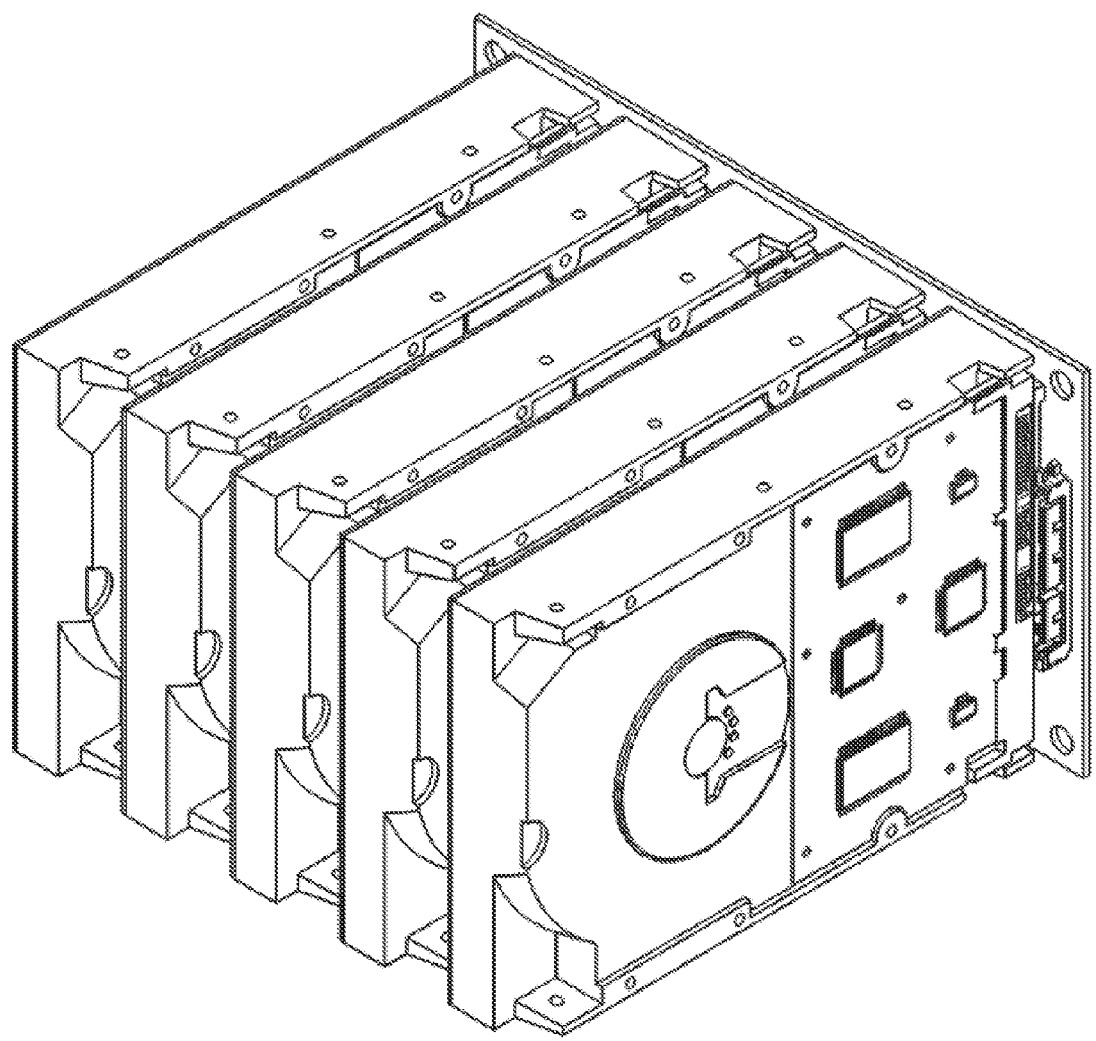
FIG. 111 illustrates a front right perspective view of a preferred exemplary system embodiment semi-passive PCB backplane with multiple PTDDC-enabled SATA disk drives inserted into the PCB backplane.
Figure 112:
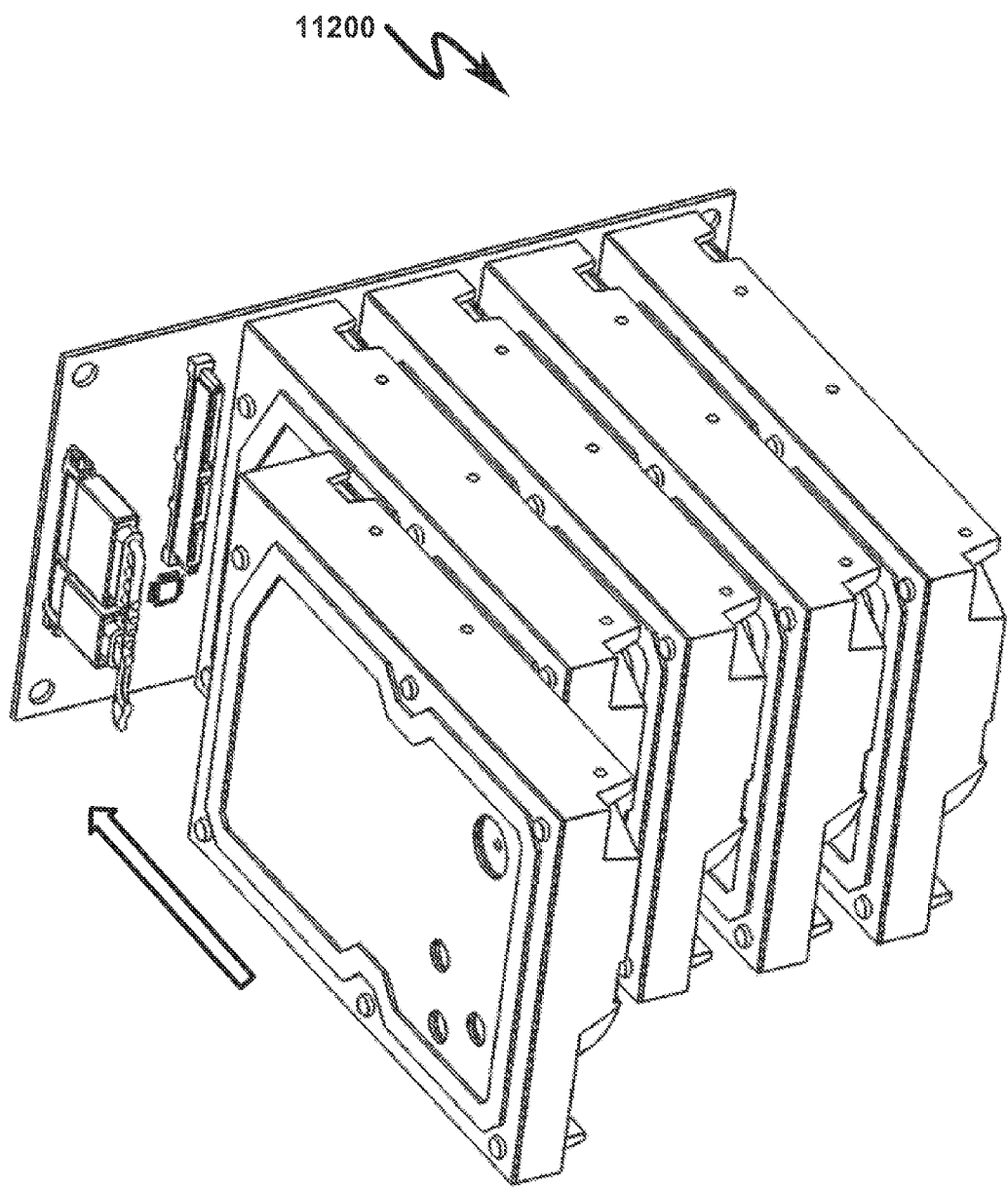
FIG. 112 illustrates a front left perspective view of a preferred exemplary system embodiment semi-passive PCB backplane with multiple PTDDC-enabled SATA disk drives inserted into the PCB backplane and the first SATA disk drive removed for connector viewing.

An exemplary embodiment of this mechanical structure using this semi-passive backplane technique is depicted in FIG. 106 (10600)-FIG. 112 (11200). It should be noted that this semi-passive PCB backplane (10510) differs from that of the passive backplane depicted in FIG. 97 (9700) in that a small amount of bypass logic (10519) is incorporated into the backplane to permit bypass of an individual SATA disk drive slot when an individual PTDDC-enabled SATA disk drive is not installed in the semi-passive PCB backplane (10510). This bypass logic is very simple, highly reliable, and thus allows the semi-passive PCB backplane (10510) to be inexpensively constructed with minimal circuitry. An additional interface connector on the SATA drive may control the disabling of the bypass logic (10519) or this may be accomplished using an optical detector or other similar means to discern when the SATA disk drive is installed into the semi-passive PCB backplane (10510).

Finally, it should be noted that this configuration does not restrict the placement of PTDDC-enabled SATA disk drives to consecutive adjacent slots within the PCB backplane, as the PCB backplane bypass logic automatically jumpers signaling from one empty SATA slot to the next slot when a PTDDC-enabled SATA disk drive is not installed in the system. When a PTDDC-enabled SATA disk drive is installed in the system as depicted, all PTDDC daisy-chaining functionality is enabled to permit the entire disk array to appear as one large disk drive to the incoming HBA/PTI input port.

Active PTDDC Backplane Storage Array (11300)-(12000)

Figure 113:
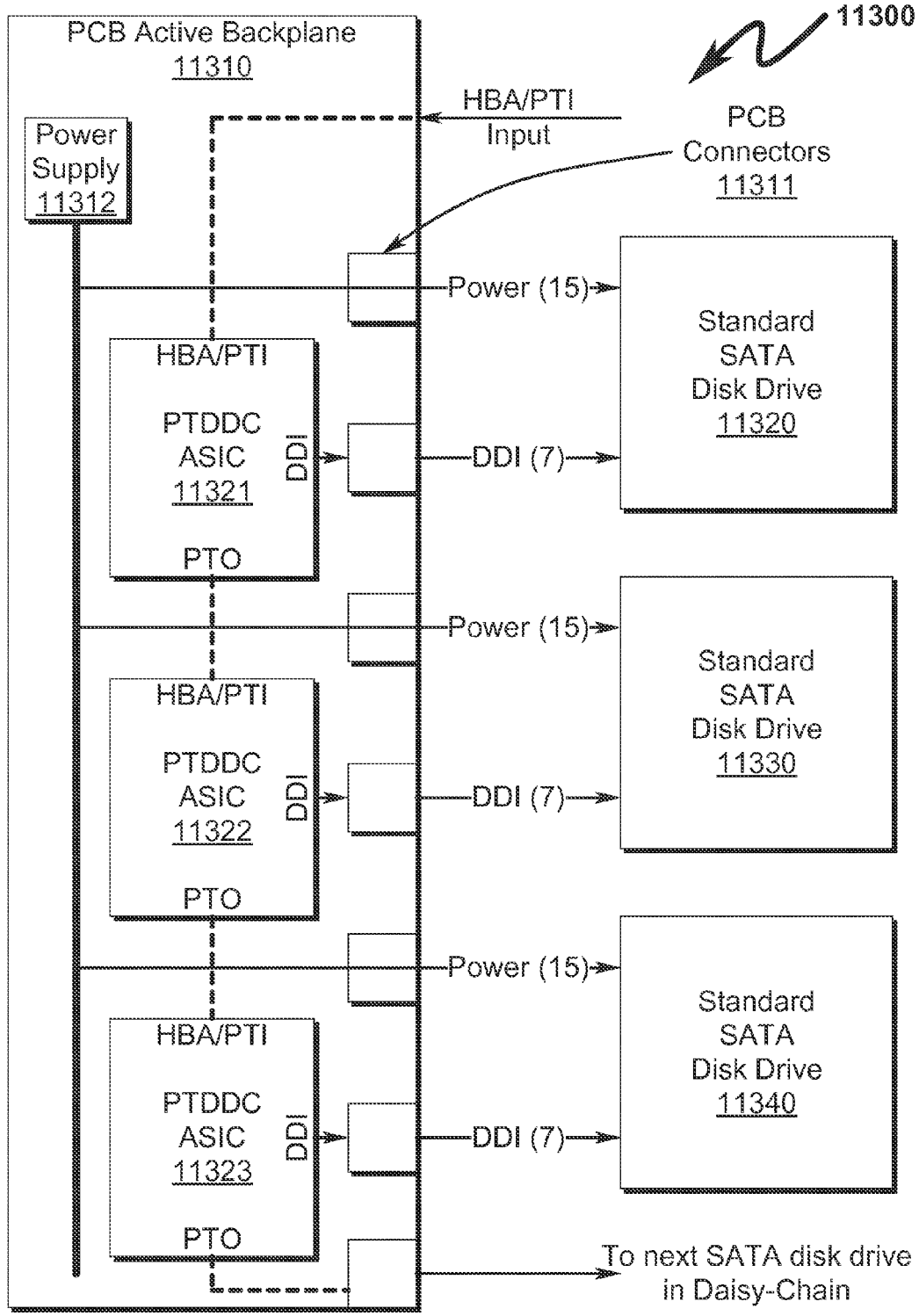
FIG. 113 illustrates a preferred exemplary system embodiment block diagram schematic depicting a PTDDC-enabled SATA disk drive connected in a storage array using a active PCB backplane.
Figure 120:
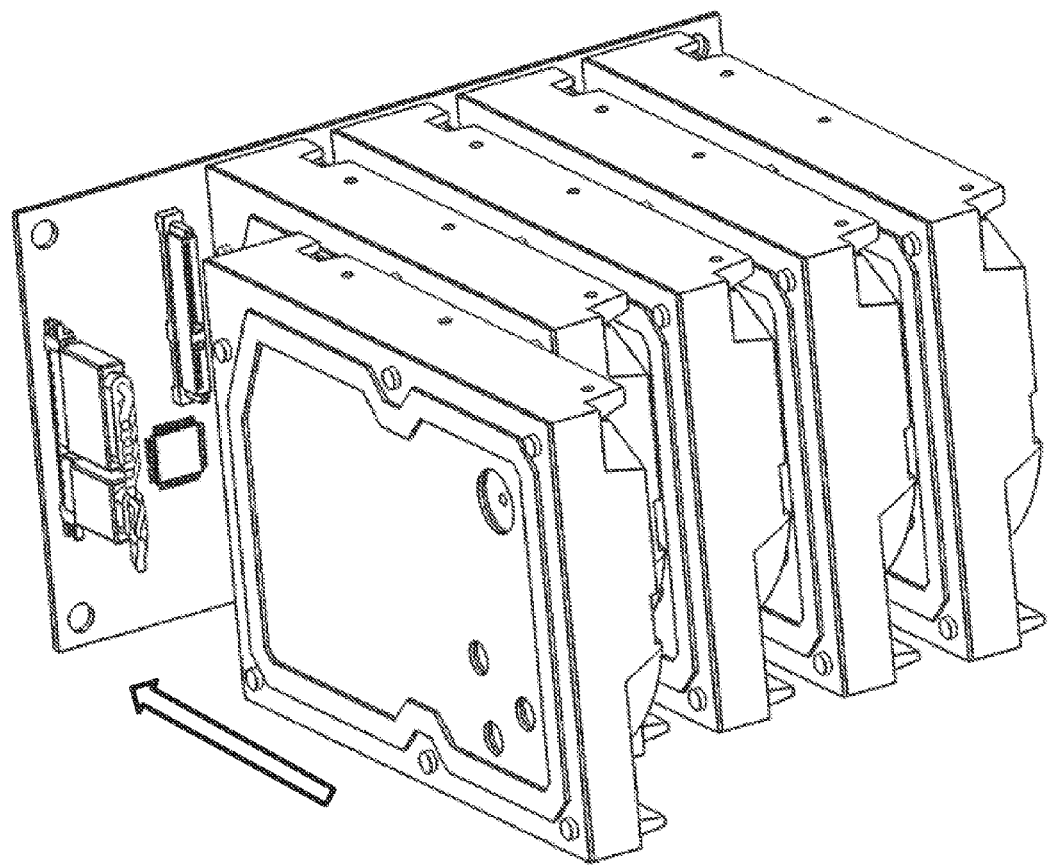

The PTDDC technology described herein may be applied to standard SATA disk drives using an active backplane as depicted in FIG. 113 (11300)-FIG. 120 (12000) in which PTDDC ASICs are placed on a backplane to interconnect a number of SATA disk drives in a daisy-chain configuration. As depicted in FIG. 113 (11300), this configuration schematically can be depicted as an active PCB backplane (11310) that supplies power (via an optional power supply (11312) and associated power bus) and interconnecting traces that inter-link PCB connectors (11311) with individual SATA disk drives (11320, 11330, 11340) each having a standard SATA interface connector. In this configuration, the PTDDC logic is integrated into ASIC form (11321, 11331, 11341) and placed on the PCB active backplane (11310). As described previously, each PTDDC ASIC comprises a HBA/PTI input port, DDI disk drive interface port, and PTO daisy-chaining output port.

Figure 114:
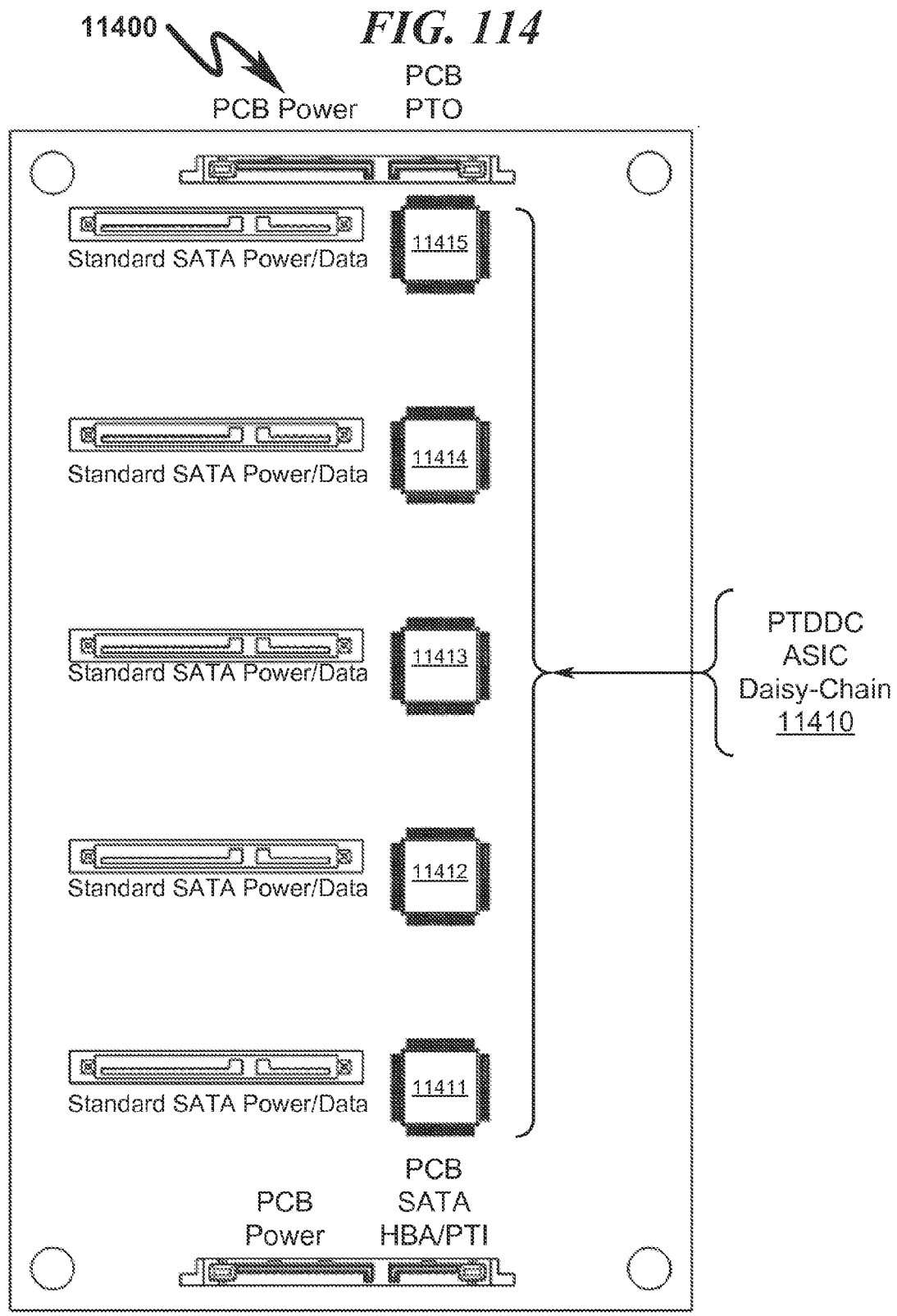
FIG. 114 illustrates a front view of a preferred exemplary system embodiment active PCB backplane with detail of a modified SATA interface connector.

An exemplary embodiment of this mechanical structure using this active backplane technique is depicted in FIG. 114 (11400)-FIG. 120 (12000). It should be noted that since the PTDDC logic is integrated into the PCB backplane (11310), each SATA disk drive can be configured with a standard SATA disk drive mechanical/electrical interface. This allows standard SATA disks to be configured in a daisy-chain configuration with just the addition of the active PCB. Additionally, it should be noted that this configuration permits loading of the PCB backplane in any order desired, as signal daisy-chaining logic is included on the backplane and not in each individual SATA disk drive.

Figure 115:
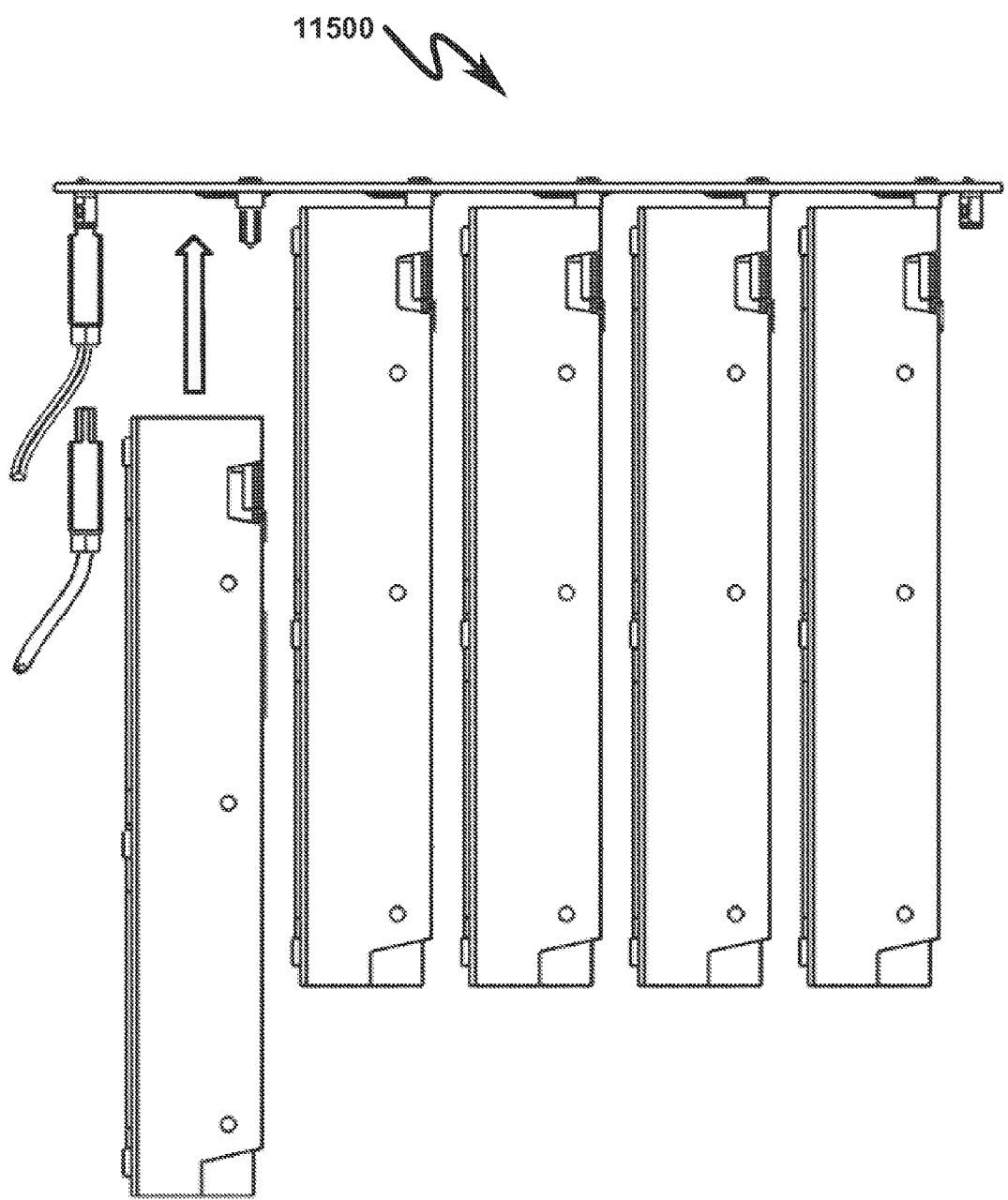
FIG. 115 illustrates a top view of a preferred exemplary system embodiment active PCB backplane with SATA disk drives installed and one SATA disk drive and SATA power connector positioned for insertion into the backplane.
Figure 117:
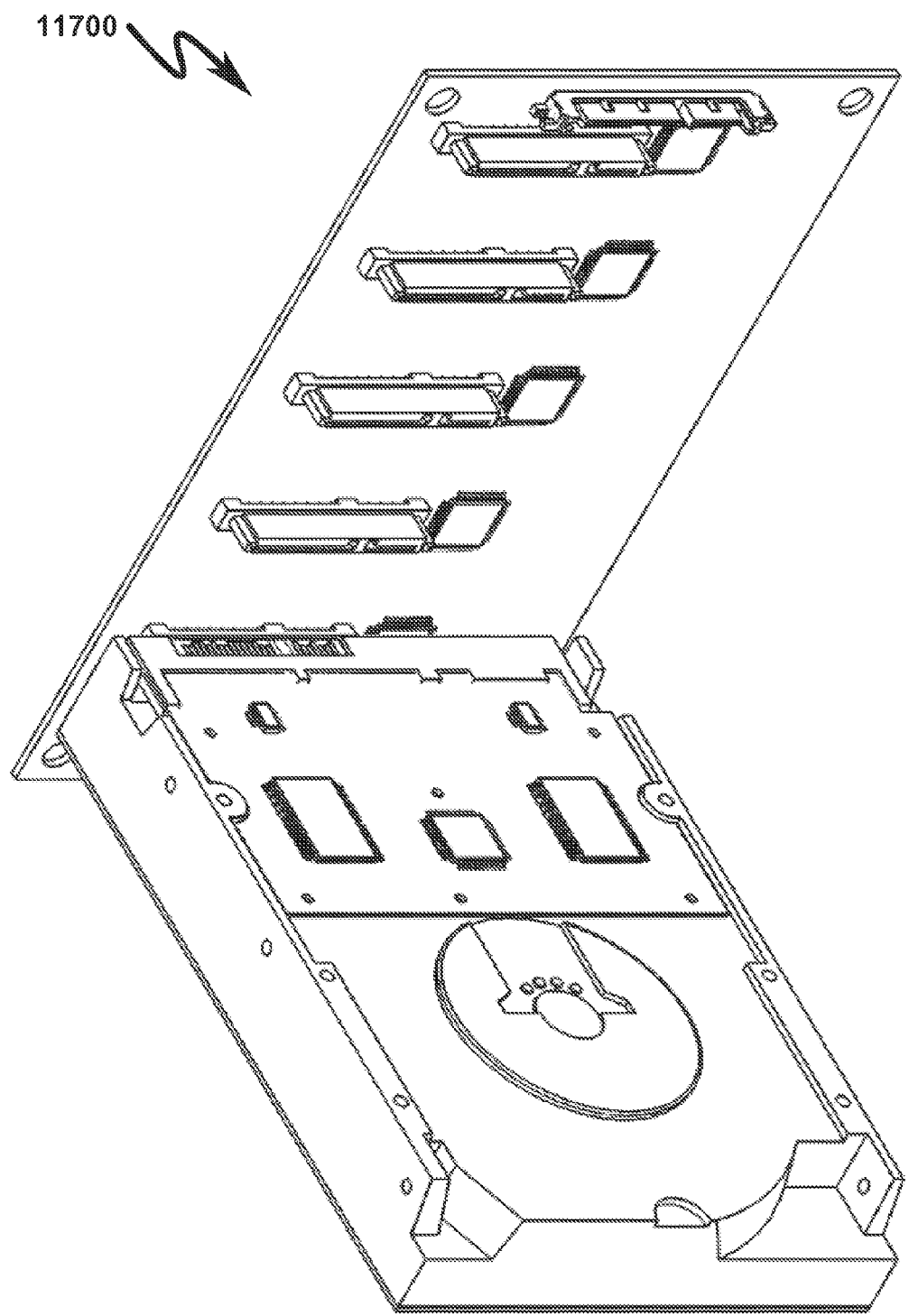
FIG. 117 illustrates a front right perspective view of a preferred exemplary system embodiment active PCB backplane with a PTDDC-enabled SATA disk drive positioned for insertion into the PCB backplane.
Figure 118:
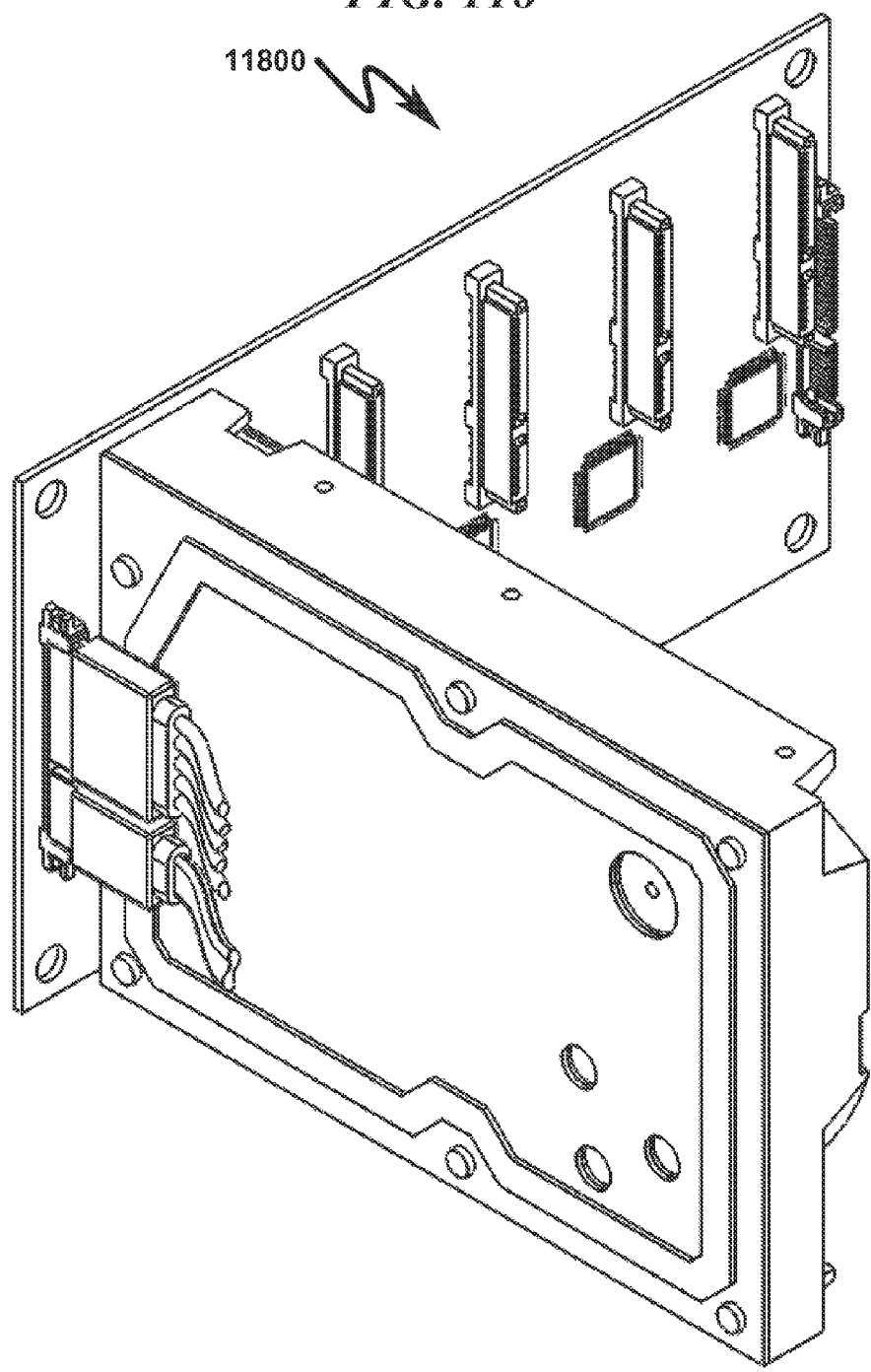
FIG. 118 illustrates a front left perspective view of a preferred exemplary system embodiment active PCB backplane with a PTDDC-enabled SATA disk drive inserted into the PCB backplane.
Figure 119:
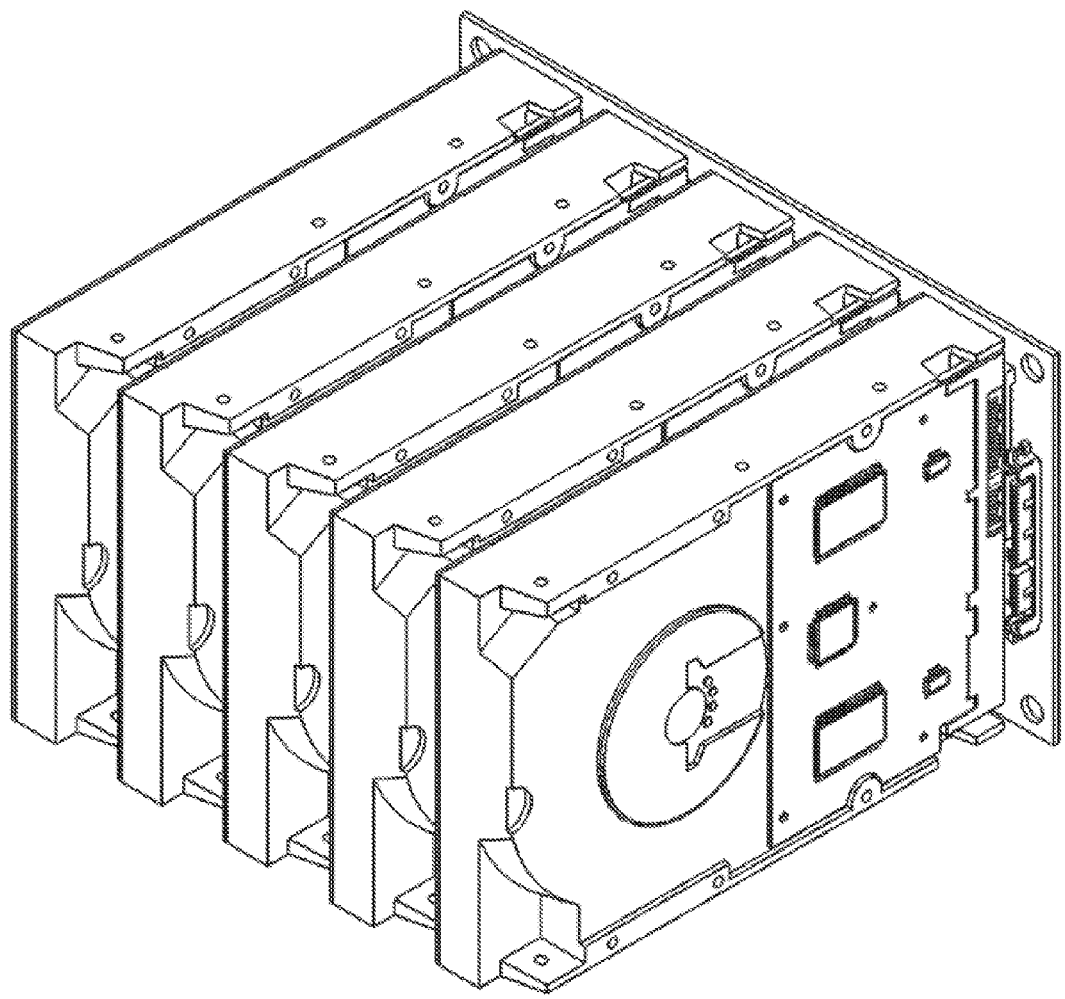

Referencing FIG. 114 (11400), the PCB backplane is seen as augmented with a PTDDC daisy-chain (11410) comprising a number of PTDDC ASICs (11411, 11412, 11413, 11414, 11415) that interlink a number of standard SATA power/data connectors that are used to interface to the standard SATA disk drives. As depicted in the mechanical drawings of FIG. 115 (11500)-FIG. 120 (12000), this configuration permits daisy-chaining of disk drives having a standard SATA mechanical/electrical interface.

Exemplary Embodiment

Stacked Drive Arrays (12100)-(13600)

Overview

The present invention anticipates that the techniques associated with the PTDDC may be implemented on a PCB that incorporates connectors for disk drives to be plugged into the PCB at right angles to the plane of the PCB. By incorporating the PTDDC onto the PCB, it is possible to create a stacked drive enclosure with a plethora of disk drive bays that can be inserted or removed at will. This configuration is especially useful in scenarios where the PTDDC implements some form of RAID among the various hard drives within the stacked drive enclosure, permitting disk drives that have failed to be replaced if necessary.

As mentioned in U.S. patent application Ser. No. 13/200,242 (and depicted in FIG. 31 (3100) of this referenced patent application), an example of a typical type of prior art concept was provided in this referenced patent application and generally illustrates that the stacked drive enclosure can incorporate multiple disk drives that can be removed without the use of tools or other hardware. In this scenario, the invention anticipates that the best mode implementation of this concept will utilize SATA drives incorporating hot-swap capabilities. FIG. 121 (12100)-FIG. 136 (13600) illustrate a preferred embodiment implementation of this concept.

Exemplary SATA Storage Array PCB (12100)-(12200)

Figure 122:
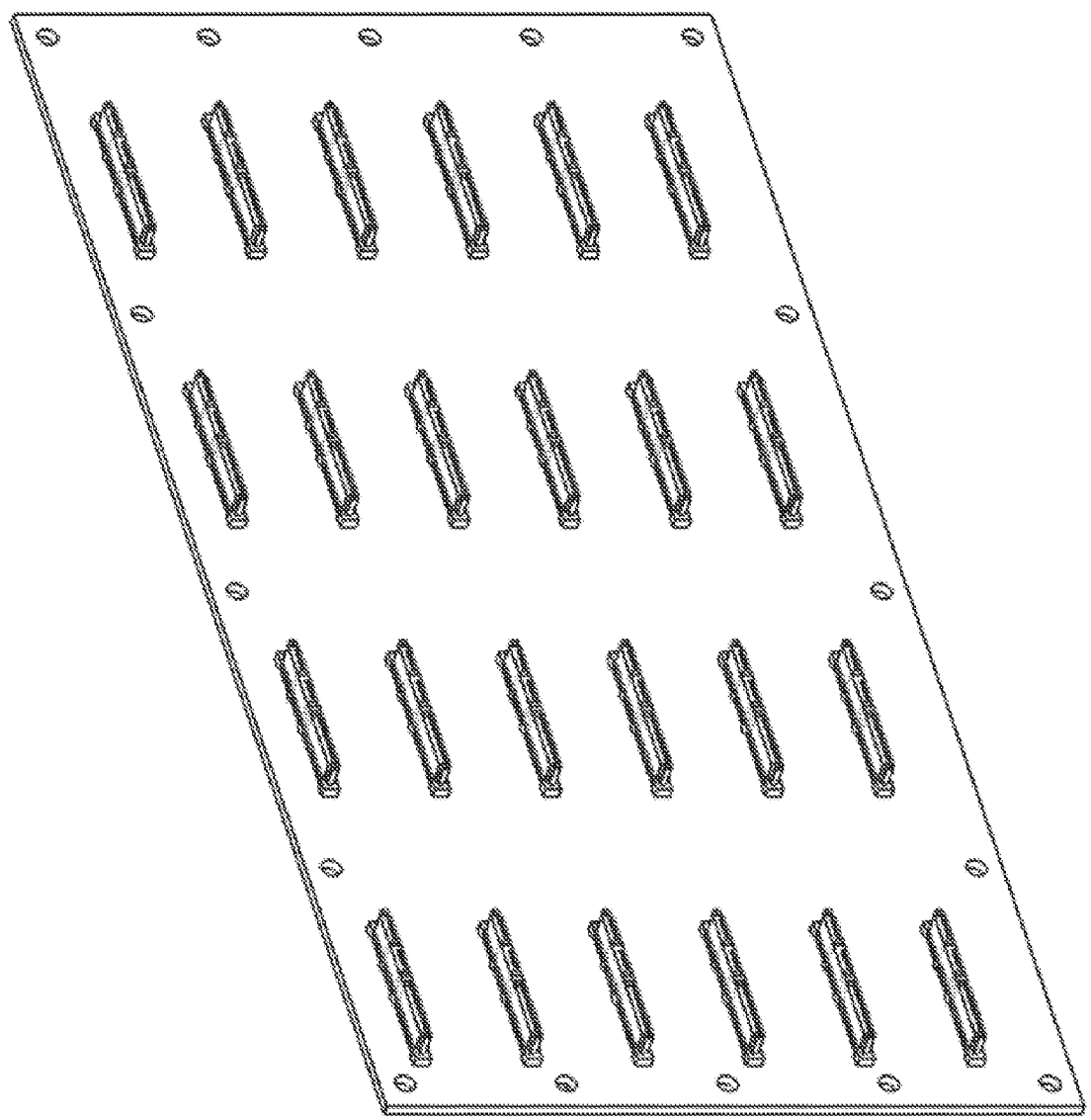

One exemplary basis for interconnecting SATA disk drives using the PTDDC-enabled daisy-chain concept is generally depicted in FIG. 121 (12100)-FIG. 122 (12200). Here the PCB is configured for 24 SATA disk drives configured with PTI/PTO/Power connectors to enable SATA disk drives incorporating the PTDDC ASIC to form a storage array. While one side of this PCB is depicted in these figures, it should be noted that PTI/PTO/Power connectors may be placed on both sides of the PCB to enable SATA drives to mate with the PCB from both the front and rear of the PCB assembly. While not shown, it should be understood that this PCB assembly could incorporate a passive, semi-passive, or active backplane topology as described herein.

Exemplary SATA Storage Array Enclosure (12300)-(12800)

Figure 123:
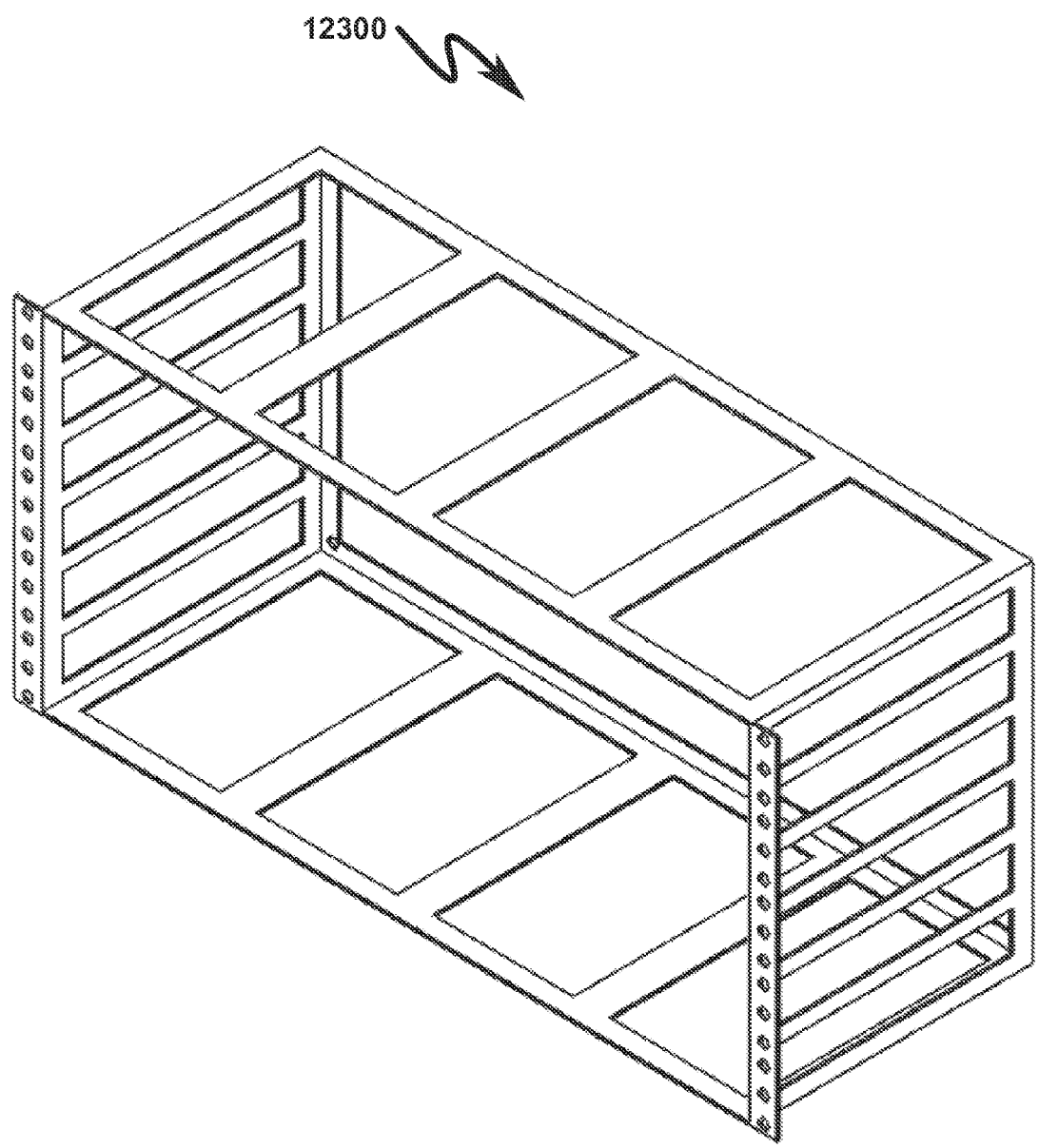
Figure 124:
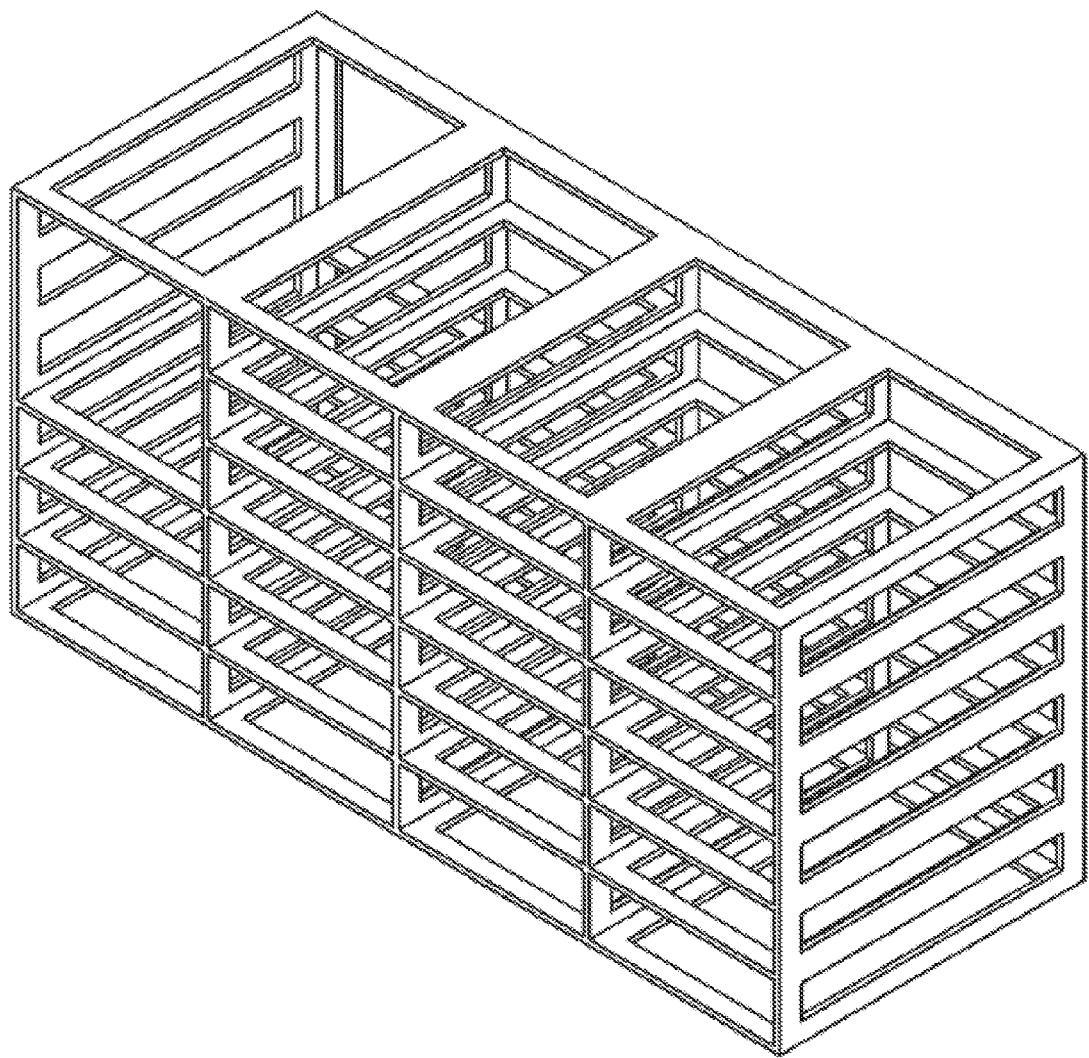
Figure 125:
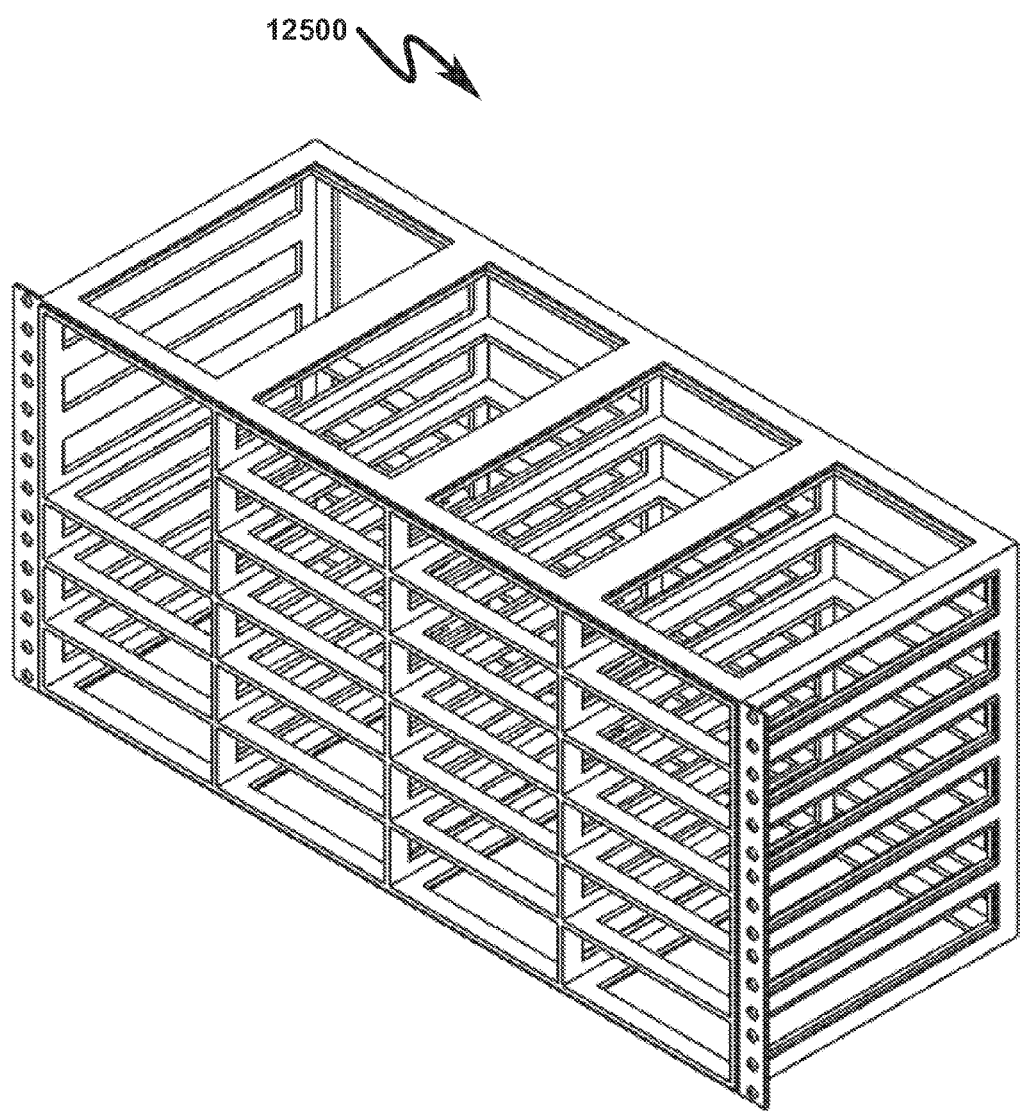
Figure 126:
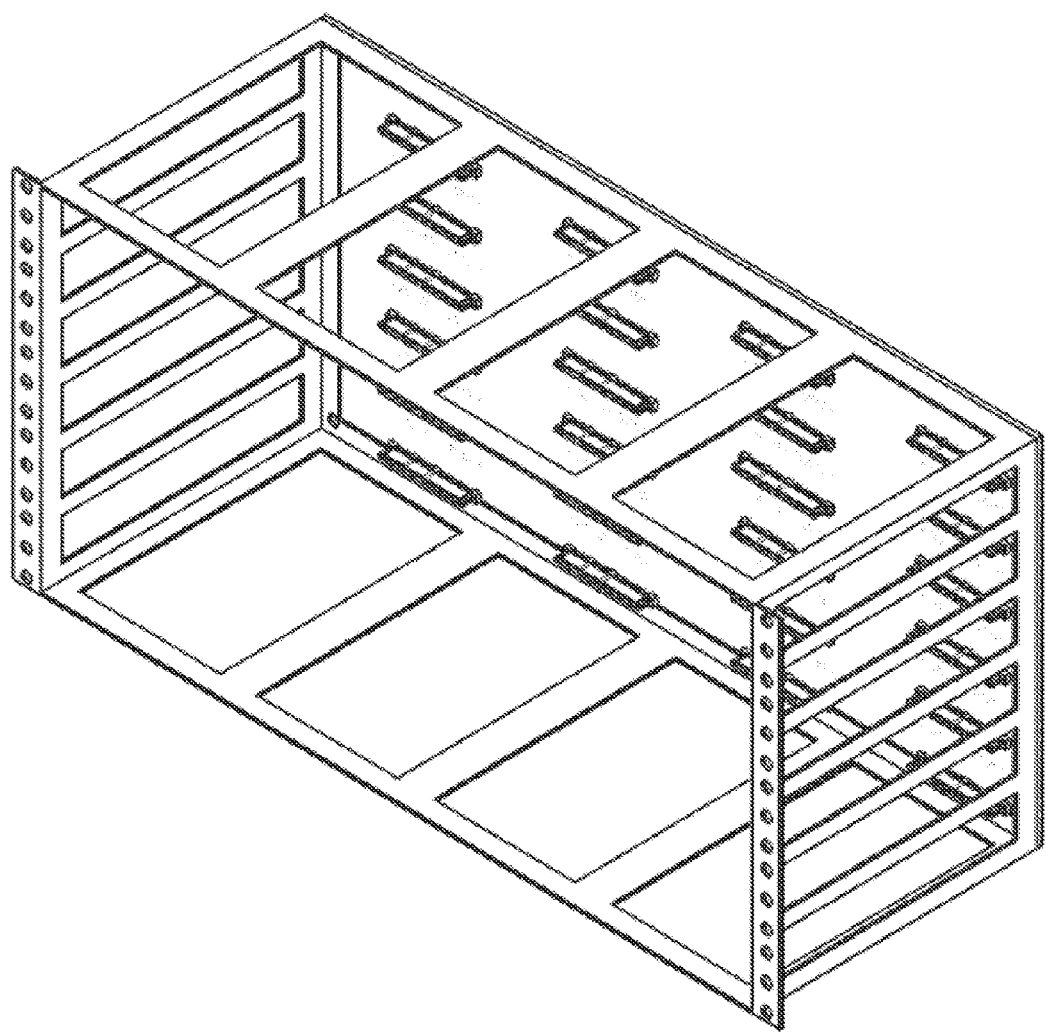
Figure 127:
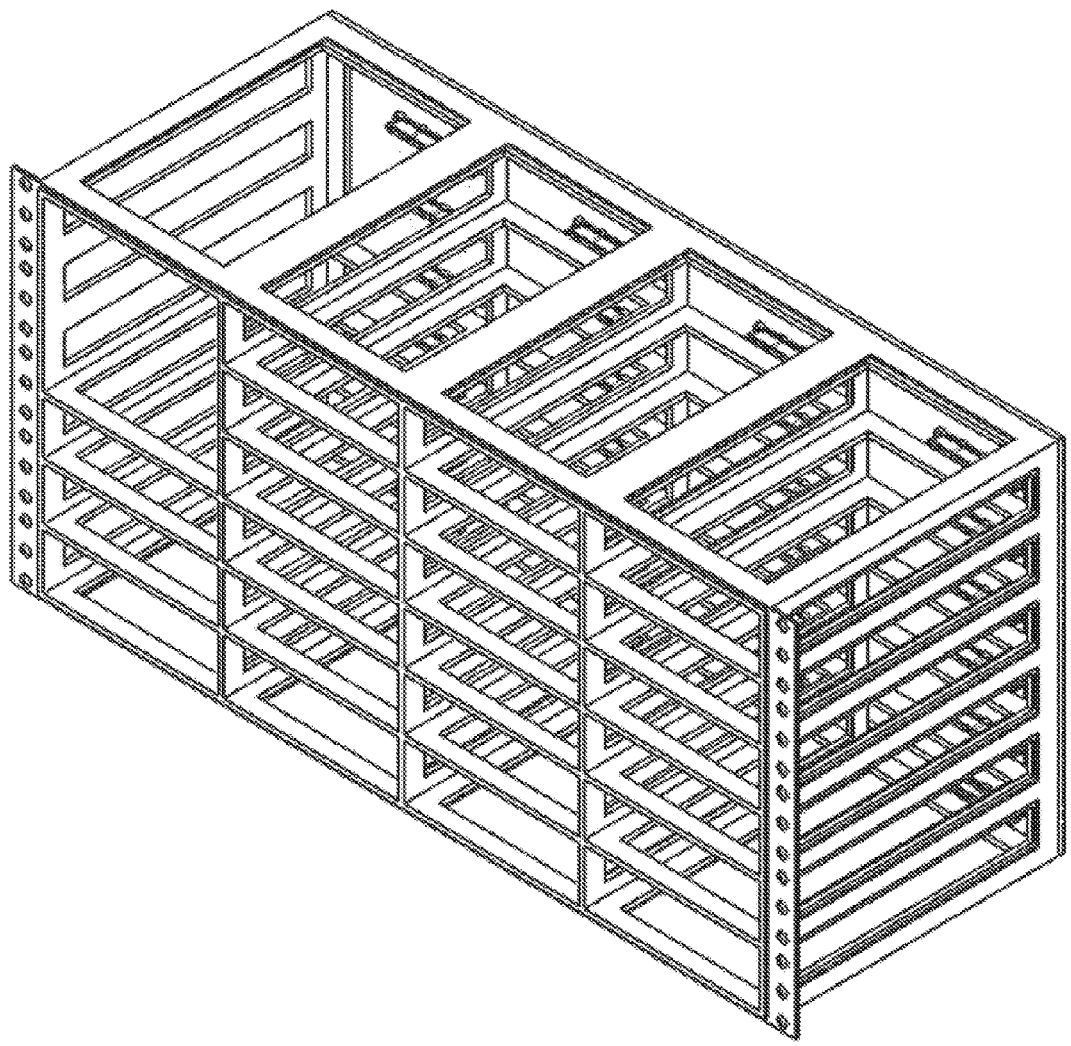

The PCB depicted in FIG. 121 (12100)-FIG. 122 (12200) may be mated with a standard 19-inch rack enclosure structure as depicted in FIG. 123 (12300). This rack enclosure (12300) may incorporate a separator insert as depicted in FIG. 124 (12400) to permit loading and support of individual SATA disk drives as they are inserted into the PCB backplane. FIG. 125 (12500) illustrates the rack enclosure (12300) integrated with the separator insert of FIG. 124 (12400). FIG. 126 (12600) illustrates the PCB (12100, 12200) as it is mated to the rack enclosure (12300). FIG. 127 (12700) illustrates the completed assembly of PCB (12100, 12200), rack enclosure (12300), and separator insert (12400). As depicted in FIG. 128 (12800), this rack assembly may incorporate SATA connections on the rear of the PCB (12100, 12200) as well as backside rack enclosure (12300) and separator insert (12400) modules to permit SATA disk insertion on both sides of the PCB (12100, 12200).

Populated SATA Storage Array Enclosure (12900)-(13300)

Figure 129:
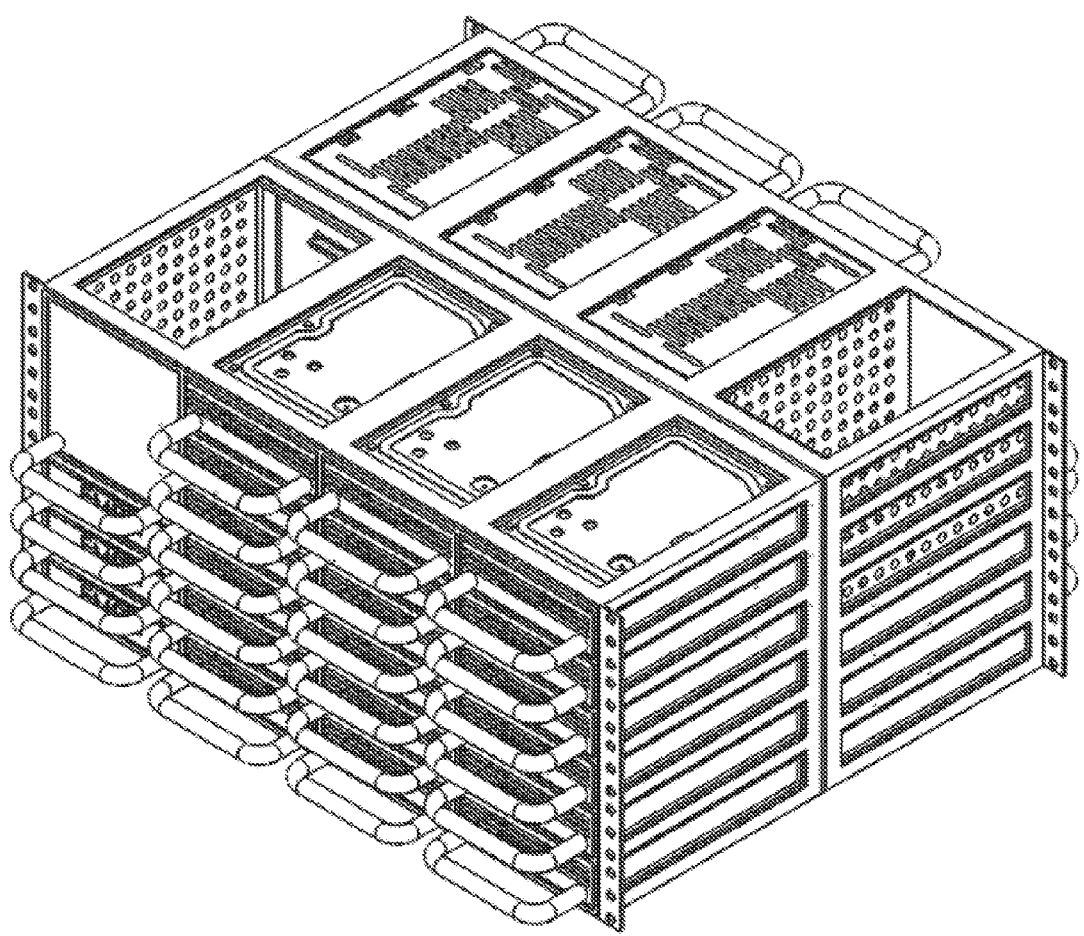
Figure 130:
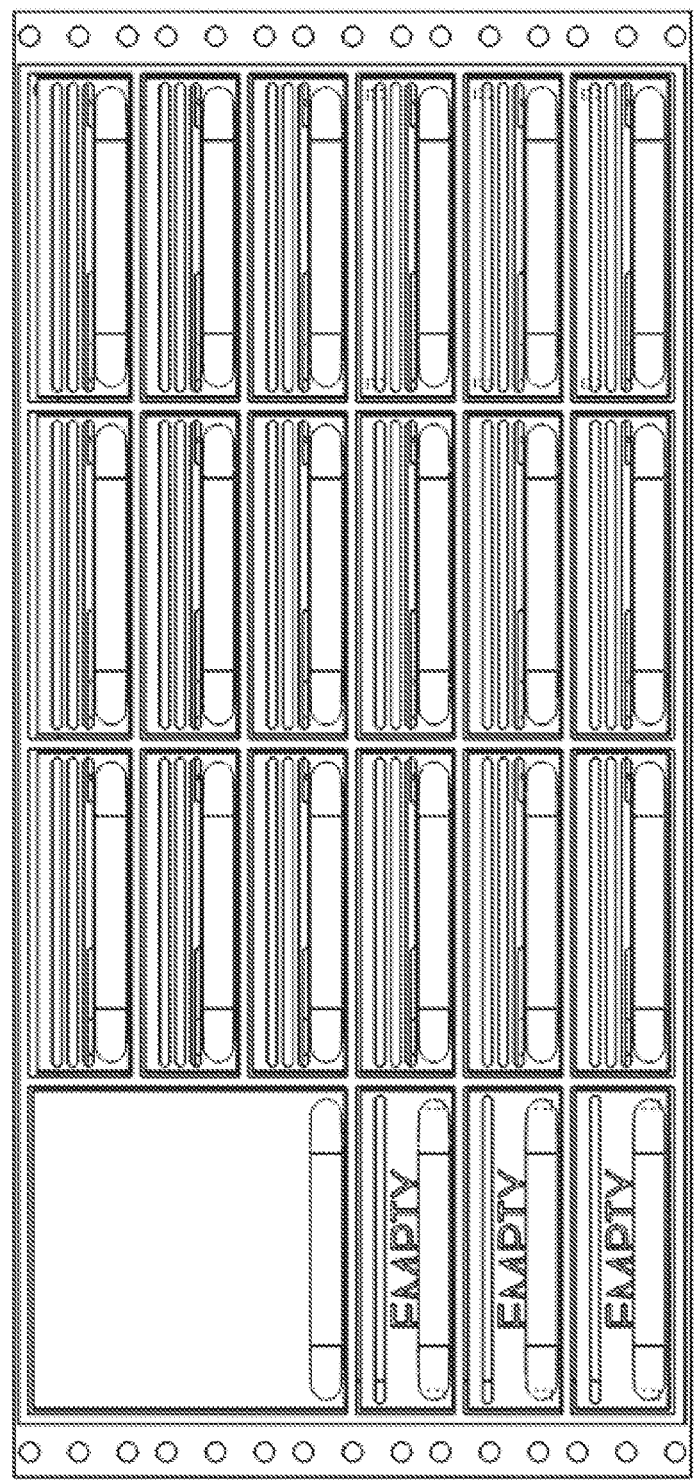

This exemplary storage array form factor is configured for a standard 19-inch rack with a 5 U vertical height form factor as shown in FIG. 129 (12900)-FIG. 133 (13300). As depicted, three of the SATA slots have been removed to support a power supply module and/or inexpensive storage interface module (as generally depicted in the schematics of FIG. 31 (3100) and FIG. 32 (3200). As depicted, the storage rack can support 21 disk drives on each side of the PCB, with a total capacity of 168 TB of storage per rack assuming 4 TB SATA disk drives. This allows a petabyte class storage array to be constructed with only six (6) of these storage racks. Note that the SATA disk drives may be inverted on the rear of the storage rack to enable proper connector clearances to be maintained with respect to SATA drive connectors located on the front of the PCB backplane.

Exemplary Petabyte Storage Application Context (13400)-(13600)

As depicted in FIG. 134 (13400)-FIG. 136 (13600), the present invention may incorporate power supply, network connectivity, and PTDDC daisy-chained SATA disk drives in a conventional rack mount structure that is highly efficient and expandable. As an exemplary application context, these figures illustrate the economic advantage of the present invention. In this application context, each disk drive storage bay is configured in a standard 5 U (8.75-inch) height and contains up to 42 SATA disk drives (21 disk drives in the front of each storage bay and 21 disk drives at the rear of each storage bay). If each SATA disk drive has a capacity of 4 TB, the total storage bay contains 168 TB of storage. A petabyte-class storage array (1.008 PB) can then be constructed using just six (6) of these storage bays, is approximately 52.5-inches in height, and can fit in a standard 19-inch wide rack (having an opening width aperture of approximately 17.875 inches). This disk drive storage bay configuration when using this 5 U form factor permits up to 8 of the disk drive storage bays to be placed within a standard 70-inch high rack, thus providing for a total storage capacity of 1.34 PB of storage per rack as depicted in FIG. 134 (13400)-FIG. 136 (13600).

Economic Advantages

Analyzing the cost of a petabyte class storage system in this application context reveals that the mechanical enclosure and power supply for each storage bay would cost approximately USD$200 (6 required), each SATA disk drive (252 required) approximately USD$200, the 19-inch mounting rack (1 required) approximately USD$500, making the total cost of the petabyte storage array system approximately USD$52100. These cost estimates assume that a PTDDC ASIC has been integrated within each SATA disk drive or incorporated into the storage bay PCB backplane. This cost estimate compares very favorably to conventional petabyte class storage arrays that regularly cost USD$500000 or more. Thus, it can be seen in this example that the present invention reduces the cost of petabyte class storage arrays by approximately a factor of ten (10) compared to the prior art.

Improved Storage Array Connectivity

It is significant to note that the storage system as depicted utilizes ESATA interconnects between each storage bay to connect the PTO port of one storage bay to the HBA/PTI port of the subsequent storage bay. This connectivity approach has several advantages:

First, this method of interconnection provides data transfer rates that are faster than that possible using conventional Ethernet interfaces. This is because the Ethernet protocol overhead and require TCP/IP software overhead limits the effective bandwidth of this transfer mechanism. Furthermore, the use of Ethernet in this context implies the use of a hub/switch, which will result in data collisions during multi-party transfers, thus further reducing effective bandwidth.

Second, this method is very cost efficient in that it does not require a full computing server to act as the intermediary between the Ethernet protocols and the resulting storage array.

Third, the storage system as depicted appears to the connected host computer system as a single large disk drive. The means that the host computer operating system is not burdened with the tasks of managing individual disk drives to ensure that they cooperate as a singular file system.

Fourth, the storage system as depicted may incorporate RAID-1 functionality without the need for any host computer system intervention. This fact is important in scenarios where failing disk drives must be replaced while still providing full-bandwidth host computer access to the storage array.

These advantages combined result in improved storage array bandwidth as compared to traditional petabyte class storage arrays. The ability to fully utilize the very efficient 6 Gb/s SATA bus as the sole interface to the storage array cannot be overestimated in this context, as traditional Ethernet interfaces (irrespective of physical bit transfer rate) have inherent protocol overheads that significantly reduce their effective transfer bandwidth.

Cost Comparison to the Prior Art

As stated previously, one of the deficiencies of the prior art is the near exponential increase in the disk drive cost when the disk drive is attached to the computer system via the use of NAS and related technologies. The fact that these technologies rely on a separate computer-controlled interface to the storage array which then must be interfaced to a host computer requires the deployment of significant hardware and software resources that necessarily drive up the cost of these systems, generally to 4-10 times that of the individual disk drives that are added. Unfortunately, as the storage array size is increased, so is this per-drive cost multiplication factor.

In contrast, the PTDDC daisy-chained approach of the present invention permits the per-drive interface to consume only an estimated USD$4 in PCB/ASIC costs (asymptotically reaching USD$1 in quantity). Even assuming this per-drive interface cost was USD$10, it would still only represent a 25% increase in overall per-drive installation costs for a given storage array, not the 500%-1000% cost increases associated with the prior art. As a practical example, using the inflated USD$10 cost of each PTDDC and 2-TB disk drives to create a 24-TB storage array, the resulting retail storage array cost would be approximately USD$1200, rather than the cited USD$15000 value for the DROBO® brand NAS equivalent storage system detailed herein above. Even assuming disk drive rack mounting system and associated power supplies costing USD$300, this still represents a cost reduction of an order of magnitude in comparison to the current capabilities of the prior art.

System Summary

The present invention system anticipates a wide variety of variations in the basic theme of construction, but can be generalized as a data storage architecture extension system comprising a pass-thru disk drive controller (PTDDC), the PTDDC further comprising:
(a) host bus adapter (HBA) port;
(b) disk drive interface (DDI) port;
(c) pass-thru input (PTI) port; and
(d) pass-thru output (PTO) port;
wherein
the PTDDC receives disk drive data access command (DDDAC) input via the HBA port or the PTI port;
the DDDAC is translated by the PTDDC and electrically transmitted via the DDI port in a form suitable for use by any attached and logically addressed disk drive electrically connected to the DDI port;
the PTDDC determines if the DDDAC falls within the LBA range of the attached disk drive, and if so, passes the DDDAC to the attached disk drive after modifying the DDDAC to account for the logical block address space mapped by the attached disk drive;
the PTDDC determines if the DDDAC falls within the LBA range of the attached disk drive, and if not, the DDDAC is passed via the PTO port to the PTI port of any daisy-chained PTDDC attached to the PTDDC PTO port; and
the PTDDC logically connects the DDI port from the attached disk drive with the HBA port and the PTI port to affect data transfers requested by the DDDAC to/from the attached disk drive and the HBA port or the PTI port.

This general system summary may be augmented by the various elements described herein to produce a wide variety of invention embodiments consistent with this overall design description.

Alternate SATA Disk Drive System Summary

An alternate present invention system anticipates a wide variety of variations in the basic theme of construction, but can be generalized as a SATA disk drive system comprising:
(a) electrical interface connector (EIC);
(b) printed circuit board (PCB); and
(c) data storage media (DSM);
wherein
the EIC is electrically coupled to the PCB;
the PCB is mounted on the DSM;
the EIC comprises a pass-thru input (PTI) port, pass-thru output (PTO) port, and power supply input (PSI) port electrical interfaces;
the PTI port and the PTO port are configured as serial advanced technology attachment (SATA) interfaces;
the PSI port supplies power to the PCB;
the PCB comprises SATA drive electronics (SDE) configured to provide data access to the DSM;
the PCB further comprises a pass-thru disk drive controller (PTDDC) electrically coupled to the EIC and the SDE;
the PTDDC is configured to connect a plurality of PTDDCs to form a serial daisy-chain by only interconnecting the PTO port of one PTDDC to the PTI port of another PTDDC in the daisy-chain;
the PTDDC is configured to present a continuous logical block address space via the PTI port comprising disk drives electrically connected to PTDDCs in the daisy-chain;
the PTDDC is configured to receive disk drive data access command (DDDAC) input via the PTI port;
the PTDDC is configured to translate the DDDAC and electrically transmit the translation to the SDE in a form suitable for use by the SDE;
the PTDDC determines if the DDDAC falls within the logical block address (LBA) range of the DSM, and if so, passes the DDDAC to the SDE after modifying the DDDAC to account for the LBA range mapped by the SATA disk drive;
the PTDDC determines if the DDDAC falls within the LBA range of the DSM, and if not, the DDDAC is passed via the PTO port to the PTI port of any daisy-chained PTDDC attached to the PTDDC PTO port; and
the PTDDC logically connects storage from the DSM with the PTI port to pass-thru data transfers requested by the DDDAC to or from the DSM and the PTI port.

This preferred embodiment represents integration of the PTDDC within a SATA disk drive, and generally corresponds to information depicted in FIG. 89 (8900)-FIG. 112 (11200). This general system summary may be augmented by the various elements described herein to produce a wide variety of invention embodiments consistent with this overall design description.

Alternate Active Storage Array Backplane System Summary

An alternate present invention system anticipates a wide variety of variations in the basic theme of construction, but can be generalized as an active SATA disk drive storage array backplane system comprising:
- (a) printed circuit board (PCB) backplane;
- (b) plurality of pass-thru disk drive controllers (PTDDCs);
- (c) plurality of electrical interface connectors (EICs);

wherein the plurality of PTDDCs is mounted on the PCB backplane;

the plurality of EICs is mounted on the PCB backplane and configured to electrically couple to a corresponding plurality of host bus adapter (HBA) and power supply input (PSI) connectors associated with a corresponding plurality of SATA disk drives;

the PTDDCs each comprise a pass-thru input (PTI) port, pass-thru output (PTO) port, and disk drive interface (DDI) port;

the PTI ports, the PTO ports, and the DDI ports are configured as serial advanced technology attachment (SATA) interfaces;

the PTDDCs are configured to electrically couple corresponding the DDI ports to the corresponding plurality of host bus adapter (HBA) connectors;

the PTDDCs are configured to connect a plurality of PTDDCs to form a serial daisy-chain by only interconnecting the PTO port of one PTDDC to the PTI port of another PTDDC in the daisy-chain;

the PTDDC is configured to present a continuous logical block address space via the PTI port comprising disk drives electrically connected to PTDDCs in the daisy-chain;

the PTDDC is configured to receive disk drive data access command (DDDAC) input via the PTI port;

the PTDDC is configured to translate the DDDAC and electrically transmit the translation to a SATA disk drive (SDD) in a form suitable for use by the SDD;

the PTDDC determines if the DDDAC falls within the logical block address (LBA) range of the SDD, and if so, passes the DDDAC to the SDD after modifying the DDDAC to account for the LBA range mapped by the SDD;

the PTDDC determines if the DDDAC falls within the LBA range of the SDD, and if not, the DDDAC is passed via the PTO port to the PTI port of any daisy-chained PTDDC attached to the PTDDC PTO port; and the PTDDC logically connects storage from the SDD with the PTI port to pass-thru data transfers requested by the DDDAC to or from the SDD and the PTI port.

This preferred embodiment represents integration of the PTDDC within an active backplane as generally depicted in FIG. 113 (11300)-FIG. 120 (12000). This general system summary may be augmented by the various elements described herein to produce a wide variety of invention embodiments consistent with this overall design description.

Alternate Piggy-Back Daisy Chaining System Summary

An alternate present invention system anticipates a wide variety of variations in the basic theme of construction, but can be generalized as a piggy-back SATA disk drive daisy-chaining system comprising:
- (a) printed circuit board (PCB);
- (b) disk drive interface port connector (DDIC);
- (c) pass-thru input port connector (PTIC);
- (d) pass-thru output port connector (PTOC); and
- (e) power supply input connector (PSIC);

wherein the DDIC, the PTIC, the PTOC, and the PSIC are mechanically coupled to the PCB;

the PCB further comprises an application specific integrated circuit (ASIC) implementing a pass-thru disk drive controller (PTDDC), the PTDDC further comprising a host bus adapter (HBA) port, disk drive interface (DDI) port, pass-thru input (PTI) port, and pass-thru output (PTO) port;

the PTI port, the PTO port, and the DDI port are configured as serial advanced technology attachment (SATA) interfaces;

the PTI port is electrically coupled to the PTIC;

the PTO port is electrically coupled to the PTOC;

the DDI port is electrically coupled to the DDIC;

the PSIC is electrically coupled to the PCB and supplies power to the PTDDC;

the PCB is configured to connect a plurality of PCBs each containing a PTDDC to form a serial daisy-chain by only interconnecting the PTOC of one PCB to the PTIC of another PCB in the daisy-chain;

the PTDDC is configured to present a continuous logical block address space via the PTI port comprising disk drives electrically connected to PTDDCs in the daisy-chain;

the PTDDC is configured to receive disk drive data access command (DDDAC) input via the PTI port;

the PTDDC is configured to translate the DDDAC and electrically transmit the translation to the DDI port in a form suitable for use by a SATA disk drive connected to the DDIC;

the PTDDC determines if the DDDAC falls within the logical block address (LBA) range of the SATA disk drive, and if so, passes the DDDAC to the SATA disk drive after modifying the DDDAC to account for the LBA range mapped by the SATA disk drive;

the PTDDC determines if the DDDAC falls within the LBA range of the SATA disk drive, and if not, the DDDAC is passed via the PTOC to the PTIC of any daisy-chained PCB containing a PTDDC that is attached to the PTOC; and the PTDDC logically connects storage from the SATA disk drive with the PTIC to pass-thru data transfers requested by the DDDAC to or from the SATA disk drive and the PTIC.

This preferred embodiment represents the use of a piggy-back daisy-chain PCB backplane as generally depicted in FIG. 73 (7300)-FIG. 80 (8000). This general system summary may be augmented by the various elements described herein to produce a wide variety of invention embodiments consistent with this overall design description.

Method Summary

The present invention method anticipates a wide variety of variations in the basic theme of implementation, but can be generalized as a data storage architecture extension method wherein the method controls a data storage architecture extension system comprising a pass-thru disk drive controller (PTDDC), the PTDDC further comprising:
- (a) host bus adapter (HBA) port;
- (b) disk drive interface (DDI) port;
- (c) pass-thru input (PTI) port; and
- (d) pass-thru output (PTO) port;

with the method comprising the steps of:
(1) receiving a disk drive data access command (DDDAC) input via the HBA port or the PTI port;
(2) translating the DDDAC and transmitting the DDDAC via the DDI port in a form suitable for use by any attached and logically addressed disk drive electrically connected to the DDI port;
(3) determining if the DDDAC falls within the LBA range of the attached disk drive, and if so, passing the DDDAC to the attached disk drive after modifying the DDDAC to account for the logical block address space mapped by the attached disk drive;
(4) determining if the DDDAC falls within the LBA range of the attached disk drive, and if not, passing the DDDAC via the PTO port to the PTI port of any daisy-chained PTDDC attached to the PTDDC PTO port; and
(5) logically connecting the DDI port from the attached disk drive with the HBA port and the PTI port to affect data transfers requested by the DDDAC to/from the attached disk drive and the HBA port or the PTI port.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and its associated method may be augmented with a variety of ancillary embodiments, including but not limited to:

An embodiment wherein the HBA port comprises an electrical interface selected from a group consisting of PATA, SATA, eSATA, microSATA, Fibre Channel, Serial Storage Architecture (SSA), and USB.

An embodiment wherein the HBA port and the PTI port are electrically connected and form a single unitary interface port with respect to the PTDDC.

An embodiment wherein the PTDDC comprises an ASIC mounted on a PCB, the PCB further comprising a connector for electrically mating the DDI port to a disk drive, a connector for electrically mating the HBA port to a computer host bus adapter, a connector for electrically mating the PTO port to the PTI port of a downstream daisy-chained PTDDC controller, and a connector for electrically mating the PTI port to the PTO port of an upstream daisy-chained PTDDC controller.

An embodiment wherein the PTDDC comprises an ASIC mounted on a PCB, the ASIC incorporating disk drive control electronics in conjunction with PTDDC functionality, the PCB being integrated into the electrical control system of a disk drive, the PCB further comprising a connector for electrically mating the HBA port to a computer host bus adapter, a connector for electrically mating the PTO port to the PTI port of a downstream daisy-chained PTDDC controller, and a connector for electrically mating the PTI port to the PTO port of an upstream daisy-chained PTDDC controller.

An embodiment wherein the PTDDC performs the translation by determining if the LBA values associated with the DDDAC falls within the LBA range of the attached disk drive, and if not, reducing the LBN values associated with the DDDAC by the LBA count of the attached disk drive and passing this resulting DDDAC via the PTO port to the PTI port of any daisy-chained PTDDC attached to the PTDDC PTO port.

An embodiment wherein the disk drive access command does not undergo LBA translation but is immediately forwarded to the PTO port for processing by the daisy-chained PTDDC to affect a RAID storage array configuration between the attached disk drive and another disk drive attached to the daisy-chained PTDDC, the RAID storage array configuration selected from a group consisting of RAID-0, RAID-1, RAID-2, RAID-3, RAID-4, RAID-5, and RAID-6.

An embodiment wherein the DDI port comprises an electrical interface selected from a group consisting of PATA, SATA, eSATA, microSATA, Fibre Channel, Serial Storage Architecture (SSA), and USB.

An embodiment comprising a logical file system, the logical file system comprising a plethora of PTDDC controllers daisy-chained in series via connection of a PTO port from an upstream PTDDC to the PTI port on a downstream PTDDC, with each the PTDDC connected to a disk drive via a DDI port, and with the HBA port of the first PTDDC in the daisy-chain connected to the host bus adapter of a computer system.

An embodiment wherein the logical file system implements an on-disk file system selected from a group consisting of EXT2, EXT3, EXT4, FAT12, FAT16, FAT32, Files-11 (ODS), HFS, HFS Plus (HFS+), NTFS, and XFS.

An embodiment wherein the logical file system has a logical storage capacity larger than the sum of the storage capacity of disk drives attached to the plethora of series daisy-chained PTDDC controllers, with the logical storage capacity in excess of the disk drive capacity allocated to one or more RESERVED files within the logical file system, wherein the BASE LOCATION and EXTENT SIZE of the RESERVED files may be modified to permit addition of one or more supplemental disk drives/PTDDC controller combinations as these the supplemental disk drives/PTDDC controller combinations are added to the terminal end of the chain of the plethora of series daisy-chained PTDDC controllers.

An embodiment further comprising a passive backplane interconnect configured to provide a plurality of electrical connectors configured to mate with the EIC, the plurality of electrical connectors configured to each electrically couple power to the PSI port of the EIC and electrically interconnect the PTI port of a first EIC with the PTO port of a second EIC.

An embodiment further comprising a semi-passive backplane interconnect configured to provide a plurality of electrical connectors configured to mate with the EIC, the plurality of electrical connectors configured to each electrically couple power to the PSI port of the EIC and provide dynamic interconnection of the PTI port of a first EIC with the PTO port of a second EIC.

An embodiment wherein a plurality of the SATA disk drive systems are daisy-chained in a storage rack array via attachment to a common PCB backplane.

An embodiment wherein the storage rack array further comprises a power supply electrically coupled to the common PCB backplane.

An embodiment further comprising a plurality of SATA disk drives electrically coupled to the EICs.

An embodiment further comprising a power supply electrically coupled to the PCB backplane.

An embodiment wherein the DDIC further comprises a power supply output connector (PSOC) that is configured to mechanically couple to the SATA disk drive and electrically couple the PSIC to the SATA disk drive.

An embodiment wherein the PSIC and the PTIC form a unitary connector structure.

An embodiment wherein the PSIC, the PTIC, and the PTOC form a unitary connector structure.

An embodiment wherein the PTDDC comprises an application specific integrated circuit (ASIC) mounted on the PCB.

One skilled in the art will recognize that other embodiments are possible based on combinations of elements taught within the above invention description.

GENERALIZED COMPUTER USABLE MEDIUM

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A data storage architecture extension (DAX) system and method that daisy-chains multiple SATA disk drive storage elements to allow a single host bus adapter (HBA) to view the daisy-chain as one logical SATA disk drive has been disclosed. The system/method may be broadly described as comprising a pass-thru disk drive controller (PTDDC) further comprising a pass-thru input (PTI) port, disk drive interface (DDI) port, and pass-thru output (PTO) port. The PTDDC intercepts and translates PTI port input to the requirements of a SATA disk drive connected to the DDI. Each PTDDC may be daisy-chained to other PTDDCs to permit a plethora of SATA drives to be associated with a given HBA, with the first PTDDC providing a presentation interface to the HBA integrating all SATA disk drive storage connected to the PTDDCs. Rack mounting of PTDDC-enabled SATA disk drives enables creation of inexpensive dynamically expandable petabyte-class storage arrays.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. §112(f) and such claim shall be construed to cover the corresponding structure, material, or acts described in the specification and equivalents thereof.

The phrase "MEANS FOR" specifically invokes the means-plus-function claims limitation recited in 35 U.S.C. §112(f) and such claim shall be construed to cover the corresponding structure, material, or acts described in the specification and equivalents thereof.

The phrase "STEP FOR" specifically invokes the step-plus-function claims limitation recited in 35 U.S.C. §112(f) and such claim shall be construed to cover the corresponding structure, material, or acts described in the specification and equivalents thereof.

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A serial advanced technology attachment (SATA) disk drive storage array system implementing a Redundant Array of Independent Disks RAID-1 WRITE functionality in a serially connected plurality of SATA disk drives electrically coupled in a daisy-chain configuration using pass-thru disk drive controllers (PTDDCs), said system comprising:

(a) plurality of pass-thru disk drive controllers (PTDDCs); and
(b) plurality of SATA disk drives, each individually electrically coupled to a DDI port of said PTDDCs;

wherein:

said PTDDCs each comprise a pass-thru input (PTI) port, a pass-thru output (PTO) port, and a disk drive interface (DDI) port;

said PTDDCs are configured to connect a plurality of PTDDCs to form a serial daisy-chain by only interconnecting the PTO port of one PTDDC to the PTI port of another PTDDC in said daisy-chain;

said PTI ports, said PTO ports, and said DDI ports are configured as SATA interfaces;

said each PTDDC is configured to present a continuous logical block address space via said PTI port comprising disk drives electrically connected to PTDDCs in said daisy-chain;

said each PTDDC is configured to receive disk drive data access command (DDDAC) input via said PTI port;

said each PTDDC is configured to translate said DDDAC and electrically transmit said translation to said DDI port in a form suitable for use by a SATA disk drive connected to said DDIC;

said each PTDDC determines when said DDDAC falls within the logical block address (LBA) range of said SATA disk drive, and when so, passes said DDDAC to said SATA disk drive after modifying said DDDAC to account for said LBA range mapped by said SATA disk drive;

said each PTDDC determines when said DDDAC falls within said LBA range of said SATA disk drive, and when not, said DDDAC is passed via said PTO port to a PTI port of a daisy-chained PTDDC; and said PTDDCs are configured to implement a RAID-1 WRITE function comprising the following data transfer operations on said PTDDCs:

with a host computer, writing a starting WRITE LBA (LBA_RW) via a host bus adapter (HBA) to a first PTDDC-configured disk drive connected in said daisy-chain;

with a currently selected PTDDC in said daisy-chain, receiving said LBA_RW from a PTDDC PTI port and storing said LBA_RW in a local match register (LMR);

with said currently selected PTDDC, writing said LBA_RW via a PTO port on said PTDDC to a next PTDDC in said daisy-chain;

determining if all PTDDCs in said daisy-chain have not been updated, and if not, then proceeding to step (2) to continue updating said daisy-chain;

with said host computer, writing a starting transfer count (LBA_TC) via said HBA to said first PTDDC-configured disk drive;

with a currently selected PTDDC in said daisy-chain, receiving said LBA transfer count (LBA_TC) from said host computer via a PTDDC PTI port;

with said currently selected PTDDC, writing said LBA_TC via a PTO port to the next PTDDC in said daisy-chain;

determining if all PTDDCs in said daisy-chain have not been updated, and if not, then proceeding to step (6) to continue updating said daisy-chain;

with a PTDDC in said daisy-chain, calculating a starting LBA for an attached SATA disk drive and issuing a WRITE to said attached SATA disk drive; and with a PTDDC in said daisy-chain, receiving WRITE data from a PTDDC PTI port and transparently transmitting this WRITE data to both said attached SATA disk drive and a PTO port on said PTDDC.

2. The data storage architecture system of claim 1 wherein said each PTDDC comprises an application specific integrated circuit (ASIC).

3. The data storage architecture system of claim 1 wherein said each PTDDC performs said translation by determining when the LBA values associated with said DDDAC falls within the LBA range of said attached disk drive, and when not, reducing the LBN values associated with said DDDAC by the LBA count of said attached disk drive and passing this resulting DDDAC via said PTO port to the PTI port of any daisy-chained PTDDC attached to said PTDDC PTO port.

4. The data storage architecture system of claim 1 further comprising a logical file system, said logical file system comprising a plurality of PTDDC controllers daisy-chained in series via connection of a PTO port from an upstream PTDDC to the PTI port on a downstream PTDDC, with each said PTDDC connected to a disk drive via a DDI port, and with the PTI port of the first PTDDC in said daisy-chain connected to the host bus adapter of a computer system.

5. The data storage architecture system of claim 4 wherein said logical file system is a MICROSOFT® New Technology File System (NTFS) file system configured to have a logical storage capacity larger than the sum of the storage capacity of disk drives attached to said plurality of series daisy-chained PTDDC controllers, with said logical storage capacity in excess of said disk drive capacity allocated to one or more RESERVED files within said logical file system, wherein a BASE LOCATION and EXTENT SIZE of said RESERVED files may be modified to permit addition of one or more supplemental disk drives/PTDDC controller combinations as these said supplemental disk drives/PTDDC controller combinations are added to the terminal end of the chain of said plurality of series daisy-chained PTDDC controllers.

6. A serial advanced technology attachment (SATA) disk drive storage array method implementing a Redundant Array of Independent Disks RAID-1 WRITE functionality in a serially connected plurality of SATA disk drives electrically coupled in a daisy-chain configuration using pass-thru disk drive controllers (PTDDCs), said method comprising:

(1) with a host computer, writing a starting WRITE logical block address (LBA) (LBA_RW) via a host bus adapter (HBA) to a first PTDDC-configured disk drive connected in said daisy-chain;

with a currently selected PTDDC in said daisy-chain, receiving said LBA_RW from a PTDDC pass-thru input (PTI) port and storing said LBA_RW in a local match register (LMR);

with said currently selected PTDDC, writing said LBA_RW via a pass-thru output (PTO) port on said PTDDC to a next PTDDC in said daisy-chain;

determining if all PTDDCs in said daisy-chain have not been updated, and if not, then proceeding to step (2) to continue updating said daisy-chain;

with said host computer, writing a starting transfer count (LBA_TC) via said HBA to said first PTDDC-configured disk drive;

with a currently selected PTDDC in said daisy-chain, receiving said LBA transfer count (LBA_TC) from said host computer via a PTDDC PTI port;

with said currently selected PTDDC, writing said LBA_TC via a PTO port to the next PTDDC in said daisy-chain;

determining if all PTDDCs in said daisy-chain have not been updated, and if not, then proceeding to step (6) to continue updating said daisy-chain;

with a PTDDC in said daisy-chain, calculating a starting LBA for an attached SATA disk drive and issuing a WRITE to said attached SATA disk drive; and with a PTDDC in said daisy-chain, receiving WRITE data from a PTDDC PTI port and transparently transmitting this WRITE data to both said attached SATA disk drive and a PTO port on said PTDDC;

wherein:

said PTDDCs each comprise a pass-thru input (PTI) port, a pass-thru output (PTO) port, and a disk drive interface (DDI) port;

said PTDDCs are configured to connect a plurality of PTDDCs to form a serial daisy-chain by only interconnecting the PTO port of one PTDDC to the PTI port of another PTDDC in said daisy-chain;

said PTI ports, said PTO ports, and said DDI ports are configured as SATA interfaces;

said each PTDDC is configured to present a continuous logical block address space via said PTI port comprising disk drives electrically connected to PTDDCs in said daisy-chain;

said each PTDDC is configured to receive disk drive data access command (DDDAC) input via said PTI port;

said each PTDDC is configured to translate said DDDAC and electrically transmit said translation to said DDI port in a form suitable for use by a SATA disk drive connected to said DDIC;

said each PTDDC determines when said DDDAC falls within the logical block address (LBA) range of said SATA disk drive, and when so, passes said DDDAC to said SATA disk drive after modifying said DDDAC to account for said LBA range mapped by said SATA disk drive; and said each PTDDC determines when said DDDAC falls within said LBA range of said SATA disk drive, and when not, said DDDAC is passed via said PTO port to a PTI port of a daisy-chained PTDDC.

7. The data storage architecture system of claim 6 wherein said each PTDDC comprises an application specific integrated circuit (ASIC).

8. The data storage architecture system of claim 6 wherein said each PTDDC performs said translation by determining when the LBA values associated with said DDDAC falls within the LBA range of said attached disk drive, and when not, reducing the LBN values associated with said DDDAC by the LBA count of said attached disk drive and passing this resulting DDDAC via said PTO port to the PTI port of any daisy-chained PTDDC attached to said PTDDC PTO port.

9. The data storage architecture system of claim 6 further comprising a logical file system, said logical file system comprising a plurality of PTDDC controllers daisy-chained in series via connection of a PTO port from an upstream PTDDC to the PTI port on a downstream PTDDC, with each said PTDDC connected to a disk drive via a DDI port, and with the PTI port of the first PTDDC in said daisy-chain connected to the host bus adapter of a computer system.

10. The data storage architecture system of claim 9 wherein said logical file system is a MICROSOFT® New Technology File System (NTFS) file system configured to have a logical storage capacity larger than the sum of the storage capacity of disk drives attached to said plurality of series daisy-chained PTDDC controllers, with said logical storage capacity in excess of said disk drive capacity allocated to one or more RESERVED files within said logical file system, wherein a BASE LOCATION and EXTENT SIZE of said RESERVED files may be modified to permit addition of one or more supplemental disk drives/PTDDC controller combinations as these said supplemental disk drives/PTDDC controller combinations are added to the terminal end of the chain of said plurality of series daisy-chained PTDDC controllers.

11. A serial advanced technology attachment (SATA) disk drive storage array system implementing a Redundant Array of Independent Disks RAID-1 READ functionality in a serially connected plurality of SATA disk drives electrically coupled in a daisy-chain configuration using pass-thru disk drive controllers (PTDDCs), said system comprising:

(a) plurality of pass-thru disk drive controllers (PTDDCs); and (b) plurality of SATA disk drives, each individually electrically coupled to a DDI port of said PTDDCs;

wherein:

said PTDDCs each comprise a pass-thru input (PTI) port, a pass-thru output (PTO) port, and a disk drive interface (DDI) port;

said PTDDCs are configured to connect a plurality of PTDDCs to form a serial daisy-chain by only interconnecting the PTO port of one PTDDC to the PTI port of another PTDDC in said daisy-chain;

said PTI ports, said PTO ports, and said DDI ports are configured as SATA interfaces;

said each PTDDC is configured to present a continuous logical block address space via said PTI port comprising disk drives electrically connected to PTDDCs in said daisy-chain;

said each PTDDC is configured to receive disk drive data access command (DDDAC) input via said PTI port;

said each PTDDC is configured to translate said DDDAC and electrically transmit said translation to said DDI port in a form suitable for use by a SATA disk drive connected to said DDIC;

said each PTDDC determines when said DDDAC falls within the logical block address (LBA) range of said SATA disk drive, and when so, passes said DDDAC to said SATA disk drive after modifying said DDDAC to account for said LBA range mapped by said SATA disk drive;

said each PTDDC determines when said DDDAC falls within said LBA range of said SATA disk drive, and when not, said DDDAC is passed via said PTO port to a PTI port of a daisy-chained PTDDC; and said PTDDCs are configured to implement a RAID-1 READ function comprising the following data transfer operations on said PTDDCs:

(1) with a host computer, writing a starting READ LBA (LBA_RW) via a host bus adapter (HBA) to a first PTDDC-configured disk drive connected in said daisy-chain;

with a currently selected PTDDC in said daisy-chain, receiving said LBA_RW from a PTDDC PTI port and storing said LBA_RW in a local match register (LMR);

with said currently selected PTDDC, writing said LBA_RW via a PTO port on said PTDDC to a next PTDDC in said daisy-chain;

determining if all PTDDCs in said daisy-chain have not been updated, and if not, then proceeding to step (2) to continue updating said daisy-chain;

with said host computer, writing a starting transfer count (LBA_TC) via said HBA to said first PTDDC-configured disk drive;

with a currently selected PTDDC in said daisy-chain, receiving said LBA transfer count (LBA_TC) from said host computer via a PTDDC PTI port;

with said currently selected PTDDC, writing said LBA_TC via a PTO port to the next PTDDC in said daisy-chain;

determining if all PTDDCs in said daisy-chain have not been updated, and if not, then proceeding to step (6) to continue updating said daisy-chain;

with a PTDDC in said daisy-chain, calculating a starting LBA for an attached SATA disk drive and issuing a READ to said attached SATA disk drive; and with the first PTDDC able to respond to the host READ request, transparently transmitting READ data from the attached SATA disk to a PTDDC PTI port back to said host computer.

12. The data storage architecture system of claim 11 wherein said each PTDDC comprises an application specific integrated circuit (ASIC).

13. The data storage architecture system of claim 11 wherein said each PTDDC performs said translation by determining when the LBA values associated with said DDDAC falls within the LBA range of said attached disk drive, and when not, reducing the LBN values associated with said DDDAC by the LBA count of said attached disk drive and passing this resulting DDDAC via said PTO port to the PTI port of any daisy-chained PTDDC attached to said PTDDC PTO port.

14. The data storage architecture system of claim 11 further comprising a logical file system, said logical file system comprising a plurality of PTDDC controllers daisy-chained in series via connection of a PTO port from an upstream PTDDC to the PTI port on a downstream PTDDC, with each said PTDDC connected to a disk drive via a DDI port, and with the PTI port of the first PTDDC in said daisy-chain connected to the host bus adapter of a computer system.

15. The data storage architecture system of claim 14 wherein said logical file system is a MICROSOFT® New Technology File System (NTFS) file system configured to have a logical storage capacity larger than the sum of the storage capacity of disk drives attached to said plurality of series daisy-chained PTDDC controllers, with said logical storage capacity in excess of said disk drive capacity allocated to one or more RESERVED files within said logical file system, wherein a BASE LOCATION and EXTENT SIZE of said RESERVED files may be modified to permit addition of one or more supplemental disk drives/PTDDC controller combinations as these said supplemental disk drives/PTDDC controller combinations are added to the terminal end of the chain of said plurality of series daisy-chained PTDDC controllers.

16. A serial advanced technology attachment (SATA) disk drive storage array method implementing a Redundant Array of Independent Disks RAID-1 READ functionality in a serially connected plurality of SATA disk drives electrically coupled in a daisy-chain configuration using pass-thru disk drive controllers (PTDDCs), said method comprising:

(1) with a host computer, writing a starting READ logical block address (LBA) (LBA_RW) via a host bus adapter (HBA) to a first PTDDC-configured disk drive connected in said daisy-chain;

(2) with a currently selected PTDDC in said daisy-chain, receiving said LBA_RW from a PTDDC pass-thru input (PTI) port and storing said LBA_RW in a local match register (LMR);

(3) with said currently selected PTDDC, writing said LBA_RW via a pass-thru output (PTO) port on said PTDDC to a next PTDDC in said daisy-chain;

(4) determining if all PTDDCs in said daisy-chain have not been updated, and if not, then proceeding to step (2) to continue updating said daisy-chain;

(5) with said host computer, writing a starting transfer count (LBA_TC) via said HBA to said first PTDDC-configured disk drive;

(6) with a currently selected PTDDC in said daisy-chain, receiving said LBA transfer count (LBA_TC) from said host computer via a PTDDC PTI port;

(7) with said currently selected PTDDC, writing said LBA_TC via a PTO port to the next PTDDC in said daisy-chain;

(8) determining if all PTDDCs in said daisy-chain have not been updated, and if not, then proceeding to step (6) to continue updating said daisy-chain;

(9) with a PTDDC in said daisy-chain, calculating a starting LBA for an attached SATA disk drive and issuing a READ to said attached SATA disk drive; and

(10) with the first PTDDC able to respond to the host READ request, transparently transmitting READ data from the attached SATA disk to a PTDDC PTI port back to said host computer;

wherein:

said PTDDCs each comprise a pass-thru input (PTI) port, a pass-thru output (PTO) port, and a disk drive interface (DDI) port;

said PTDDCs are configured to connect a plurality of PTDDCs to form a serial daisy-chain by only interconnecting the PTO port of one PTDDC to the PTI port of another PTDDC in said daisy-chain;

said PTI ports, said PTO ports, and said DDI ports are configured as SATA interfaces;

said each PTDDC is configured to present a continuous logical block address space via said PTI port comprising disk drives electrically connected to PTDDCs in said daisy-chain;

said each PTDDC is configured to receive disk drive data access command (DDDAC) input via said PTI port;

said each PTDDC is configured to translate said DDDAC and electrically transmit said translation to said DDI port in a form suitable for use by a SATA disk drive connected to said DDIC;

said each PTDDC determines when said DDDAC falls within the logical block address (LBA) range of said SATA disk drive, and when so, passes said DDDAC to said SATA disk drive after modifying said DDDAC to account for said LBA range mapped by said SATA disk drive;

said each PTDDC determines when said DDDAC falls within said LBA range of said SATA disk drive, and when not, said DDDAC is passed via said PTO port to a PTI port of a daisy-chained PTDDC.

17. The data storage architecture system of claim 16 wherein said each PTDDC comprises an application specific integrated circuit (ASIC).

18. The data storage architecture system of claim 16 wherein said each PTDDC performs said translation by determining when the LBA values associated with said DDDAC falls within the LBA range of said attached disk drive, and when not, reducing the LBN values associated with said DDDAC by the LBA count of said attached disk drive and passing this resulting DDDAC via said PTO port to the PTI port of any daisy-chained PTDDC attached to said PTDDC PTO port.

19. The data storage architecture system of claim 16 further comprising a logical file system, said logical file system comprising a plurality of PTDDC controllers daisy-chained in series via connection of a PTO port from an upstream PTDDC to the PTI port on a downstream PTDDC, with each said PTDDC connected to a disk drive via a DDI port, and with the PTI port of the first PTDDC in said daisy-chain connected to the host bus adapter of a computer system.

20. The data storage architecture system of claim 19 wherein said logical file system is a MICROSOFT® New Technology File System (NTFS) file system configured to have a logical storage capacity larger than the sum of the storage capacity of disk drives attached to said plurality of series daisy-chained PTDDC controllers, with said logical storage capacity in excess of said disk drive capacity allocated to one or more RESERVED files within said logical file system, wherein a BASE LOCATION and EXTENT SIZE of said RESERVED files may be modified to permit addition of one or more supplemental disk drives/PTDDC controller combinations as these said supplemental disk drives/PTDDC controller combinations are added to the terminal end of the chain of said plurality of series daisy-chained PTDDC controllers.

\* \* \* \* \*